United States Patent
Akhalwaya et al.

(10) Patent No.: US 12,505,370 B2
(45) Date of Patent: Dec. 23, 2025

(54) LINEAR-DEPTH QUANTUM SYSTEM FOR TOPOLOGICAL DATA ANALYSIS

(71) Applicant: International Business Machines Corporation, Armonk, NY (US)

(72) Inventors: Ismail Yunus Akhalwaya, Emmarentia (ZA); Shashanka Ubaru, Ossining, NY (US); Kenneth Lee Clarkson, Madison, NJ (US); Mark S. Squillante, Greenwich, CT (US); Vasileios Kalantzis, White Plains, NY (US); Lior Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 17/863,524

(22) Filed: Jul. 13, 2022

(65) Prior Publication Data
US 2024/0028939 A1    Jan. 25, 2024

(51) Int. Cl.
*G06N 10/20*    (2022.01)
*G06N 10/40*    (2022.01)

(52) U.S. Cl.
CPC ............. *G06N 10/40* (2022.01); *G06N 10/20* (2022.01)

(58) Field of Classification Search
USPC .................. 716/100, 101, 104, 106
See application file for complete search history.

(56) References Cited

U.S. PATENT DOCUMENTS 9,275,011 B2    3/2016 Svore et al.
9,430,688 B1    8/2016 Ray
(Continued)

FOREIGN PATENT DOCUMENTS

CN    110443785 A    11/2019
CN    110612540 A    12/2019
(Continued)

OTHER PUBLICATIONS

Ubaru, Shashanka et al., "Quantum Topological Data Analysis with Linear Depth and Exponential Speedup," arXiv preprint arXiv:2108.02811, Aug. 5, 2021, 27 pages (Grace Period Disclosure).
(Continued)

*Primary Examiner* — Brian Ngo
(74) *Attorney, Agent, or Firm* — Scully, Scott, Murphy & Presser, P.C.; Erik Johnson

(57) ABSTRACT

A quantum computer-implemented system, method, and computer program product for quantum topological domain analysis (QTDA). The QTDA method achieves an improved exponential speedup and depth complexity of $O(n \log(1/(\delta \epsilon)))$ where n is the number of data points, $\epsilon$ is the error tolerance, $\delta$ is the smallest nonzero eigenvalue of the restricted Laplacian, and achieves quantum advantage on general classical data. The QTDA system and method efficiently realizes a combinatorial Laplacian as a sum of Pauli operators; performs a quantum rejection sampling and projection approach to build the relevant simplicial complex repeatedly and restrict the superposition to the simplices of a desired order in the complex; and estimates Betti numbers using a stochastic trace/rank estimation method that does not require Quantum Phase Estimation. The quantum circuit and QTDA method exhibits computational time and depth complexities for Betti number estimation up to an error tolerance $\epsilon$.

25 Claims, 45 Drawing Sheets

(56) References Cited

U.S. PATENT DOCUMENTS

| | | | |
|---|---|---|---|
| 10,311,370 | B2 | 6/2019 | Bravyi et al. |
| 10,977,546 | B2 | 4/2021 | Gambetta et al. |
| 11,625,637 | B2 | 4/2023 | Gidney |
| 12,001,925 | B2 | 6/2024 | Barber et al. |
| 2007/0036434 | A1 | 2/2007 | Saveliev |
| 2015/0363708 | A1 | 12/2015 | Amin et al. |
| 2016/0191060 | A1 | 6/2016 | McDermott et al. |
| 2017/0147946 | A1 | 5/2017 | Umeda |
| 2018/0025073 | A1 | 1/2018 | Singh et al. |
| 2018/0287788 | A1 | 10/2018 | Damin |
| 2019/0164034 | A1 | 5/2019 | Gambetta et al. |
| 2020/0265274 | A1 | 8/2020 | Kachman et al. |
| 2020/0342380 | A1* | 10/2020 | Selina .............. G06Q 10/06315 |
| 2020/0349050 | A1 | 11/2020 | Ghobadi et al. |
| 2020/0349459 | A1 | 11/2020 | Cao et al. |
| 2021/0058244 | A1 | 2/2021 | Jacak et al. |
| 2021/0089953 | A1 | 3/2021 | Bocharov et al. |
| 2021/0232960 | A1 | 7/2021 | Genin et al. |
| 2021/0256410 | A1 | 8/2021 | Bravyi et al. |
| 2021/0256414 | A1* | 8/2021 | Kachman .......... G06F 18/24155 |
| 2021/0272009 | A1 | 9/2021 | Gidney et al. |
| 2021/0329601 | A1 | 10/2021 | Li |
| 2021/0383022 | A1 | 12/2021 | Bennati et al. |
| 2022/0058435 | A1 | 2/2022 | Ou et al. |
| 2022/0084398 | A1 | 3/2022 | Zhang et al. |
| 2022/0172050 | A1 | 6/2022 | Dalli et al. |
| 2022/0180214 | A1* | 6/2022 | Cervantes ................ G06N 3/08 |
| 2022/0299341 | A1 | 9/2022 | Zhang |
| 2023/0040289 | A1 | 2/2023 | Sels et al. |
| 2023/0080319 | A1 | 3/2023 | Zhang et al. |
| 2023/0104188 | A1 | 4/2023 | Zilberman et al. |
| 2023/0401792 | A1 | 12/2023 | Hofmann |
| 2024/0020563 | A1 | 1/2024 | Akhalwaya et al. |
| 2024/0020564 | A1 | 1/2024 | Ubaru et al. |
| 2024/0020565 | A1 | 1/2024 | Ubaru et al. |
| 2024/0022247 | A1 | 1/2024 | Ubaru et al. |
| 2024/0037304 | A1 | 2/2024 | Akhalwaya et al. |
| 2024/0296367 | A1 | 9/2024 | Rubin et al. |

FOREIGN PATENT DOCUMENTS

| | | |
|---|---|---|
| CN | 112651418 A | 4/2021 |
| CN | 113204738 A | 8/2021 |
| WO | 2014/081882 A2 | 5/2014 |
| WO | 2020164772 A1 | 8/2020 |
| WO | 2020/263146 A1 | 12/2020 |

OTHER PUBLICATIONS

Hayakawa, Ryu, "Quantum Algorithm for Persistent Betti Numbers and Topological Data Analysis," arXiv preprint arXiv:2111.00433, Oct. 31, 2021, 25 pages.

Seth Lloyd,"Quantum algorithms for topological and geometric analysis of data." arXiv:1408.3106v2 [quant-ph] Dec. 15, 2015 20 pages https://arxiv.org/abs/1408.3106.

Grover L.K.: A fast quantum mechanical algorithm for database search, Proceedings, 28th Annual ACM Symposium on the Theory of Computing, (May 1996) p. 212-219 https://arxiv.org/abs/quant-ph/9605043.

Jajij, Mustafa et al., "Simplicial Complex Representation Learning," arXiv preprint arXiv:2103.04046, Feb. 22, 2022, 10 pages.

NIST, "NIST Cloud Computing Program", http://csrc.nist.gov/groups/SNS/cloud-computing/index.html, Created Dec. 1, 2016, Updated Oct. 6, 2017, 9 pages.

Horesh, L., et al., "Quantum Computing Algorithms for Decision Making Under Uncertainty", Jul. 14, 2021, 111 pages (Grace Period Disclosure).

Low, G.H., et al., "Optimal Hamiltonian Simulation by Quantum Signal Processing", arXiv:1606.02685v2, Dec. 20, 2016, 6 pages.

Van Den Berg, E., et al., "Circuit optimization of Hamiltonian simulation by simultaneous diagonalization of Pauli clusters", arXiv:2003.13599v2, Sep. 5, 2020, 28 pages.

Cade, Chris, and Ashley Montanaro. "The Quantum Complexity of Computing Schatten norms." arXiv preprint arXiv:1706.09279 (Jun. 28, 2017). 28 Pages.

Luongo, Alessandro, and Changpeng Shao. "Quantum algorithms for spectral sums." arXiv preprint arXiv:2011.06475 (Nov. 12, 2020). 24 Pages.

Gyurik, Casper, Chris Cade, and Vedran Dunjko. "Towards quantum advantage for topological data analysis." arXiv e-prints (Mar. 1, 2020): arXiv-2005. 29 Pages.

Avron, Haim, and Sivan Toledo. "Randomized algorithms for estimating the trace of an implicit symmetric positive semi-definite matrix." Journal of the ACM (JACM) 58.2 (Apr. 2010): 16 Pages.

Hutchinson, M.F., 1989. A stochastic estimator of the trace of the influence matrix for Laplacian smoothing splines. Communications in Statistics-Simulation and Computation, 18(3), pp. 1059-1076.

Brakerski, Zvika, and Shmueli, Omri "(Pseudo) Random Quantum States with Binary Phase." Theory of Cryptography Conference. Springer, Cham, Jun. 26, 2019, 21 pages.

Fitzsimons, Jack K. et al., "Improved Stochastic Trace Estimation using Mutually Unbiased Bases," arXiv preprint arXiv:1608.00117, Jul. 30, 2016, 5 pages.

Fika, Paraskevi et al., "Estimation of the Bilinear Form y☐ f (A) x for Hermitian Matrices," Linear Algebra and its Applications 502, 2016, pp. 140-158. (See article history for dates).

Ubaru, Shashanka, and Yousef Saad. "Fast methods for estimating the numerical rank of large matrices." International Conference on Machine Learning. PMLR, 2016. 10 Pages.

Han, I., Malioutov, D., Avron, H., & Shin, J. (2017). Approximating spectral sums of large-scale matrices using stochastic chebyshev approximations. SIAM Journal on Scientific Computing, 39(4), A1558-A1585. Mar. 9, 2017 30 Pages.

Fan, Li et al., "Spectrum-Adapted Polynomial Approximation for Matrix Functions," arXiv preprint arXiv:1808.09506, Aug. 28, 2018, 5 pages.

Han, Insu et al., "Stochastic Chebyshev Gradient Descent for Spectral Optimization," Advances in Neural Information Processing Systems 31, 2018, 11 pages.

Akhalwaya, Ismail Yunus et al., "Don't Count the Shots, Make the Shots Count: Efficient Quantum Computation of the Fermionic Boundary Operator", arXiv:2201.11510v1, Jan. 27, 2022, 16 pages (Grace Period Disclosure).

Non-Final Rejection Mailed on Apr. 11, 2025 for U.S. Appl. No. 17/863,449, 8 page(s).

Non-Final Rejection Mailed on Jun. 30, 2025 for U.S. Appl. No. 17/863,508, 25 page(s).

Non-Final Rejection Mailed on Aug. 22, 2025 for U.S. Appl. No. 17/863,484, 6 page(s).

A Holzner et al., "Chebyshev matrix product state approach for spectral functions", published to Physical Review B 83, 195115, May 10, 2011, 20 pages.

C. Bekas, et al., "An Estimator for the Diagonal of a Matrix", Jun. 1, 2005, 22 pages, https://www-users.cse.umn.edu/~saad/PDF/umsi-2005-082.pdf.

Cortinovis et al., "On Randomized Trace Estimates for Indfeinite Matrices with an Application to Determinants", published to Foundations of Computational Mathematics, Jul. 9, 2021, 29 pages.

Costa et al., "Topological data analysis and applications", published via MIPRO, May 22-26, 2017, 06 pages.

Jonnadula et al., "On the moments of characteristics polynomials", Jun. 22, 2021, 26 pages.

Marco Taboga, "Trace of a matrix", Mar. 13, 2019, 04 pages, https://www.statlect.com/matrix-algebra/trace-of-a-matrix.

United States Non-Final Rejection dated Oct. 16, 2025, 17 pages, in U.S. Appl. No. 17/863,554.

United States Notice of Allowance dated Nov. 4, 2025, 17 pages, in U.S. Appl. No. 17/863,508.

* cited by examiner

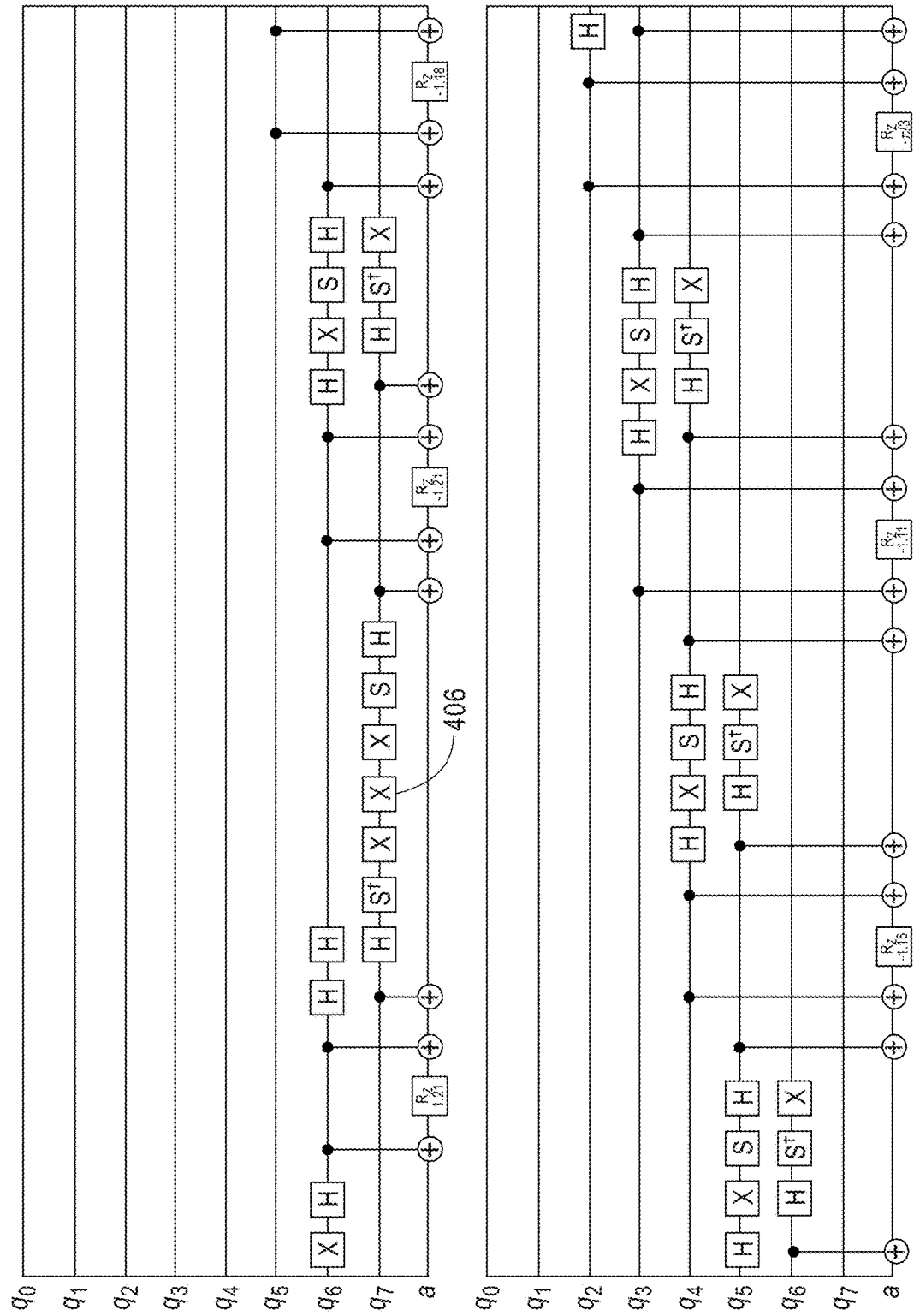
FIG. 5 (CONT. -1)

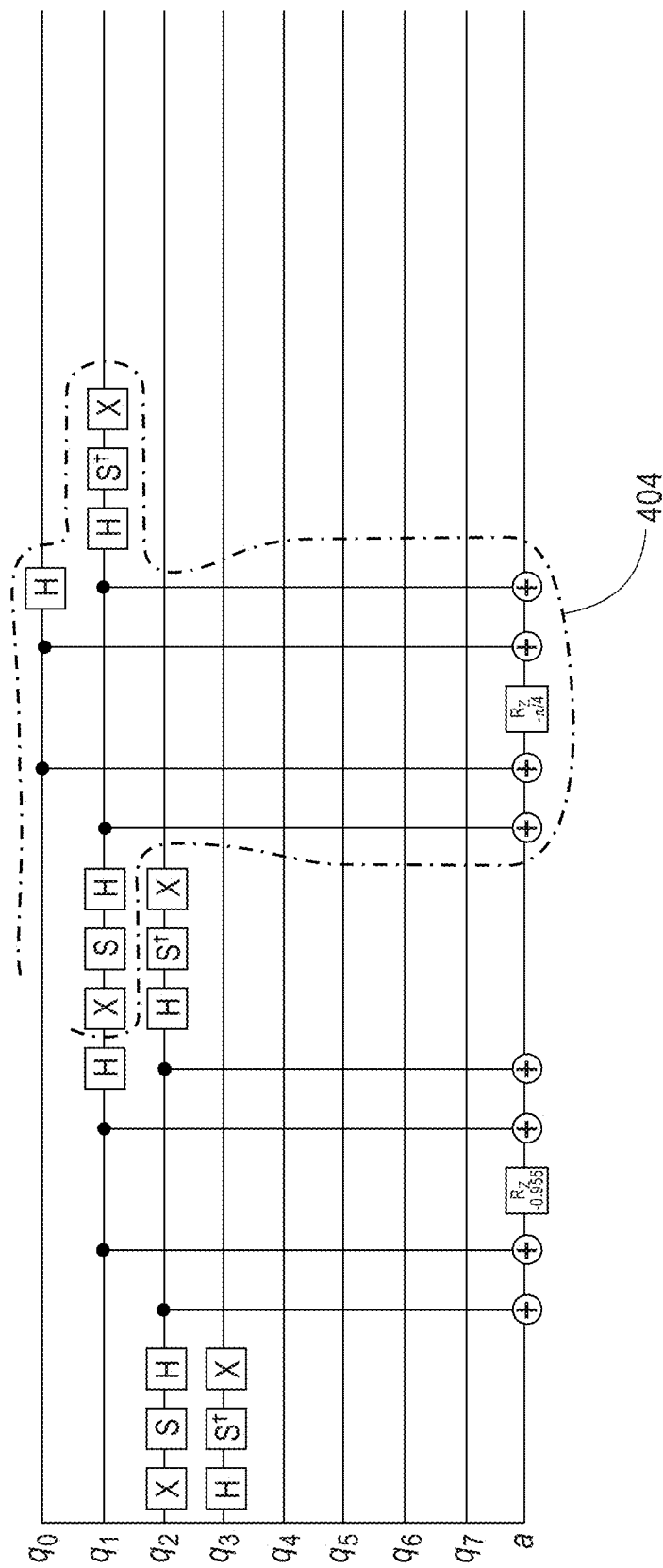
FIG. 5 (CONT. -2)

| Dimension | State | Simplex | Vertices/Pairs Included |
|---|---|---|---|
| - | $s_0$ | $\emptyset$ | - |
| 0 | $s_1$ | $v_0$ | $v_0$ |
| 0 | $s_2$ | $v_1$ | $v_1$ |
| 0 | $s_3$ | $v_2$ | $v_2$ |
| 0 | $s_4$ | $v_3$ | $v_3$ |
| 1 | $s_5$ | $line(v_0, v_1)$ | $(v_0, v_1)$ |
| 1 | $s_6$ | $line(v_0, v_2)$ | $(v_0, v_2)$ |
| 1 | $s_7$ | $line(v_0, v_3)$ | $(v_0, v_3)$ |
| 1 | $s_8$ | $line(v_1, v_2)$ | $(v_1, v_2)$ |
| 1 | $s_9$ | $line(v_1, v_3)$ | $(v_1, v_3)$ |
| 1 | $s_{10}$ | $line(v_2, v_3)$ | $(v_2, v_3)$ |
| 2 | $s_{11}$ | $triangle(v_0, v_1, v_2)$ | $(v_0, v_1), (v_0, v_2), (v_1, v_2)$ |
| 2 | $s_{12}$ | $triangle(v_0, v_1, v_3)$ | $(v_0, v_1), (v_0, v_3), (v_1, v_3)$ |
| 2 | $s_{13}$ | $triangle(v_0, v_2, v_3)$ | $(v_0, v_2), (v_0, v_3), (v_2, v_3)$ |
| 2 | $s_{14}$ | $triangle(v_1, v_2, v_3)$ | $(v_1, v_2), (v_1, v_3), (v_2, v_3)$ |
| 3 | $s_{15}$ | $tetrahedron(v_0, v_1, v_2, v_3)$ | $(v_0, v_1), (v_0, v_2), (v_0, v_3),$ $(v_1, v_2), (v_1, v_3), (v_2, v_3)$ |

FIG. 13

| Dimension | State | Simplex | Vertices/Pairs Included |
|---|---|---|---|
| - | $s_0$ | $\emptyset$ | - |
| 0 | $s_1$ | $v_0$ | $v_0$ |
| 0 | $s_2$ | $v_1$ | $v_1$ |
| 0 | $s_3$ | $v_2$ | $v_2$ |
| 0 | $s_4$ | $v_3$ | $v_3$ |
| 1 | $s_5$ | line($v_0, v_1$) | ($v_0, v_1$) |
| 1 | $s_6$ | line($v_0, v_2$) | ~~($v_0, v_2$)~~ |
| 1 | $s_7$ | line($v_0, v_3$) | ~~($v_0, v_3$)~~ |
| 1 | $s_8$ | line($v_1, v_2$) | ~~($v_1, v_2$)~~ |
| 1 | $s_9$ | line($v_1, v_3$) | ~~($v_1, v_3$)~~ |
| 1 | $s_{10}$ | line($v_2, v_3$) | ($v_2, v_3$) |
| 2 | $s_{11}$ | triangle($v_0, v_1, v_2$) | ($v_0, v_1$), ~~($v_0, v_2$)~~, ~~($v_1, v_2$)~~ |
| 2 | $s_{12}$ | triangle($v_0, v_1, v_3$) | ($v_0, v_1$), ~~($v_0, v_3$)~~, ~~($v_1, v_3$)~~ |
| 2 | $s_{13}$ | triangle($v_0, v_2, v_3$) | ~~($v_0, v_2$)~~, ~~($v_0, v_3$)~~, ($v_2, v_3$) |
| 2 | $s_{14}$ | triangle($v_1, v_2, v_3$) | ~~($v_1, v_2$)~~, ~~($v_1, v_3$)~~, ($v_2, v_3$) |
| 3 | $s_{15}$ | diamond($v_0, v_1, v_2, v_3$) | ~~($v_0, v_1$)~~, ~~($v_0, v_2$)~~, ~~($v_0, v_3$)~~, ~~($v_1, v_2$)~~, ~~($v_1, v_3$)~~, ~~($v_2, v_3$)~~ |

FIG. 15

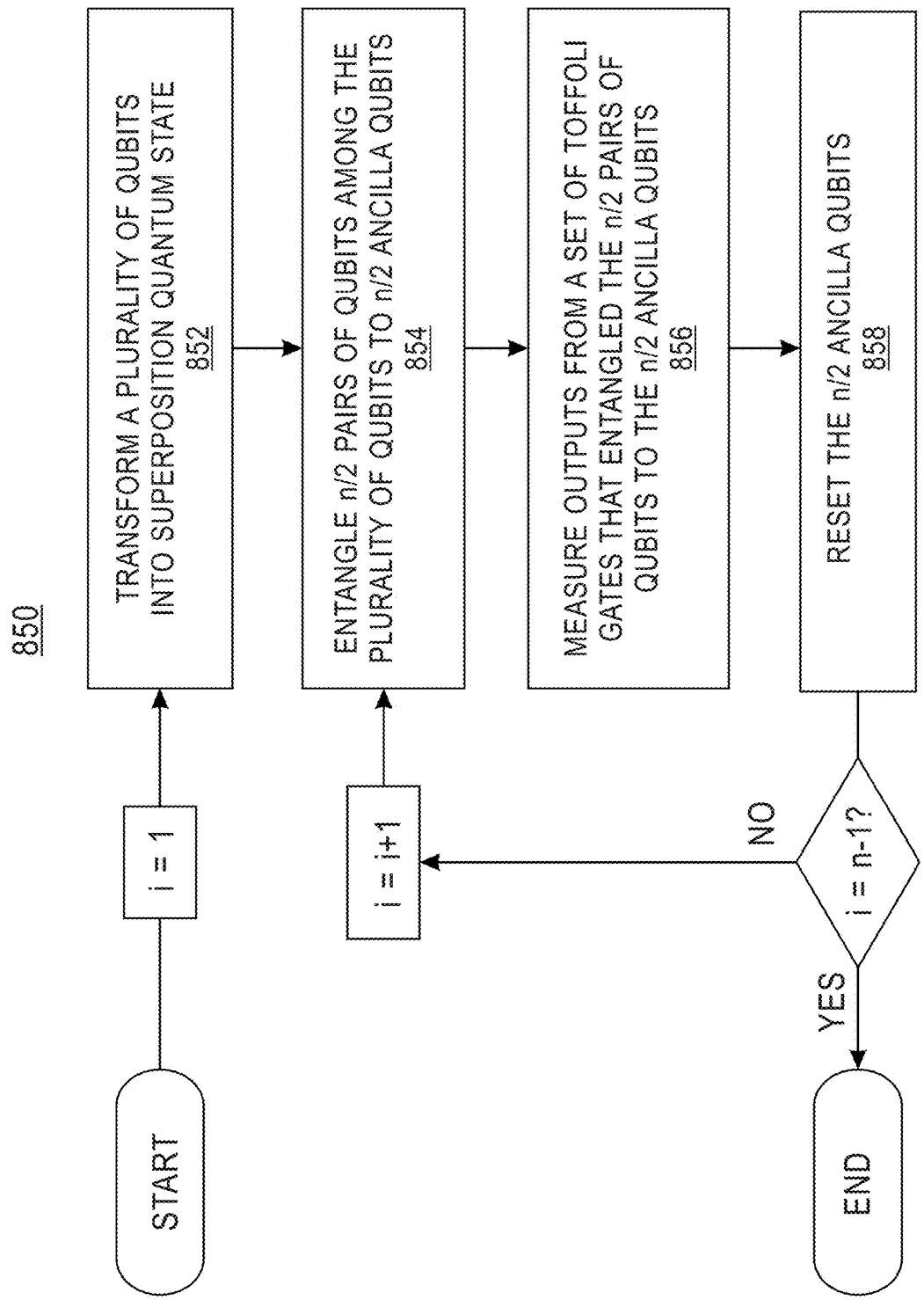

Algorithm 1 NISQ-QTDA Algorithm  ⎯ 1005

Input: Pairwise distances of $n$ data points and encoding of the $\varepsilon$-close pairs; parameters $\epsilon, \delta$, and $n_v = O(\epsilon^{-2})$; and $n_v$ $n$-bit random binary numbers. ⎯ 1010

Output: Betti number estimates $\chi_k$, $k = 0, \ldots, n-1$.

for $l = 1, \ldots, n_v$ do
  for $i = 0, \ldots, m = O(\log(1/(\delta\epsilon)))$ do
    1. Prepare a random Hadamard state vector $|v_l\rangle$ from $|0\rangle$ using the $l$-th random number. ⎯ 1030
    2. Apply $P_{\mathrm{T}}$, apply $P_k$, and simulate $B$ to obtain
$$|\phi_l^{(i)}\rangle = \left(\prod_{j=0}^{j=i-1} P_{\mathrm{T}} P_k^{j\mathcal{K}_2} B\right) P_{\mathrm{T}} P_k |v_l\rangle;^{11}$$
    Save the value of $\dim \mathcal{H}_k$ the first time by leaving out $P_{\mathrm{T}} P_k^{j\mathcal{K}_2} B$ (i.e., $i = 0$). ⎯ 1033
    3. Compute the moments $\mu_l^{(i)} = \langle v_l | \Delta_k^i | v_l \rangle$ as $\mu_l^{(i)} = \langle \phi_l^{(i)} | \phi_l^{(i)} \rangle$ or $= \||\phi_l^{(i)}\rangle\|^2$;
    Readout the $\mu_l^{(i)}$ and compute the Chebyshev moments $\theta_l^{(j)} = \langle v_l | T_j(\Delta_k) | v_l \rangle$ using (11). ⎯ 1036
  end for
end for
Estimate $\chi_k = 1 - \frac{1}{n_v \dim \mathcal{H}_k} \sum_{l=1}^{n_v} \left[\sum_{j=0}^{m} c_j \theta_l^{(j)}\right]$. ⎯ 1050
*Repeat* for $k = 0, \ldots, n-1$.

LINEAR-DEPTH QUANTUM SYSTEM FOR TOPOLOGICAL DATA ANALYSIS

STATEMENT REGARDING FEDERALLY SPONSORED RESEARCH OR DEVELOPMENT

This invention was made with government support under contract number FA8750-18-C-0098 awarded by the U.S. Air Force Research Lab. The government has certain rights to this invention.

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE(S): Quantum Computing Algorithms for Decision Making under Uncertainty, Lior Horesh, Ken Clarkson, Vasileios Kalantzis, Mark Squillante, Shashanka Ubaru, Amir Abboud, July 2021;
Quantum Topological Data Analysis with Linear Depth and Exponential Speedup, Shashanka Ubaru, Ismail Yunus Akhalwaya, Mark S. Squillante, Kenneth L. Clarkson, Lior Horesh, arXiv:2108.02811v1, Aug. 5, 2021;
Don't Count the Shots, Make the Shots Count: Efficient Quantum Computation of the Fermionic Boundary Operator, Ismail Yunus Akhalwaya, Yang-Hui He, Lior Horesh, Vishnu Jejjala, William Kirby, Kugendran Naidoo, Shashanka Ubaru, arXiv:2201.11510v1, Jan. 27, 2022.

FIELD

The present application relates generally to information handling, data processing, and/or data analytics, and more particularly to systems, platforms, computer program products, and/or methods for topological classification, and more specifically, to a quantum system implementing quantum machine learning methods for topological classification.

BACKGROUND

Topological data analysis (TDA) is a field of mathematics which deals with qualitative geometric features to analyze datasets. TDA encompasses a collection of powerful tools that have an ability to quantify shape and structure in data to answer questions and gain information from the data's domain.

Topological data analysis techniques utilize algebraic topology formulations to provide a framework to analyze datasets that are high-dimensional, incomplete and noisy in a manner that can be insensitive to a particular metric chosen, provide dimensionality reduction, and/or be robust to noise found in the subject data. Further, topological data analysis can be facilitated by machine learning, deep learning, classification, inference, and/or artificial intelligence tasks. For instance, one or more machine learning tasks can utilize principals of algebraic topology to generate higher and higher levels of abstraction of the subject data, wherein determinations regarding characteristics of the data can then be performed based on the abstractions rather than the raw data.

Traditionally, classical computing techniques have been implemented to perform topological data analyses. Classical computing techniques can readily execute topological data analyses on large datasets. Given the low cost and availability of processing power for classical computing devices, classical computing techniques can exhibit a desired efficiency in analyzing large datasets. However, analysis by classical computing techniques can be limited by the complexity of the data.

While TDA has garnered significant interest in the applied mathematics community as it is one of the few "big data" algorithms that can consume massive datasets and reduce them to a handful of global and interpretable signature numbers, laden with predictive and analytical value, unfortunately, classical algorithms for TDA have significant computational demands.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, platform, processing pipeline, their architectural structure, the computer program product, and/or their method of operation to achieve different effects. In this regard it will be appreciated that the disclosure presents and describes one or more inventions, and in aspects includes numerous inventions as defined by the claims.

A system, method and computer program product are implemented that implement quantum computing techniques that can readily execute topological data analyses on complex datasets, and that achieve a level of circuit depth and fault tolerance that heretofore cannot be readily achieved in near term quantum computing.

A system, method and computer program product has been developed to run a Quantum Machine Learning (QML) algorithm with linear-depth complexity and exponential speedup on arbitrary input. The algorithm can be implemented generically as a Noisy Intermediate-Scale Quantum (NISQ) algorithm with quantum advantage on NISQ devices.

In particular, the system, method and computer program product provides a NISQ-based quantum topological data analysis (NISQ-QTDA) algorithm that has an improved exponential speedup and improved depth complexity.

In an embodiment, the quantum topological data analysis algorithm has an improved exponential speedup and a depth complexity of $O(n)$, where n is the number of data points.

In embodiments, the system, method and computer program product is directed to a NISQ-QTDA algorithm that provides an efficient representation of a boundary operator as a sum of Pauli operators;

In embodiments, the NISQ-QTDA algorithm implements a quantum rejection sampling technique to build the relevant simplicial complex;

Further, in embodiments, the NISQ-QTDA algorithm implements a stochastic rank estimation method to estimate the Betti numbers that does not require Quantum Phase Estimation (QPE), i.e., the eigen-decomposition of the combinatorial Laplacian.

The approach of the present disclosure facilitates the elimination of the fault-tolerance requirement based on a key observation that while QPE provides estimates of the actual eigenvalues, there is only needed the dimension of the kernel, i.e., the count of the zero eigenvalues, and thus QPE is able to be replaced with an alternative method.

According to an aspect, there is provided a computer-implemented method of analyzing topological data. The method comprises: receiving, by a controller of a quantum system, an instruction; generating, by the controller of the quantum system, a command signal based on the instruction; converting, by an interface of the quantum system, the command signal into a quantum operation; and based on the quantum operation, controlling quantum hardware including a plurality of qubits encoding an input dataset comprising a plurality of data points, a topology of the dataset is represented by a simplicial complex, the controlling quantum hardware configuring a first quantum circuit to simulate a boundary map operator that creates a mapping of boundaries of a given graph having at least nodes and edges formed using the input dataset, the first quantum circuit having linear depth relative to number of nodes in the given graph; and further controlling the quantum hardware to implement a second quantum circuit configured to simulate a combinatorial Laplacian of simplices of a specific order in the simplicial complex based on the simplicial complex and boundary map operator; estimating Betti numbers by computing, using a hardware processor, a stochastic rank estimation of the combinatorial Laplacian; and obtaining, using the hardware processor of a computing system, one or more features of the input dataset based on a Betti number estimate.

According to one or more aspects, there is provided a system platform for analyzing topological data. The system comprises: a controller configured to generate command signals; quantum hardware including a plurality of qubits encoding an input dataset comprising a plurality of data points, a topology of the dataset is represented by a simplicial complex; an interface connected to the controller and the quantum hardware, the interface being configured to control the quantum hardware based on the command signals to implement a first quantum circuit configured to simulate a boundary map operator that creates a mapping of boundaries of a given graph having at least nodes and edges formed using the input dataset, the quantum circuit having linear depth relative to number of nodes in the given graph; the interface being configured to further control the quantum hardware to implement a second quantum circuit configured to simulate a combinatorial Laplacian of simplices of a specific order in the simplicial complex based on the simplicial complex and boundary map operator; and a hardware processor configured to estimate Betti numbers by computing a stochastic rank estimation of the combinatorial Laplacian and obtain one or more features of the input dataset based on a Betti number estimate.

According to a further aspect, there is provided an apparatus. The apparatus comprises: a controller configured to at least: receive an instruction from the first computing device; and generate a command signal based on the instruction; quantum hardware including a plurality of qubits; and an interface connected to the controller and the quantum hardware, the interface being configured to control the quantum hardware based on the command signal received from the controller to apply a first projector onto a simplicial order, the simplicial order being an order in a given simplicial complex representing a topology of a dataset; apply a second projector onto the given simplicial complex; and simulate a boundary operator that creates a mapping of simplices of orders in the given simplicial complex, wherein the application of the first projector, the second projector and the boundary operator is interleaved.

In an embodiment, a computer programming product is provided that includes instructions that, when executed by at least one hardware processor, configure the at least one hardware processor to perform one or more of the steps, tasks, and/or functions described herein, and the system and/or platform includes a non-transitory memory storage device storing program instructions; and a hardware processor having circuitry and logic to execute said program instructions, wherein the hardware processor is in communication with said memory storage device and in response to executing said program instructions, is configured to perform the steps, task, and/or functions described herein.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and embodiments of a system, platform, computer program product, and/or method to optimize a fraud detection system for determining suspicious or fraudulent payment activity associated with a conducted transaction will be better understood when read in conjunction with the figures provided. Embodiments are provided in the figures for the purpose of illustrating aspects, features, and/or various embodiments of the systems, platforms, computer program products, and/or methods, but the claims should not be limited to the precise arrangement, structures, features, aspects, systems, platforms, modules, functional units, assemblies, subassemblies, circuitry, embodiments, instructions, programming, methods, processes, techniques, and/or devices shown, and the arrangements, structures, features, aspects, systems, platforms, modules, functional units, assemblies, subassemblies, circuitry, embodiments, instructions, programming, methods, processes, techniques, and/or devices shown may be used singularly or in combination with other arrangements, structures, features, aspects, assemblies, subassemblies, systems, platforms, modules, functional units, circuitry, embodiments, instructions, programming, methods, techniques, processes, and/or devices.

FIG. 13 is a diagram illustrating a plurality of simplices that may be in a simplicial complex in one embodiment.

FIG. 15 is a diagram illustrating an example result of an implementation of the quantum circuit shown in FIG. 4 in one embodiment.

FIG. 18A is a flowchart of an example process that may implement a quantum circuit for pairwise testing according to an embodiment of the disclosure.

FIG. 33 depicts a flow of the NISQ-QTDA algorithm for estimating Betti numbers according to the present disclosure.

DETAILED DESCRIPTION

Figure 1:
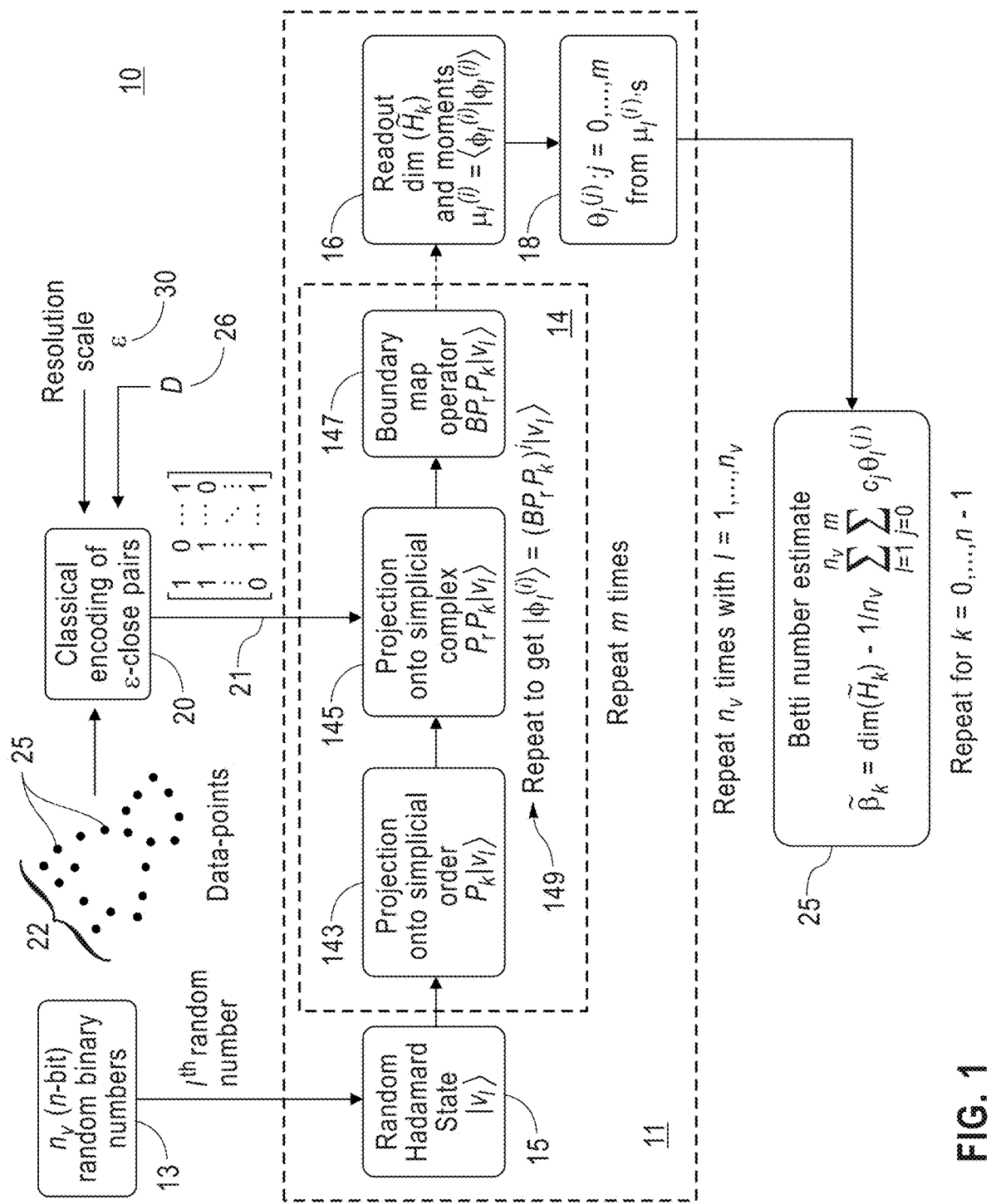
FIG. 1 is a block diagram of an NISQ-QTDA system according to an embodiment of the present disclosure.

The present application relates generally to computers and computer applications, and more particularly to quantum computing system and quantum circuits that can perform analytics such as topological data analysis (TDA).

As known, quantum computers uses quantum processors that operate on data represented by quantum bits, also known as qubits. One qubit can represent the classical binary states '0', '1', and also additional states that are superstitions of '0' and '1'. Due to the ability to represent superpositions of '0' and '1', a qubit can represent both '0' and '1' states at the same time. For example, if there are N bits of data, then $2^N$ quantum states can be represented at the same time. Further, qubits in a superposition can be correlated with each other, referred to as entanglement, where the state of one qubit (whether it is a 1 or a 0 or both) can depend on the state of another qubit, and more information can be encoded within the two entangled qubits. Based on superposition and entanglement principles, qubits can enable quantum computers to perform functions that may be relatively complex and time consuming for classical computers.

For example, quantum computers are capable of performing linear algebraic operations in exponentially large spaces, and promise to achieve significant asymptotic speed-ups over classical computers. Big data refers to a collection of data that can be huge in size and further can grow, for example, exponentially. Extracting useful information from large data sets can be a difficult task. Topological methods for analyzing data sets provide a powerful technique for extracting such information. Persistent homology is a useful technique that can analyze the data and extract such topological features—connected components, holes, or voids—and, for example, determine how such features persist as the data is viewed at different scales. While a homology technique can find clusters, loops and voids in large datasets, and thus can find interesting features in big data, a classical computer implementing such a tool can encounter many challenges, including, for example, problem solution scaling and operation times. Quantum computing can speed up the process.

TDA is a powerful machine learning and data analysis technique used to extract shape-related information of large data sets. TDA permits representing large volumes of data using a few global and interpretable features called Betti numbers. Classical algorithms for TDA and Betti number calculations are typically computationally expensive. While one known quantum algorithm proposed for TDA (or QTDA) may provably achieve exponential speed up over classical TDA algorithms under certain conditions, that quantum TDA (or QTDA) algorithm requires fault-tolerance, due to the need for a full Quantum Phase Estimation (which may be made worse by the embedded and repeated use of Grover's search).

In TDA, as the data can be high dimensional, for example, with a data point having many attributes, the TDA allows for interpretability of data and can be used in unsupervised learning where data can be grouped into subsets based on one or more criteria such as their characteristics or attributes. Persistent homology finds in data signature shapes that persist, e.g., local and/or global features in data. TDA or homology can include studying shapes in data, e.g., by finding number of connected components, holes, voids, and higher dimensional counterparts. Given a set of data-points in some ambient (possibly high-dimensional) space, TDA aims to extract a small set of robust and interpretable features that capture the "shape" of the dataset.

TDA can be considered a "big data" algorithm that can consume massive datasets and reduce them to a handful of global and interpretable signature Betti numbers, which can be used in predictions and analytics.

While a Quantum-circuit based Topological Data Analysis is known, the solutions are typically very complex (e.g., $O(n^4)$), and in one instance, requires repeated Grover Search (GS) techniques for clique construction and Quantum Phase Estimation (QPE) or eigen-decomposition for rank estimation which both require deep circuits and fault-tolerance. That is, currently known approaches to quantum TDA (QTDA) can require or assume a fault-tolerant system and deep depth quantum circuits.

In one or more embodiments, a technique described herein can provide one or more components such as quantum circuits for implementing a quantum machine learning (QML) algorithm with linear-depth complexity and provable exponential speedup on arbitrary input, providing a useful Noisy Intermediate-Scale Quantum (NISQ) algorithm with quantum advantage. For example, the technique presented herein aids in achieving NISQ-QTDA, a quantum topological data analysis algorithm that has an improved exponential speedup and a depth complexity of $O(n \log(1/(\delta\in)))$, where $\in$ denotes the error tolerance and $\delta$ is a sepactral gap parameter.

In one aspect, the following description is a system, method and computer program product that provides a quantum computer implementation for time domain analysis (TDA) employing settings that enables a Noisy Intermediate-Scale Quantum (NISQ) algorithm with quantum advantage on NISQ devices (NISQ-QTDA implementation) and achieves improved exponential speedup.

The TDA implementation on a NISQ computing system provides for obtaining, from a set of data-points in some ambient (sometimes high-dimensional) space, local and global topological data features at different scales of resolution for many types of data applications. In one data application, a topological data (TDA) solution is provided to obtain certain features of among a highly dimensional data.

For exemplary and non-limiting purposes, a NISQ computing system employing TDA is be applied for grouping patients according to data in patient records and obtain features or other information about patients based on data from multiple patient records. For example, patient records have highly-dimensional data, e.g., characteristics (features) that a health professional uses to measure a patient's wellness such as blood pressure, glucose level, heartbeat rate, temperature, oxygen level, etc. In an embodiment, a NISQ-QTDA implementation is employed for unsupervised learning, e.g., analyzing the pure high-dimensional dataset, e.g., for extracting a set of robust and interpretable features that capture the "shape" of the dataset.

FIG. 1 depicts a block diagram of a NISQ-QTDA computing system 10 according to one embodiment. NISQ-QTDA system 10 includes both conventional classical computing systems 11, 13, 16, 18, 20, 25 and NISQ computing device components 14, 15 employed for performing Quantum TDA analysis with linear depth and exponential speedup upon highly-dimensional data sets. Implementations of a linear-depth quantum system for TDA 10 include both quantum software simulation and real hardware elements that is NISQ implementable to run: a quantum machine learning (QML) algorithm with linear-depth complexity and provable exponential speedup on arbitrary input that open the doors to the first generically useful NISQ algorithm with quantum advantage; a quantum technique for Topological Data Analysis (TDA) that achieves exponential speedup over classical algorithms provably on arbitrary data; and a quantum circuit that implements QTDA with n+log n qubits, just O(n) depth and linear time complexity.

As shown in FIG. 1, the linear-depth quantum system for NISQ-QTDA 10 includes classical computing component 20 to form an adjacency matrix 21 depending upon the closeness parameter ε, i.e., a simplical complex "Γ" that is derived from data-points embedded in some ambient space. As known, a k-simplex is a collection of k+1 vertices forming a simple polytope of dimension k; e.g., 0-simplices are single points (zero-dimensional), 1-simplices are line segments (one-dimensional), 2-simplices are triangles (two-dimensional), and so on. A simplicial complex is a collection of such simplices (of any order), closed under adding all lower simplices, which are simplices obtained by removing one vertex (e.g., if a triangle is in a complex, then all three associated edge simplices are also in the complex and, recursively, so are all three associated points). Homology provides a linear-algebraic approach to extract, from simplicial complexes derived from the data, features that describe the "shape" of the data, such as the number of connected components, or holes (as in doughnuts), or voids (as in swiss cheese), or higher-dimensional holes/cavities.

Specifically, computing component 20 receives a set 22 of n data-points $\{x_i\}_{i=0}^{n-1}$ 25 in some space together with a distance metric $\mathcal{D}$ 26, and constructs a Vietoris-Rips simplicial complex by selecting a resolution/grouping scale ε 30 that defines the "closeness" of the points with respect to the distance metric $\mathcal{D}$, and then connecting the points that are a distance of ε from each other (i.e., connecting points $x_i$ and $x_j$ whenever $\mathcal{D}(x_i, x_j) \le \varepsilon$, forming a so-called 1-skeleton). A k-simplex is then added for every subset of k+1 data-points that are pair-wise connected (i.e., for every k-clique, the associated k-simplex is added). The resulting simplicial complex is related to the clique-complex from graph theory.

Further, in an embodiment, there is further received as input a binary numbers (n-bit) random binary numbers $n_v$ that is used to create random Hadamard states 15 using n-qubit Hadamard gate circuit. For example, in an embodiment, trace estimation of a matrix in the NISQ-TDA system 10 requires the generation of random quantum states $|v_l\rangle$ at quantum circuit 15 of short-depth and involves the sampling of a random Hadamard state vector in a quantum computer of short-depth circuit.

Further in FIG. 1, NISQ-QTDA system 10 computing components 14 employ a quantum hardware 143 for applying a projector $P_k$ onto a simplicial order k in the complex, a quantum hardware 145 for applying a projector $P_\Gamma$ onto the simplicial complex taking as input the ε-close skeleton 21, and a quantum hardware 147 and associated simulators and measuring devices to efficiently construct and apply a boundary map operator B to the k-simplex to obtain a set of k−1-simplices, which form the boundary of the simplex. For higher ordered powers 1 through m, where m is the degree of the polynomial, these quantum hardware circuits 143, 145, 147 are repeatedly applied m times, where $P_\Gamma$ is applied in an interleaved fashion. In an embodiment, the whole process is repeated for $n_v$ times using different "l" random vectors.

As will be described, at 147, FIG. 1, the simulation of the boundary operator B (also known as boundary map) for TDA can be achieved with a circuit comprising only O(n) gates. The system creates an efficient representation for the boundary operator B as a sum of Pauli operators. The quantum circuits 14 of system 10 can simulate or represent the boundary operator on a quantum computer. As will be described, in an embodiment, the boundary operator has a special structure in the form of a complete sum of fermionic creation and annihilation operators. In an embodiment, these operators pairwise anticommute to produce an $\mathcal{O}(n)$-depth circuit that can exactly implement the boundary operator without any Trotterization or Taylor series approximation errors. Having fewer errors reduces the number of measurement shots required to obtain desired accuracies. In one or more embodiments, the boundary operator is represented as a sum of Pauli operators. Pauli operators can map to quantum primitives or gates in quantum computing that can perform operations on qubits.

More specifically, the NISQ-QTDA system 10 runs an NISQ-QTDA algorithm that lets $S_k$ denote the set of k-simplices in the Vietoris-Rips complex $\Gamma = \{S_k\}_{k=0}^{n-1}$, with $s_k \in S_k$ written as $[j_0, \ldots, j_k]$ where $j_i$ is the ith vertex of $s_k$. Further, $\mathcal{H}_k$ is used to denote an $$\binom{n}{k+1}$$

-dimensional Hilbert space ((n choose k+1)-dimensional Hilbert space), with basis vectors corresponding to each of the possible k-simplices (all subsets of size k+1). Further $\tilde{\mathcal{H}}_k$ is used to denote the subspace of $\mathcal{H}_k$ spanned by the basis vectors corresponding to the simplices in $S_k$, and $|s_k\rangle$ denotes the basis state corresponding to $s_k \in S_k$. Then, the n-qubit Hilbert space $\mathbb{C}^{2^n}$ is given by $\mathbb{C}^{2^n} \cong \oplus_{k=0}^{n} \mathcal{H}_k$. The boundary map (operator) on k-dimensional simplices $\partial_k: \mathcal{H}_k \to \mathcal{H}_{k-1}$ is a linear operator and is defined by its action on the basis states as follows:

$$\partial_k |s_k\rangle = \Sigma_{l=0}^{k-1}(-1)^l |s_{k-1}(l)\rangle,$$

where $|s_{k-1}(l)\rangle$ is the lower simplex obtained by leaving out vertex l (i.e., $s_{k-1}$ has the same vertex set as $s_k$ except without $j_l$). It is noted that, $s_{k-1}$ is k−1-dimensional, one dimension less than $s_k$. The factor $(-1)^l$ produces the so-called oriented sum of boundary simplices, which keeps track of neighbouring simplices so that $\partial_{k-1}\partial_k|s_k\rangle = 0$, given that the boundary of the boundary is empty.

A boundary map $\tilde{\partial}_k: \tilde{\mathcal{H}}_k \to \tilde{\mathcal{H}}_{k-1}$ restricted to a given Vietoris Rips complex Γ is given by $\tilde{\partial}_k = \partial_k \tilde{P}_k$, where $\tilde{P}_k$ is the projector onto the space $S_k$ of k simplices in the complex. The full boundary operator on the fully connected complex (the set of all subsets of n points) is the direct sum of the k-dimensional boundary operators, namely $\partial = \oplus_k \partial_k$.

The k-homology group is the quotient space $\mathbb{H}_k := \ker(\tilde{\partial}_k)/\mathrm{img}(\tilde{\partial}_{k+1})$, representing all k-holes which are not "filled-in" by k+1 simplices and counted once when connected by k simplices (e.g., the two holes at the ends of a tunnel count once). Such global structures moulded by local relationships is what is meant by the "shape" of data. The kth Betti Number $\beta_k$ is the dimension of this k-homology group, namely $$\beta_k := \dim \mathbb{H}_k.$$

Figure 34:
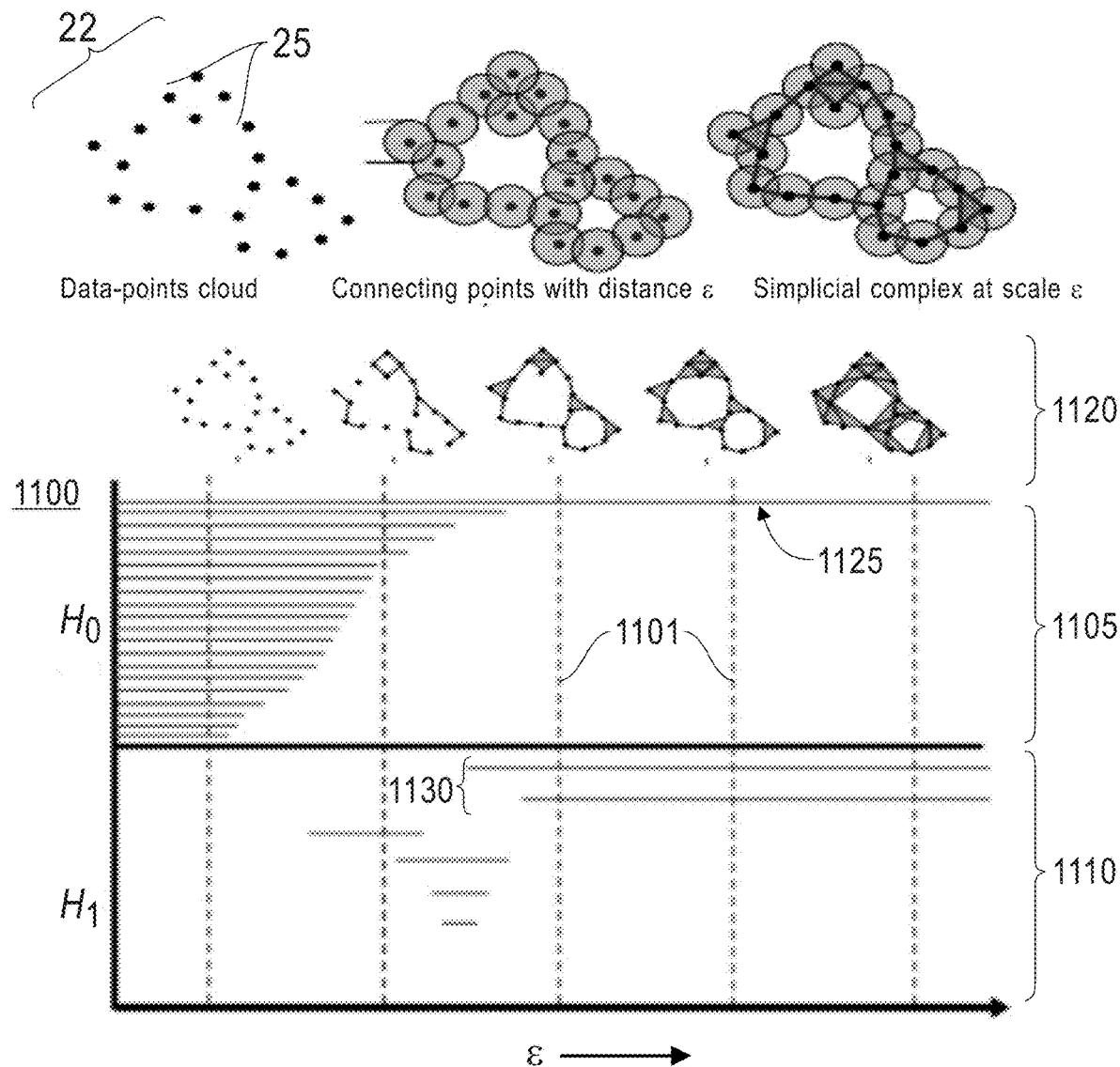
FIG. 34 illustrates an example bar graph depicting example output results of the NISQ-QTDA analysis for a given ε.

These Betti numbers therefore count the number of holes at scale ε, as described above. By computing the Betti numbers at different scales ε, there is obtained a persistence barcodes/diagrams, such as the barcode diagram 1100 shown in FIG. 34. In particular, the barcode diagram 1100 shown in FIG. 34 provides a set of powerful interpretable topological features that account for different scales ε (X-axis) while being robust to small perturbations and invariant to various data manipulations. These stable persistence diagrams not only provide information at multiple resolutions, but they aid in identifying, in an unsupervised fashion, the resolutions at which interesting structures exist.

For Betti numbers estimation, there is then computed the Combinatorial Laplacian, or Hodge Laplacian, of a given complex defined as $\Delta_k := \tilde{\partial}_k^\dagger \tilde{\partial}_k + \tilde{\partial}_{k+1}\tilde{\partial}_{k+1}^\dagger$. From the Hodge theorem, the method involves computing the kth Betti number as follows:

$$\beta_k := \dim \ker(\Delta_k).$$

Therefore, computing Betti numbers for TDA is viewed as a rank estimation problem (i.e., $\beta_k = \dim \tilde{\mathcal{H}}_k - \mathrm{rank}(\Delta_k)$).

Betti number estimation (BNE) is then defined as follows:

Given a set of n points, its corresponding Vietorisâ-Rips complex Γ, an integer $0 \le k \le n-1$, and the parameters (ϵ, η) ∈ (0,1), find the random value $\chi_k \in [0,1]$ that satisfies with probability 1-η the condition $$\left| \chi_k - \frac{\beta_k}{\dim \tilde{\mathcal{H}}_k} \right| \le \epsilon,$$

where dim $\tilde{\mathcal{H}}_k$ is the dimension of the Hilbert space spanned by the set of k-simplices in the complex (i.e., the number of k-simplices $|S_k|$ in $\Gamma$). To obviate taking super-polynomial time to compute this on a classical computer, a quantum TDA algorithm is implemented for BNE.

In an embodiment, NISQ-QTDA and BNE requires the simulation of the Laplacian $\Delta_k$ (or the Dirac operator $\tilde{B}$). That is, given a simplicial complex $\Gamma$ and the full boundary map matrix B, a combinatorial Laplacian $\Delta$ corresponding to all the simplices in the given complex $\Gamma$ is generated by an interleaving of B and projector $P_\Gamma$ according to:

$$\Delta = P_\Gamma B P_\Gamma B P_\Gamma$$

where B is the Hermitian full Boundary map matrix, and $P_\Gamma$ is the projection over the complex $\Gamma$ and is built on a NISQ device.

The linear depth quantum computing system 10 for NISQ-QTDA implements an efficient quantum construction of $\Delta_k$ from just the pairwise distances of the given points, for all k≤n. Namely, the linear depth quantum computing system 10 for NISQ-QTDA of FIG. 1 implements NISQ-compatible quantum circuits components 14 that run methods providing an efficient representation of a boundary operator $\Delta_k$ as a sum of Pauli operators and implements a quantum rejection sampling technique to build the relevant simplicial complex repeatedly. These methods at block 14 further involve the constructing of a projector $P_k$ onto the k-simplex subspace. Then, by computing moments of a matrix function, the method then runs a novel trace/stochastic rank estimation method to estimate the Betti numbers that does not require Quantum Phase Estimation (QPE), i.e., does not require the eigen-decomposition of the combinatorial Laplacian.

In particular, the novel trace/rank estimation approach is based on the classical stochastic Chebyshev method and involves recasting the rank estimation problem to one of estimating the trace of a certain function of the matrix.

In an embodiment, the NISQ-QTDA system 10 uses the classical computer at 16 to calculate the moments $\mu_l^{(i)}$ of the Laplacian $\Delta_k$, i.e., $\mu_l^{(i)}$ for i=0, . . . , m and l=1, . . . , $n_v$. In an embodiment, the method computes moments $\mu_l^{(i)}$ by computing the quantum state $\phi_l^{(i)}$, at 149, FIG. 1, according to:

$$|\phi_l^{(i)}\rangle = (BP_\Gamma P_k)^i |v_l\rangle$$

By computing the vector state $\phi_l^{(i)}$ and computing its inverse (i.e., complex conjugate) the method estimates/measures moments $\mu_l^{(i)}$ at classical computing block 16, FIG. 1, according to:

$$\mu_l^{(i)} = \langle \phi_l^{(i)} | \phi_l^{(i)} \rangle$$

An alternative approach is to compute the vector state $\phi_l^{(i)}$ and estimate its norm, given that $\mu_l^{(i)} = \|\phi_l^{(i)}\|^2$.

Then, using a trace/stochastic rank estimation method, a trace of a function, i.e., a step function of the Laplacian matrix is approximated by a stochastic trace estimator, where the step function, for example, is approximated by a Chebyshev polynomial approximation at 18. That is, at classical computing block 18, FIG. 1, the stochastic Chebyshev method approximates the trace using random vector states $|v_l\rangle$, and involves computing the Chebyshev moments $\theta_l^{(j)}$ from the computed moments $\mu_l^{(i)}$ wherein i are the moments. In an embodiment, a quantum circuit of O(n) size (both gate and depth complexity) is implemented to compute $\phi_l^{(i)}$ and the moments $\mu_l^{(i)}$ in order to estimate the Betti numbers $\chi_k$.

Then, at block 25, FIG. 1, a classical computer is used to estimate the Betti numbers $\chi_k$ using the stochastic Chebyshev method that utilize the Chebychev moments as shown.

A QTDA algorithm run on the linear depth quantum computing system 10 for NISQ-QTDA of FIG. 1, achieves an improved exponential speedup and depth complexity of $O(n \log(1/(\delta\epsilon)))$ where n is the number of data points, $\epsilon$ is an error tolerance, and $\delta$ is a smallest nonzero eigenvalue of a restricted Laplacian. This depth complexity opens the door for an implementation on near-term quantum hardware and thus the NISQ-QTDA algorithm becomes useful to achieve quantum advantage on general classical data.

The following table 1 shows a comparison of the prior art circuit and computational complexities for QTDA to compute BNE with an $\epsilon$ error, a $\zeta_k$ fraction of order-k simplices in the complex, and a $\delta$ smallest nonzero eigenvalue of $\tilde{\Delta}_k$

TABLE 1

| Methods | # Qubits | # Gates | Depth | Time |
|---|---|---|---|---|
| Prior Art | $2n + \log n + \frac{1}{\delta}$ | $O\left(\frac{n^2}{\delta\sqrt{\zeta_k}}\right)$ | $O\left(\frac{n^2}{\delta\sqrt{\zeta_k}}\right)$ | $O\left(\frac{n^4}{\epsilon^2\delta\sqrt{\zeta_k}}\right)$ |
| NISQ-QTDA | 3n/2 | $O(n^2\log(1/(\delta\epsilon)))$ | $O(n\log(1/(\delta\epsilon)))$ | $O\left(\frac{n\log(1/(\delta\epsilon))}{\epsilon^2\zeta_k^{2\log(1/(\delta\epsilon))}}\right)$ |

As seen from the Table 1, prior art method for BNE of order k has a time complexity of $\mathcal{O}(\text{poly}(n^k))$ as it implements a quantum TDA (or QTDA) algorithm that requires fault-tolerance, due to the need for a full Quantum Phase Estimation (which may be made worse by an embedded and repeated use of Grover's search). The NISQ-QTDA system of FIG. 1 achieves O(n)-depth implementation and exponential speedup when implemented on a quantum computer.

FIG. 33 depicts such a NISQ-QTDA method 1000 corresponding to the system 10 shown in FIG. 1. At a first step 1005, FIG. 33, the quantum system 10 receives input such as a highly dimensional data set which can include multiple, e.g., "n" data-points embedded in some ambient space. In an example embodiment, for non-limiting purposes of description, each data point can represent a health record of a patient, e.g., a patient record, each patient record having multiple attributes such as values of the patient's health characteristic features, e.g., blood pressure measurement, glucose level, heartbeat rate, temperature, oxygen level, etc. and which multiple data points (patient records) form the highly dimensional data set. A result of the TDA analysis is to find interesting features among the patients based on their recorded information. The input data includes pairwise distances of n data points and these data points are encoded as $\epsilon$-close pairs. Further received as input at 1005 are the parameters "$\epsilon$" representing the error tolerance, "$\delta$" representing the smallest nonzero eigenvalue of a restricted Laplacian, and $n_v = O(\epsilon^{-2})$ where $n_v$ represents the number of random vectors (number of n-bit random binary numbers to be generated). The output 1010 of the NISQ-QTDA method 1000 is the "Betti" number estimates $\chi_k$, where k is the simplex order, i.e., k=0, . . . , n−1.

In the method 1000, FIG. 33, a first outer FOR-DO loop is entered at 1020 to iterate through the n-bit random number l=1, . . . , $n_v = O(\epsilon^{-2})$ to create $n_v$ random vectors $|v_l\rangle$, and corresponds to use of NISQ-compatible quantum circuit operations repeated at block 11 of the system 10 depicted in FIG. 1. For each iteration in outer loop 1020, there is run an inner FOR-DO loop 1040 that iterates through i=0, . . . , $m=O(\log(1/(\delta \epsilon)))$ (to compute different powers/moments of the Laplacian) and corresponds to use of NISQ-compatible quantum circuit operations at block 14 of the system 10 depicted in FIG. 1. At each iteration in inner FOR-DO loop 1040 there is first prepared, at step 1030, a random Hadamard quantum state vector $|v_l\rangle$ from $|0\rangle$ using the $l^{th}$ random number received as input for stochastic trace estimation. Using short-depth quantum circuits, this random Hadamard state vector $|v_l\rangle$ is received from sampling a random Hadamard state vector in a quantum computer processing block 15 of the NISQ-QTDA system 10 of FIG. 1.

Then, at 1033 there is performed steps for stochastic trace estimation that makes use of the moments of the Hermitian matrix $\Delta_k$ (the Hermitian Laplacian) to approximate the trace. This method further includes constructing the boundary map operator B corresponding to all simplices which is achieved with a circuit comprising only O(n) gates. This method, at 1033, FIG. 33 employs constructing and applying the projection $P_k$ onto a simplicial order $P_k|v_l\rangle$ where $P_k$ is the projection onto all simplices of order k. This projection corresponds to use of NISQ-compatible quantum circuit operations at block 143 of the system 10 depicted in FIG. 1. This step 1033 further employs constructing and applying the projection $P_\Gamma$ onto the simplicial complex $P_\Gamma P_k|v_l\rangle$ where $P_\Gamma$ the projector onto all simplices in $\Gamma$. This projection corresponds to use of NISQ-compatible quantum circuit operations at block 145 of the system 10 depicted in FIG. 1. Method 1033 further comprises simulating B (the Hermitian boundary operator) and hence, the combinatorial Laplacian of k-simplices $\Delta_k$ on a quantum computer which corresponds to use of NISQ-compatible quantum circuit operations at block 147 of the system 10 depicted in FIG. 1 to produce $BP_\Gamma P_k|v_l\rangle$. These steps are repeated m times in order to estimate the different moments to approximate the quantum state $|\phi_l\rangle$ as follows:

$$|\phi_l^{(i)}\rangle = \left(\prod_{j=0}^{j=i-1} P_\Gamma P_k^{j\%2} B\right) P_\Gamma P_k |v_l\rangle$$

where the binary modulo operation % 2 indicates that the projection $P_k$ is applied only in the odd rounds, since there will not be any components of order k after an odd number of B applications and thus $P_k$ can be left out every second time.

Further to step 1033, the method saves the value of dim $\tilde{\mathcal{H}}_k$ the first time by leaving out $P_\Gamma P_k^{j\%2} B$ (i.e., i=0).

Continuing to steps 1036, NISQ-QTDA method computes the moments $\mu_l^{(i)}$ of the matrix to approximate the trace according to:

$$\mu_l^{(i)} = \langle v_l|\Delta_k^i|v_l\rangle \text{ as } \mu_l^{(i)} = \langle \phi_l^{(i)}|\phi_l^{(i)}\rangle \text{ or } = \||\phi_l^{(i)}\rangle\|^2;$$

Reading out the moments $\mu_l^{(i)}$ at 1036 corresponds to use of quantum computing circuit operations at block 16 of the system 10 depicted in FIG. 1. Then, continuing at 1036, FIG. 33, the method then computes the Chebychev moments $\theta_l^{(j)}$:j=0, ..., m, from the $\mu_l^{(i)}$'s using classical computing operations at block 18 of the system 10 of FIG. 1.

In particular, to estimate the rank, the method computes the Chebychev moments $\theta_l^{(j)}$ according to:

$$\theta_l^{(j)} = \langle v_l|T_j(\Delta_k)|v_l\rangle$$

The Chebychev moments of the matrix $\langle v_l|T_j(A)|v_l\rangle$, where $A=\Delta_k$, involves computing moments $\langle v_l|A^i|v_l\rangle$ in the quantum computer for a given order i and then using a general summation formula given by:

$$T_j(x) = \sum_{i=0}^{\lfloor \frac{j}{2} \rfloor} (-1)^i 2^{j-(2i+1)} g(j,i) x^{j-2i},$$

where $$g(j,i) = \frac{\binom{2i}{i}\binom{j}{2i}}{\binom{j-1}{i}}.$$

For Betti number estimation, The Chebyshev moments $\theta_l^{(j)}$ for $\langle v_l|T_j(A)|v_l\rangle$ are thus computed using the moments { $\langle v_l|A^i|v_l\rangle$ }$_{i=0}^j$ where $A=\Delta_k$ is the Laplacian.

Upon completing the outer FOR DO loop 1020, the method continues to step 1050 to estimate the Betti numbers $\chi_k$. In particular, using the computed Chebychev moments $\theta_l^{(j)}$, Betti number estimation is computed according to:

$$\chi_k = 1 - \frac{1}{n_v \dim \tilde{\mathcal{H}}_k} \sum_{l=1}^{n_v} \left[\sum_{j=0}^{m} c_j \theta_l^{(j)}\right],$$

where $c_j$ are the coefficients for the Chebyshev approximation of the step function with inflection at $\delta/2$ and the method is then repeated for each k, k=0, ..., n−1.

Returning to FIG. 34 there is depicted an example persistence barcode diagram 1100 which plots connected components at dimension $H_0$, $H_1$ (corresponding to Betti numbers $\beta_0$, $\beta_1$) etc. (Y-axis) and used for indicating how the data is distributed at different closeness scales $\epsilon$ (X-axis). As an example, bars 1105 plotted at dimension $H_0$ shows connections of datapoints 25 of the dataset 22 at different closeness scales $\epsilon$, while bars 1110 plotted at dimension $H_1$ shows loop structures, e.g., two-dimensional (2-D) holes at different scales $\epsilon$. Thus, for datapoints 25 representing patient health records, the number of bars 1105 indicate Betti number Bk indicating the relatedness of patient records, e.g., points (0-simplex or vertex), edges (1-simplex or line), triangles (2-simplex), tetrahedrons (3-simplex), at the corresponding closeness scales $\epsilon$ as shown by alignment of vertical lines 1101 at the corresponding closeness scales $\epsilon$. For example, Betti number $\beta_0$ informs how many connected components there are at a particular $\epsilon$. The evolution of the dataset's topological features represented as shapes formed by the relatedness of patient records is shown at 1120 at corresponding closeness scales $\epsilon$. Similarly, bars 1110 would indicate collections of patient records at a different Betti number that form a loop or a hole structure in the dataset at a corresponding closeness scales $\epsilon$.

For example, in FIG. 34, even though initially there are several connected components at small scale $\epsilon$, only one connected component 1125 (corresponding to $\beta_0=1$) persists at larger scale. Similarly, while there are multiple 2-D holes at certain smaller scale, there are shown two holes 1130 (corresponding to $\beta_1=2$) that persist for a larger scale. A further connection of components at Betti number $\beta_2$ would indicate connected components that form a three-dimensional void (not shown).

The existence of the bars 1105, 1110 informs how the data is distributed and any correlations of the data. In the exemplary patient health records dataset 22, the bars indicate how individuals' health deviates from each other. For example, such persistent bars 1125, 1130 in the diagram 1100 inform which set of patients will remain connected (persistence) at different scales, suggesting the connected patients should have common health issues/patterns. As a further example, a loop that exists can reveal a pattern, e.g., patient's blood pressure and hemoglobin counts. The patterns can reveal non-linear correlations of patients' health characteristics.

The following description provides further details of a quantum computing environment for performing TDA on a quantum computer. The obtaining of the Betti numbers translates to computing the number of non-zero eigenvalues of a combinational Laplacian matrix. For the example patient health records data, the bars 1105 of As discussed in the commonly-owned U.S. patent application Ser. No. 17/863,500 entitled QUANTUM CIRCUIT FOR SIMULATING BOUNDARY OPERATORS FOR QUANTUM HOMOLOGY, the whole contents and disclosure of which is incorporated by reference as if fully set forth herein, there is provided an apparatus and system and methods for generating a boundary operator, which can be used in quantum homology and particularly, one that can perform boundary mapping in graphs (e.g., nodes and edges), for example, for facilitating quantum topological data analysis.

Representation of a Boundary Operator for TDA

Boundary operators (also known as boundary maps) are computational primitives used for the representation and analysis of graph and network analysis, machine vision, control systems, computational geometry, differential equations, finite element methods, and more. They are also used to bridge the gap between discrete representations, such as graphs and simplicial complexes, and continuous representations, such as vector spaces and manifolds. The graph Laplacians (including higher-order combinatorial Laplacians) can be constructed using the boundary operator. Laplacians of graphs and hypergraphs play a practical role in spectral clustering, a computationally tractable solution to the graph partitioning problem that is prevalent in applications such as image segmentation, collaborative recommendation, text categorization, and manifold learning. Graph Laplacians are implemented in graph neural network architectures, a recent set of neural network techniques for learning graph representations.

In an embodiment, the boundary operator can also be used in Topological Data Analysis (TDA), as a linear operator that acts on a given set of simplices and maps them to their boundaries.

In TDA, the data can be high dimensional, for example, with a data point having many attributes. TDA allows for interpretability of data and can be used in unsupervised learning where data can be grouped into subsets based on one or more criteria such as their characteristics or attributes. Persistent homology finds in data signature shapes that persist, e.g., local and/or global features in data. TDA or homology can include studying shapes in data, e.g., by finding number of connected components, holes, voids, and higher dimensional counterparts. Given a set of data-points in some ambient (possibly high-dimensional) space, TDA aims to extract a small set of robust and interpretable features that capture the "shape" of the dataset. Persistent Homology aims to compute these features at different scales of resolution, thus obtaining a set of local and global features to describe the data distribution topologically. These topological features are not only invariant under rotation and translation, but are also generically robust with respect to the data representation, the data sampling procedure, and noise. For these reasons, TDA can be a powerful tool used in many data applications.

TDA can be considered a "big data" algorithm that can consume massive datasets and reduce them to a handful of global and interpretable signature numbers, which can be used in predictions and analytics. Currently known approaches to quantum TDA can require or assume a fault-tolerant system and deep depth quantum circuits. In one or more embodiments, a technique described herein can provide one or more components such as quantum circuits for implementing a quantum machine learning (QML) algorithm with linear-depth complexity and provable exponential speedup on arbitrary input, providing a useful NISQ algorithm with quantum advantage. For example, a technique presented herein can aid in achieving NISQ-QTDA, a quantum topological data analysis algorithm that has an improved exponential speedup and a depth complexity of $O(n \log(1/(\delta \in)))$, where $\in$ denotes the error tolerance.

In an embodiment, the boundary operator quantum circuit can be a component of a quantum homology algorithm implemented on a quantum computing processor. For example, the quantum circuit can simulate one or more boundary operators for quantum homology. In an embodiment, such quantum homology algorithm can be used for big data analysis, for example, to find useful features in a large and still growing data set. In an aspect, a boundary matrix is expressed in terms of boundaries (for example, edges) of simplices (for example, faces), and can involve exponentially many terms, e.g., many non-zero terms. In an embodiment, the quantum circuit can improve efficiency in boundary matrix operations used in quantum homology.

In an embodiment, a QTDA algorithm implemented with such a boundary operator quantum circuit is amenable to NISQ implementations. For example, the algorithm may have only an O(n)-depth quantum circuit, and thus has the potential to be a useful NISQ algorithm that achieves exponential speed up.

In an embodiment, systems, methods, apparatus and/or techniques can be provided, which can develop algorithms that may achieve quantum advantage for useful tasks, on quantum computers, including, for example but not limited to, noisy intermediate-scale quantum (NISQ) devices. More specifically, in a further embodiment, one or more quantum circuits can be provided for performing a quantum computation task related to a boundary operator, used in, topological data analysis (TDA).

Figure 2:
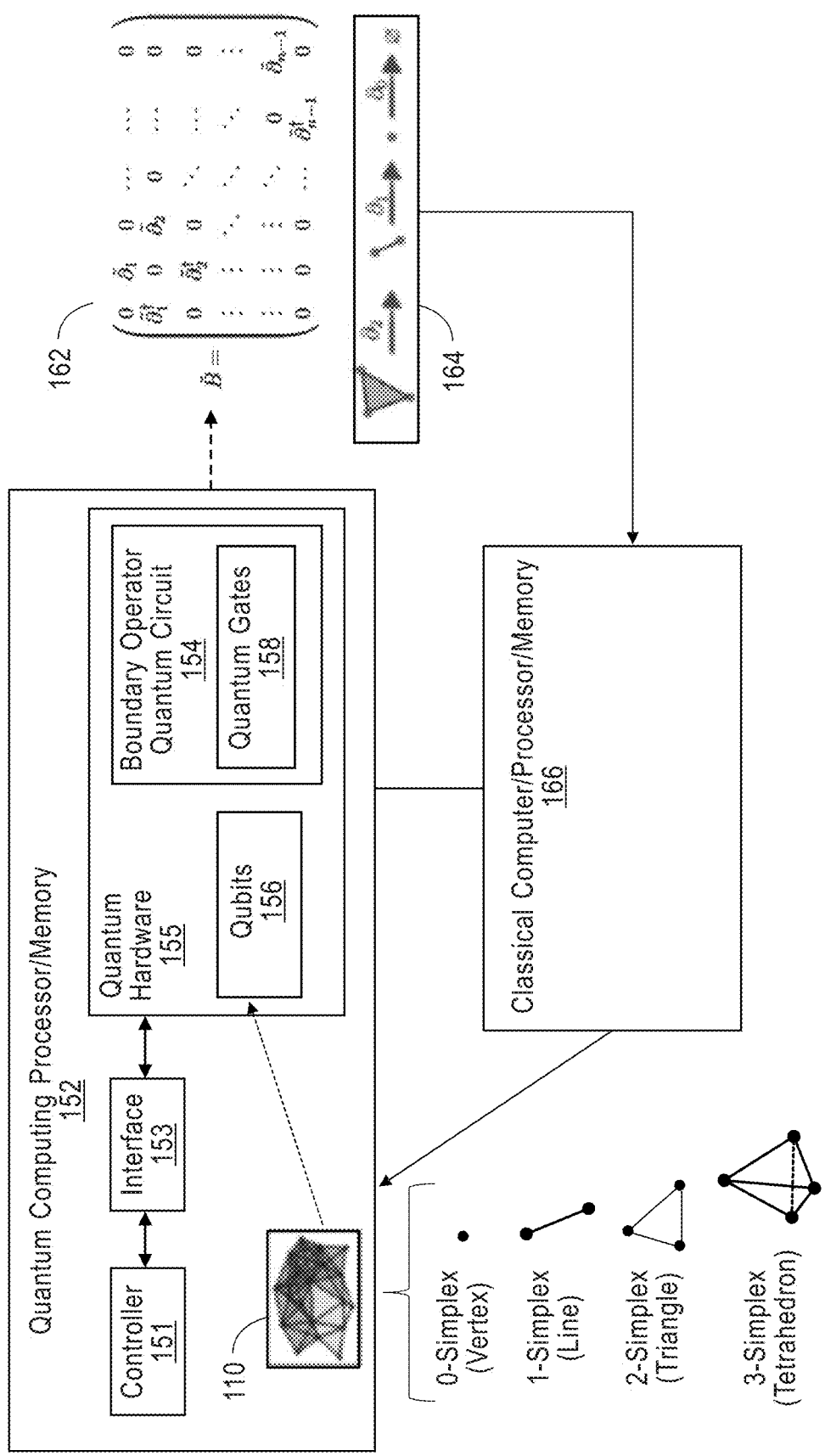
FIG. 2 is a block diagram illustrating an example computing environment that can facilitate simulation of boundary operators in an embodiment.

FIG. 2 is a block diagram illustrating an example computing environment that can facilitate simulation of one or more boundary operators in an embodiment. A quantum computing processor 152 can include or can construct one or more quantum circuits for performing quantum computations, for example, by applying various quantum gates 158 or operations on one or more qubits 156 or qubit states to result in quantum states of the qubits. For example, a quantum circuit can include a sequence of quantum gates, measurements, and other operations, with initialization of qubits to some known values. In the following description, the input data is described as vertices of simplicial complex. However, it should be understood that techniques described herein, for example, quantum circuit and methods thereof, can be applicable to other graphs that include vertices (also referred to as nodes) and edges that may connect the vertices. For instance, another example of such a graph can be a mesh.

Referring to FIG. 2, the quantum circuit 154 in one or more embodiments can simulate a boundary operator, e.g., constructs a boundary matrix 162 given n vertices of a simplicial complex (a collection of one or more simplices) 160. For example, the quantum circuit 154, which includes a sequence of operations of quantum gates 108 on qubits 106, can be configured to simulate a boundary operator that creates a mapping of orders of simplices in a given simplicial complex. The $2^n$ (2^n) possible simplices of the simplicial complex 160 can be mapped onto an n-qubit quantum state. Each vertex can be assigned a qubit 156 that is operated on by the quantum circuit 154. A simplicial complex 160 can be constructed based on distances between the vertices, for example, depending on the grouping scale $\epsilon$. For example, a simplicial complex can be constructed based on inclusion depending on the distance, which can be specified. This quantum state can contain exponentially fewer qubits than the number of bits required to describe the classical filtration of the complex. Given a simplicial complex, a boundary operator simulated by the quantum circuit 154 can create a mapping of orders of simplices (e.g., a boundary matrix 162). As explained below, the quantum circuit 154 can have linear depth relative to the number of vertices in the given simplicial complex (e.g., O(n)). Also as explained below, the number of quantum gates in the quantum circuit can have a linear relationship with the number of vertices in the given simplicial complex (e.g., O(n)).

The input to the quantum circuit 154 can be a superposition over simplices, a quantum state that is a superposition of all simplices in the given data or given simplicial complex. For example, for a square (n=4, where n is the number of vertices), the input can be a superposition of four vertices (the four '1' state (|0001>, |0010>, |0100>, |1000>) and four edges (|1100>, |0110>, |0011>, |1001>). So, in this example, the input can be a superposition of these 8 states. The output of the quantum circuit 154 can be quantum states of qubits representative of boundary matrix 162 applied to simplicial complex. Generally, a boundary matrix 162 sends a simplex 160 to a combination of its faces 164. That is, the boundary operator maps the vector space of k-simplices into the vector space of k−1 simplices. The quantum circuit 154 simulating the boundary operator calculates the boundary simplices, both "up" and "down". For example, if the starting simplex is a triangle simplex, "down" would produce the edges of the triangle, "up" would produce the tetrahedron that the input triangle is a face of. To be described further below, the quantum circuit 154 implements quantum primitives or gates that map to Pauli operators or matrices. For example, the boundary operator can be represented in terms of Pauli spin operators, as a sum of Pauli spin operators, and the Pauli spin operators can be mapped into fermionic creation and annihilation operators.

In the example shown in FIG. 2, quantum computing processor 152 can be any suitable set of components capable of performing quantum operations on a physical system. A quantum operation can be, for example, a quantum gate operation that manipulate qubits to interact with one another in accordance with the quantum gate operation. In the example embodiment depicted in FIG. 2, quantum computing processor 152 can include a controller 151, an interface 153, and quantum hardware 155. In some embodiments, all or part of each of controller 151, interface 153, and quantum hardware 155 can be located in a cryogenic environment to aid in the performance of the quantum operations. Quantum hardware 155 may be any hardware capable of using quantum states to process information. Such hardware may include a plurality of qubits 156, and mechanisms to couple/entangle qubits 156, in order to process information using the quantum states. A qubit can be implemented as a physical device. Examples of physical implementation of a qubit can include, but not limited to, a superconducting qubit, a trapped ion qubit, and/or others. Qubits 156 may include, but are not limited to, charge qubits, flux qubits, phase qubits, spin qubits, and trapped ion qubits. Quantum hardware 155 can include a set of quantum gates 158, where quantum gates 158 can be configured to perform quantum logic operations on qubits 156. Quantum gates 158 can include one or more single-qubit gates, two-qubit gates, and/or other multi-qubit gates.

Controller 151 can be any combination of digital computing devices capable of performing a quantum computation, such as executing a quantum circuit 154, in combination with interface 153. Such digital computing devices may include digital processors and memory for storing and executing quantum commands using interface 153. Additionally, such digital computing devices may include devices having communication protocols for receiving such commands and sending results of the performed quantum computations to classical computer 166. Additionally, the digital computing devices may include communications interfaces with interface 153. In one embodiment, controller 151 can be configured to receive classical instructions (e.g., from classical computer 166) and convert the classical instructions into commands (e.g., command signals) for interface 153.

Interface 120 can be a classical-quantum interface including a combination of devices capable of receiving commands from controller 151 and converting the commands into quantum operations for implementing quantum hardware 155. In one embodiment, interface 153 can convert the commands from controller 151 into drive signals that can drive or manipulate qubits 156, and/or apply quantum gates 158 on qubits 156. Additionally, interface 153 can be configured to convert signals received from quantum hardware 155 into digital signals capable of processing and transmitting by controller 151 (e.g., to classical computer 166). Devices included in interface 153 can include, but are not limited to, digital-to-analog converters, analog-to-digital converters, waveform generators, attenuators, amplifiers, optical fibers, lasers, and filters. Interface 153 can further include circuit components configured to measure a basis of the plurality of qubits following the implementation of quantum gates 158, where the measurement that will yield a classical bit result. For example, a basis of |0⟩ corresponds to classical bit zero, and a basis of |1⟩ corresponds to classical bit one. Each measurement performed by interface 153 can be read out to a device, such as classical computer 166, connected to quantum computing processor 152. A plurality of measurement results provided by interface 153 can result in a probabilistic outcome. In an embodiment, the qubit states output by quantum circuit 154 that simulates a boundary operator need not be measured, but can used directly by another quantum circuit, or used as input directly to another quantum circuit implemented on the quantum hardware 155.

In an embodiment, quantum computing processor 152 may be quantum system 84 shown and described with reference to FIG. 37. Controller 151 may be controller 85 shown and described with reference to FIG. 37. Interface 153 may be interface 86 shown and described with reference to FIG. 37. Quantum hardware 155 may be quantum hardware 87 shown and described with reference to FIG. 37. The computing environment can also include other devices such input/output devices, which may set and measure states of qubits in the quantum computing processor 152, and other devices and components for the quantum computing processor to function such as, but not limited to, buses and/or interfaces.

Non-limiting examples of quantum gates 158, implemented on the quantum circuit 154 (e.g., using devices) can include Hadamard (or H) gates, controlled gates, and phase gates. The Hadamard gate acts on a single qubit and maps the basis state |0> to $(|0>+|1>)/\sqrt{2}$ and the basis state |1> to $(|0>-|1>)/\sqrt{2}$. A phase gate acts on a single qubit and may alter the phase of one basis state of the qubit while leaving the other basis state unchanged. A controlled gate may act on two or more qubits, where one or more of the qubits provide a control for an operation.

The quantum computing processor 152 may also be connected to a classical computing processor 166 (e.g., a non-quantum computing device), which can interface with the quantum computing processor 152 and perform various pre-processing and/or post-processing tasks associated with the quantum computing performed on the quantum computing processor 152. By example of post-processing, the classical computing processor 166 may perform scaling by a constant to obtain the boundary matrix 162. For example, the classical computing processor 166 may include or more hardware processor components, for example, including components such as programmable logic devices, microcontrollers, memory devices, and/or other hardware components, which may be configured to perform respective tasks described in the present disclosure. Coupled memory devices may be configured to selectively store instructions executable by one or more hardware processors. For example, a hardware processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities. The processor may execute computer instructions stored in the memory or received from another computer device or medium. Components of classical computer 166 are also described in more detail below with reference to FIG. 35. Classical computer 166 may be classical computer 81 shown and described with reference to FIG. 37.

The boundary operator is a linear operator that acts on a collection of high-dimensional binary points (e.g., simplices) and maps them to their boundaries. The concept of a simplical complex is derived from data-points embedded in some ambient space. A k-simplex is a collection of k+1 vertices forming a simple polytope of dimension k; e.g., 0-simplices are single points (zero-dimensional), 1-simplices are line segments (one-dimensional), 2-simplices are triangles (two-dimensional), and so on. A simplicial complex is a collection of such simplices (of any order), closed under adding all lower simplices, which are simplices obtained by removing one vertex (e.g., if a triangle is in a complex, then all three associated edge simplices are also in the complex and, recursively, so are all three associated points). Homology provides a linear-algebraic approach to extract, from simplicial complexes derived from the data, features that describe the "shape" of the data, such as the number of connected components, or holes (as in doughnuts), or voids (as in swiss cheese), or higher-dimensional holes/cavities.

Given a set of n data-points $\{x_i\}_{i=0}^{n-1}$ in some space together with a distance metric $\mathcal{D}$, a Vietoris-Rips simplicial complex is constructed by selecting a resolution/grouping scale $\varepsilon$ that defines the "closeness" of the points with respect to the distance metric $\mathcal{D}$, and then connecting the points that are a distance of $\varepsilon$ from each other (i.e., connecting points $x_i$ and $x_j$ whenever $\mathcal{D}(x_i, x_j) \le \varepsilon$, forming a so-called 1-skeleton). A k-simplex is then added for every subset of k+1 data-points that are pair-wise connected (i.e., for every k-clique, the associated k-simplex is added). The resulting simplicial complex is related to the clique-complex from graph theory.

More specifically, the NISQ-QTDA system 10 runs an NISQ-QTDA algorithm that lets $S_k$ denote the set of k-simplices in the Vietoris-Rips complex $\Gamma = \{S_k\}_{k=0}^{n-1}$, with $s_k \in S_k$ written as $[j_0, \ldots, j_k]$ where $j_i$ is the ith vertex of $s_k$. Let $\mathcal{H}_k$ denote an $$\binom{n}{k+1}$$

dimensional Hilbert space ((n choose k+1)-dimensional Hilbert space), with basis vectors corresponding to each of the possible k-simplices (all subsets of size k+1). Further let $\tilde{\mathcal{H}}_k$ denote the subspace of $\mathcal{H}_k$ spanned by the basis vectors corresponding to the simplices in $S_k$, and let $|s_k\rangle$ denote the basis state corresponding to $s_k \in S_k$. Then, the n-qubit Hilbert space $\mathbb{C}^{2^n}$ is given by $\mathbb{C}^{2^n} \cong \bigoplus_{k=0}^n \mathcal{H}_k$. The boundary map (operator) on k-dimensional simplices $\partial_k: \mathcal{H}_k \to \mathcal{H}_{k-1}$ is a linear operator and can be defined by its action on the basis states as follows (also defined in Eq. (1) below):

$$\partial_k |s_k\rangle = \sum_{l=0}^{k-1} (-1)^l |s_{k-1}(l)\rangle,$$

where $|s_{k-1}(l)\rangle$ is the lower simplex obtained by leaving out vertex l (i.e., $s_{k-1}$ has the same vertex set as $s_k$ except without $j_l$). It is noted that, $s_{k-1}$ is k-1-dimensional, one dimension less than $s_k$. The factor $(-1)^l$ produces the so-called oriented sum of boundary simplices, which keeps track of neighbouring simplices so that $\partial_{k-1} \partial_k |s_k\rangle = 0$, given that the boundary of the boundary is empty.

This boundary operator (also known as boundary map) can be used as one of the components in numerous applications, including but not limited to, differential equations, machine learning, computational geometry, machine vision and control systems. The quantum circuit 154 can simulate or represent the boundary operator on a quantum computer. In an embodiment, the boundary operator has a special structure in the form of a complete sum of fermionic creation and annihilation operators. In an embodiment, these operators pairwise anticommute to produce an $\mathcal{O}(n)$-depth circuit that can exactly implement the boundary operator without any Trotterization or Taylor series approximation errors.

Having fewer errors reduces the number of measurement shots required to obtain desired accuracies. In one or more embodiments, the boundary operator is represented as a sum of Pauli operators. Pauli operators can map to quantum primitives or gates in quantum computing that can perform operations on qubits.

In one or more embodiments, the (generalized) boundary operator B can be represented in a novel tensor form, as a complete sum of fermionic creation and annihilation operators. In an embodiment, the standard technique of applying a Hermitian operator on a quantum computer can be implemented, namely executing the time-evolution unitary $e^{-itB}$ for short time t and 'solving' for the second term of the Taylor series (−itB). The time-evolution can be approximated by Trotterization. Using this technique, with certain gate cancellations, an O(n)-depth circuit representation can be obtained for the boundary operator.

In another embodiment, an exact implementation of the boundary operator can be provided by a quantum circuit, which does not incur Trotterization errors. For example, in one or more embodiments, a technique is used or implemented (where it is called unitary partitioning) to exactly express the full (e.g., all k-simplices) Hermitian boundary operator as a unitary operator that has an efficient O(n)-depth construction in terms of quantum computing primitives. This short depth circuit, without evolution and Trotterization, analytically can implement the boundary operator, allowing for fewer measurement shots than the standard Hermitian-evolution technique. This can be instrumental in many downstream applications such as QTDA, in cohomology problems, quantum algorithms for finite element methods, solving partial differential equations, and potential quantum algorithms for machine vision and control systems.

The Boundary Operator and its Fermionic Representation

By way of example, the following description introduces the concept of boundary operators in the context of computational geometry and TDA in more detail. The description further explains the fermionic creation and annihilation operators, and presents a fermionic representation for the boundary operator. For completeness, a proof establishing its correctness is also described below.

Computational Geometry

In a quantum algorithm for topological data analysis (QTDA), simplices can be represented by strings of n bits. Each bit corresponds to a vertex, with zero indicating exclusion and one inclusion. On the quantum computer, the usual computational basis can directly map to simplices. There are $2^n$ computational basis vectors, one for each unique n-bit binary string, written $|s_k\rangle$, where k indicates the number of vertices in the simplex (i.e., the number of ones in the binary string). There can be a difference in a way for how to index the bits of the binary string. Herein, this way is described explicitly and refer to 'counting from the left' or 'right'. Herein, the introduced indices are indexed from 0. In general, the quantum state vector (of length $2^n$) can be in a superposition of these basis vectors/simplices. In an aspect, core to the QTDA algorithm is the restricted boundary operator, defined by its action on k-dimensional simplices (among n vertices, hence the superscript $^{(n)}$ in the following):

$$\partial_k^{(n)}|s_k\rangle = \Sigma_l(-1)^l|s_{k-1}(l)\rangle, \quad (1)$$

where $|s_k\rangle$ represents a simplex, and $|s_{k-1}(l)\rangle$ is the simplex of one dimension less than $|s_k\rangle$ with the same vertex set (containing n vertices), but leaving out the $l^{th}$ vertex counting from the left.

Fleshing Out the Restricted Boundary Operator

It helps to rewrite (1) without the use of index l, which hides some algorithmic steps, because l presupposes that the locations of the ones are known (i.e., which vertices are in a given simplex, e.g., l=0 refers to the first 1 in the string reading from left-to-right). Eq. (1) can be rewritten using index i:

$$\partial_k^{(n)}|s_k\rangle = \sum_{i=0}^{n-1} \delta_{s_k[i],1}(-1)^{\sum_{j=i+1}^{n-1} s_k[j]}|s_{k-1}(i)\rangle, \quad (2)$$

where it is now chosen to locate each bit counting from the right starting with index 0. The description here introduces the notation $s_k[i]$ to represent the $i^{th}$ bit of the string. The description uses $|s_{k-1}(i)\rangle$ to mean $|s_k\rangle$ with the $i^{th}$ vertex set to 0 (where i can be any bit index). All references to l can be replaced, including the implicitly required knowledge of the location of the last 1 (the sum across i simply runs from 0 to n−1). Below, this definition is illustrated with explicit examples.

In an aspect, $\partial_k^{(n)}$'s action on a single simplex can be split into two cases depending on whether the last vertex, indexed n−1, is in the simplex or not. The absence or presence of this last vertex is represented by the bit $s_k[n-1]$ being 0 or 1, respectively. If $s_k[n-1]=0$, the quantum state corresponding to this single simplex (call it $|s_{k,0}\rangle$) is a single computational basis state whose binary string has exactly k one's somewhere in it, except that the left most bit is zero. If this basis state is written as an exponentially long vector it consists of a column of $2^{n-1}$ bits only one of which is 1 (at a location whose binary string consists of those k ones) followed by $2^{n-1}$ zeros. This is similarly the case for $|s_{k,1}\rangle$, but with the single 1 appearing in the second half of the column vector.

If $|s_k\rangle = |s_{k,0}\rangle$ for $k \leq n - 1$, $$\partial_k^{(n)}|s_{k,0}\rangle = \sum_{i=0}^{n-1} \delta_{s_k[i],1}(-1)^{\sum_{j=i+1}^{n-1} s_k[j]}|s_{k-1}(i)\rangle \quad (3)$$

$$= \sum_{i=0}^{n-2} \delta_{s_k[i],1}(-1)^{\sum_{j=i+1}^{n-2} s_k[j]}|s_{k-1}(i)\rangle$$

$$= \begin{pmatrix} \partial_k^{(n-1)} & 0 \\ 0 & 0 \end{pmatrix}|s_{k,0}\rangle.$$

If $|s_k\rangle = |s_{k,1}\rangle$ for $k \leq n$, $$\partial_k^{(n)}|s_{k,1}\rangle = \sum_{i=0}^{n-1} \delta_{s_k[i],1}(-1)^{\sum_{j=i+1}^{n-1} s_k[j]}|s_{k-1}(i)\rangle \quad (4)$$

$$= |s_{k-1}(n-1)\rangle + (-1)$$

$$\sum_{i=0}^{n-2} \delta_{s_k[i],1}(-1)^{\sum_{j=i+1}^{n-2} s_k[j]}|s_{k-1}(i)\rangle$$

$$= \begin{pmatrix} 0 & P_{k-1}^{(n-1)} \\ 0 & 0 \end{pmatrix}|s_{k,1}\rangle - 1\begin{pmatrix} 0 & 0 \\ 0 & \partial_{k-1}^{(n-1)} \end{pmatrix}|s_{k,1}\rangle.$$

where $P_{k-1}^{(n-1)}$ is the projection on to the computational basis states of n−1 qubits whose binary strings contain exactly k−1 ones. It can be seen how the block diagonal notation is allowing for removing or leaving alone the kth one precisely in the $n^{th}$ position. In this particular equation, since one may only act on $|s_{k,1}\rangle$ and remove the $n^{th}$ vertex, the projection could be replaced by the identity operator.

Fermionic Boundary Operator

Fermionic fields obey Fermi-Dirac statistics, which means that they admit a mode expansion in terms of creation and annihilation oscillators that anticommute. In one or more embodiments, fermionic creation and annihilation operators can be mapped to Pauli spin operators. The mapping can work both way. For example, Pauli spin operators can be mapped to fermionic creation and annihilation, for example, depending on a starting premise. The Jordan-Wigner transformation is one such mapping. In one or more embodiments, a system and/or method can make use of it to express the boundary matrix.

The restricted boundary operator given in Eq. (1) is not in a form that can be easily executed on a quantum computer, nor does it act on all orders, k, at the same time. In particular, it is a high-level description of the action of the boundary operator on a single generic k-dimensional simplex with the location of the ones assumed to be known. In one or more embodiments, a novel representation is proposed that realizes the full boundary operator as a matrix. Furthermore, this representation in an embodiment is in tensor product form composed of quantum computing primitives that directly map to quantum gates in the quantum circuit model.

To begin, there is defined the operator:

$$Q^+ := \frac{1}{2}(\sigma_x - i\sigma_y) = \begin{pmatrix} 0 & 1 \\ 0 & 0 \end{pmatrix}. \qquad (5)$$

This way, the full boundary operator can be written in terms of the above operator:

$$\partial^{(n)} := \sigma_z \otimes \ldots \otimes \sigma_z \otimes Q^+ + \qquad (6)$$
$$\sigma_z \otimes \ldots \otimes \sigma_z \otimes Q^+ \otimes I$$
$$\vdots +$$
$$\sigma_z \otimes Q^+ \otimes I \otimes \ldots +$$
$$Q^+ \otimes I \otimes I \otimes \ldots$$
$$= \sum_{i=0}^{n-1} a_i.$$

where the $a_i$ are the Jordan-Wigner Pauli embeddings corresponding to the n-spin fermionic annihilation operators. In another embodiment, for example, other than the Jordan-Wigner mapping of fermionic operators, other embeddings (e.g., Bravyi-Kitaev) may also be contemplated, for example, via translation between the different embeddings. In yet another embodiment, since simplicial homology can be recast in terms of these fermionic operators, other geometric structures can be explored under this light. To be explicit, $a_i$ is the antisymmetric annihilation operator on mode/orbital i (indexed from the right, starting at zero):

$$a_i := \underbrace{\sigma_z \otimes \ldots \otimes \sigma_z}_{n-(i+1)} \otimes Q^+ \underbrace{\otimes I \otimes \ldots \otimes I}_{i} \qquad (7)$$
$$= \sigma_z^{\otimes(n-(i+1))} \otimes Q^+ \otimes I^{\otimes i},$$
$$\{a_i, a_j^\dagger\} = \delta_{ij} I^{\otimes n}. \qquad (8)$$

When Eq. (6) is realized in matrix form, where the rows' and columns' integer indices (counting from left to right and top to bottom, beginning at zero) are translated into binary, the meaning of these strings correspond exactly to the simplex strings introduced above. Recall, a one at bit i of the simplex string (counting from the right, starting from zero) corresponds to selecting the $i^{th}$ vertex.

The following result can be shown:

Theorem 1. The full boundary operator as defined in Eq. (6) is a sum over the restricted boundary operators over simplices of each dimension as defined above as follows $$\partial^{(n)} = \Sigma_{k=1}^n \partial_k^{(n)}. \qquad (9)$$

Remark. A simple sum (as opposed to a direct sum) can be used because the definition of $\partial_k$ has been extended to a common vertex space of size n. The rewriting constructs the full boundary operator in one step and the individual $\partial_k$'s do not feature at all. To recover the $\partial_k$'s one would project into the appropriate space, which is a step in implementing QTDA on quantum computers. The index i of the $a_i$ fermionic operators indicates which qubit out of n is acted upon by $Q^+$ (counting from the right) and does not involve $\partial_k$ (e.g., there is no k dependence).

A proof of this theorem that proceeds by induction is described in commonly-owned, U.S. patent application Ser. No. 17/863,500, the whole contents and disclosure of which is incorporated by reference herein.

With the proof in hand, it can be understood as to why Eq. (6) and its recursive form can only produce Eq. (1) in summation form of Eq. (9). In particular, $\partial_k$ on a simplex with one more potential vertex (n+1) is related to both $\partial_k$ and $\partial_{k-1}$ on the original number of vertices (n). Therefore, in an embodiment, a system (and/or method and/or apparatus) can implement the full chain of sums to build up a recursive construction, where the system can sequentially add one vertex at a time, which then makes a quantum-implementable tensor definition possible.

Unitary Circuit

The boundary operator above is not Hermitian. To work with a version that is Hermitian, an embodiment for implementing a quantum circuit can add the Hermitian conjugate of the boundary operator to itself. Every $Q^+$ in the tensor product now becomes $\sigma_x = Q^+ + (Q^+)^\dagger$. Hence, the full Hermitian boundary operator is $$B = \partial + \partial^\dagger = \sigma_z \otimes \ldots \otimes \sigma_z \otimes \sigma_x + \qquad (10)$$
$$\sigma_z \otimes \ldots \otimes \sigma_z \otimes \sigma_x \otimes I$$
$$\vdots +$$
$$\sigma_z \otimes \sigma_x \otimes I \otimes \ldots +$$
$$\sigma_x \otimes I \otimes I \otimes \ldots$$
$$= \sum_{i=0}^{n-1} Q_i,$$

where I denotes the single-qubit identity operator, and $$Q_i := a_i + a_i^\dagger, \qquad (11)$$

with $a_i$ as defined in Eq. (7). This, $Q_i$ is a Kronecker product of n Pauli matrices, of which the n–(i+1) leftmost are $\sigma_z$. The goal can now be to construct a unitary circuit to implement either B or exp(iBt) (depending on the application). Towards this end, it is useful to note that:

Lemma 1 The $Q_i$'s pairwise anticommute: $\{Q_i, Q_j\}=0$ for i≠j.

Proof. The mixed-product identity for the Kronecker product is $$(A \otimes B) \cdot (C \otimes D) = (AC) \otimes (BD). \qquad (12)$$

Hence, there can be (assuming without loss of generality that i>j so that there are more $\sigma_z$ matrices in $Q_j$)

$$\{Q_i, Q_j\} = \Big\{ \underbrace{\sigma_z \otimes \ldots \otimes \sigma_z}_{n-(i+1)} \otimes \sigma_x \otimes \underbrace{I \otimes \ldots \otimes I}_{i}, \tag{13}$$

$$\underbrace{\sigma_z \otimes \ldots \otimes \sigma_z}_{n-(j+1)} \otimes \sigma_x \otimes \underbrace{I \otimes \ldots \otimes I}_{j} \Big\}.$$

Since $\{\sigma_\ell, \sigma_k\} = 2\delta_{\ell k} I$ and $[\sigma_k, I] = 0$ for any k=x, y, z, Eq. (13) immediately yields the result.

Any real linear combination of pairwise anticommuting Pauli operators can be unitarily equivalent to a single Pauli operator, up to some rescaling. One can think of this as a generalization of the Bloch sphere to more than three Pauli operators. Moreover, the unitary that maps the linear combination to the single Pauli operator can be efficiently constructed. This technique can reduce the number of distinct terms in Hamiltonians to be simulated using variational quantum eigensolvers, in which context it is known as unitary partitioning.

For neighbouring Q's $Q_{i-1}$ and $Q_i$, $$-iQ_{i-1}Q_i = -i\Big(\underbrace{\sigma_z \otimes \ldots \otimes \sigma_z}_{n-i} \otimes \sigma_x \otimes \underbrace{I \otimes \ldots \otimes I}_{i-1}\Big) \cdot \tag{14}$$

$$\Big(\underbrace{\sigma_z \otimes \ldots \otimes \sigma_z}_{n-(i+1)} \otimes \sigma_x \otimes \underbrace{I \otimes \ldots \otimes I}_{i}\Big),$$

$$= -iI^{\otimes(n-(i+1))} \otimes \sigma_z\sigma_x \otimes \sigma_x \otimes I^{\otimes(i-1)}$$

$$= -iI^{\otimes(n-(i+1))} \otimes i\sigma_y \otimes \sigma_x \otimes I^{\otimes(i-1)}$$

$$= Y_i X_{i-1}$$

where $X_{i-1}$ and $Y_i$ are, respectively, $$X_{i-1} = I^{\otimes(n-i)} \otimes \sigma_x \otimes I^{\otimes(i-1)}, \tag{15}$$

$$Y_i = I^{\otimes(n-(i+1))} \otimes \sigma_y \otimes I^{\otimes i}. \tag{16}$$

Hence, $-iQ_{i-1}Q_i$ is itself a Pauli operator, and commutes with all Pauli terms in B except for $Q_{i-1}$ and $Q_i$. Therefore, a rotation generated by $-iQ_{i-1}Q_i$ only affects those two terms. For an arbitrary linear combination $\alpha Q_i + \beta Q_{i-1}$ for real $\alpha$ and $\beta$, define the following rotation generated by $-iQ_{i-1}Q_i$:

$$R_i \equiv \exp\Big(\frac{Q_{i-1}Q_i}{2}\text{atan2}(\alpha, \beta)\Big) = \exp\Big(\frac{iY_iX_{i-1}}{2}\text{atan2}(\alpha, \beta)\Big). \tag{17}$$

It can be shown that $R_i$'s adjoint action on the linear combination is $$R_i(\alpha Q_i + \beta Q_{i-1})R_i^\dagger = \sqrt{\alpha^2+\beta^2} Q_{i-1}. \tag{18}$$

Therefore, the system can map B, which as given in Eq. (10) is the sum of all of the $Q_i$s, to a single $Q_i$ via a sequence of such rotations as follows:

$$B = \sum_{i=0}^{n-1} Q_i \xrightarrow{R_{n-1} \text{ with } \alpha=1, \beta=1} \sqrt{2} Q_{n-2} + \sum_{i=0}^{n-3} Q_i \tag{19}$$

$$\xrightarrow{R_{n-2} \text{ with } \alpha=\sqrt{2}, \beta=1} \sqrt{3} Q_{n-3} + \sum_{i=0}^{n-4} Q_i$$

$$\xrightarrow{R_{n-3} \text{ with } \alpha=\sqrt{3}, \beta=1} \sqrt{4} Q_{n-4} + \sum_{i=0}^{n-5} Q_i,$$

$$\vdots$$

$$\xrightarrow{R_2 \text{ with } \alpha=\sqrt{n-2}, \beta=1} \sqrt{n-1} Q_1 + Q_0$$

$$\xrightarrow{R_1 \text{ with } \alpha=\sqrt{n-1}, \beta=1} \sqrt{n} Q_0$$

where each arrow represents an application of $R_i$ as in Eq. (17) with the given values of $\alpha$ and $\beta$. Hence, the system can map B to $\sqrt{n}Q_0 = \sqrt{n}X_0$, i.e., a single-qubit Pauli $\sigma_x$, via n−1 rotations generated by two-qubit Paulis $Y_iX_{i-1}$.

Letting R denote this entire sequence of rotations, i.e., $$R = \Pi_{i=(n-1)}^{i=1} R_i. \tag{20}$$

In terms of R, the above result is $$RBR^\dagger = \sqrt{n}X_0, \tag{21}$$

which implies that $$B = \sqrt{n}R^\dagger X_0 R. \tag{22}$$

Based on Eq. (22), a boundary map quantum circuit can be constructed or built, e.g., for a QTDA use case. Since $R^\dagger X_0 R$ is unitary, it can be implemented as a quantum circuit, and to obtain B the constant of proportionality can be included during classical postprocessing.

Figure 3:
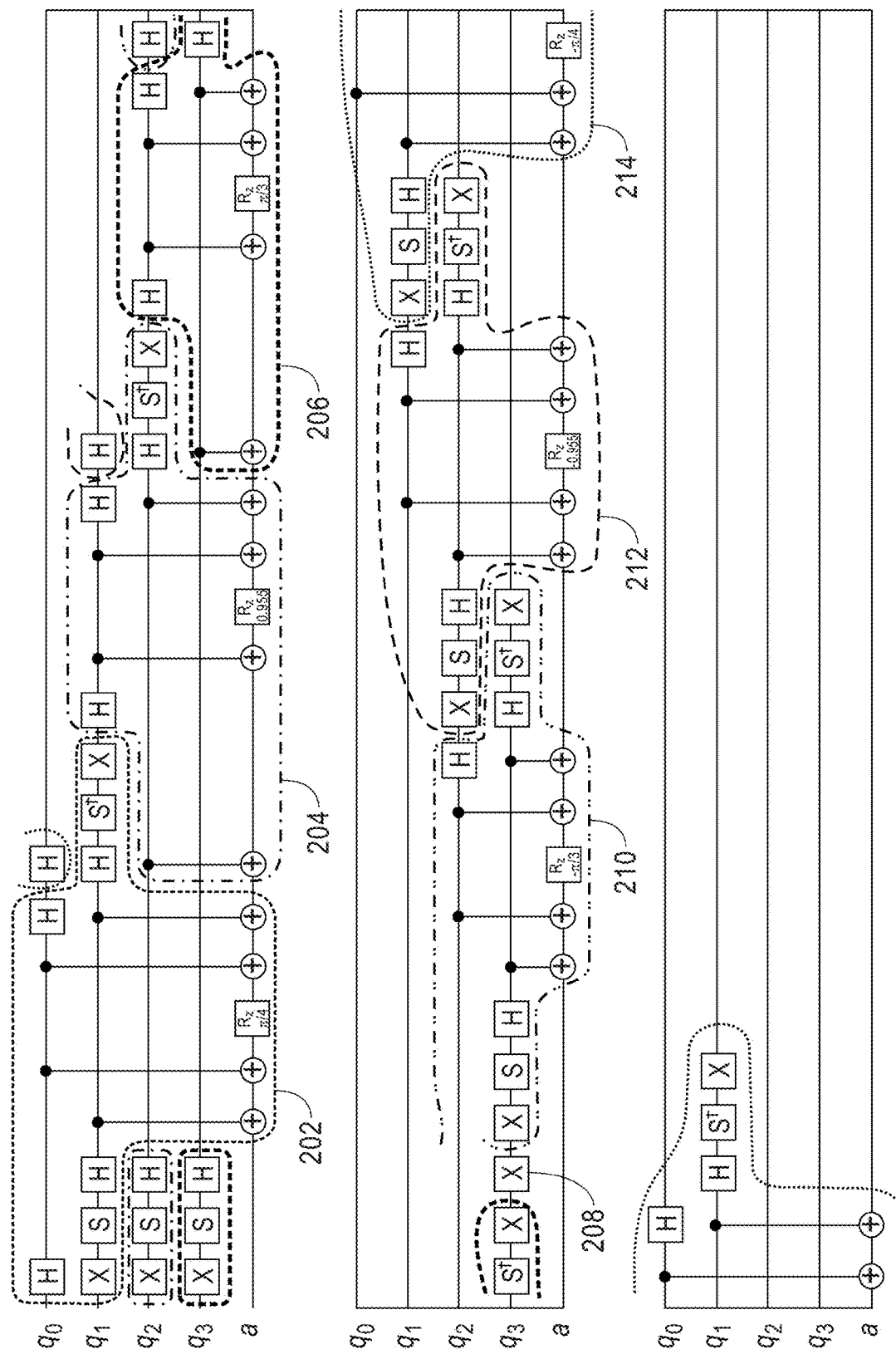
FIG. 3 illustrates a quantum circuit that can simulate a boundary operator, e.g., given a simplicial complex with n number of vertices, where n is 4.

FIG. 3 shows an example quantum circuit simulating a boundary operator for a given simplicial complex in an embodiment. In this example, the given simplicial complex has n vertices, where n is 4. In an embodiment, Eq. (22) given above can be used to build the quantum circuit. For example, terms in Eq. (22) can translate to quantum circuit components, e.g., a linear combination of Pauli gates. For instance, the quantum circuit performs rotations around a string of two Pauli gates (Pauli X and Pauli Y), followed by Pauli X gate, followed by reverse of the two X and Y Pauli string rotations. The quantum circuit can have an O(n)-depth construction in terms of quantum computing primitives. For example, in an embodiment, the number of gates in the quantum circuit can be some constant factor multiplied by the number of qubits (vertices or nodes). The quantum circuit can include n qubits and an ancillary qubit (an extra qubit, also referred to an ancilla bit). The n qubits can correspond to n vertices of a simplex and via superposition of the entire simplicial complex, on which the boundary operator or map acts. For instance, through superposition, n vertices can be "reused" by each simplex in the simplicial complex. Each vertex can be assigned a qubit out of the n qubits in the quantum circuit. At the input, the n qubits are encoded with information. For example, the n qubits loaded with information (e.g., simplicial complex information) can be loaded with a probe simplicial complex. The ancilla bit at the input can be |0>.

Referring to Eq. (22), the quantum gates shown at 202, 204, 206 construct the rotations represented as "R" (e.g., concatenation of $R_i$'s, i=1 to n−1), where n=4; the CNOT (controlled NOT) gate shown at 208 represents the term "$X_0$"; and the gates shown at 210, 212, 214 represent the term "$R^\dagger$" (e.g., concatenation of $R^\dagger_i$'s, i=1 to n−1).

For example, $R_i$ implements Pauli $Y_i$ and $X_{i-1}$ rotations applied to the i-th and (i−1)-th qubits, respectively. In an embodiment, a quantum circuit can implement this rotation around the eigenstates of Pauli X and Y by applying a change of bases onto the z-axis, and rotating about the z-axis by a given angle. A change of basis from X to z-axis for (i−1)-th qubit can be implemented by applying an H-gate to the (i−1)-th qubit. A change of basis from Y to z-axis for i-th qubit can be implemented by applying X-gate, S-gate, and H-gate to the i-th qubit. A rotation around the z-axis can be implemented by applying a rotation gate about the z-axis by a given angle.

For instance, each of 202, 204 and 206 shows rotations, $R_i$ according to Eq. (17), for qubit i, where i=1 to n−1 (see Eq. (20)). Referring to 202 (e.g., for i=1), by way of example, H-gate on $q_0$ performs change of basis of qubit i−1 ($X_{i-1}$ in Eq. (17)) to z-axis; X-gate, S-gate, H-gate on $q_1$ perform change of basis of qubit i ($Y_i$ in Eq. (17)) to z-axis; CNOT-gate on $q_0$ and ancilla bit, and CNOT-gate on $q_1$ and ancilla bit prepare for rotation about z-axis, e.g., a CNOT-gate entangles two qubits; $R_z$-gate (or Z-gate) implements rotation by a given angle (atan 2($\alpha$, $\beta$), e.g., see Eq. (19)); the rest of the gates shown in 202 perform changing back of basis or undoing the changes of basis. As shown by 202, 204 and 206, the set of gates shown at 202 repeat for n−1 iterations, for any n qubits (e.g., vertices of a simplicial complex or nodes in a graph). Each iterations operates on two-qubits, i-th and (i−1)-th qubits.

Briefly, X-gate rotates the qubit state by π radians (180°) about the x-axis. S-gate rotates the qubit state by π/2 radians (90°) about the z-axis. Z-gate rotates the qubit state by π radians (180°) about the z-axis. H-gate rotates the qubit state by π radians (180°) about an axis diagonal in the x-z plane, which can be equivalent to an X-gate followed by a π/2 rotation about the y-axis. Controlled-NOT (CNOT)-gate applies an X-gate to the target qubit if the control qubit is in state |1>.

For instance, a quantum circuit simulating a boundary operator can include n input qubit registers, an ancilla qubit register, n−1 sets of first quantum gates configured to perform two qubit Pauli $X_{i-1}$ and $Y_i$ rotations applied to the (i−1)-th and i-th qubits, respectively, where i can be 1 to n−1, an X-gate configured to act on (n−1)-th qubit, and a series of n−1 sets of second quantum gates configured to reverse the two qubit rotations performed by the n−1 sets of first quantum gates.

The resulting transformation or mapping represented in the quantum states of the qubits can be communicated to another one or more quantum circuits, to be used in computation. For instance, in an embodiment, the quantum circuit simulating a boundary operator can be used as a component of a series of quantum circuits, implementing TDA. In another embodiment, the quantum circuit simulating a boundary operator can be used as a component of a series of quantum circuits implementing another quantum algorithm.

Figure 4:
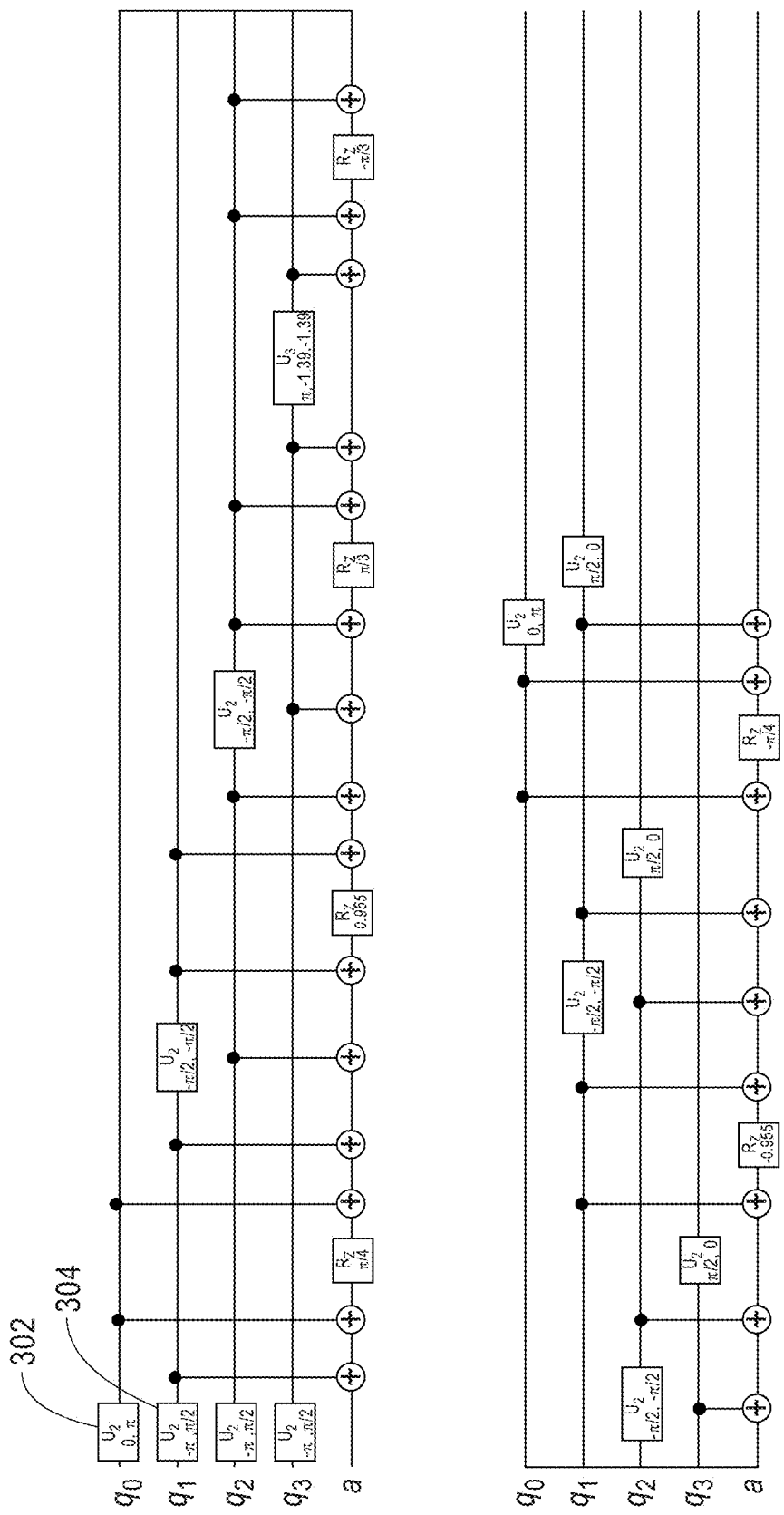
FIG. 4 illustrates an optimized version of the quantum circuit shown in FIG. 2 in an embodiment, where a series of gates is combined to obtain a simpler unitary gate.

FIG. 4 shows an optimized example quantum circuit of FIG. 3, optimized using unitary operators in an embodiment, where a series of gates is combined to obtain a simpler unitary gate, and also cancellation of gates. As with the quantum circuit shown in FIG. 3, in an embodiment, the quantum circuit has an O(n)-depth construction in terms of quantum computing primitives. The quantum circuit can include n qubits and an ancillary qubit (an extra qubit, also referred to an ancilla bit). The n qubits can correspond to n vertices of a simplex and via superposition of the entire simplicial complex, on which the boundary operator or map acts. For instance, through superposition, n vertices can be "reused" by each simplex in the simplicial complex. In an embodiment, each vertex of the simplicial complex can be assigned a qubit of n qubits in the quantum circuit. In comparison to the circuit shown in FIG. 3, a set of, or a sequence of adjacent single qubit gates can be transformed or optimized to a unitary operator. For example, shown at 302, an H-gate on $q_0$ can be transformed to a unitary operator. Similarly, shown at 304, X-gate, S-gate, H-gate on $q_1$ can be transformed to a unitary operator. Adjacent H-gates (H-gates next to one another) can be cancelled. Three adjacent X-gates can be simplified to one X-gate.

Figure 5:
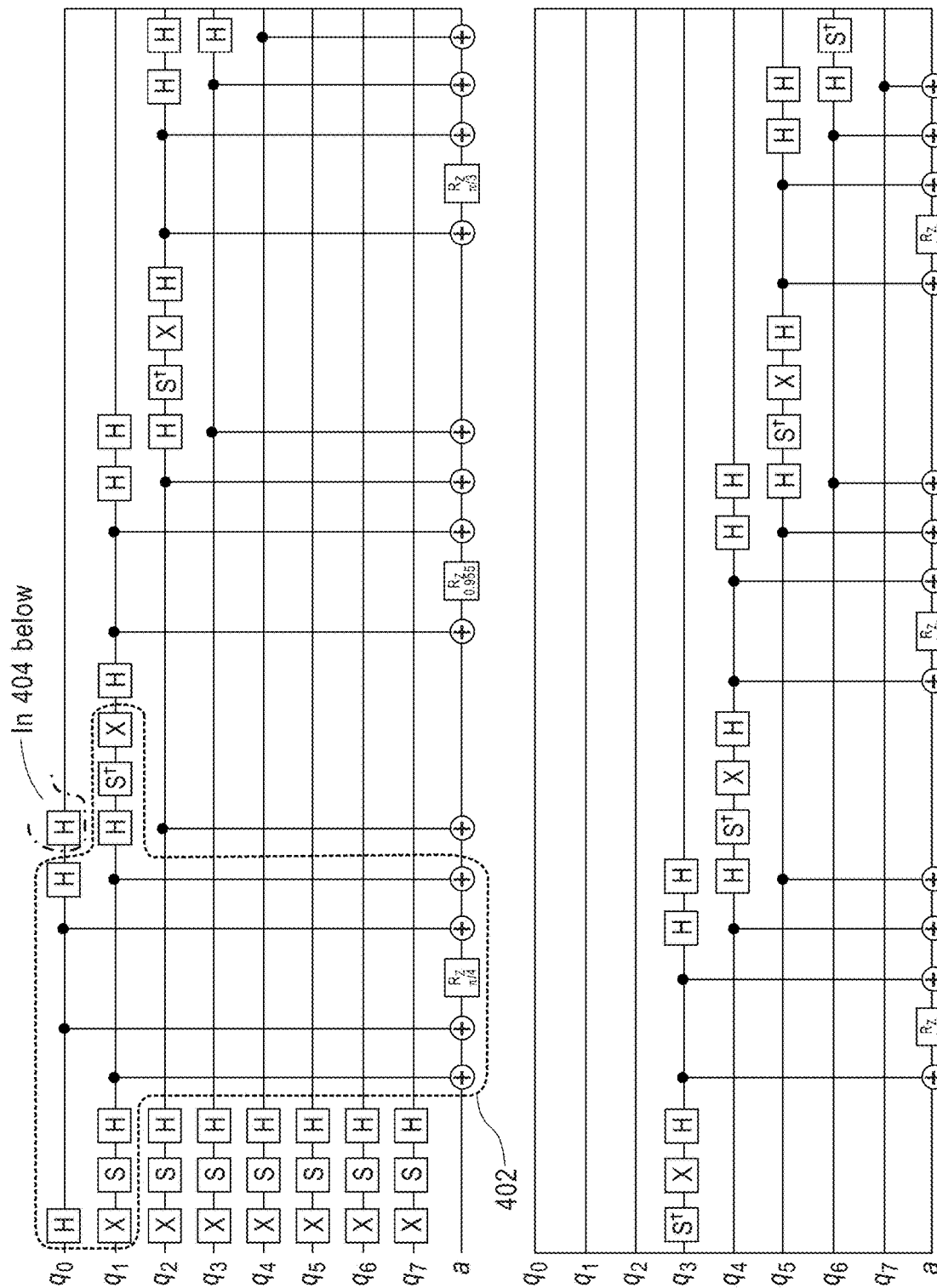
FIG. 5 illustrates a quantum circuit that can simulate a boundary operator, e.g., given a simplicial complex with n number of vertices, where n is 8.

FIG. 5 illustrates a quantum circuit that can simulate a boundary operator, e.g., given a simplicial complex with n vertices, where n is 8. The quantum circuit has an O(n)-depth construction in terms of quantum computing primitives. The quantum circuit can include n qubits and an ancillary qubit (an extra qubit, also referred to an ancilla bit). For example, the n qubits can correspond to n vertices of a simplex and via superposition of the entire simplicial complex, on which the boundary operator or map acts. For instance, through superposition, n vertices can be "reused" by each simplex in the simplicial complex. Each vertex of the simplicial complex can be assigned a qubit of n qubits in the quantum circuit. The quantum circuit shown in FIG. 5 includes n−1 sets of gates, a set of gates operating with i-th and (i−1)-th qubits. For example, the quantum gates shown at 402 represent "R", where i=1. Concatenation of such quantum gates are shown for i=1 to n−1, followed by the CNOT-gate (control NOT) shown at 406, which represents the term "$X_0$". The quantum gates shown at 404 represent the term "$R^\dagger$", for i=1. Again, concatenation of such quantum gates is shown for i=1 to n−1. As shown, the quantum gates in the sets at 402 and 404 operate on $q_1$ and $q_0$.

Figure 6:
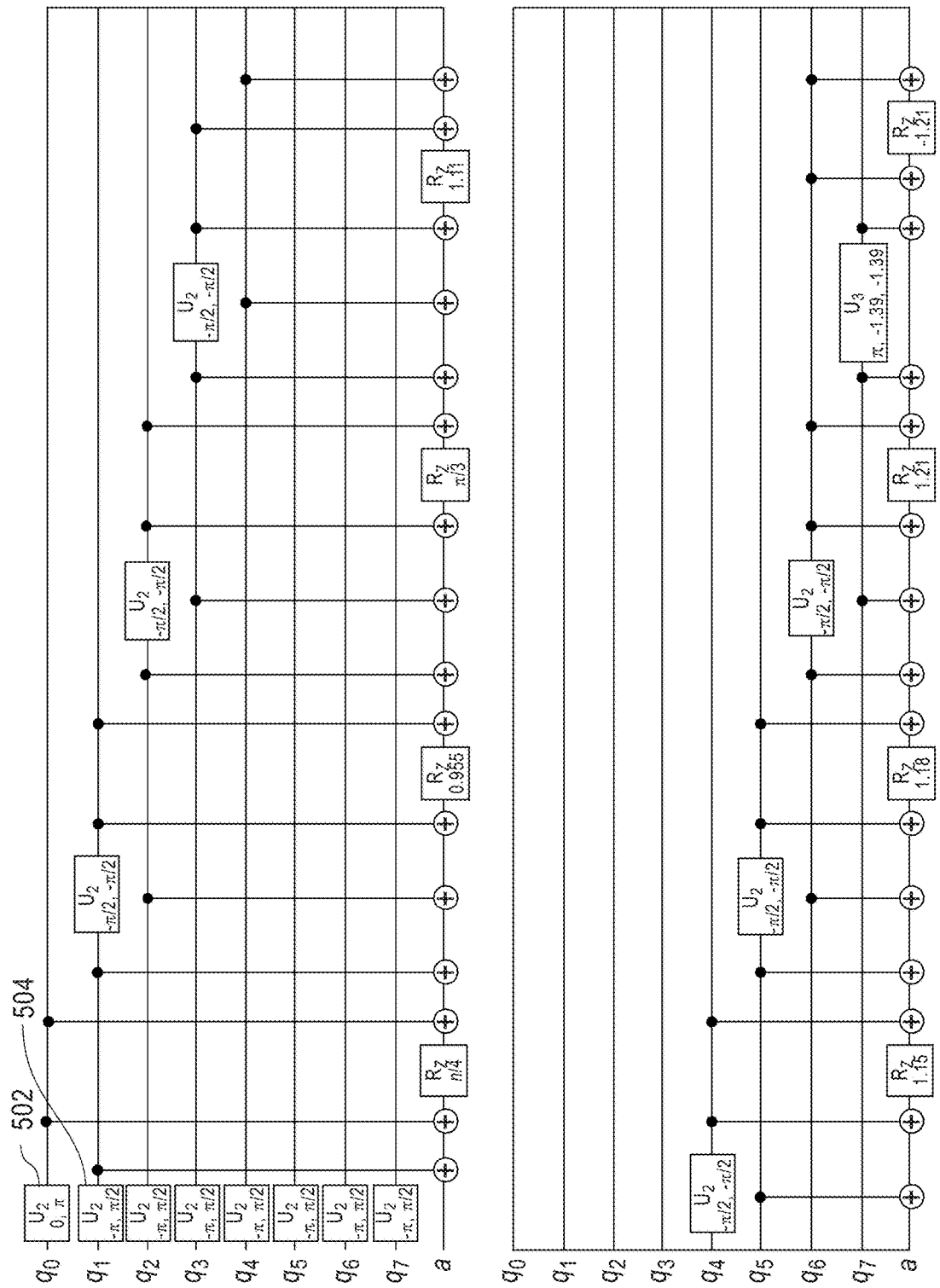
FIG. 6 illustrates an optimized version of the quantum circuit shown in FIG. 4 in an embodiment, where a series of gates is combined to obtain a simpler unitary gate.
Figure 6:
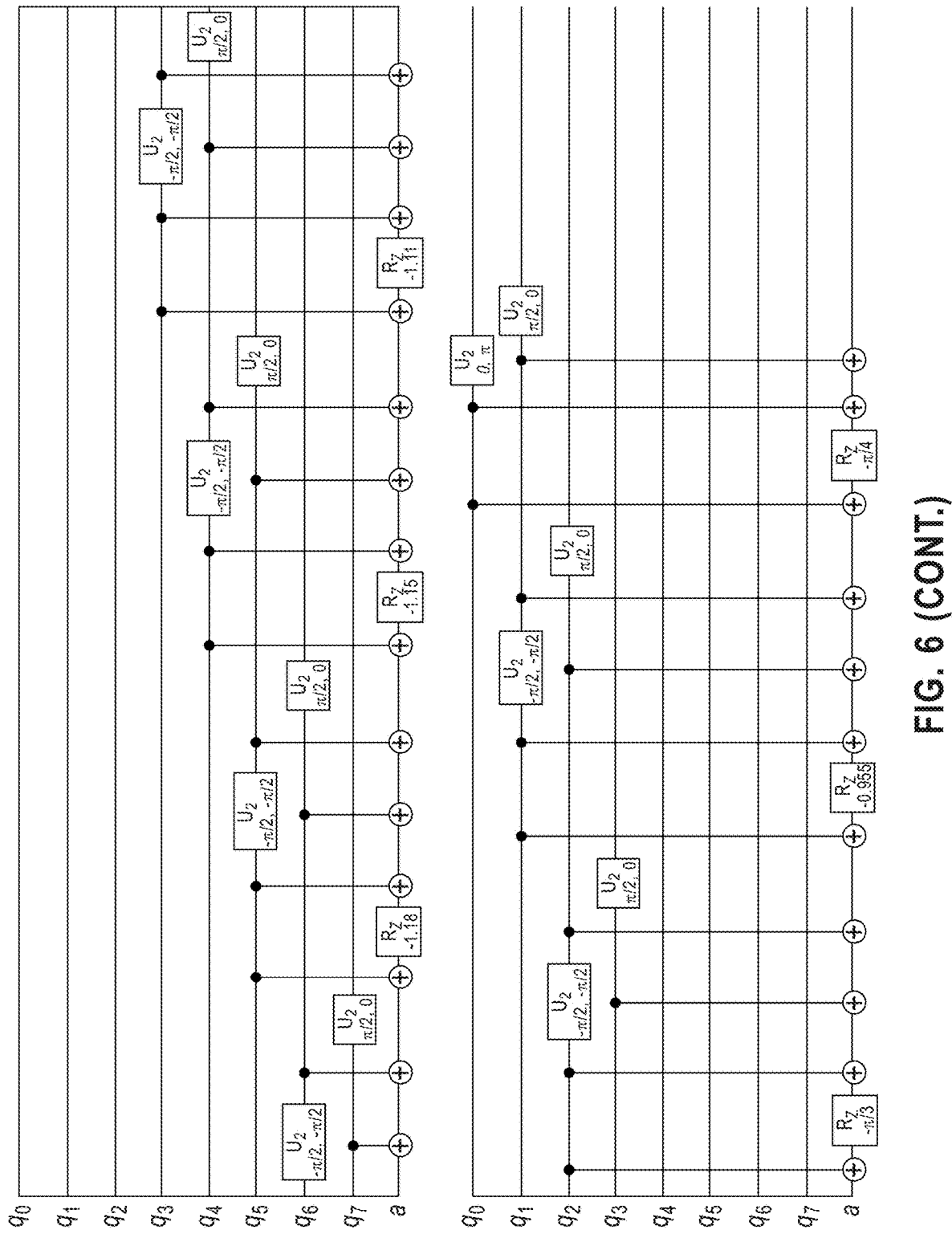

FIG. 6 illustrates an optimized version of the quantum circuit shown in FIG. 5 in an embodiment, where a series of gates is combined to obtain a simpler unitary gate. Gate cancellation where applicable can also be performed for further simplification. The quantum circuit has an O(n)-depth construction in terms of quantum computing primitives. The quantum circuit can include n qubits and an ancillary qubit (an extra qubit, also referred to an ancilla bit). The n qubits correspond to n vertices of a simplex or simplicial complex for which a boundary operator or map is being constructed. Each vertex of the simplicial complex can be assigned a qubit of n qubits in the quantum circuit. Similarly to the optimization of 4 qubit circuit shown in FIG. 3 and FIG. 4, the circuit in FIG. 6 shows a set of, or a sequence of single qubit gates, which are transformed or optimized to a unitary operator. Two adjacent H-gates can be cancelled. For example, shown at 502, an H-gate on $q_0$ can be transformed to a unitary operator. Similarly, shown at 504, X-gate, S-gate, H-gate on $q_1$ can be transformed to a unitary operator.

In an embodiment, because the quantum circuit is an exact representation of the boundary operator or map (an exact implementation), for example, without approximation, there are no trotterization errors and no approximation errors. For example, previous works that use approximation for implementing a large matrix via techniques such as sparse data access, may introduce errors including approximation errors into the representation.

Depth and Shots in QTDA Use Case

The above unitary form of the boundary operator shown as Eq. (22) has depth $\mathcal{O}(n)$ since there are 2(n−1) rotations and one $X_0$. To be precise, the dependence on n is contained in R, which is a sequence of n−1 two-qubit rotations, so in total there can be 2(n−1) two-qubit rotations. For achieving the $\mathcal{O}(n)$ depth, each Pauli rotation (involving two qubits) can be implemented in constant depth. For example, the standard way to evolve a single Pauli string is to change the basis of each of the qubits affected by a $\sigma_x$ or $\sigma_y$ into the $\sigma_z$ basis (there are only two such qubits for each rotation, which is independent of n) followed by rotation around the z-axis while accounting for parity. Therefore, the two-qubit rotations are independent of n and the overall depth of Eq. (22) is $\mathcal{O}(n)$.

With the boundary operator performed analytically there can be a saving in the number of shots needed compared to the Trotterized version. In the Trotterized version, $\Delta$ (the Laplacian of the restricted boundary operator) is implemented via Taylor expansion of the Trotterized evolution of exp(iBt) for small t and solving for $\Delta$. In order to account for Trotterization error, $\mathcal{O}(t^2) \leq \epsilon$. Therefore $\mathcal{O}(t) \leq \sqrt{\epsilon}$. In order to account for the Taylor-expansion-and-solve-for-B error, the intermediate expectation calculation should be known to within $\epsilon n \mathcal{O}(t^2)$. Therefore, $\mathcal{O}(t) \leq \epsilon n \mathcal{O}(t^2)$ and $1/\epsilon \leq n \mathcal{O}(t)$. Therefore, $1/(\epsilon n) \leq \mathcal{O}(t) \leq \sqrt{\epsilon}$. This may show that not all $\epsilon$ can be achieved.

Next, consider, for achievable E, the number of samples needed to overcome shot-noise $$\left(\epsilon_{shot} \sim \frac{1}{\sqrt{N}}\right).$$

The measurement expectation should be known to within $\epsilon_{shot} \leq O(t^2) \leq \epsilon^2$. Therefore the number of samples needed is $$N > O\left(\frac{1}{\epsilon^4}\right).$$

In contrast, since there is no Trotterization and Taylor expansion error for the analytic circuit, the number of samples needed can be $$N > O\left(\frac{1}{\epsilon^2}\right),$$

which is a quadratic saving (and more for higher moments).

In one or more embodiments, a short-depth (O(n)) quantum circuit for the exact, analytical implementation of the full Hermitian boundary operator on a gate-based quantum computer can be provided. The quantum circuit can provide for an improvement over a Trotterized implementation, which can result in at least quadratic savings in the number of shots. A formal proof is described above for the proposition that the boundary operator can be written as a sum of fermionic creation and annihilation operators. This connection between algebraic geometry and fermionic operators can potentially be explored for applications in other areas. The fermionic representation together with the property of pairwise Pauli anticommutation permits implementation via a short-depth circuit implementing a cascade of two-qubit rotations. With such a short-depth circuit for the full boundary operator, additional quantum implementations of many algorithms that have the boundary operator as a component, e.g., including in the fields of differential equations and machine learning, can be contemplated.

By way of example, the following illustrates the formulae described above with the explicit example of n=3. There are three vertices in the example here, which can be called, $v_{0,1,2}$. The following then uses binary degree-lexicographic representation of the 8 simplices constructible from these vertices as follows:

| Dimension | Binary | Simplex | (23) |
|---|---|---|---|
| – | 000 | $\phi$ | |
| 0 | 001 | $v_0$ | |
|   | 010 | $v_1$ | |
|   | 100 | $v_2$ | |
| 1 | 011 | line $(v_0, v_1)$ | |
|   | 101 | line $(v_0, v_2)$ | |
|   | 110 | line $(v_1, v_2)$ | |
| 2 | 111 | triangle $(v_0, v_1, v_2)$ | |

A few of the boundary operators as defined above can be checked as follows. Consider $\partial_1^{(3)}$, which should take a line to its boundary endpoints, with sign. Take $|s_1\rangle = 011$, there are only 2 terms contribution since the Kronecker-delta picks out $v_1$ and $v_0$, i.e., i=0,1

$$\partial_1^{(3)}|s_1\rangle = \qquad (24)$$
$$(-1)^{\sum_{j=1}^2 s_1(j)} v_0 + (-1)^{\sum_{j=2}^2 s_1(j)} v_1 = (-1)^{1+2} v_0 + (-1)^0 v_1 = v_1 - v_0.$$

Next, take $|s_2\rangle = 111$ and act upon it with $\partial_2^{(3)}$, whereupon all 3 terms in the sum contribute:

$$\partial_2^{(3)}|s_2\rangle = (-1)^{\sum_{j=1}^2 s_2(j)} v_0 + (-1)^{\sum_{j=2}^2 s_2(j)} v_1 + (-1)^{\sum_{j=3}^2 s_2(j)} v_2 = \qquad (25)$$
$$(-1)^{1+1} v_0 + (-1)^1 v_1 + (-1)^0 v_2 = v_0 - v_1 + v_2,$$

which says that that the boundary of the triangle are the 3 (signed) edges.

The Boundary Operator $\partial^{(n)}$

The following shows the boundary operator $\partial^{(n)}$, constructed from the pieces $\partial_k^{(n)}$ given in Eq. (6), explicitly. The initial cases are simply:

$$\partial^{(1)} = \begin{pmatrix} 0 & 1 \\ 0 & 0 \end{pmatrix} \qquad (26)$$

$$\partial^{(2)} = a_0 + a_1 = \sigma_z \otimes Q^+ + Q^+ \otimes I = \begin{pmatrix} 0 & 1 & 0 & 0 \\ 0 & 0 & 0 & 0 \\ 0 & 0 & 0 & -1 \\ 0 & 0 & 0 & 0 \end{pmatrix} + \begin{pmatrix} 0 & 0 & 1 & 0 \\ 0 & 0 & 0 & 1 \\ 0 & 0 & 0 & 0 \\ 0 & 0 & 0 & 0 \end{pmatrix}$$

$$= \begin{pmatrix} 0 & 1 & 1 & 0 \\ 0 & 0 & 0 & 1 \\ 0 & 0 & 0 & -1 \\ 0 & 0 & 0 & 0 \end{pmatrix},$$

-continued $$\partial^{(3)} = a_0 + a_1 + a_2 = \sigma_z \otimes \sigma_z \otimes Q^+ + \sigma_z \otimes Q^+ \otimes I + Q^+ \otimes I \otimes I$$

$$= \begin{pmatrix} 0 & 1 & 0 & 0 & 0 & 0 & 0 & 0 \\ 0 & 0 & 0 & 0 & 0 & 0 & 0 & 0 \\ 0 & 0 & 0 & -1 & 0 & 0 & 0 & 0 \\ 0 & 0 & 0 & 0 & 0 & 0 & 0 & 0 \\ 0 & 0 & 0 & 0 & 0 & -1 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 0 \end{pmatrix} +$$

$$\begin{pmatrix} 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & -1 & 0 \\ 0 & 0 & 0 & 0 & 0 & 0 & 0 & -1 \\ 0 & 0 & 0 & 0 & 0 & 0 & 0 & 0 \\ 0 & 0 & 0 & 0 & 0 & 0 & 0 & 0 \end{pmatrix} + \begin{pmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}.$$

$$= \begin{pmatrix} 0 & 1 & 1 & 0 & 1 & 0 & 0 & 0 \\ 0 & 0 & 0 & 1 & 0 & 1 & 0 & 0 \\ 0 & 0 & 0 & -1 & 0 & 0 & 1 & 0 \\ 0 & 0 & 0 & 0 & 0 & 0 & 0 & 1 \\ 0 & 0 & 0 & 0 & 0 & -1 & -1 & 0 \\ 0 & 0 & 0 & 0 & 0 & 0 & 0 & -1 \\ 0 & 0 & 0 & 0 & 0 & 0 & 0 & 1 \\ 0 & 0 & 0 & 0 & 0 & 0 & 0 & 0 \end{pmatrix}$$

Nilpotency

The following checks that the boundary operator is nilpotent, as is required from homology:

Lemma 2. The boundary operator satisfies $\partial^{(n)} \cdot \partial^{(n)} = 0$.

A proof of this that proceeds by induction is described in herein incorporated commonly-owned, U.S. patent application Ser. No. 17/863,500.

Figure 7:
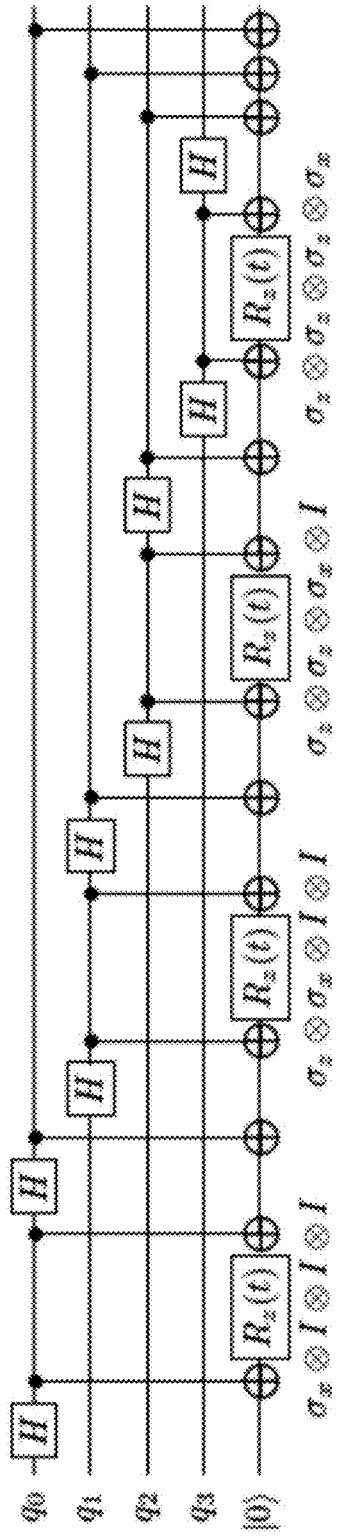
FIG. 7 illustrates another example of an optimized quantum circuit that can simulate a boundary operator in an embodiment.

As discussed above, a quantum circuit can implement or simulate a boundary operator. A quantum circuit can include a sequence of quantum gates and initialization of qubits to known values, and may also include measurements. FIG. 7 is a diagram illustrating a quantum circuit for a boundary operator in another embodiment. The quantum circuit in an embodiment can be constructed with CNOT, Hadamard (H), and rotation gates, e.g., $R_z(t)$ gates. Using gate cancellations related to commuting Pauli subterms, in an embodiment, the quantum circuit can achieve O(n) gates, e.g., 2(2n−1) CNOT gates, 2n Hadamard gates, and n rotation gates. The depth of this circuit can be 4n, and therefore it is NISQ implementable. By way of example, the quantum circuit implements a specific example of a quantum circuit generally presented by Eq. (6).

As described above, the boundary operator B can be represented efficiently as a sum of Pauli operators. For instance, as described above with reference to Eq. (6), the matrix a (e.g., also known as the single spin annihilation operator from second quantization quantum mechanics) can be defined as $$a = \frac{(\sigma_x + i\sigma_y)}{2} = \begin{pmatrix} 0 & 1 \\ 0 & 0 \end{pmatrix},$$

where a is written in terms of the Pauli operators $\sigma_x$ and $\sigma_y$. This a can be considered as removing a specific vertex out of a simplex. Note, by inspection or by recognizing the coefficient of $\sigma_y$ is imaginary, that both a and the boundary operator below are not Hermitian. Similar to Eq. (6) above, the full boundary map operator $\partial = \otimes_k \partial_k$ of all possible simplices can be written in the following manner, $$\partial = a \otimes I \otimes I \otimes \ldots I + \\ \sigma_z \otimes a \otimes I \otimes \ldots I + \\ \sigma_z \otimes \sigma_z \otimes a \otimes \ldots I + \\ \vdots \\ \sigma_z \otimes \sigma_z \otimes \sigma_z \otimes \ldots \otimes a = , \\ \sum_{i=0}^{n-1} a_i$$

where the $a_i$ are the Jordan-Wigner Pauli embeddings corresponding to the n-spin fermionic annihilation operators.

The $\otimes$ is the tensor product (as many as qubits, n), and a is applied consecutively to each qubit, preceded by $\sigma_z$ (also referred to as Z matrices). The identity matrices, leave other vertices in-place, if they are there. The tensor of Z matrices before the a matrix in each term achieves the parity calculation, which keeps track of the sign of the boundary simplex. There are n terms. The boundary matrix applies to a vector of size: $2^n$ (2 to the power of n, also denoted as 2^n). For example, this vector encodes the simplices (points, edges, faces, ... ) in binary characteristic form (0 for absent, 1 for present). The Hermitian full Boundary map matrix can be given as $B = \partial^\dagger + \partial = \sum_{i=0}^{n-1} a_i + a_i^\dagger$.

There can be n single qubit operations in the tensor product in each of the above terms, one for each vertex in the simplicial complex. The a term "removes a vertex" from a simplex and the instances of $\sigma_z$ provide the correct sign in the oriented sum by accumulating as many instances of −1 as there are vertices present to the left of the vertex being removed (also known as anti-symmetrizing the wave function).

This non-Hermitian operator can be transformed into an associated Hermitian operator by adding its complex conjugate as $$B = \partial^\dagger + \partial = \sum_{i=0}^{n-1} a_i + a_i^\dagger.$$

Since the $\sigma_y$ terms cancel out, the matrix B only has $\sigma_x$ and $\sigma_z$ terms. B can be expressed as a sum of polynomially-many Pauli terms, and $e^{iB}$ can be simulated efficiently, e.g., using the Trotter-Suzuki formula. The structure of the quantum circuit can further be reduced with gate cancellations to achieve a depth complexity of O(n). That is, the number of gates implemented on the quantum circuit can be linearly related, e.g., by some constant value, to n, the number of qubits representing the vertices in a simplicial complex.

Figure 8:
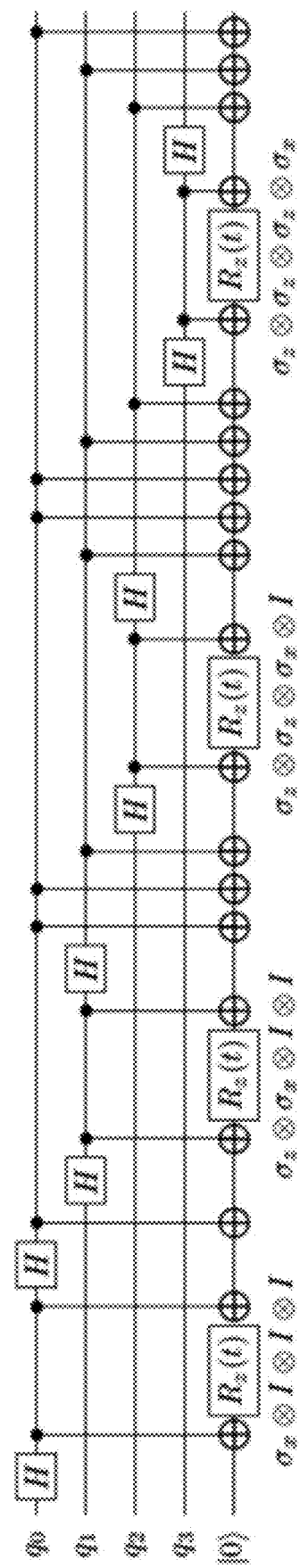
FIG. 8 illustrates an example of a quantum circuit that can simulate a boundary operator, which can be further optimized as shown in FIG. 6, in an embodiment.

The following describes details on the simulation of B in another embodiment, for example, as shown in FIG. 7 and FIG. 8. In this embodiment also, a representation for the boundary operator B can implemented as a sum of Pauli operators. For a quantum implementation, a unitary $U_B(t) = e^{-iBt}$ for some t can be constructed. For instance, to do so, the Trotter-Suzuki formula can be used: Supposing an n-qubit Hamiltonian is written as $A = \sum_{j=1}^{n} A_j$, then there can be $$e^{-i\sum_{j=1}^{n} A_j t} = \prod_{j=1}^{n} e^{-iA_j t} + O(n^2 t^2),$$

where the error in this approximation is negligible when $t \ll 1$.

Each $A_j$ are Pauli terms $\{\sigma_x, \sigma_y, \sigma_z, \sigma_i\}^{\otimes n}$. Pauli terms commute with each other. Hence, by permuting blocks to align the terms that commute, several gates can be cancelled in order to reduce the size (both gate and depth complexity) of the circuit.

In an embodiment, the Pauli terms can be mapped to quantum circuits using diagonalization and unitary evolution. The Pauli terms $\{\sigma_z, \sigma_i\}^{\otimes n}$ are already diagonal, and thus there can be $e^{i\sigma_i t} = e^{it}I$ and $$e^{i\sigma_z t} = \begin{bmatrix} e^{it} & 0 \\ 0 & e^{-it} \end{bmatrix} =: R_Z(t).$$

Using diagonalization, the Pauli $\sigma_x = H\sigma_z H^T$, where $$H = \frac{1}{\sqrt{2}}\begin{bmatrix} 1 & 1 \\ 1 & -1 \end{bmatrix}$$

is the Hadamard matrix, and $e^{-i\sigma_x t} = He^{i\sigma_z t}H^T = HR_z(t)H^T$.

Next, for the boundary operator $B = \partial + \partial^\dagger$, there can be $$\begin{aligned} B &= \sigma_x \otimes I \otimes I \otimes ... I \\ &+ \sigma_z \otimes \sigma_x \otimes I \otimes ... I \\ &\vdots \\ &+ \sigma_z \otimes \sigma_z \otimes \sigma_z \otimes ... \otimes \sigma_x, \end{aligned}$$

since $a + a^\dagger = \sigma_x$. Therefore, $e^{iBt}$ can be simulated using a quantum circuit with CNOT, Hadamard H, and rotation $R_z(t)$ gates.

For example, supposing n=4, the basic circuit (with one ancillary qubit) can be obtained for B using the above diagonalization. An embodiment of this basic circuit is shown in FIG. 8. In this implementation, the circuit has $O(n^2)$ gates (i.e., n(n+1) CNOT gates, n rotation $R_z(t)$ gates, and 2n Hadamard H gates) with depth $O(n^2)$. This circuit can be simplified by identifying sub-terms that commute and then using gate cancellations. Since the sub-terms $\{\sigma_z\}^{\otimes r}$ for different r values between the terms in B commute, a number of CNOT gates can be cancelled (because they are redundant). FIG. 7 shows the simplified circuit. The simplified circuit shown in FIG. 7 has O(n) gates, simplified using gate cancellations related to commuting Pauli subterms. The simplified circuit for simulating $e^{iBt}$ now has O(n) gates, i.e., 2(2n−1) CNOT gates, 2n Hadamard gates, and n rotation gates. The depth of this circuit is 4n.

Referring to FIG. 7, a quantum circuit is shown that is a decomposition of a boundary map. The circuit can include n qubits and an ancillary qubit (an extra qubit, also referred to an an ancilla bit). The n qubits can correspond to n vertices of a simplex and via superposition of the entire simplicial complex, on which the boundary operator or map acts. For instance, through superposition, n vertices can be "reused" by each simplex in the simplicial complex. FIG. 7 shows a specific example where n is 4. Each vertex can be assigned a qubit of n qubits in the circuit.

Pauli operators or matrices can represent quantum gates. For example, there is a Pauli gate or matrix for each axis in space (X, Y and Z) or bloch sphere. The X-gate is represented by the Pauli-X (or $\sigma_x$) matrix:

$$\begin{bmatrix} 0 & 1 \\ 1 & 0 \end{bmatrix}.$$

A Pauli gate acts on one qubit at a time. The Pauli X-gate corresponds to a classical NOT gate. For example, the X-gate can be referred to as the quantum NOT gate. The X-gate generally turns the spin-up state |0> of an electron into a spin-down state |1> and vice-versa.

Likewise, the Y (also referred to as $\sigma_y$) and Z (also referred to as $\sigma_z$) Pauli matrices act as the Y-gate and the Z-gate: The following shows the Pauli Y and Z gates expressed in matrix forms.

$$Y: \begin{bmatrix} 0 & -i \\ i & 0 \end{bmatrix}$$

$$Z: \begin{bmatrix} 1 & 0 \\ 0 & -1 \end{bmatrix}$$

Generally, the Pauli X gate action can be considered a rotation by $\pi$ (pi) radians (180 degrees) around the x-axis of the Bloch sphere, and can result in the bit flip; the Pauli Z gate action can be considered a rotation by $\pi$ radians around the z-axis of the Bloch sphere, and can result in the phase flip; and the Pauli Y gate action can be considered a rotation by $\pi$ radians around the y-axis of the Bloch sphere, and can result in both the bit flip and the phase flip simultaneously. Pauli operators have properties such that two Pauli operators commute only if they are identical or one of them is the identity operator or matrix, otherwise they anticommute. For example, $a_i a_j = I$, if i=j; and $a_i a_j = 0$, if i j; where i and j are x, y or z of the Pauli operators, and I is the identify matrix.

Generally, controlled gates act on two or more qubits, where one or more qubits act as a control for some specified operation. The controlled NOT gate (or CNOT) can act on 2 qubits, and perform the NOT operation on the second qubit (target) if the first qubit (control) is |1⟩, and if the first qubit is |0⟩, leave the second qubit unchanged. The solid circle or dot represents a control bit. If the control bit is |1⟩ (e.g., from the first qubit), the CNOT gate acts on (performs NOT operation on) the second qubit (e.g., the ancillary qubit), otherwise, the second qubit is left unchanged. The CNOT gate is annotated with '+' within a circle. The Hadamard gate or H-gate (annotated as 'H' within a box) creates superpositions of vectors. For example, the Hadamard gate turns vector |0⟩ to $$\frac{1}{\sqrt{2}}(|0\rangle + |1\rangle);$$

turns vectors |1⟩ to $$\frac{1}{\sqrt{2}}(|0\rangle - |1\rangle).$$

H-gate rotates the qubit state by $\pi$ (pi) radians (180 degrees) about an axis diagonal in the x-z plane of the Bloch sphere. This is equivalent to an X-gate followed by a $$\frac{\pi}{2}$$

rotation about the y-axis. The Rotation $R_z$ gate rotates or flips the qubit around the z-axis of the bloch sphere.

The quantum circuit shown in FIG. 7 has five quantum bits or qubits. The four qubits correspond to n (e.g., 4) vertices that form a simplicial complex. The circuit can receive n qubits encoded with information. The fifth qubit is an ancillary qubit set to |0⟩. The Hadamard gate is a single qubit gate and applies to only one qubit. The quantum circuit shown includes two types of single qubit gates, the Hadamard gate and Rotation $R_z$ gate. There is one type of two qubit gates that connects two qubits, which is the CNOT-gate. For example, a CNOT-gate connects the ancillary qubit to the other qubits that are assigned to the n vertices.

In an aspect, the number of non-parallel gates, i.e., those that run on their own time slice, is called depth of gate or gate depth. For example, there can be ten gates total in a quantum circuit, but its gate depth can be five, if some of the gates can be run in parallel, that is, at the same time slice. One or more quantum circuits disclosed herein is able to use O(n) gates and depth, where n corresponds to the number of vertices (or nodes). A practical example of a vertex can be a data point that represents an object with one or more attributes. Another example can be a patient having one or more attributes, for example, of a health or medical database. As more vertices are added, more qubits (e.g., horizontal line in FIG. 6) can be added. For example, there can be a qubit per vertex or node. That is, as n grows, the number of qubits grows, and the boundary operator can become larger. O(n) or order n shows that the number of gates used in the quantum circuit grows linearly by some constant value as the number of vertices (qubits) grows. The gate depth also increases linearly with respect to the number of vertices, i.e., the gate depth of O(n) can also be achieved. Hence, the quantum circuit can achieve short gate and short depth. O(n) gate and O(n) depth provides an improvement over the existing quantum circuits that may implement a boundary operator, which have $O(n^2)$ gate and depth.

Referring to FIG. 7, generally, the quantum circuit includes and extra qubit or ancillary qubit (ancilla bit), on which CNOT-gate is performed. For example, if there are four vertices, one extra qubit is included and the circuit operates by performing a CNOT into that extra qubit, e.g., based on the values of the four qubits that are the vertices. In an embodiment, the circuit controls into one qubit, and hence the underlying quantum computer on which the circuit can be implemented, only needs to have a connectivity between other qubits and this one qubit. For instance, the control bit associated with $q_0$ is connected to the ancilla bit, where based on the control bit, CNOT can be performed on the ancilla bit; the control bit associated with $q_1$ is connected to the ancilla bit, where based on the control bit, CNOT can be performed on the ancilla bit; the control bit associated with $q_2$ is connected to the ancilla bit, where based on the control bit, CNOT can be performed on the ancilla bit; Hadamard gate is acted on $q_3$ and the control bit associated with $q_3$ is connected to the ancilla bit, where based on the control bit of associated with $q_3$, CNOT can be performed on the ancilla bit; a rotation is performed on the ancilla bit; and so on (reading the circuit from left to right). Thus, in an embodiment, only one qubit needs to be highly connected. For instance, there is no CNOTs between the four qubits ($q_0$, $q_1$, $q_2$, $q_3$).

As described above, the generic template for a quantum circuit can be given by Eq. (33), and also by Eq. (6). Those formulae decompose the boundary operator or represents the boundary operator in terms of simple objects which can be represented in quantum computing. For instance, a 2×2 matrix form can be represented using quantum gates such as the four basic gates, which are Pauli gates based on Pauli operators. This 2×2 form can be combined with other set of such 2×2 matrices to build a $2^n$ (also expressed as 2^n) matrix. For example, if there are n points or vertices, the boundary operator can be a $2^n$ matrix. This $2^n$ matrix can be constructed using the 2×2 building blocks. For any given n, using this building block, $2^n$ boundary operator can be constructed. In an embodiment, a quantum circuit provides an actual representation of such matrix on a quantum computer.

A boundary map or operator, which can be expressed as a $2^n \times 2^n$ matrix, can represent a graph that defines connections between two or more points, nodes or vertices. For instance, where the data represents a simplicial complex, the subscript k in the term $\partial_k$, represents a simplex dimension. For example, subscript of 1 (e.g., $\partial_1$) indicates a connection between two points (forming a line); subscript 2 (e.g., $\partial_2$) indicates connections between three points (forming a triangle), e.g., how many triangles are connected among one another; and so on. The sum of all the connections can be $2^n$ (also expressed as 2^n). In an embodiment, the boundary map can be decomposed into components that can be mapped to quantum primitives, e.g., Pauli operators. For example, a quantum circuit implementation can construct a boundary map or operator, which can be an exponentially large matrix, using O(n) gates and depth on the quantum computer. In an embodiment, only one qubit needs to be well connected to other qubits in the quantum circuit. Such boundary map can have many different applications. As the number of qubits increases, the circuit can be scaled to include additional set of gates, e.g., 3 CNOT gates, 2 H gates and a $R_z$ gate, which connect the ancilla gate and an additional qubit. For instance, each set of operators correspond to a Pauli operator or Pauli string, which is quantum circuit mapped. For example, referring to Eq. (6), each $a_i$ in $\Sigma_{i=0}^{n-1} a_i$ can be a Pauli operator or Pauli string. Further, considering the pairwise anticommute properties of the Pauli operator, some gates can be cancelled to reduce the overall gate depth. Connecting the individual qubits and using rotation operations systematically translates the initial state to quantum states that construct the boundary operator on a quantum computer.

So for example, the quantum circuit shown in FIG. 7 and/or FIG. 8 can include at least n input qubit registers; an ancilla qubit register; and n sets of third quantum gates, wherein a set of third quantum gates is configured to perform tensor product of Pauli X matrix and i number of Pauli Z matrices, for qubit register i, where i can be 0 to n−1. For example, each set in the n sets of third quantum gates can be configured thusly.

Figure 9A:
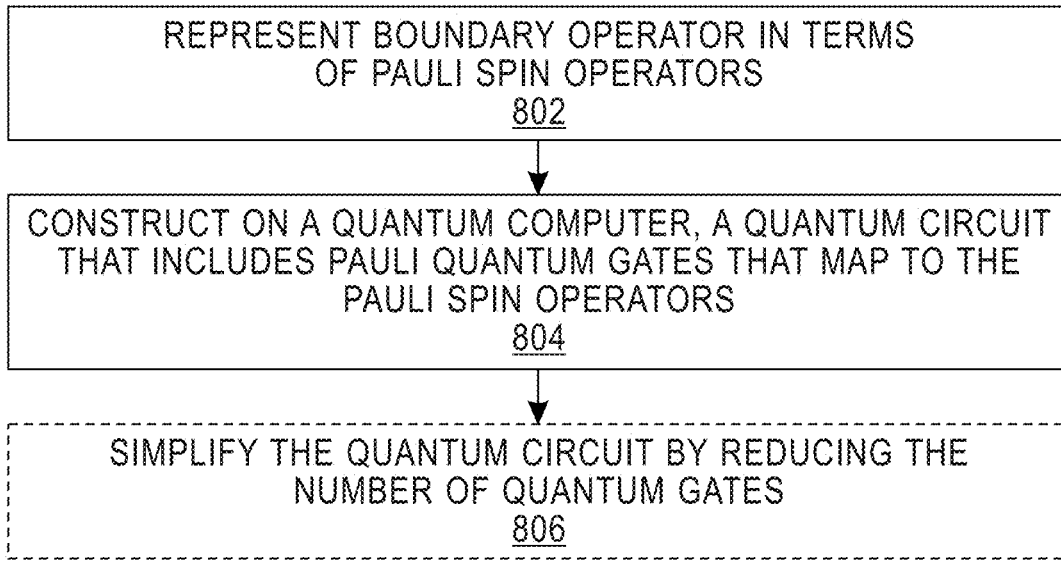
FIG. 9A is a flow diagram illustrating a method of providing a quantum circuit that can simulate a boundary operator in an embodiment.

FIG. 9A is a flow diagram illustrating a method or process of providing or building a quantum circuit that can simulate a boundary operator in an embodiment. The example process shown may include one or more operations, actions, or functions as illustrated by one or more of blocks. Although illustrated as discrete blocks, various blocks can be divided into additional blocks, combined into fewer blocks, eliminated, performed in different order, or performed in parallel, depending on the desired implementation.

At 802, the method can include representing a boundary operator that maps boundaries of a given graph having at least nodes and edges in terms of Pauli spin operators, the boundary operator decomposed as a sum of the Pauli spin operators. In an embodiment, a boundary operator can be represented that maps a given graph with nodes and edges to its boundaries. For example, in an embodiment, the method can include representing a boundary operator that maps simplices of orders, e.g., of all orders, in a given simplicial complex in terms of Pauli spin operators, the boundary operator decomposed as a sum of the Pauli spin operators, for example, for example, as described above. At 804, the method can include constructing on or for a quantum computer, a quantum circuit that includes Pauli quantum gates that map to the Pauli spin operators, for example, as described above. In an embodiment, the Pauli spin operators are mapped into fermionic creation and annihilation operators. In an embodiment, the quantum circuit operates on n qubits corresponding to n vertices in the given simplicial complex, and an ancillar qubit. In an embodiment, the quantum circuit operates on two qubits of the n qubits and an ancilla bit at a time. In another embodiment, the connectivity in the quantum circuit occurs only between the ancilla qubit and one the n qubits at a time.

In an embodiment, at 806, the method may also include simplifying the quantum circuit, e.g., reducing the number of Pauli quantum gates in the quantum circuit based on anticommutation property associated with the Pauli spin operators. In an embodiment, consecutive or series of single qubit gates can be combined into a unitary operator.

Figure 9B:
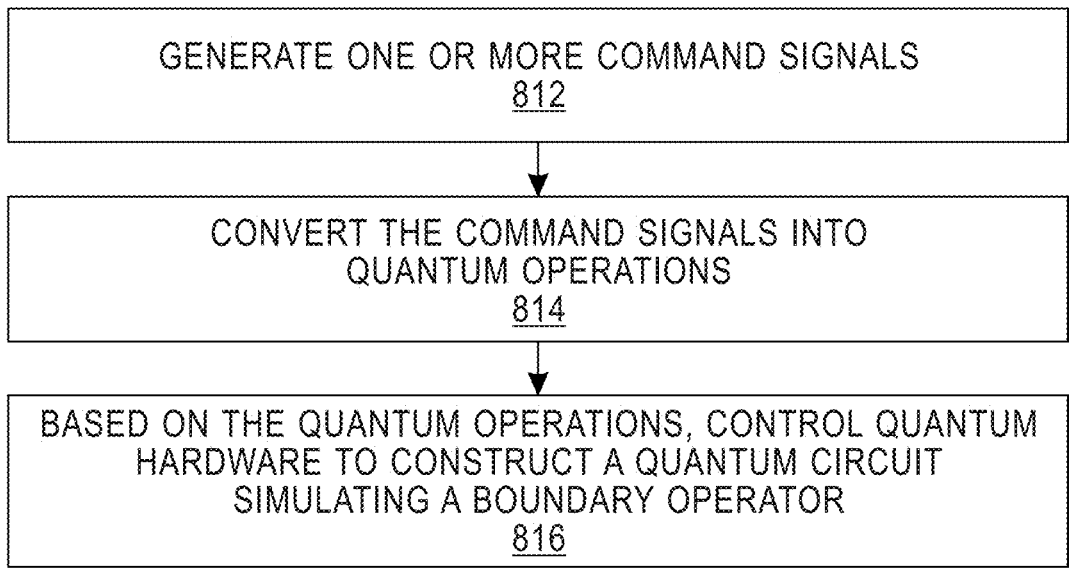
FIG. 9B is another flow diagram illustrating a method of providing a quantum circuit that can simulate a boundary operator in an embodiment.

FIG. 9B is another flow diagram illustrating a method or process of providing or building a quantum circuit that can simulate a boundary operator in an embodiment. The example process shown may include one or more operations, actions, or functions as illustrated by one or more of blocks. Although illustrated as discrete blocks, various blocks can be divided into additional blocks, combined into fewer blocks, eliminated, performed in different order, or performed in parallel, depending on the desired implementation.

At 812, the method can include a controller such as a controller of a quantum system generating one or more command signals. In an embodiment, for example, the command signals indicate what operations are to be performed on qubits of quantum hardware. At 814, the method can also include an interface of the quantum system converting the command signals into quantum operations. For instance, the interface can convert the command signals into signals that can drive or manipulate qubits, for example, to perform operations on the qubits. At 816, the method can include the interface of the quantum system, based on the quantum operations, controlling quantum hardware of the quantum system to construct a quantum circuit including at least Pauli quantum gates. For example, control signals (e.g., quantum operations) applied to or routed to one or more qubits control gate operates that construct the quantum circuit. The quantum circuit can be configured to simulate a boundary operator that creates a mapping of boundaries of a given graph having at least nodes and edges. In an embodiment, the quantum circuit can have linear depth relative to the number of nodes in the given graph.

In an embodiment, a boundary operator can be represented that maps a given graph with nodes and edges to its boundaries. In an embodiment, a boundary operator that maps boundaries of a given graph having at least nodes and edges can be represented in terms of Pauli spin operators, the boundary operator decomposed as a sum of the Pauli spin operators. For example, in an embodiment, a boundary operator can map simplices of orders, e.g., of all orders, in a given simplicial complex in terms of Pauli spin operators, where the boundary operator can be decomposed as a sum of the Pauli spin operators. In an embodiment, the Pauli spin operators are mapped into fermionic creation and annihilation operators. In an embodiment, the quantum circuit operates on n qubits corresponding to n vertices in the given simplicial complex, and an ancillar qubit. In an embodiment, the quantum circuit operates on two qubits of the n qubits and an ancilla bit at a time. In another embodiment, the connectivity in the quantum circuit occurs only between the ancilla qubit and one the n qubits at a time.

In an embodiment, the quantum circuit can be a simplified quantum circuit, e.g., the number of Pauli quantum gates in the quantum circuit being reduced based on anticommutation property associated with the Pauli spin operators. In an embodiment, consecutive or series of single qubit gates can be combined into a unitary operator to simplify the quantum circuit.

Figure 10:
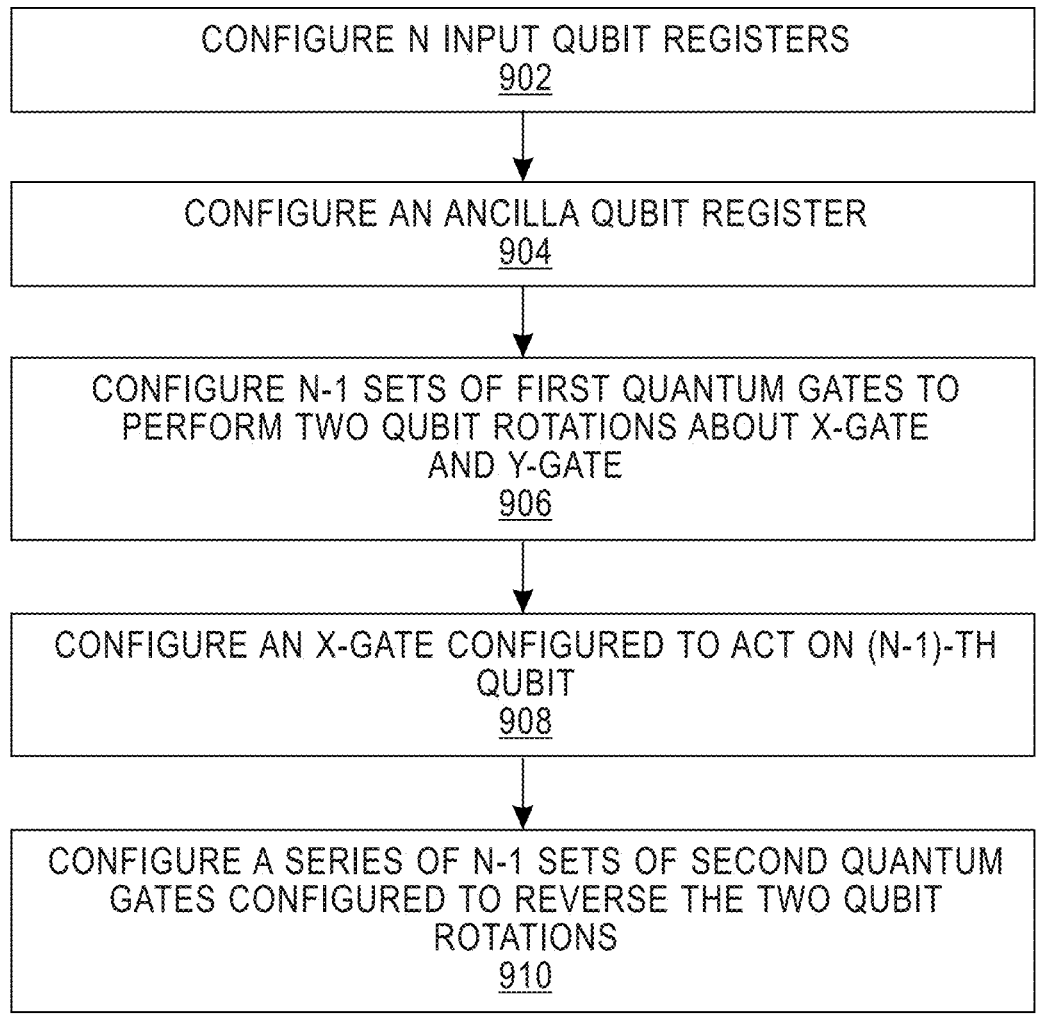
FIG. 10 is a flow diagram illustrating a method of constructing a quantum circuit, which can simulate a boundary operator.

FIG. 10 is a flow diagram illustrating a method of constructing a quantum circuit, which can simulate a boundary operator for NISQ-QTDA in an embodiment. In an embodiment, the boundary operator can map a given simplicial complex to its boundaries. In another embodiment, the boundary operator can map a given graph with nodes and edges to their boundaries. At 902, n input qubit registers can be configured or allocated, for example, on a quantum computer. At 904, an ancilla qubit register can be configured. At 906, n−1 sets of first quantum gates can be configured to perform two qubit Pauli $X_{i-1}$ and $Y_i$ rotations applied to the (i−1)-th and i-th qubits, where i=1 to n−1. At 908, an X-gate can be configured to act on (n−1)-th qubit, for example, on quantum state of the (n−1)-th qubit subsequent to a cascade of two qubit rotations performed by the n−1 sets of first quantum gates. At 910, a series of n−1 sets of second quantum gates can be configured to reverse the two qubit rotations performed by the n−1 sets of first quantum gates.

As discussed in the commonly-owned co-pending U.S. patent application Ser. No. 17/863,484 entitled SHORT-DEPTH QUANTUM CIRCUIT FOR COMPLETE PAIRWISE TESTING, the whole contents and disclosure of which is incorporated by reference as if fully set forth herein, there is provided an apparatus and system and methods for pairwise checking for facilitating quantum topological data analysis.

Figure 11:
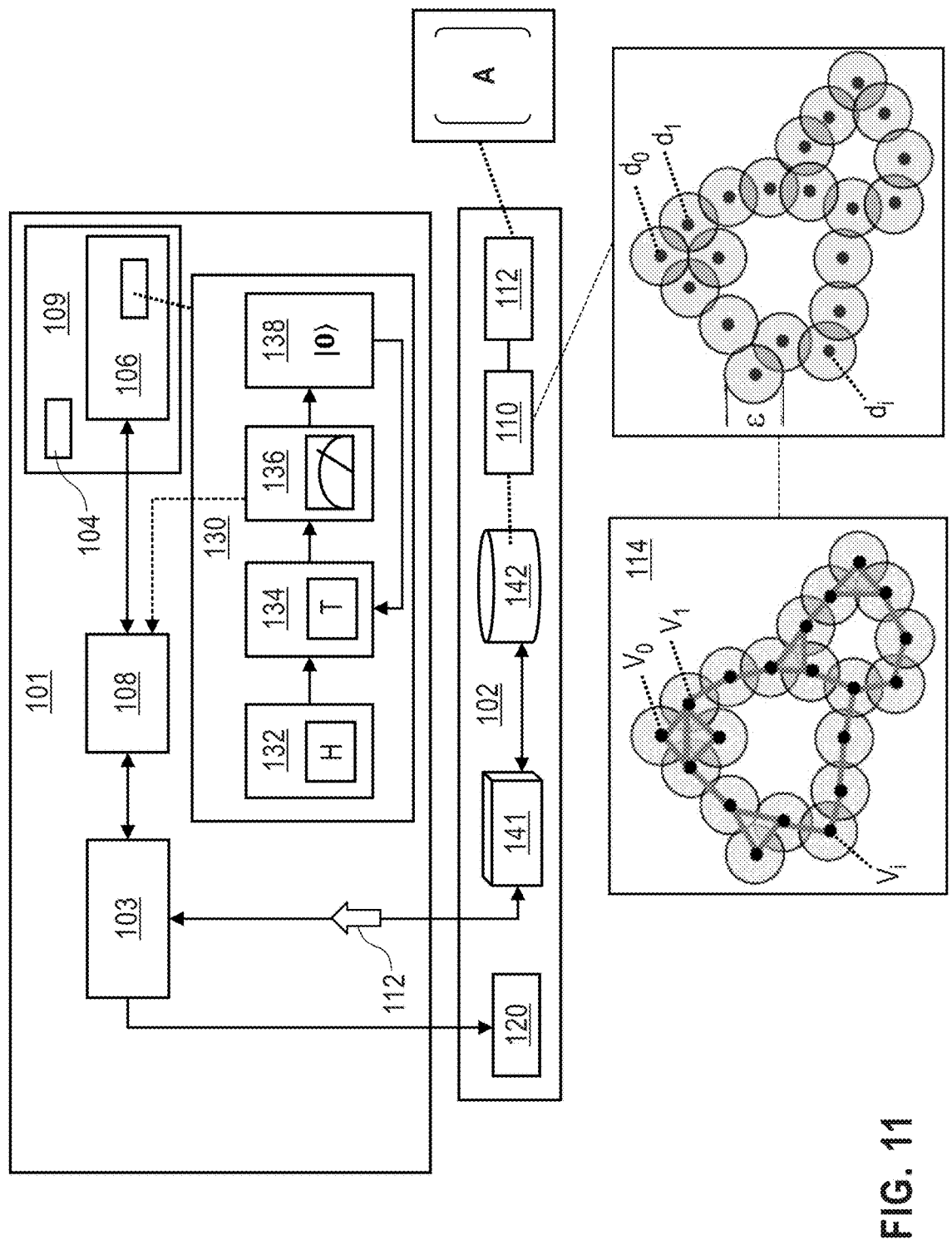
FIG. 11 is a block diagram of an example system for a quantum circuit for pairwise testing in one embodiment.

FIG. 11 is a block diagram of an example system 100 for a quantum circuit for pairwise testing in one embodiment. FIG. 11 corresponds to the block diagram of FIG. 1. System 100 can be a hybrid computing system including a combination of one or more quantum computers, quantum systems, and/or and classical computers. In an example shown in FIG. 11, system 100 can include a quantum system 101 and a classical computer 102. In one embodiment, quantum system 101 and classical computer 102 can be configured to be in communication via one or more of wired connections and wireless connections (e.g., a wireless network). Quantum system 101 can include a quantum chipset that includes various hardware components for processing data encoded in qubits. The quantum chipset can be a quantum computing core surrounded by an infrastructure to shield the quantum chipset from sources of electromagnetic noise, mechanical vibration, heat, and other sources of noise, which tend to degrade performance. Classical computer 102 can be electronically integrated, via any suitable wired and/or wireless electronic connection, with quantum system 101.

In the example shown in FIG. 11 quantum system 101 can be any suitable set of components capable of performing quantum operations on a physical system. A quantum operation can be, for example, a quantum gate operation that manipulate qubits to interact with one another in accordance with the quantum gate operation. In the example embodiment depicted in FIG. 1, quantum system 101 can include a controller 103, an interface 108, and quantum hardware 109.

In some embodiments, all or part of each of controller 103, interface 108, and quantum hardware 109 can be located in a cryogenic environment to aid in the performance of the quantum operations. Quantum hardware 109 may be any hardware capable of using quantum states to process information. Such hardware may include a plurality of qubits 104, and mechanisms to couple/entangle qubits 104, in order to process information using said quantum states. Qubits 104 may include, but are not limited to, charge qubits, flux qubits, phase qubits, spin qubits, and trapped ion qubits. Quantum hardware 109 can include a set of quantum gates 130, where quantum gates 130 can be configured to perform quantum logic operations on qubits 104. Quantum gates 130 can include one or more single-qubit gates, two-qubit gates, and/or other multi-qubit gates.

Controller 103 can be any combination of digital computing devices capable of performing a quantum computation, such as executing a quantum circuit 106, in combination with interface 108. Such digital computing devices may include digital processors and memory for storing and executing quantum commands using interface 108. Additionally, such digital computing devices may include devices having communication protocols for receiving such commands and sending results of the performed quantum computations to classical computer 102. Additionally, the digital computing devices may include communications interfaces with interface 108. In one embodiment, controller 103 can be configured to receive classical instructions (e.g., from classical computer 102) and convert the classical instructions into commands (e.g., command signals) for interface 108. Command signals being provided by controller 103 to interface 108 can be, for example, digital signals indicating which quantum gates among quantum gates 106 needs to be applied to qubits 104 to perform a specific function (e.g., pairwise checking described herein). Interface 108 can be configured to convert these digital signals into analog signals (e.g., analog pulses such as microwave pulses) that can be used for applying quantum gates on qubits 104 to manipulate interactions between qubits 104.

Interface 108 can be a classical-quantum interface including a combination of devices capable of receiving commands from controller 103 and converting the commands into quantum operations for implementing quantum hardware 109. In one embodiment, interface 108 can convert the commands from controller 103 into drive signals that can drive or manipulate qubits 104, and/or apply quantum gates on qubits 104. Additionally, interface 108 can be configured to convert signals received from quantum hardware 109 into digital signals capable of processing and transmitting by controller 103 (e.g., to classical computer 102). Devices included in interface 108 can include, but are not limited to, digital-to-analog converters, analog-to-digital converters, waveform generators, attenuators, amplifiers, optical fibers, lasers, and filters. Interface 108 can further include circuit components configured to measure a basis of the plurality of qubits following the implementation of quantum gates 130, where the measurement will yield a classical bit result. For example, a basis of |0⟩ corresponds to classical bit zero, and a basis of |1⟩ corresponds to classical bit one. Each measurement performed by interface 108 can be read out to a device, such as classical computer 102, connected to quantum system 101. A plurality of measurement results provided by interface 108 can result in a probabilistic outcome.

Classical computer 102 can include hardware components such as processors and storage devices (e.g., including memory devices and classical registers) for processing data encoded in classical bits. In one embodiment, classical computer 102 can be configured to control quantum system 101 by providing various control signals, commands, and data encoded in classical bits to quantum system 101. Further, quantum states measured by quantum system 101 can be read by classical computer 102 and classical computer 102 can store the measured quantum states as classical bits in classical registers. In one embodiment of an implementation, classical computer 102 can be any suitable combination of computer-executable hardware and/or computer-executable software capable of executing a preparation module 141 to perform quantum computations with data stored in data store 142 as part of building and implementing a machine learning protocol. Data store 142 may be a repository for data to be analyzed using a quantum computing algorithm, as well as the results of such analysis. Preparation module 141 may be a program or module capable of preparing classical data from data store 142 to be analyzed as part of the implementation of a quantum circuit 106. Preparation module 141 may be instantiated as part of a larger algorithm, such as a function call of an application programming interface (API) or by parsing a hybrid classical-quantum computation into aspects for quantum and classical calculation. As described in more detail below, preparation module 141 may generate instructions for creating a quantum circuit 106 using quantum gates 130. In an embodiment, such instructions may be stored by controller 103, and may instantiate the execution of the components of interface 108 so that the quantum operations of the quantum gates 130 may be executed on quantum hardware 109.

Components of classical computer 102 are described in more detail below with reference to FIG. 35. In an example system, classical computer 102 can be a laptop computer, a desktop computer, a vehicle-integrated computer, a smart mobile device, a tablet device, and/or any other suitable classical computing device. Additionally or alternatively, classical computer 102 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 38 and FIG. 39.

System 100 can be implemented to perform pairwise checking of a plurality of data points in a dataset to identify one or more properties related to the plurality of data points. The pairwise checking performed by system 100 can be implemented for various applications that needs to identify specific properties that can be defined by relationship between pairs of data points. In one embodiment, system 100 is implemented for Topological Data Analysis (TDA). Quantum computing offers the potential of exponential speedups for certain classical computations. In an aspect, quantum machine learning (QML) algorithms have been proposed as candidates for such exponential improvements. TDA in particular, is one type of data analysis that may benefit from quantum computing. In an aspect, TDA can consume massive datasets and reduce them to a handful of global and interpretable signature numbers, laden with predictive and analytical value.

In an aspect, given a set of data-points embedded in some ambient space, a simplicial complex can be derived from the set of data-points. A k-simplex is a collection of k+1 vertices forming a simple polytope of dimension k. For example, 0-simplices are single points (zero-dimensional), 1-simplices are line segments (one-dimensional), 2-simplices are triangles (two-dimensional), and so on. A simplicial complex is a collection of a plurality of k-simplices (of any order), and higher order simplices (e.g., higher k) can include lower order simplices. For example, a triangle simplex includes three line or edge simplices that form the triangle simplex, and also includes the three vertices (e.g., 0-simplices) connected by the three edge simplices.

Simplices in a simplicial complex $\Gamma$ can be constructed as a mixed state (e.g., superposition quantum state) in quantum computing. The mixed state simplices can be projected onto the kernel of a combinatorial Laplacian $\Delta_k$ corresponding to k-simplices of simplicial complex $\Gamma$ denoted as $\Delta_k$, in order to estimate the dimension of the kernel. The estimation of the kernel dimension allows the determination of the Betti numbers, because a k-th Betti number is a kernel dimension of the combinatorial Laplacian $\Delta_k$ corresponding to k-simplices of simplicial complex $\Gamma$.

As mentioned, the combinatorial Laplacian $\Delta$ corresponding to all simplices of simplicial complex $\Gamma$ can be used for determining the combinatorial Laplacian $\Delta_k$ corresponding to k-simplices. The combinatorial Laplacian $\Delta$ corresponding to all simplices of simplicial complex $\Gamma$ is denoted as:

$$\Delta = P_\Gamma B P_\Gamma B P_\Gamma$$

where $P_\Gamma$ is the projector that projects the boundary operator (or boundary map) B onto all simplices present in simplicial complex $\Gamma$. The boundary operator B can create a mapping of orders of simplices (e.g., simplices of all orders) in a given simplicial complex. That is, the boundary operator can map the vector space of k-simplices into the vector space of k−1 simplices. Projector $P_\Gamma$ is projected on a boundary operator B multiple times (e.g., three times) because boundary operator B includes a boundary conjugate that is restricted to the simplices in the simplicial complex $\Gamma$. In an example, if $P_\Gamma = I$, then $\Delta = B^2 = nI$, and the kernel will be empty and will not include holes. The projector $P_\Gamma$ can be used for determining the combinatorial Laplacian $\Delta$ corresponding to all simplices that are present in simplicial complex $\Gamma$. The combinatorial Laplacian $\Delta_k$ corresponding to k-simplices can be used for determining the Betti numbers of simplicial complex $\Gamma$, and the determination of $\Delta_k$ is based on $\Delta$. If the boundary map B is known, determination of the projector $P_\Gamma$ can lead to the determination of combinatorial Laplacian $\Delta$, then the combinatorial Laplacian $\Delta_k$ can be determined, leading to determination of the Betti numbers of simplicial complex $\Gamma$.

In one embodiment, data store 142 may include a dataset 110, where a simplicial complex 114 can represent a topology of a plurality of data points among dataset 110 (e.g., in a database) and relationships between the plurality of data points. In an aspect, a vertex in simplicial complex 114 can represent a data point in dataset 110, and an edge or a line connecting two vertices can represent a relationship between the two vertices or data points, where the relationship can be one or more of a dependency, a shared attribute, and/or other types of relationships. Formation of simplicial complex 114 can be based on a determination of whether each pair of data points in dataset 110 are $\varepsilon$-close, or within a distance of $\varepsilon$ from one another. If two data points are $\varepsilon$-close, then an edge can connect the two data points to form one or more simplices of simplicial complex 114. In the example shown in FIG. 11, data points $d_0$ and $d_1$ can form an $\varepsilon$-close pair, hence they are connected by an edge as shown in simplicial complex 114. However, data points $d_0$ and $d_i$ are not $\varepsilon$-close, hence they are not connected by any edge in simplicial complex 114. In general, a k-simplex is added to simplicial complex 114 for every subset of k+1 data points that are pair-wise connected (e.g., $\varepsilon$-close). As the value of $\varepsilon$ varies, different data points may be connected to form different simplices, hence forming different simplicial complex.

Dataset 110 can include n data points ranging from $d_0, \ldots d_n$, and simplicial complex 114 can include n vertices, ranging from $v_0, \ldots, v_n$, representing the n data points in dataset 110. If dataset 110 has n data points, then a maximum possible number of simplices present in simplicial complex 114 is $2^n$. For example, if all $$\binom{n}{2}$$

pairs of vertices of simplicial complex 114 are connected with one another, then simplicial complex 114 includes $2^n$ simplices. Note that multiple simplices having the same dimension are considered as different simplices. For example, if simplicial complex 114 has n vertices, then there are n 0-simplices (e.g., single point, zero dimension simplices) in simplicial complex 114. If there are pairs of vertices that are disconnected from one another among simplicial complex 114, then the number of simplices in simplicial complex 114 will be less than $2^n$.

Classical computer 102 can be configured to generate an adjacency graph 112 based on dataset 110, where adjacency graph 112 can be a Vietoris-Rips 1-skeleton encoding pairwise distances of all data points in dataset 110. In one embodiment, adjacency graph 112 can be a matrix (e.g., a square matrix) and elements among the matrix can represent whether two data points are within a distance E from one another (e.g., being $\varepsilon$-close). To generate adjacency graph 112, classical computer 102 can encode pairwise distances between data points of dataset 110 as $\varepsilon$-close pairs (e.g., encoding a zero when the data points are not $\varepsilon$-close, and encoding a one when the data points are $\varepsilon$-close). Adjacency graph 112 can show whether pairs of data points are $\varepsilon$-close to one another—but may not indicate a number of simplices (and/or which simplices) that are formed in simplicial complex 114 based on the $\varepsilon$-close pairs.

System 100 can be implemented to construct the projector $P_\Gamma$ that can project all simplices that can be formed by dataset 110 to construct simplicial complex 114 based on a value of $\varepsilon$. In one embodiment, the projector $P_\Gamma$ can be a quantum circuit including one or more quantum gates. Classical computer 102 can send adjacency graph 112 to quantum system 101. Quantum system 101 can perform pairwise checking, or pairwise testing, on every pair of data points in dataset 110, where a result of the pairwise checking can be used for constructing projector $P_\Gamma$. In one embodiment, classical computer 102 can determine the quantum gates (e.g., among quantum gates 130) that can be used for constructing projector $P_\Gamma$. Projector $P_\Gamma$ can project a number of simplices that are present in simplicial complex 114. The pairwise testing performed by quantum system 101 can include checking every pair of data points (e.g., $$\binom{n}{2}$$

pairs) among dataset 110 to identify a property of dataset 110. Properties that can be identified include at least one of, for example, which pairs of data points are $\varepsilon$-close data points, whether the data points are close to each other with respect to certain metrics, whether they belong to same group or class, and/or other properties. Pairs of data points in dataset1 110 that are ε-close data points can form one or more simplices in simplicial complex 114. For example, if two data points are ε-close, then an edge can be added to connect the two data points, and the two connected data points can form a 1-simplex and/or a higher order simplex (e.g., 2-simplex or higher order) in simplicial complex 114. If two data points are not ε-close, then there will be no edge between the two data points and simplices including these two disconnected data points can be considered as absent from simplicial complex 114, and the absent simplices will not be projected by projector $P_\Gamma$ to form simplicial complex 114.

In one embodiment, quantum system 101 can be provided with adjacency graph 112 from classical computer 102. Quantum system 101 can perform a pairwise checking on all $$\binom{n}{2}$$

pairs of data points in dataset 110 to project all simplices that can be formed by ε-close pairs of data points among dataset 110. In another embodiment, quantum system 101 can be provided with adjacency graph 112 from classical computer 102, and a matrix representing vertices that form a set of projected k-simplices (e.g., $P_k$) that can be generated by quantum system 101. The set of projected k-simplices can be simplices of a specific order k. For example, if k=2, then the matrix can represent vertices among simplicial complex that form 2-simplices. Quantum system 101 can perform the pairwise checking on pairs of data points that satisfy the conditions of 1) being ε-close according to adjacency graph 112, and 2) being a part of the simplex of the specific order k.

In one embodiment, the pairwise checking performed by quantum computer 102 can determine which pairs of vertices in simplicial complex 114 are not part of any simplices in simplicial complex 114. Quantum computer 102 can output results of the pairwise checking to classical computer 102, where classical computer 102 can use the pairwise checking results to determine which simplices are absent from simplicial complex 114. Classical computer 102 can determine a difference between the number of absent simplices in simplicial complex 114 and the value $2^n$, where this determined difference represents a number of simplices present in simplicial complex 114. The pairwise checking performed by system 100 can be a rejection scheme to filter out simplices that are absent from, or may not be formed in, simplicial complex 114. The number of simplices present in simplicial complex 114 can be used for generating projector $P_\Gamma$ that corresponds to all simplices that are present in simplicial complex 114.

In one embodiment, quantum gates 130 can include gates that form quantum circuit 106 configured to perform the pairwise checking, and quantum gates that form another quantum circuit representing the projector $P_\Gamma$. Interface 108 can be configured to control quantum circuit 106 based on a command signal received from controller 103. In one embodiment, interface 108 can control quantum circuit 106 by applying quantum gates (e.g., among quantum gates 130) being used for forming quantum circuit 106 on qubits 104. Quantum circuit 106 can be formed using a set of Hadamard gates 132, a set of Toffoli (or C-C-NOT) gates 134, a set of measurement circuits 136, and a set of reset gates 138. Each Hadamard gate among Hadamard gates 132 can act on a single qubit to transform or project the qubit to a superposition quantum state. The set of Toffoli gates 134 can entangle pairs of qubits representing pairs of vertices among simplicial complex 114 with n/2 ancilla qubits that can be among the qubits 104 (the entanglement will be described in more detail below). The n/2 ancilla qubits can store or log whether the pairs of data points undergoing the pairwise checking are ε-close or not (or whether they form 1-simplices or not). The storing or logging using the n/2 ancilla qubits can be outputs of the projector $P_\Gamma$ being implemented by quantum circuit 106 and the outputs can provide a projection or highlight of the simplices that are present in simplicial complex 114 formed from dataset 110. Using n/2 ancilla qubits can allow quantum circuit 106 to process (e.g., check) n/2 pairs of data points at a time (e.g., in one iteration of pairwise checking), such that the pairwise checking can be completed for all $$\binom{n}{2}$$

ε-close pairs of vertices in n−1 iterations of pairwise checking. If n is an odd number, then (n−1)/2 ancilla qubits is used for checking (n−1)/2 pairs at a time, resulting in n iterations of pairwise checking. Measurement circuits 136 can be configured to measure ancilla qubits entangled by the set of Toffoli gates 134, and the measurement results can be provided to interface 108. The set of reset gates 138 can reset the n/2 ancilla qubits to, for example, the |0⟩ state, such that the n/2 ancilla qubits can be reused for checking a next iteration of n/2 pairs of data points.

A first iteration of pairwise checking can progress from the set of Hadamard gates 132 to the set of Toffoli gates 134, then to measurement circuits 136, and lastly the reset circuits 138. Iterations subsequent to the first iteration begins at the set of Toffoli gates 134, then progress to measurement circuits 136, and lastly the reset circuits 138. The number of Hadamard gates used for the pairwise checking can be equivalent to the number of data points in dataset 110, which is the same number as the vertices in simplicial complex 114 (e.g., n Hadamard gates). The number of Toffoli gates, the number of measurement circuits 136, and the number of reset gates used for the pairwise checking can be $$\binom{n}{2}$$

since $$\binom{n}{2}$$

pairs of vertices are being checked. Hence, quantum circuit 106 can be a short-depth quantum circuit for complete pairwise testing because it has a relatively short depth of O(n) (e.g., linear depth) and can check all $$\binom{n}{2}$$

pairs of vertices in simplicial complex 114 using n/2 ancilla qubits. For n−1 iterations of pairwise checking, there are n−1 measure-and-reset operations (e.g., implementation of measurement circuits 136 and reset gates 138). Interface 108 can provide the measurement results from measurement circuits 136 to classical computer 102, via controller 103. Classical computer 102 can store the measurement results in $$\binom{n}{2}$$

classical registers 120.

Figure 12:
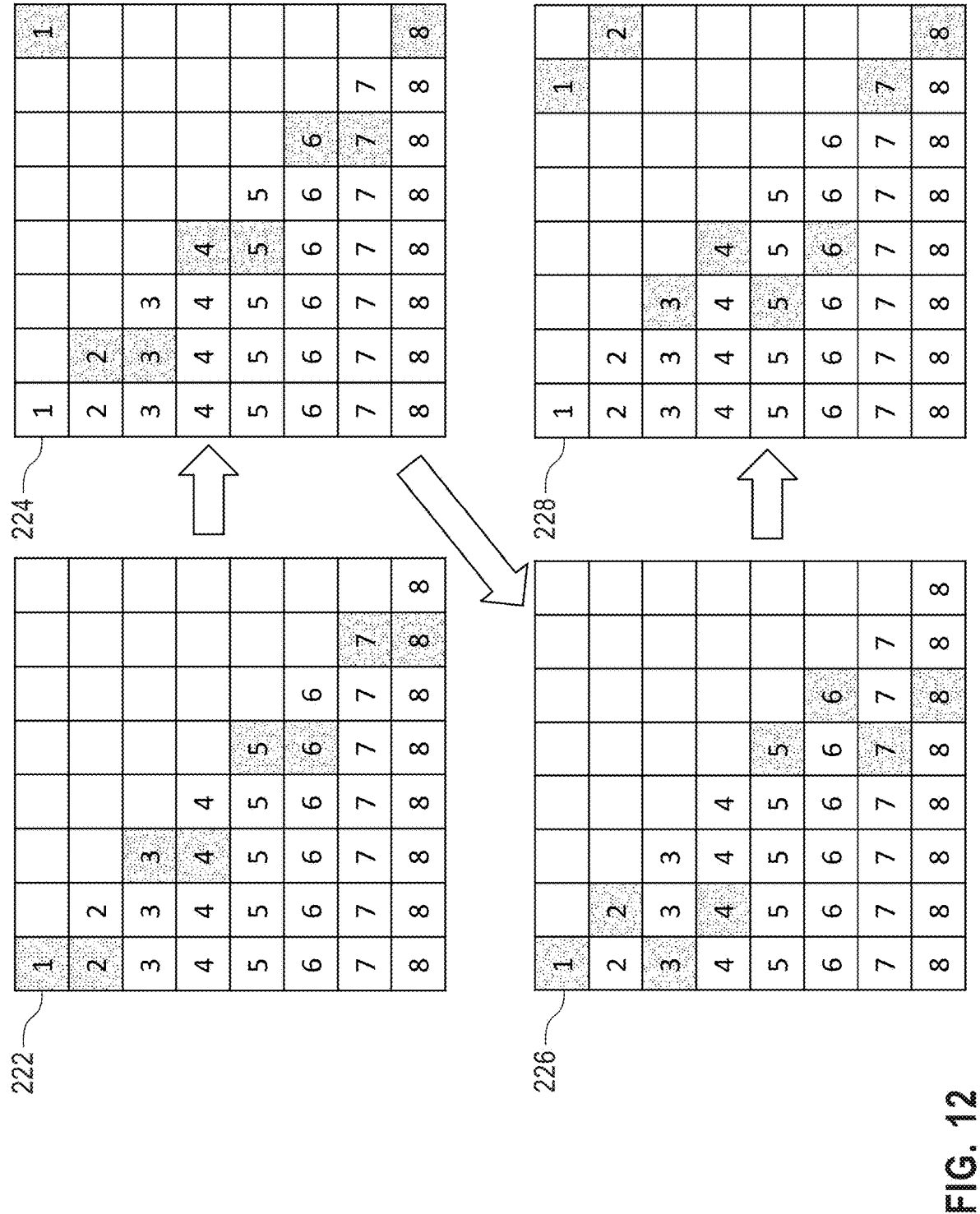
FIG. 12 is a diagram illustrating a cyclic shift technique to select pairs of vertices for different iterations of pairwise testing in one embodiment.

FIG. 12 is a diagram illustrating a cyclic shift technique to select pairs of vertices for different iterations of pairwise testing in one embodiment. In an example shown in FIG. 12, the pairwise testing implemented by system 100 of FIG. 11 can begin at iteration 222, then progress to iteration 224, then iteration 226, then iteration 228, and so on. A set of n/2 pairs of vertices are selected for pairwise testing in each iteration. The selection of pairs of vertices for each iteration can be based on a cyclic shift technique that allows the Toffoli gates 134 (see FIG. 11) to operate in parallel. For example, in iteration 222, the pairs of vertices (1, 2), (3, 4), (5, 6), (7, 8) are being checked. In iteration 224, the pairs of vertices (2, 3), (4, 5), (6, 7), (1, 8) are being checked. In iteration 226, the pairs of vertices (1, 3), (1, 4), (5, 7), (6, 8) are being checked. In iteration 228, the pairs of vertices (3, 5), (4, 6), (1, 7), (2, 8) are being checked. For n=8, a total of 7 iterations (e.g., n−1 iterations) of pairwise checking will be performed using the cyclic shift technique shown in FIG. 12 to check all $$\binom{n}{2}$$

pairs (e.g., 28 pairs for n=8) of vertices.

FIG. 13 is a diagram illustrating a plurality of simplices that may be in a simplicial complex in one embodiment. A simplicial complex 310 including four vertices (e.g., n=4) is shown in FIG. 13. Simplicial complex 310 includes vertices $v_0$, $v_1$, $v_2$, $v_3$ and all vertices are connected to one another (e.g., all pairs are ε-close pairs). As a result of all vertices being connected to one another, simplicial complex 310 includes $2^n$ simplices, or 16 simplices (e.g., $2^4$=16). Each simplex among simplicial complex 310 can correspond to a simplex of a specific dimension 312. For example, simplicial complex 310 can include a simplex Ø that has no dimension, four zero-dimension simplices (0-simplices), six one-dimension simplices (1-simplices), four two-dimension simplices (2-simplices), and one three-dimension simplex (3-simplices).

The simplex Ø can be represented as a state $s_0$. The four 0-simplices are represented as states $s_1$, $s_2$, $s_3$, $s_4$, where states $s_1$, $s_2$, $s_3$, $s_4$ include the vertices $v_0$, $v_1$, $v_2$, $v_3$, respectively. The six 1-simplices are represented as states $s_5$, $s_6$, $s_7$, $s_8$, $s_9$, $s_{10}$, where states $s_5$, $s_6$, $s_7$, $s_8$, $s_9$, $s_{10}$ include the pairs of vertices $(v_0, v_1)$, $(v_0, v_2)$, $(v_0, v_3)$, $(v_1, v_2)$, $(v_1, v_3)$, $(v_2, v_3)$, respectively. The four 2-simplices are represented as states $s_1$, $s_{12}$, $s_{13}$, $s_{14}$, where states $S_1$, $s_{12}$, $s_{13}$, $s_{14}$, include the pairs of vertices $(v_0, v_1)$, $(v_0, v_2)$, $(v_1, v_2)$; $(v_0, v_1)$, $(v_0, v_3)$, $(v_1, v_3)$; $(v_0, v_2)$, $(v_0, v_3)$, $(v_2, v_3)$; and $(v_1, v_2)$, $(v_1, v_3)$, $(v_2, v_3)$, respectively. The one 3-simplex is represented as state $s_{15}$, where state $s_{15}$ include the pairs of vertices $(v_0, v_1)$, $(v_0, v_2)$, $(v_0, v_3)$, $(v_1, v_2)$, $(v_1, v_3)$, $(v_2, v_3)$. In one embodiment, if four Hadamard gates (e.g., Hadamard gates 132 in FIG. 1) are used for transforming four qubits representing $v_0$, $v_1$, $v_2$, $v_3$ in parallel, the output of the four Hadamard gates will be a tensor product representing the sixteen states $s_0, \ldots, s_{15}$.

The simplex with zero dimension or 0-th order (state $s_0$) and the 0-simplices (states $s_1$, $s_2$, $s_3$, $s_4$) are considered to be present in the simplicial complex 310 regardless of a result of the pairwise checking being performed by system 100 of FIG. 11. To determine whether the simplices with dimensions greater than or equal to one are present or absent in the simplicial complex 310, system 100 can check all $$\binom{n}{2}$$

pairs of vertices (e.g., six pairs) to determine whether specific pairs of vertices are disconnected (e.g., not ε-close pairs) from one another in simplicial complex 310. The simplices that include the disconnected pairs are vertices that are considered to be absent from simplicial complex 310.

Figure 14:
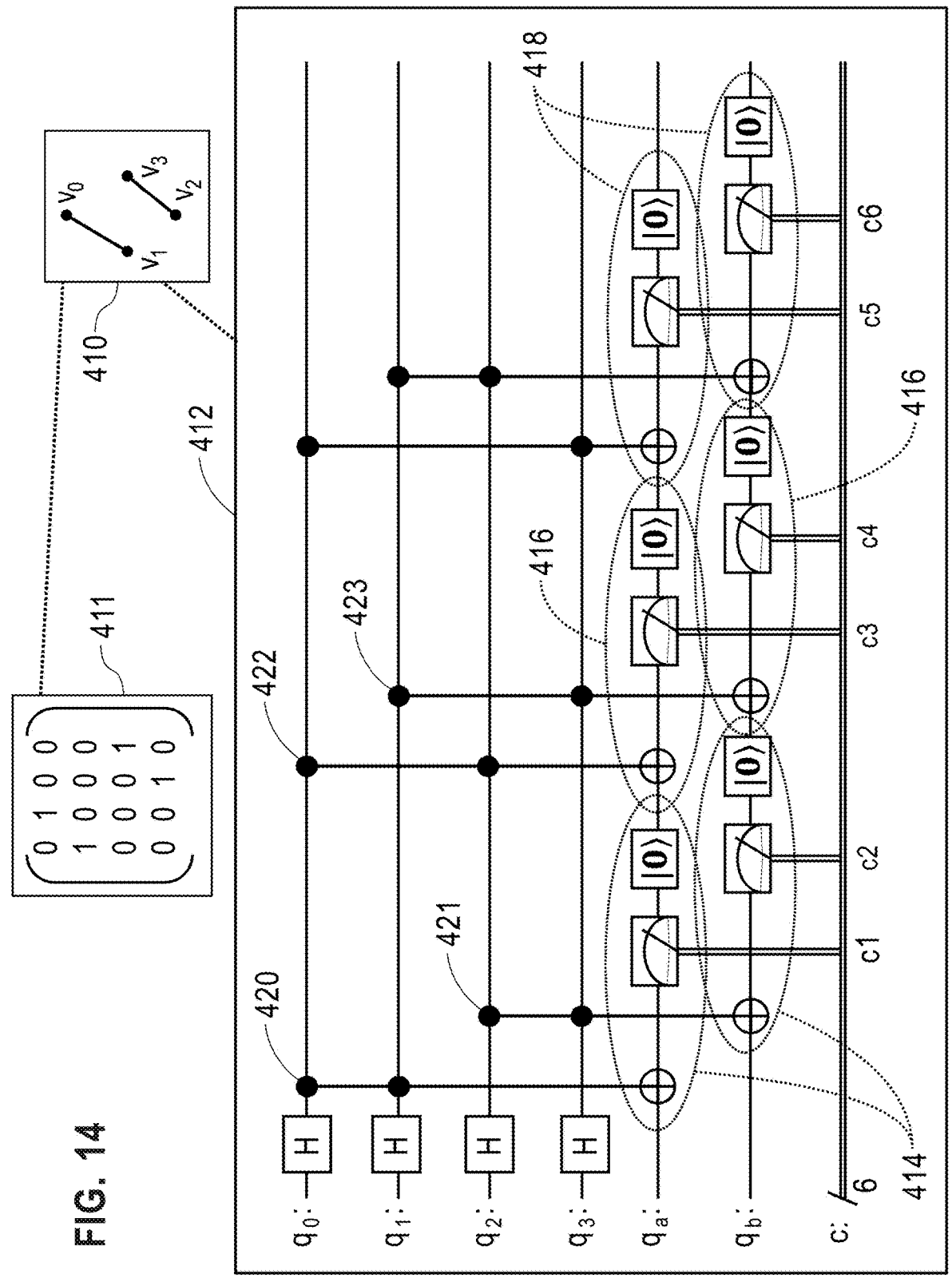
FIG. 14 is a diagram illustrating an example quantum circuit that can be implemented as a quantum circuit for pairwise testing in one embodiment.

FIG. 14 is a diagram illustrating an example quantum circuit 412 that can be implemented as a quantum circuit for pairwise testing in one embodiment. In an example shown in FIG. 14, a dataset 410 can include data points corresponding to vertices $v_0$, $v_1$, $v_2$, $v_3$, where the pair of vertices $(v_0, v_1)$ are connected and the pair of vertices $(v_2, v_3)$ are connected. Classical computer 102 shown in FIG. 11 can generate an adjacency graph 411 of dataset 410, and can send adjacency graph 411 to quantum system 101. A quantum circuit 412 can be part of quantum circuit 106 of FIG. 11, and quantum circuit 412 can be implemented to perform pairwise checking on every pair of data points in dataset 410 to identify a specific property of the data points in dataset 410. For example, the specific property can be whether each pair of data points in dataset 410 are within a predefined distance or resolution from one another (e.g., whether each pair is ε-close or not), whether they are close to each other with respect to certain metrics, or whether they belong to same group or class, and/or other properties. In one embodiment, a result of the pairwise checking performed by quantum circuit 412 can indicate a number of disconnected pairs of vertices, and the number of disconnected pairs of vertices can allow classical computer 102 to determine the number of simplices that are absent in simplicial complex.

A plurality of qubits, $q_0$, $q_1$, $q_2$, $q_3$ can represent the vertices $v_0$, $v_1$, $v_2$, $v_3$. Since dataset 410 includes four data points (e.g., n=4), two ancilla qubits $q_a$, $q_b$ (e.g., n/2) can be used for the pairwise checking. A plurality of Hadamard gates (e.g., Hadamard gates 132 in FIG. 11) can be used for transforming qubits $q_0$, $q_1$, $q_2$, $q_3$ into superposition states. In one embodiment, the four Hadamard gates in FIG. 14 can transform qubits $q_0$, $q_1$, $q_2$, $q_3$ in parallel and the output of the four Hadamard gates will be a tensor product representing sixteen states or sixteen simplices. A set of Toffoli gates (e.g., Toffoli gates 134 in FIG. 11) can entangle pairs of qubits to ancilla qubits $q_a$, $q_b$. Measurement of an ancilla qubit entangled to a pair of qubits using a Toffoli gate can indicate whether a pair of vertices represented by the pair of qubits are connected or disconnected. A Toffoli gate is a universal reversible logic gate (e.g., any classical reversible circuit can be constructed from Toffoli gates). Toffoli gates have 3-qubit inputs and outputs, and if the first two qubits are both set to 1, the third qubit will be inverted, otherwise, all qubits remain the same.

In the example shown in FIG. 14, in a first iteration of pairwise checking 414, a Toffoli gate 420 can entangle qubits $q_0$, $q_1$ to ancilla qubit $q_a$, and Toffoli gate 421 can entangle qubits $q_2$, $q_3$ to ancilla qubit $q_b$. Ancilla qubits $q_a$, $q_b$ can be initialized to the basis state of $|0\rangle$. Since adjacency graph 411 indicates that vertices $v_0$, $v_1$ are connected (e.g., element (0, 1) or (1, 0) in adjacency graph 411 being a one), ancilla qubit $q_a$ will be inverted from $|0\rangle$ to $|1\rangle$. A measurement circuit can measure ancilla qubit $q_a$, which is state $|1\rangle$, and this result can be written to a classical register c1 of classical computer 102. Similarly, adjacency graph 411 indicates that vertices $v_2$, $v_3$ are connected (e.g., element (2, 3) or (3, 2) in adjacency graph 411 being a one), ancilla qubit $q_b$ will be inverted from $|0\rangle$ to $|1\rangle$. Another measurement circuit can measure ancilla qubit $q_b$, which is state $|1\rangle$, and this result can be written as a classical bit one in a classical register c2 of classical computer 102. A result of the first iteration of pairwise checking 414 shows that the pairs of vertices $(v_0, v_1)$ and $(v_2, v_3)$ are connected pairs. In response to measuring ancilla qubits $q_a$, $q_b$, the first iteration of pairwise checking 414 can conclude with reset gates (e.g., reset gates 138 in FIG. 11) resetting ancilla qubits $q_a$, $q_b$ to state $|0\rangle$, such that ancilla qubits $q_a$, $q_b$ can be reused for a next iteration of pairwise checking (e.g., a second iteration of pairwise checking 416).

In the second iteration of pairwise checking 416, a Toffoli gate 422 can entangle qubits $q_0$, $q_2$ to ancilla qubit $q_a$, and a Toffoli gate 423 can entangle qubits $q_1$, $q_3$ to ancilla qubit $q_b$. Ancilla qubits $q_a$, $q_b$ have states of $|0\rangle$ due to the reset from the first iteration of pairwise checking 414. Since adjacency graph 411 indicates that vertices $v_0$, $v_2$ are disconnected (e.g., element (0, 2) or (2, 0) in adjacency graph 411 being a zero), ancilla qubit $q_a$ will remain at $|0\rangle$. A measurement circuit can measure ancilla qubit $q_a$, which is state $|0\rangle$, and this result can be written as a classical bit zero in a classical register c3 of classical computer 102. Similarly, adjacency graph 411 indicates that vertices $v_1$, $v_3$ are disconnected (e.g., element (1, 3) or (3, 1) in adjacency graph 411 being a zero), ancilla qubit $q_b$ will remain at $|0\rangle$. A measurement circuit can measure ancilla qubit $q_b$, which is state $|0\rangle$, and this result can be written as a classical bit zero in a classical register c4 of classical computer 102. A result of the second iteration of pairwise checking 416 shows that the pairs of vertices $(v_0, v_2)$ and $(v_1, v_3)$ are disconnected pairs. In response to measuring ancilla qubits $q_a$, $q_b$, the second iteration of pairwise checking 416 can conclude with reset gates resetting ancilla qubits $q_a$, $q_b$ to state $|0\rangle$ (even though ancilla bits $q_a$, $q_b$ are already at state $|0\rangle$), such that ancilla qubits $q_a$, $q_b$ can be reused for a next iteration of pairwise checking (e.g., a third iteration of pairwise checking 418).

A result of the third iteration of pairwise checking 418 shows that the pairs of vertices $(v_0, v_3)$ and $(v_2, v_3)$ are disconnected pairs. The result of the third iteration of pairwise checking 418 can be written to classical registers c5 and c6. In response to measuring ancilla qubits $q_a$, $q_b$, the third iteration of pairwise checking 418 can conclude with reset gates resetting ancilla qubits $q_a$, $q_b$ to state $|0\rangle$ (even though ancilla bits $q_a$, $q_b$ are already at state $|0\rangle$), such that ancilla qubits $q_a$, $q_b$ can be reused for a next pairwise checking (e.g., for another simplicial complex). The three iterations (e.g., n–1 iterations) conclude the pairwise checking for simplicial complex 410. The result shows that there are four disconnected pairs of vertices in simplicial complex 410 (e.g., four zeroes written to classical register c). The four disconnected pairs of vertices are $(v_0, v_2)$, $(v_0, v_3)$, $(v_1, v_2)$, and $(v_1, v_3)$.

FIG. 15 is a diagram illustrating an example result 500 of an implementation of the quantum circuit 402 shown in FIG. 14 in one embodiment. Result 500 shows four disconnected pairs of vertices $(v_0, v_2)$, $(v_0, v_3)$, $(v_1, v_2)$, and $(v_1, v_3)$. Based on the disconnected pairs of vertices, simplices represented by states $s_6$, $s_7$, $s_8$, $s_9$, $s_{11}$, $s_{12}$, $s_{13}$, $s_{14}$, $s_{15}$, a total of nine simplices are absent from simplicial complex 410. Based on nine simplices being absent from simplicial complex 410, and a maximum number of simplices in simplicial complex is sixteen, classical computer 102 can determine that there are seven simplices in simplicial complex 410.

In one embodiment, classical computer 102 can be configured to tally the number of zeroes written to classical registers c1, c2, c3, c4, c5, c6 (see FIG. 14) to determine the number of disconnected pairs of vertices. Further, based on an order of pairs of vertices being selected by the cyclic shift technique (e.g., see FIG. 12) and an order of states being written to the classical registers, classical computer 102 can determine which pairs of vertices are disconnected pairs. For example, based on the pair of vertices $(v_0, v_1)$ being the first pair being checked, and a state of one being the first state written to classical register c1, classical computer 102 can determine that vertices $(v_0, v_1)$ are connected.

Figure 16A:
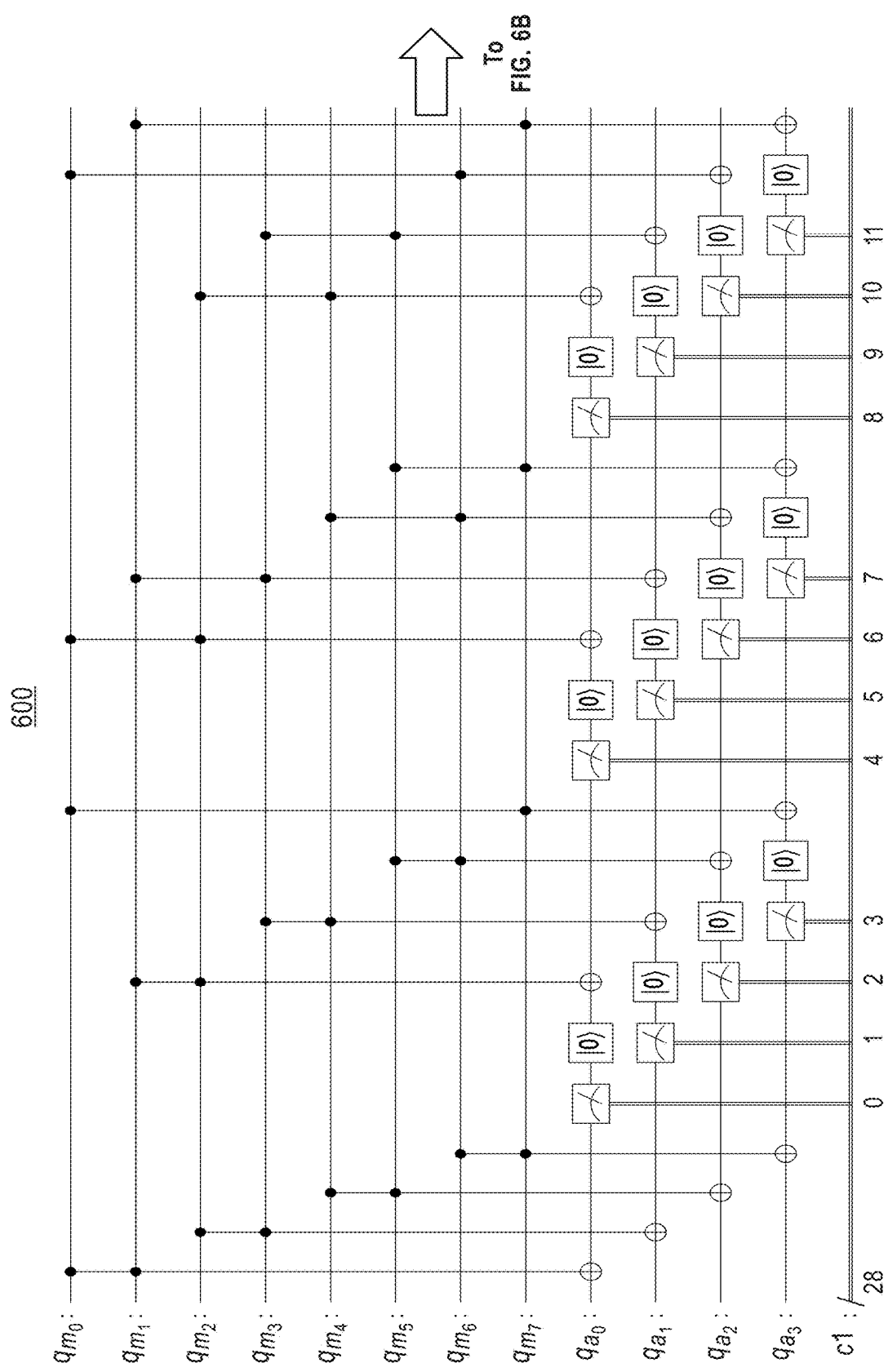
FIG. 16A is a diagram illustrating a first portion of an example quantum circuit that can be implemented as a quantum circuit for pairwise testing in one embodiment.
Figure 16B:
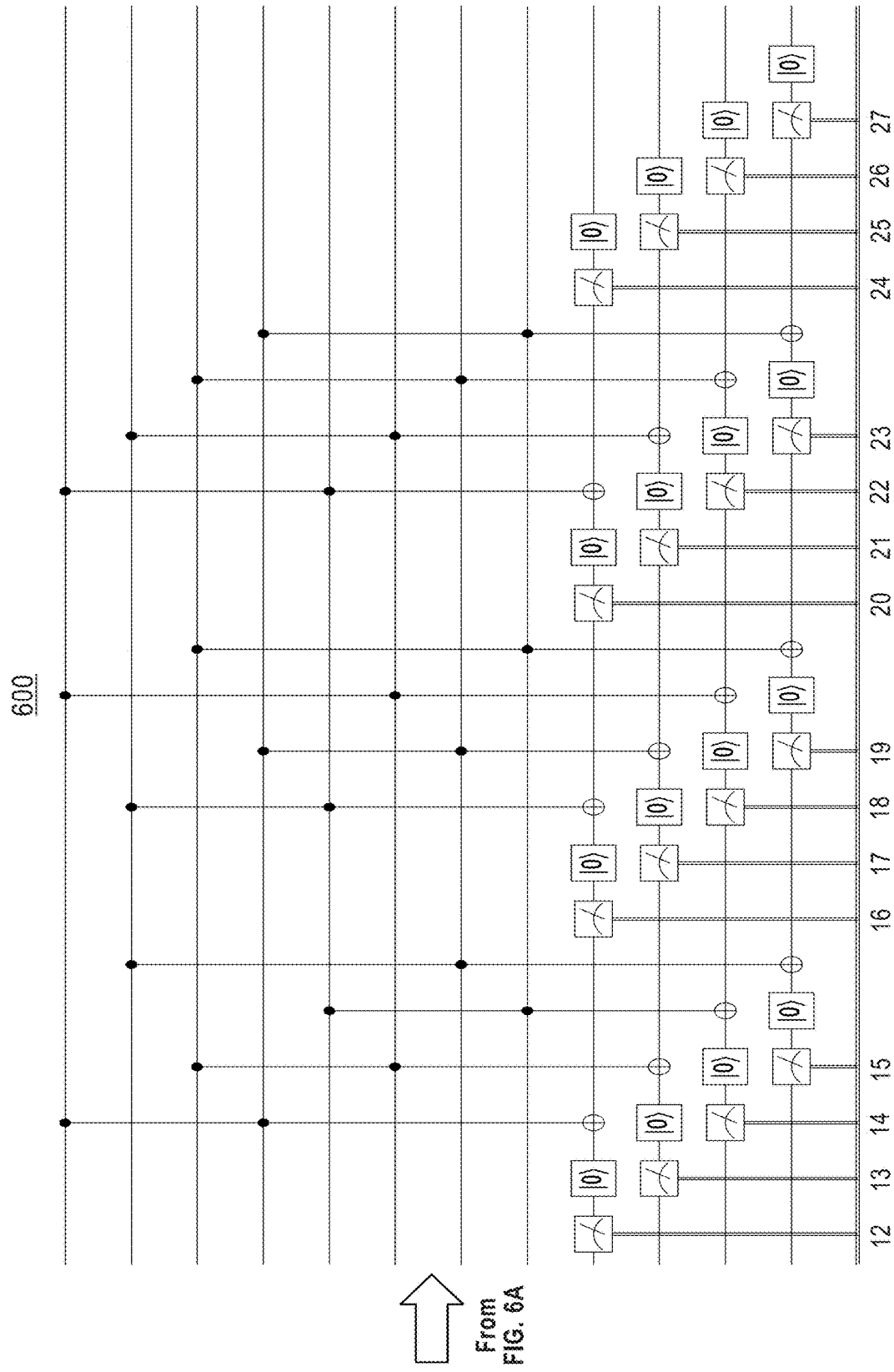
FIG. 16B is a diagram illustrating a second portion of the example quantum circuit in FIG. 6A that can be implemented as a quantum circuit for pairwise testing in one embodiment.

FIG. 16A and FIG. 16B are diagrams illustrating an example quantum circuit 600 that can be implemented as a quantum circuit for pairwise testing in one embodiment. FIG. 16A shows a first portion of quantum circuit 600 and FIG. 16B shows a second portion of quantum circuit 600, where the second portion is a continuation of the first portion. The quantum circuit 600 can be implemented to perform pairwise checking for a simplicial complex that includes eight vertices (e.g., n=8). Quantum circuit 600 can perform seven iterations of pairwise checking, where each iteration utilizes four Toffoli gates, four measurement circuits, and four reset gates are used to check four pairs of vertices. Further, four ancilla qubits are used in quantum circuit 600, and 28 classical registers are used for writing the pairwise checking results.

In an aspect, noisy intermediate-scale quantum (NISQ) processors are quantum processors that include approximately fifty to a few hundred qubits, but may not reach fault-tolerance. NISQ algorithms can be algorithms designed for NISQ processors, and can be hybrid algorithms that use NISQ processors but with reduced calculation load by implementing some parts of the algorithms in classical processors. The pairwise checking described herein need not require quantum random access memory (QRAM) or fault-tolerance quantum computers, and can be NISQ compatible. The number of logic gates implemented for the pairwise checking described herein $O(n^2 \zeta_k)$ with $\zeta_k := \min\{1-\zeta_k, \zeta_k\}$, and the depth of this circuit is $O(n)$ (e.g. linear) since n/2 of logic gates (e.g., the Toffoli gates) can operate in parallel.

Figure 17:
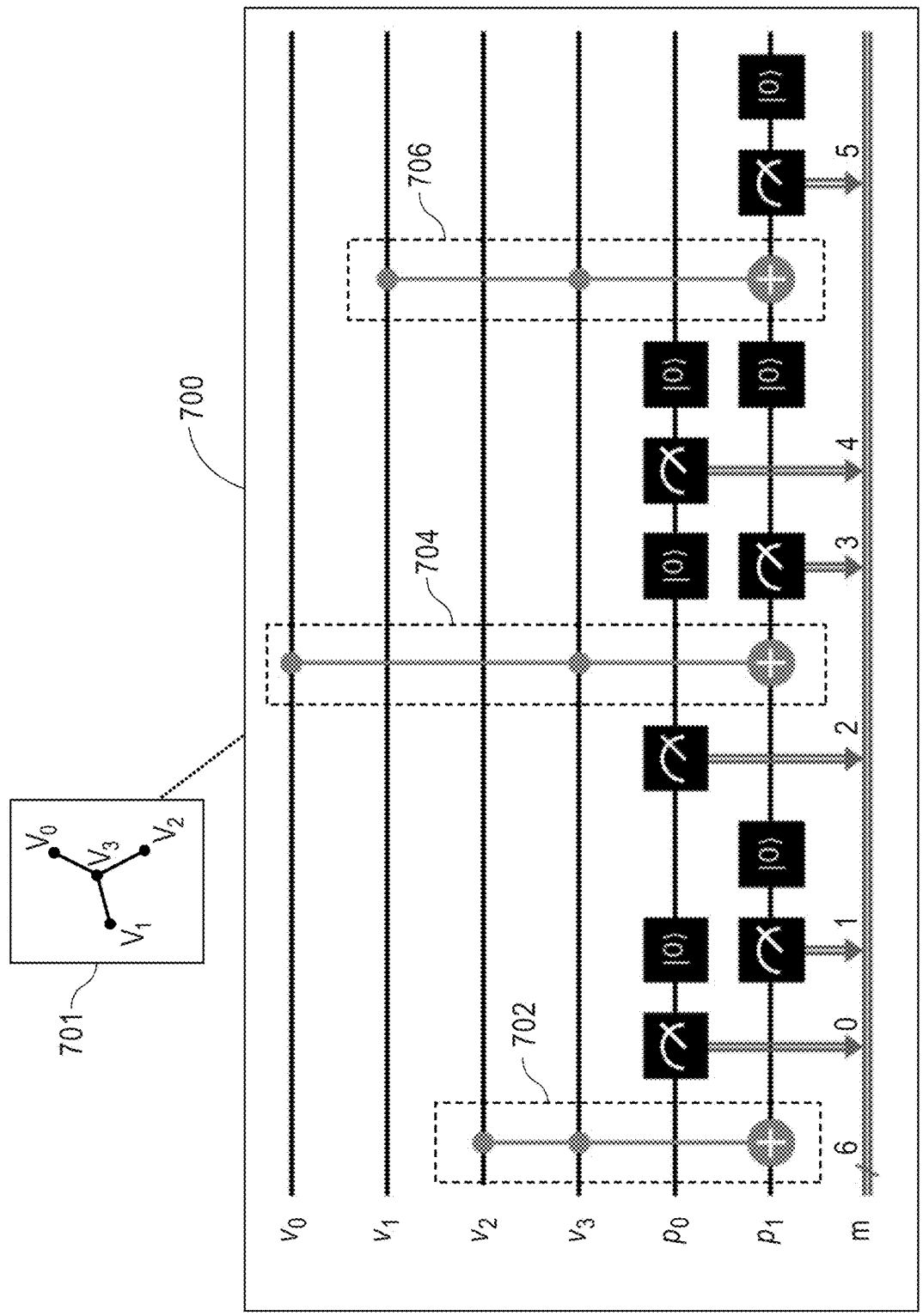
FIG. 17 is a diagram illustrating another example quantum circuit that can be implemented as a quantum circuit for pairwise testing in one embodiment.

FIG. 17 is a diagram illustrating an example quantum circuit constructed from an implementation as a quantum circuit for pairwise testing in one embodiment. Classical computer 102 can be configured to implement the cyclic shift technique, described with respect to FIG. 12, to program quantum system 101, where programming quantum system 101 includes constructing a new quantum circuit 700. Quantum circuit 700 can be the projector $P_\Gamma$ that project all simplices in a simplicial complex representing a dataset 701. The construction of quantum circuit 700 can include a determination of a number of Toffoli or CCNOT gates to be included in the new quantum circuit. In one embodiment, a result of pairwise checking performed by quantum system 101, described herein can indicate which pairs of data points among dataset 701 are ε-close pairs. Classical computer 102 can use the result indicating the number of ε-close pairs to determine the number of Toffoli gates that can be used for forming quantum circuit 700.

Dataset 701 can include four data points corresponding to four vertices $v_0$ to $v_3$ (e.g., n=4). In one embodiment, classical computer 102 can implement the cyclic shift technique based on an adjacency graph of dataset 701 to control quantum computer to perform pairwise checking on every pair of data points in dataset 701. The pairwise checking by quantum system 101 can output a result indicating that the pairs of vertices $(v_2, v_3)$, $(v_0, v_3)$ and $(v_1, v_3)$ are ε-close pairs. In response to the determination that the pairs of vertices $(v_2, v_3)$, $(v_0, v_3)$ and $(v_1, v_3)$ being ε-close, classical computer 102 can program quantum system 101 by constructing quantum circuit 700 with three CCX (C-C-NOT or Toffoli) gates 702, 704, 706. CCX gates 702, 704, 706 can be among the quantum gates 130 shown in FIG. 11. CCX gate 702 can entangle qubits representing vertices $(v_2, v_3)$ with an ancilla qubit p1. CCX gate 704 can entangle qubits representing vertices $(v_0, v_3)$ with ancilla qubit p1. CCX gate 706 can entangle qubits representing vertices $(v_1, v_3)$ with ancilla qubit p1. In one embodiment, CCX gates 702, 704, 706 can be RCCX gates, which is a variation (e.g., a simplified version, or relatively shorter depth) of Toffoli gates. The RCCX gates can have the same functionality as CCX gates—with an exception of all input qubits being in $|0\rangle$ state. In one or more embodiment, the methods and systems described herein apply Hadamard gates (e.g., Hadamard gates 132 in FIG. 11, and see FIG. 14) to transform input qubits into mixed states (e.g., superposition of different states). Hence, RCCX gates or CCX gates can be used in the same manner since the mixed states are not all $|0\rangle$.

FIG. 18A is a flowchart of an example process 850 that may implement a quantum circuit for pairwise testing according to an embodiment of the disclosure. Example process 850 may include one or more operations, actions, or functions as illustrated by one or more of blocks 852, 854, 856, and/or 858. Although illustrated as discrete blocks, various blocks can be divided into additional blocks, combined into fewer blocks, eliminated, performed in different order, or performed in parallel, depending on the desired implementation.

The process 850 can be implemented to perform pairwise checking of data points in a dataset. Process 850 can begin at block 852. At block 852, an index i can be set to i=1, and a quantum computer can transform a plurality of qubits into superposition quantum state. The plurality of qubits can encode n data points of a dataset. Process 850 can proceed from block 852 to block 854. At block 854, the quantum computer can entangle n/2 pairs of qubits among the plurality of qubits to n/2 ancilla qubits. The n/2 pairs of qubits include distinct pairs of qubits, and one qubit pair is entangled to one ancilla qubit. In one embodiment, the n/2 pairs of qubits being entangled can be selected based on a cyclic shift technique.

Process 850 can proceed from block 854 to block 856. At block 856, the quantum computer can measure outputs from a set of Toffoli gates that entangled the n/2 pairs of qubits to the n/2 ancilla qubits. Process 850 can proceed from block 856 to block 858. At block 858, in response to measuring the outputs from the set of Toffoli gates, the quantum computer can reset the n/2 ancilla qubits. In one embodiment, the measured outputs can indicate a number of pairs of data points in the dataset that are within a predefined resolution from one another. In one embodiment, a topology of the dataset is represented by a simplicial complex, and the measured outputs can indicate a number of simplices that are absent from the simplicial complex. In response to completing block 858, the index i can be incremented by one if i is not equivalent to n−1 and process 850 can return to block 854. Process 850 can end if index i is equivalent to n−1. Hence, blocks 854, 856, 858 can be repeated for n−1 iterations.

Figure 18B:
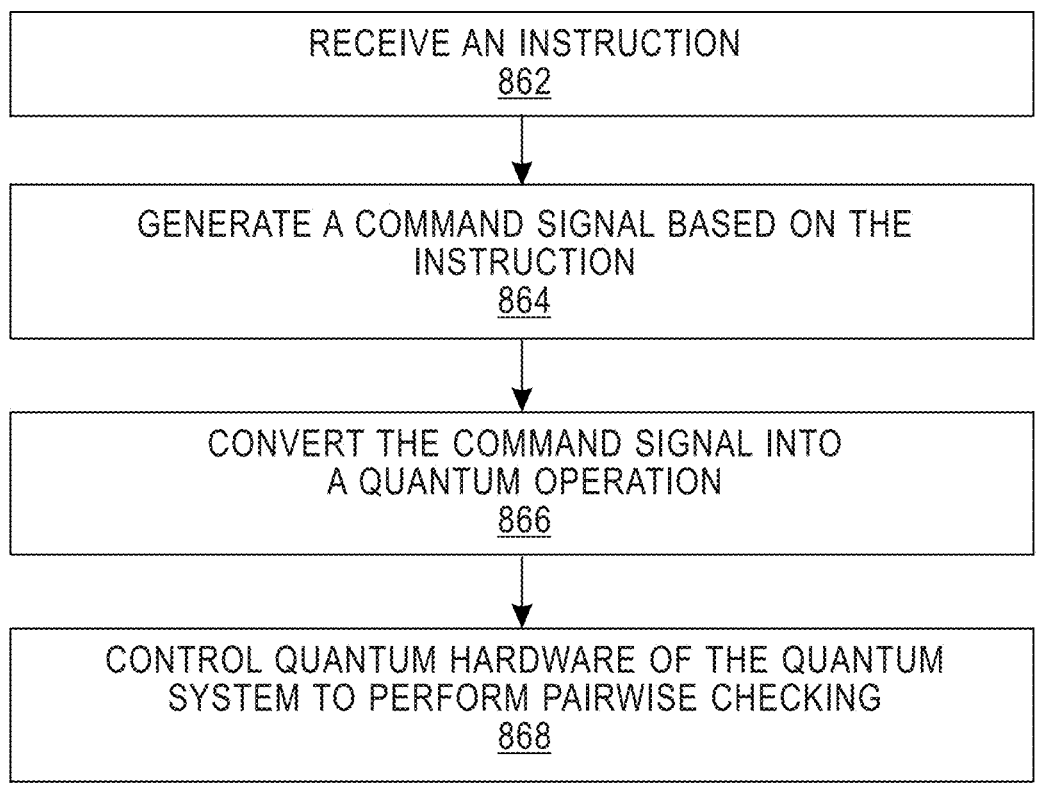
FIG. 18B is another flowchart of an example process that may implement a quantum circuit for pairwise testing according to an embodiment of the disclosure.

FIG. 18B is another flowchart of an example process 860 that may implement a quantum circuit for pairwise testing according to an embodiment of the disclosure. Example process 860 may include one or more operations, actions, or functions as illustrated by one or more of blocks 862, 864, 866, and/or 868. Although illustrated as discrete blocks, various blocks can be divided into additional blocks, combined into fewer blocks, eliminated, performed in different order, or performed in parallel, depending on the desired implementation.

The process 860 can be implemented to perform pairwise checking of data points in a dataset. Process 860 can begin at block 862. At block 862, a controller of a quantum system can receive an instruction. Process 860 can proceed from block 862 to block 864. At block 864, the controller of the quantum system can generate a command signal based on the instruction. Process 860 can proceed from block 864 to block 866. At block 866, an interface of the quantum system can convert the command signal into a quantum operation. Process 860 can proceed from block 866 to block 868. At block 868, the interface of the quantum system can control quantum hardware of the quantum system to perform pairwise checking for every pair of data points in a dataset to identify a property relating to the data points, wherein the data points are represented by the plurality of qubits.

As discussed in the commonly-owned U.S. patent application Ser. No. 17/863,449 entitled QUANTUM CIRCUIT FOR TRANSFORMATION OF MIXED STATE VECTORS, the whole contents and disclosure of which is incorporated by reference as if fully set forth herein, there is provided a quantum system that can transform mixed state vectors into vectors having a specific state. The apparatus can include a set of quantum registers and a quantum circuit. The set of quantum registers can be configured to store a plurality of qubits including a first set of qubits and a second set of qubits. The first set of qubits can represent elements of an input vector having mixed states with different Hamming weights. The second set of qubits can represent a count of nonzero elements in the input vector. The quantum circuit can be configured to sample the input vector. The quantum circuit can be further configured to entangle the first set of qubits to the second set of qubits. The quantum circuit can be further configured to generate an output vector based on the entanglement of the first set of qubits to the second set of qubits, wherein the output vector includes one or more states having a specific Hamming weight.

Figure 19:
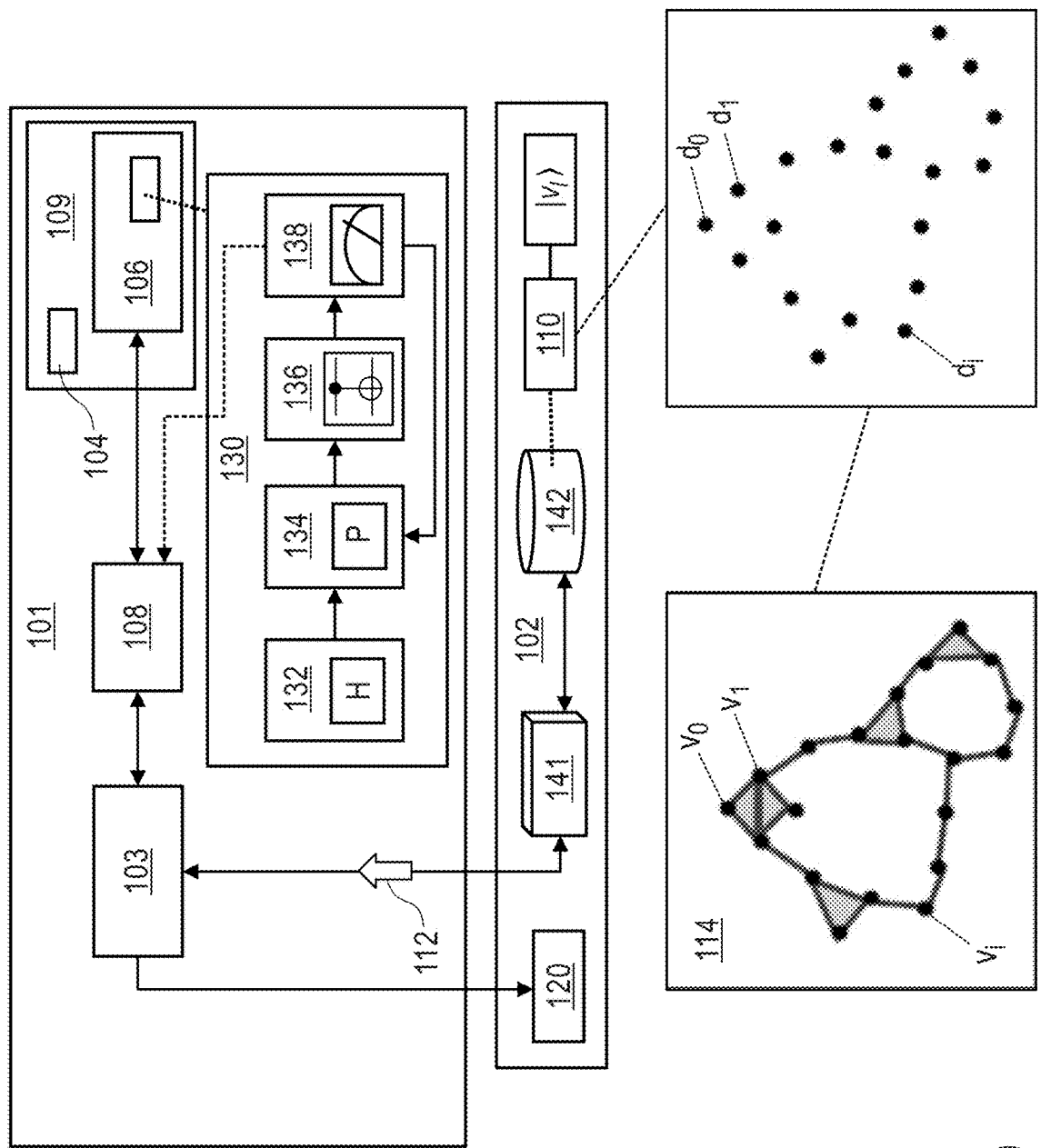
FIG. 19 is a block diagram of an example system for a quantum circuit for transformation of mixed state vectors in one embodiment.

In particular, FIG. 19 depicts a NISQ-QTDA hybrid computing system 150 corresponding to the NISQ-QTDA computing system of FIG. 11 configured as a quantum circuit for transformation of mixed state vectors in one embodiment. In an example shown in FIG. 19, system 150 can be a hybrid computing system including a combination of one or more quantum computers, quantum systems, and/or classical computers. In an example shown in FIG. 19, system 150 can include a quantum system 101 and a classical computer 102. In one embodiment, quantum system 101 and classical computer 102 can be configured to be in communication via one or more of wired connections and wireless connections (e.g., a wireless network). Quantum system 101 can include a quantum chipset that includes various hardware components for processing data encoded in qubits. The quantum chipset can be a quantum computing core surrounded by an infrastructure to shield the quantum chipset from sources of electromagnetic noise, mechanical vibration, heat, and other sources of noise, which tend to degrade performance. Classical computer 102 can be electronically integrated, via any suitable wired and/or wireless electronic connection, with quantum system 101.

In the example shown in FIG. 19, quantum system 101 can be any suitable set of components capable of performing quantum operations on a physical system. A quantum operation can be, for example, a quantum gate operation that manipulate qubits to interact with one another in accordance with the quantum gate operation. In the example embodiment depicted in FIG. 19, quantum system 101 can include a controller 103, an interface 108, and quantum hardware 109. In some embodiments, all or part of each of controller 103, interface 108, and quantum hardware 109 can be located in a cryogenic environment to aid in the performance of the quantum operations. Quantum hardware 109 may be any hardware capable of using quantum states to process information. Such hardware may include a plurality of qubits 104, and mechanisms to couple/entangle qubits 104, in order to process information using said quantum states. Qubits 104 may include, but are not limited to, charge qubits, flux qubits, phase qubits, spin qubits, and trapped ion qubits. Quantum hardware 109 can include a set of quantum gates 130 configured to perform quantum logic operations on qubits stored in quantum registers 104. Quantum gates 130 can include one or more single-qubit gates, two-qubit gates, and/or other multi-qubit gates.

Controller 103 can be any combination of digital computing devices capable of performing a quantum computation, such as executing a quantum circuit 106, in combination with interface 108. Such digital computing devices may include digital processors and memory for storing and executing quantum commands using interface 108. Additionally, such digital computing devices may include devices having communication protocols for receiving such commands and sending results of the performed quantum computations to classical computer 102. Additionally, the digital computing devices may include communications interfaces with interface 108. In one embodiment, controller 103 can be configured to receive classical instructions (e.g., from classical computer 102) and convert the classical instructions into commands (e.g., command signals) for interface 108. Command signals being provided by controller 103 to interface 108 can be, for example, digital signals indicating which quantum gates among quantum gates 106 needs to be applied to qubits 104 to perform a specific function (e.g., mixed state vector transformation described herein). Interface 108 can be configured to convert these digital signals into analog signals (e.g., analog pulses such as microwave pulses) that can be used for applying quantum gates on qubits 104 to manipulate interactions between qubits 104.

Interface 108 can be a classical-quantum interface including a combination of devices capable of receiving commands from controller 103 and converting the commands into quantum operations for implementing quantum hardware 109. In one embodiment, interface 108 can convert the commands from controller 103 into drive signals that can drive or manipulate qubits 104, and/or apply quantum gates on qubits 104. Additionally, interface 108 can be configured to convert signals received from quantum hardware 109 into digital signals capable of processing and transmitting by controller 103 (e.g., to classical computer 102). Devices included in interface 108 can include, but are not limited to, digital-to-analog converters, analog-to-digital converters, waveform generators, attenuators, amplifiers, optical fibers, lasers, and filters. Interface 108 can further include circuit components configured to measure a basis of the plurality of qubits following the implementation of quantum gates 130, where measurement can yield a classical bit result. For example, a basis of $|0\rangle$ corresponds to classical bit zero, and a basis of $|1\rangle$ corresponds to classical bit one. Each measurement performed by interface 108 can be read out to a device, such as classical computer 102, connected to quantum system 101. A plurality of measurement results provided by interface 108 can result in a probabilistic outcome.

Classical computer 102 can include hardware components such as processors and storage devices (e.g., including memory devices and classical registers) for processing data encoded in classical bits. In one embodiment, classical computer 102 can be configured to control quantum system 101 by providing various control signals, commands, and data encoded in classical bits to quantum system 101. Further, quantum states measured by quantum system 101 can be read by classical computer 102 and classical computer 102 can store the measured quantum states as classical bits in classical registers. In one embodiment of an implementation, classical computer 102 can be any suitable combination of computer-executable hardware and/or computer-executable software capable of executing a preparation module 141 to perform quantum computations with data stored in data store 142 as part of building and implementing a machine learning protocol. Data store 142 may be a repository for data to be analyzed using a quantum computing algorithm, as well as the results of such analysis. Preparation module 141 may be a program or module capable of preparing classical data from data store 142 to be analyzed as part of the implementation of a quantum circuit 106. Preparation module 141 may be instantiated as part of a larger algorithm, such as a function call of an application programming interface (API) or by parsing a hybrid classical-quantum computation into aspects for quantum and classical calculation. As described in more detail below, preparation module 141 may generate instructions for creating a quantum circuit 106 using quantum gates 130. In an embodiment, such instructions may be stored by controller 103, and may instantiate the execution of the components of interface 108 so that the quantum operations of the quantum gates 130 may be executed on quantum hardware 109.

Components of classical computer 102 are described in more detail below with reference to FIG. 35. In an example system, classical computer 102 can be a laptop computer, a desktop computer, a vehicle-integrated computer, a smart mobile device, a tablet device, and/or any other suitable classical computing device. Additionally or alternatively, classical computer 102 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 38 and FIG. 39.

System 150 can be implemented to transform any given input (e.g., an input vector having mixed states, or states with different Hamming weights) to a quantum state that is a superposition of states with one specific Hamming weight. In an embodiment, system 100 can be implemented for Topological Data Analysis (TDA) or for any application that can utilize a transformation of an input vector to a superposition of states with a specific Hamming weight.

In an aspect, given a set of data points embedded in some ambient space, a simplicial complex can be derived from the set of data-points. As mentioned, a k-simplex is a collection of k+1 vertices forming a simple polytope of dimension k. For example, 0-simplices are single points (zero-dimensional), 1-simplices are line segments (one-dimensional), 2-simplices are triangles (two-dimensional), and so on. A simplicial complex is a collection of a plurality of k-simplices (of any order), and higher order simplices (e.g., higher k) can include lower order simplices. For example, a triangle simplex includes three line or edge simplices that form the triangle simplex, and also includes the three vertices (e.g., 0-simplices) connected by the three edge simplices.

Simplices in a simplicial complex $\Gamma$ can be constructed as a mixed state (e.g., superposition quantum state) in quantum computing. The mixed state simplices can be projected onto the kernel of a combinatorial Laplacian $\Delta_k$ corresponding to k-simplices of simplicial complex $\Gamma$ denoted as $\Delta_k$, in order to estimate the dimension of the kernel. For NISQ-QTDA, the estimation of the kernel dimension allows the determination of the Betti numbers, because a k-th Betti number is a kernel dimension of the combinatorial Laplacian $\Delta_k$ corresponding to k-simplices of simplicial complex $\Gamma$.

As mentioned, the combinatorial Laplacian $\Delta$ corresponding to all simplices of simplicial complex $\Gamma$ can be used for determining the combinatorial Laplacian $\Delta_k$ corresponding to k-simplices. The combinatorial Laplacian $\Delta$ corresponding to all simplices of simplicial complex $\Gamma$ is denoted as:

$$\Delta = P_\Gamma B P_\Gamma B P_\Gamma$$

where $P_\Gamma$ is the projector that projects the boundary operator (or boundary map) B onto all simplices present in simplicial complex $\Gamma$. The boundary operator B can create a mapping of orders of simplices (e.g., simplices of all orders) in a given simplicial complex. That is, the boundary operator can map the vector space of k-simplices into the vector space of k−1 simplices. Projector $P_\Gamma$ is projected on a boundary operator B multiple times (e.g., three times) because boundary operator B includes a boundary conjugate that is restricted to the simplices in the simplicial complex $\Gamma$. In an example, if $P_\Gamma = I$, then $\Delta = B^2 = nI$, and the kernel will be empty and will not include holes. The projector $P_\Gamma$ can be used for determining the combinatorial Laplacian $\Delta$ corresponding to all simplices that are present in simplicial complex $\Gamma$.

The combinatorial Laplacian $\Delta$ corresponding to all the simplices of simplicial complex $\Gamma$ can be used for determining the combinatorial Laplacian $\Delta_k$ corresponding to k-simplices. The combinatorial Laplacian $\Delta_k$ corresponding to k-simplices is denoted as:

$$\Delta_k = P_k \Delta P_k,$$

where $P_k$ is the projector onto all k-simplices. Since the k-Betti number is the kernel dimension of the combinatorial Laplacian, $\Delta_k$, construction of the projector $P_k$ can lead to determination of the combinatorial Laplacian $\Delta_k$ corresponding to k-simplices. The combinatorial Laplacian $O_k$ corresponding to k-simplices can be used for determining the Betti numbers of simplicial complex $\Gamma$. System 150 can be implemented to project all k-simplices of a simplicial complex.

System 150, when applied to TDA, can be implemented to project all k-simplices of a simplicial complex. System 150 can project the k-simplices by transforming a plurality of random state vectors having mixed states (e.g., states with different Hamming weight), iteratively, to a quantum state that is a superposition of states with a specific Hamming weight. The Hamming weight can be equivalent to a number of nonzero elements in the random state vectors, which can also be a simplex order k.

In one embodiment, data store 142 may include a dataset 110, where a simplicial complex 114 can represent a topology of a plurality of data points among dataset 110 (e.g., in a database) and relationships between the plurality of data points. In an aspect, a vertex in simplicial complex 114 can represent a data point in the highly-dimensional dataset 110, and an edge or a line connecting two vertices can represent a relationship between the two vertices or data points, where the relationship can be one or more of a dependency, a shared attribute, and/or other types of relationships. Formation of simplicial complex 114 can be based on a determination of whether each pair of data points in dataset 110 are $\varepsilon$-close, or within a distance of $\varepsilon$ from one another. If two data points are $\varepsilon$-close, then an edge can connect the two data points to form one or more simplices of simplicial complex 114. In the example shown in FIG. 19, data points $d_0$ and $d_1$ can form an $\varepsilon$-close pair, hence they are connected by an edge as shown in simplicial complex 114. However, data points $d_0$ and $d_i$ are not $\varepsilon$-close, hence they are not connected by any edge in simplicial complex 114. In general, a k-simplex is added to simplicial complex 114 for every subset of k+1 data points that are pair-wise connected (e.g., $\varepsilon$-close). As the value of $\varepsilon$ varies, different data points may be connected to form different simplices, hence forming different simplicial complex.

Dataset 110 can include n data points ranging from $d_0, \ldots d_{n-1}$, and simplicial complex 114 can include n vertices, ranging from $v_0, \ldots, v_{n-1}$, representing the n data points in dataset 110. If dataset 110 has n data points, then a maximum possible number of simplices present in simplicial complex 114 is $2^n$. For example, if all $$\binom{n}{2}$$

pairs of vertices of simplicial complex 114 are connected with one another, then simplicial complex 114 includes $2^n$ simplices. Note that multiple simplices having the same dimension are considered as different simplices. For example, if simplicial complex 114 has n vertices, then there are n 0-simplices (e.g., single point, zero dimension simplices) in simplicial complex 114. If there are pairs of vertices that are disconnected from one another among simplicial complex 114, then the number of simplices in simplicial complex 114 will be less than $2^n$.

System 150 can be implemented to construct the projector $P_k$ that can project all k-simplices that can be formed by dataset 110 to construct simplicial complex 114. In one embodiment, the projector $P_k$ can be a quantum circuit including one or more quantum gates. Classical computer 102 can generate a set of n-bit random binary numbers 112 and send the n-bit binary number to quantum system 101. Quantum system 101 can use the n-bit random binary numbers 112 to generate a set of random state vectors, denoted as $|v_1\rangle$. Random state vectors, denoted as $|v_l\rangle$ can include random independent and identically distributed entries, where $l=1, \ldots, n_v$, and $n_v$ denotes the set of n-bit random binary numbers 112 (e.g., there are $n_v$ n-bit binary numbers). Further, each one of random state vectors $|v_l\rangle$ can be a superposition of mixed states, which is a superposition of multiple states with different Hamming weights. For example, a random state vector $|v_l\rangle$ corresponding to a vector with four elements can include sixteen states, and these sixteen states can include a mixture of states having a Hamming weight of two (e.g., |0011⟩, |1010⟩, etc.) and three (e.g., |1011⟩, |1101⟩, etc.). The parameter $n_v$ can be an input provided by classical computer 102 to quantum system 101. In one embodiment, random state vectors $|v_l⟩$ can be random vectors with zero mean and uncorrelated coordinates. In one embodiment, random state vectors $|v_l⟩$ can be random Hadamard state vectors sampled from a $2^n \times 2^n$ Hadamard matrix. A selection (e.g., by quantum system 101) of one of the $n_v$ n-bit binary numbers can return a random state vector $|v_l⟩$. For example, given n qubits with initial state $|0⟩$, quantum system 101 can randomly invert or flip the n qubits (e.g., by applying NOT gates), and apply Hadamard gates to all n qubits to produce a state corresponding to a random column of the $2^n \times 2^n$ Hadamard matrix. In one embodiment, if system 150 can tolerate an error of up to $\epsilon$, then $$n_v > \frac{1}{\epsilon^2}.$$

In an embodiment where system 150 is being used for a trace estimation application, the $n_v$ n-bit binary numbers can be based on a number of random Hadamard vectors needed for the trace estimation.

Quantum gates 130 can include gates that form a quantum circuit 106 configured to implement the projector $P_k$ that can be used for projecting simplices of order k (e.g., k-simplices) in simplicial complex 114. Interface 108 can be configured to control quantum circuit 106 based on a command signal received from controller 103. In one embodiment, interface 108 can control quantum circuit 106 by applying quantum gates (e.g., among quantum gates 130) being used for forming quantum circuit 106 on qubits 104. Quantum circuit 106 can include a set of Hadamard gates 132, a set of phase gates 134, a set of controlled-not (CNOT) gates 136, and a set of measurement circuits 138. Each Hadamard gate among Hadamard gates 132 can act on a single qubit to transform or project the qubit to a superposition quantum state. To project k-simplices in simplicial complex 114, quantum circuit 106 can randomly flip n qubits and apply n Hadamard gates 132 to all n qubits to sample random state vectors $|v_l⟩$, where the n qubits encode or represent entries of the sampled random state vectors $|v_l⟩$. Quantum circuit 106 can sample random state vector $|v_l⟩$ for $n_v$ times (e.g., l=1, ..., $n_v$), where each l-th sampled random state vector $|v_l⟩$ can be a superposition of mixed states representing simplices (of different order k) that potentially exist in simplicial complex 114, and each l corresponds to a vertex in simplicial complex 114.

The set of phase gates 134 can change a phase of one basis state, and maintain the phase of the other basis, of a qubit being inputted to quantum circuit 106. The set of CNOT gates 136 can entangle qubits that represent a k-simplex with log (n) ancilla qubits that can be among qubits 104. The phase gates 134 and the CNOT gates 136 in quantum circuit 106 can perform a controlled-increment technique, such that the n/2 ancilla qubits can count a number of nonzero elements in the sampled random state vectors $|v_l⟩$ (e.g., determining a Hamming weight of the sampled random state vectors $|v_l⟩$). A nonzero element in the sampled random state vector $|v_l⟩$ can indicate that the corresponding vertex in simplicial complex 114 is part of a simplex, and a state representing any k-simplex will have exactly k+1 nonzero elements. The entanglement of the n qubits with the ancilla qubits can be considered as entangling the k-simplex with its Hamming weight. In one embodiment, measurement circuits 138 can be configured to measure ancilla qubits entangled by the set of CNOT gates 136, and the measurement results can be provided to interface 108. Interface 108 can provide the measurement results from measurement circuits 138 to classical computer 102, via controller 103. Classical computer 102 can store the measurement results in classical registers 120.

In one embodiment, a first set of qubits among qubits 104 can be assigned to represent elements among a l-th sampled random state vector $|v_l⟩$. A second set of qubits among qubits 104 can be assigned to represent a count of nonzero elements in the l-th sampled random state vector $|v_l⟩$. The set of Hadamard gates 132 can act on the first set of qubits to transform the first set of qubits into superposition state and to generate the l-th sampled random state vector $|v_l⟩$. The set of phase gates 134 can be used for applying permutations on the second set of qubits to increment the count represented by the second set of qubits. The set of CNOT gates 136 can be used for entangling the first set of qubits with the second set of qubits. In one embodiment, one or more gates among the set of phase gates 134 and the set of CNOT gates 136 can form controlled-rotation gates, such that states of the second set of qubits can be controlled by corresponding entangled qubits among the first set of qubits. The control from the first set of qubits on the second set of qubits can be dependent on whether the states among random state vector $|v_l⟩$ include nonzero elements or not.

In one embodiment, an output of quantum circuit 106 can be a vector having Dicke states of a specific Hamming weight (e.g., k+1), such that the outputted vector represents a number of k-simplices in random state vector $|v_l⟩$. In an aspect, a vector having Dicke states is a vector having a superposition of states, with equal probability, that has a specific Hamming weight (e.g., not mixed states). After $n_v$ iterations of running quantum circuit 106, the number of k-simplices in each random state vector $|v_l⟩$ can e averaged over $n_v$ to estimate a total number of k-simplices in simplicial complex 114. The second set of qubits can represent a count indicating the number of nonzero elements in random state vector $|v_l⟩$. Measurement circuit 138 can measure the second set of qubits to output the count of nonzero elements. If the count is k+1 (e.g., corresponding to the simplex order of interest k), then the value of k+1 can be provided to another processor (e.g., another quantum circuit, or classical computer 102, depending on the application of system 100) to track a number of k-simplices in simplicial complex 114 (e.g., increment a count of k-simplices). If the count is not k+1 (e.g., not equivalent to the simplex order of interest k), then quantum circuit 101 can sample a next random state vector, such as $|v_{l+1}⟩$, without outputting the value that is not k+1, and count the number of nonzero elements in $|v_{l+1}⟩$. Hence, the second set of qubits in quantum circuit 106 can count a number of k-simplices in simplicial complex 114, effectively implementing quantum circuit as a projector $P_k$ that projects simplices of order k. In an aspect, quantum circuit 106 can include log(n) ancilla qubits, and by can include quantum logic gates that implement quantum Fourier transforms (QFT) (see FIG. 20 to FIG. 22C below). Hence, a total number of quantum logic gates in quantum circuit 130 can be $O(\log^2 n)$ gates, resulting in a relatively short circuit depth of $O(\log^2 n)$.

In one embodiment, the vector being outputted by quantum circuit 106 can be probabilistic, such as having a probability of being a vector that include one or more states with k+1 nonzero elements. For example, $|v_l\rangle$ can include a mixture of states with two nonzero elements (e.g., 1-simplices) and states with three nonzero elements (e.g., 2-simplices), and quantum circuit 106 is configured to project 1-simplices. Quantum circuit 106 can produce either a first vector with a superposition of states with two nonzero elements (e.g., Dicke states with two nonzero elements), or a second vector with a superposition of states with three nonzero elements (Dicke states with three nonzero elements). Measurement circuit 138 can measure the second set of qubits and a result of the measurement can indicate whether the 1-simplices or 2-simplices are being projected by quantum circuit 106. For example, if the measurement collapse to the first vector, then the measurement result indicates that quantum circuit 106 is projecting onto 1-simplices. If the measurement collapse to the second vector, then the measurement result indicates that quantum circuit 106 is projecting onto 2-simplices. Hence, quantum circuit 106 can transform the input random state vector $|v_l\rangle$ to one or more vectors having Dicke states with of one or more different nonzero elements (or elements that are '1'), and measurement of the second set of qubits can output a result indicating which order of simplices is being projected by quantum circuit 106.

In embodiments where system 150 is implemented for TDA applications, quantum circuit 106 can be implemented for multiple iterations and quantum system 101 can initialize system 150 prior to the multiple iterations. For example, quantum system 101 can implement or operate a deterministic quantum circuit (e.g., a quantum circuit that does not utilize ancilla qubits) to determine a deterministic or fixed value of k. As a result of initializing system 150 to determine the fixed value of k, quantum circuit 106 can generate output vectors that has Dicke states of k+1, k, or k+2 nonzero elements corresponding to the fixed value of k, k−1, or k+1, respectively. This initialization can reduce a randomless of the output vectors generated by quantum circuit 130. For example, the output vectors can have Dicke states corresponding to k−1, k, or k+1, and not values that are less than k−1 or greater than k+1.

As discussed herein with respect to FIG. 13, there is provided a diagram illustrating a plurality of simplices that may be in a simplicial complex in one embodiment with an example simplicial complex 310 including four vertices (e.g., n=4).

Figure 20:
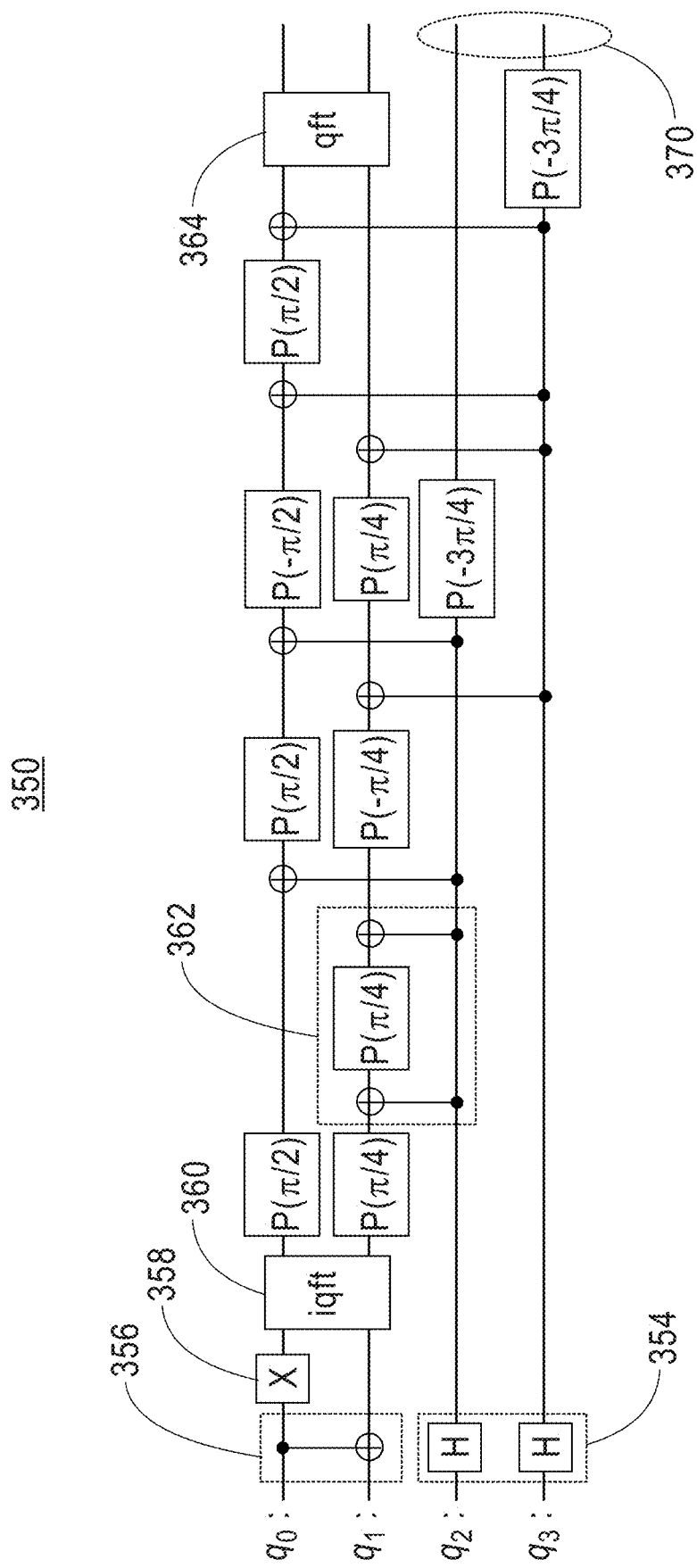
FIG. 20 is a diagram illustrating an example quantum circuit that can be implemented as a quantum circuit for transformation of mixed state vectors in one embodiment.

FIG. 20 is a diagram illustrating an example quantum circuit 350 that can be implemented as a quantum circuit for transformation of mixed state vectors in one embodiment. Quantum circuit 350 can be a circuit that can be implemented to project, or determine a number of, edges or lines (e.g., 1-simplices) in a simplicial complex. Two qubits, $q_0$ and $q_1$, can be assigned as count registers, where $q_0$ is the most significant bit, and two qubits $q_2$ and $q_3$ can be assigned as simplices registers. Qubits $q_2$ and $q_3$ can represent elements of the l-th sampled random state vector $|v_l\rangle$ corresponding to an l-th vertex in a simplicial complex. Qubits $q_0$ and $q_1$ can be controlled by qubits $q_2$ and $q_3$, and states of $q_0$ and $q_1$ can represent a permutation corresponding to a count of nonzero elements (e.g., Hamming weight) among the l-th sampled random state vector $|v_l\rangle$ represented by qubits $q_2$ and $q_3$. In one embodiment, random state vector $|v_l\rangle$ being inputted to quantum circuit 350 can be a superposition of mixed states having equal probability. An output of circuit 350, such as an output vector 370, can be a vector having a Dicke state for a random Hamming weight. For example, a random state vector $|v_l\rangle$ being inputted to quantum circuit 350 can include X states having two nonzero elements, and Y states having three nonzero elements. A measurement of qubits $q_0$ and $q_1$ can have a probability of X/(X+Y) outputting a vector having states with two nonzero elements, and a probability of Y/(X+Y) outputting an output vector 370 having states with three nonzero elements. Since quantum circuit 350 is implemented to project edges, the value of k (e.g., simplicial order of interest) corresponding to quantum circuit 350 can be k=1, and the number of nonzero elements in $|v_l\rangle$ corresponding an edges is k+1=2. The probability of output vector 370 having states with k+1 nonzero elements can be proportional to a number of simplices of order k in simplicial complex 114. In one embodiment, quantum circuit 350 can be implemented for $n_v$ iterations (e.g., for $n_v$ random state vectors) to count nonzero elements in $n_v$ random state vectors $|v_l\rangle$. In each iteration, quantum circuit 300 can count nonzero elements in the l-th random state vector $|v_l\rangle$. The count of nonzero elements from each iteration can be provided to classical computer 102, and classical computer 102 can average the counts over $n_v$ to estimate a total number of k-simplices in simplicial complex 114. In one embodiment, quantum circuit 350 can provide output vector 370 to another quantum circuit. For example, if quantum circuit 350 is being implemented for a trace estimation application, quantum circuit 350 can provide output vector 370 to a trace estimation circuit. In one embodiment, the number of ancilla qubits being assigned as count qubits can be based on a fixed value of k determined by an initialization of system 150 (e.g., initialization using deterministic quantum circuit, as described above). For example, the count qubits can represent k, k+1, or k+2 nonzero elements corresponding to k−1, k (fixed value from initialization), or k+1. Hence, for k being fixed at the value of 1 (e.g., edges), two ancilla qubits representing counts of 0, 1, 2, 3 nonzero elements can be sufficient.

Quantum circuit 350 can include Hadamard gates 354 that act on qubits $q_2$ and $q_3$. Hadamard gates 354 can transform qubits $q_2$ and $q_3$ into superposition states. Qubits $q_0$ and $q_1$ can be entangled, such as by a CNOT gate 356. One of the count qubits, such as $q_0$, can be inverted by a NOT gate 358. The inverted qubit $q_0$ and the qubit $q_1$ can be inputted to an inverted quantum Fourier transform (iqft) gate 360. A plurality of phase gates and CNOT gates can entangle qubits $q_0$ and $q_1$ with qubits $q_2$ and $q_3$, such that states of $q_2$ and $q_3$ can control phase changes of qubits $q_0$ and $q_1$. For example, a block 362 can include a phase gate to rotate qubit $q_1$ 45° about the z-axis of the Bloch sphere, and the phase gate is situated between two CNOT gates entangling qubits $q_1$ and $q_2$. Qubit $q_2$ can be the controlling qubit and qubit $q_1$ can be the target qubit. If qubit $q_2$ has a state of $|0\rangle$, then the block 362 will not change the state of qubit $q_1$. If qubit $q_2$ has a state of $|1\rangle$, then the phase gate in block 362 will rotate qubit $q_1$, thus block 362 effectively functions as a controlled-rotation gate. In response to a completion of the conditional permutations implemented by the CNOT gates and phase gates, qubits $q_0$ and $q_1$ can be inputted to a quantum Fourier transform (qft) gate 364. In one embodiment, outputs from the qft gate 364 can be measured or collapsed by measurement circuits (e.g., measurement circuits 138 in FIG. 19).

Based on entanglement of qubits $q_0$ and $q_1$ with qubits $q_2$ and $q_3$, and operations of the controlled-rotation gates, quantum circuit 350 can increment a count represented by qubits $q_0$ and $q_1$ in response to specific states of qubits $q_2$ and $q_3$. For example, if at least one of qubits $q_2$ and $q_3$ has a state of $|1\rangle$, the count represented by qubits $q_0$ and $q_1$ can increment by one, such as transitioning from $|00\rangle$ to $|01\rangle$. If both qubits $q_2$ and $q_3$ has a state of $|1\rangle$, the count represented by qubits $q_0$ and $q_1$ can increment by two, such as transitioning from |00⟩ to |10⟩. Hence, the plurality of controller-rotation gates similar to block 362 can collectively form a controlled-increment quantum circuit (e.g., quantum circuit 350). The controlled-increment on the count qubits $q_0$ and $q_1$, performed by quantum circuit 350, can be used for determining a number of nonzero elements, or a Hamming weight, in the l-th sampled random state vector $|v_l⟩$ corresponding to the l-th vertex of a simplicial complex. The entanglement of the qubits $q_2$ and $q_3$ to qubits $q_0$ and $q_1$ can be considered as entanglement of 1-simplices to its Hamming weight.

Figure 21A:
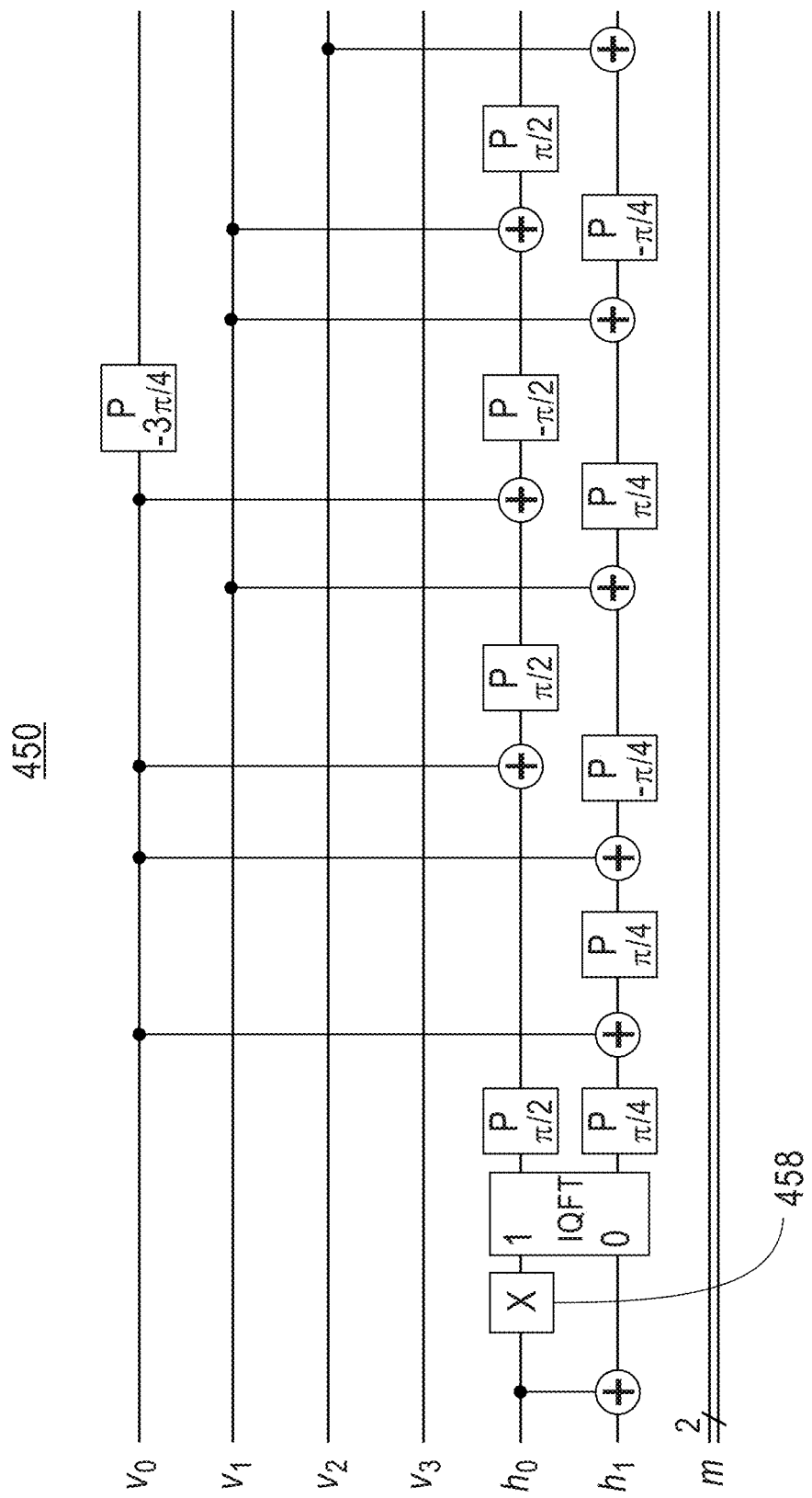
FIG. 21A is a diagram illustrating a first portion of an example quantum circuit that can be implemented as a quantum circuit for transformation of mixed state vectors in one embodiment.
Figure 21B:
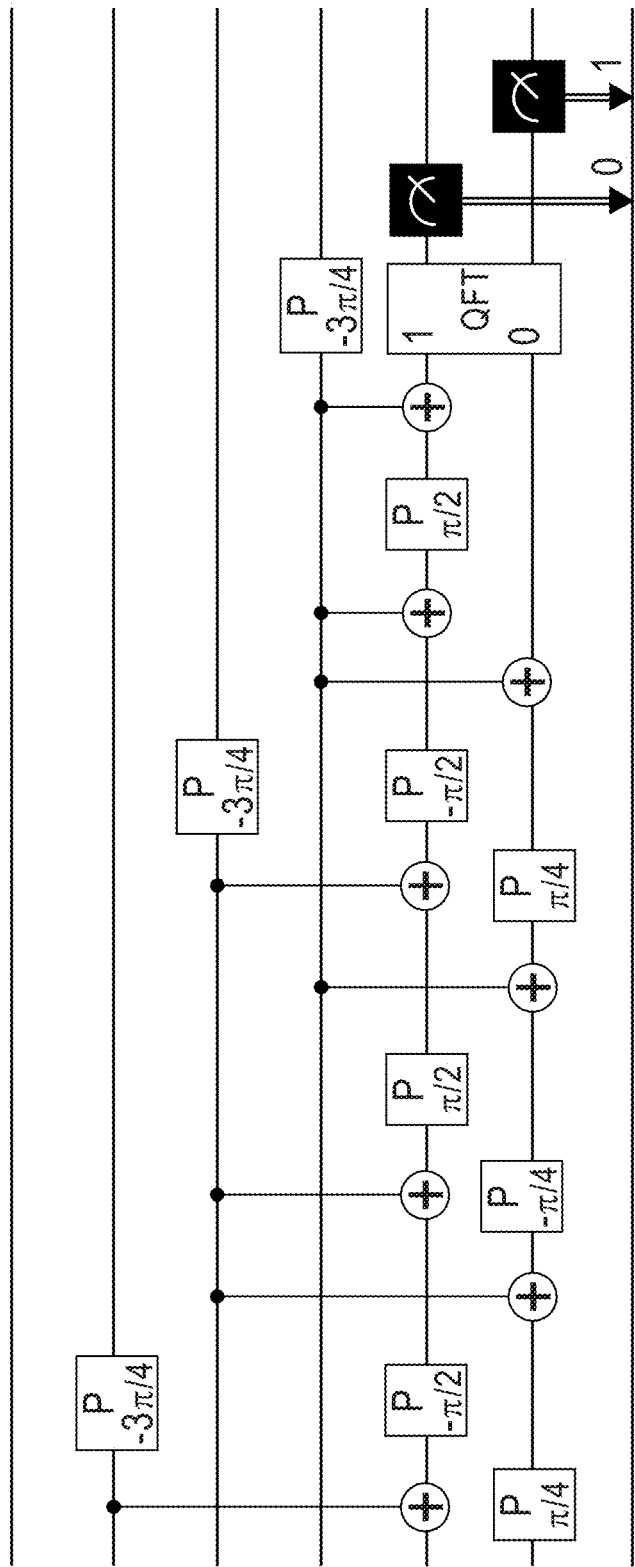
FIG. 21B is a diagram illustrating a second portion of the example quantum circuit in FIG. 4A that can be implemented as a quantum circuit for transformation of mixed state vectors in one embodiment.

FIG. 21A and FIG. 21B are diagrams illustrating an example quantum circuit 450 that can be implemented as a quantum circuit for transformation of mixed state vectors in one embodiment. FIG. 21A shows a first portion of quantum circuit 450 and FIG. 21B shows a second portion of quantum circuit 450, where the second portion is a continuation of the first portion. Two qubits, $h_0$ and $h_1$, can be assigned as count registers, and four qubits $v_0$, $v_1$, $v_2$ and $v_3$ can be assigned as simplices registers. Qubits $v_0$, $v_1$, $v_2$ and $v_3$ can represent the l-th sampled random state vector $|v_l⟩$ corresponding to an l-th vertex in a simplicial complex. Qubits $h_0$ and $h_1$ can be controlled by qubits $v_0$, $v_1$, $v_2$ and $v_3$, and states of $h_0$ and $h_1$ can represent a permutation corresponding to a count of nonzero elements (e.g., Hamming weight) among the elements of the l-th sampled random state vector $|v_l⟩$ represented by qubits $v_0$, $v_1$, $v_2$ and $v_3$.

Qubits $h_0$ and $h_1$ can be entangled with qubits $v_0$, $v_1$, $v_2$ and $v_3$ by CNOT gates. One of the count qubits, such as $h_0$, can be inverted by a NOT gate 458. The inverted qubit $h_0$ and the qubit $h_1$ can be inputted to an inverted quantum Fourier transform (iqft) gate. A plurality of phase gates and CNOT gates can entangle qubits $h_0$ and $h_1$ with qubits $v_0$, $v_1$, $v_2$ and $v_3$, such that states of $v_0$, $v_1$, $v_2$ and $v_3$ can control phase changes of qubits $h_0$ and $h_1$. Based on entanglement of qubits $h_0$ and $h_1$ with qubits $v_0$, $v_1$, $v_2$ and $v_3$, and operations of the controlled-rotation gates, quantum circuit 450 can increment a count represented by qubits $h_0$ and $h_1$ in response to specific states of qubits $v_0$, $v_1$, $v_2$ and $v_3$. The controlled-increment on the count qubits $h_0$ and $h_1$, performed by quantum circuit 450, can be used for determining a number of nonzero elements, or a Hamming weight, in the l-th sampled random state vector $I_v$ corresponding to an l-th vertex in a simplicial complex. In response to a completion of the conditional permutations implemented by the CNOT gates and phase gates, qubit $h_0$ and $h_1$ can be inputted to a quantum Fourier transform (qft) gate, and outputs from the qft gate can be measured or collapsed by measurement circuits (e.g., measurement circuits 138 in FIG. 19).

Figure 22A:
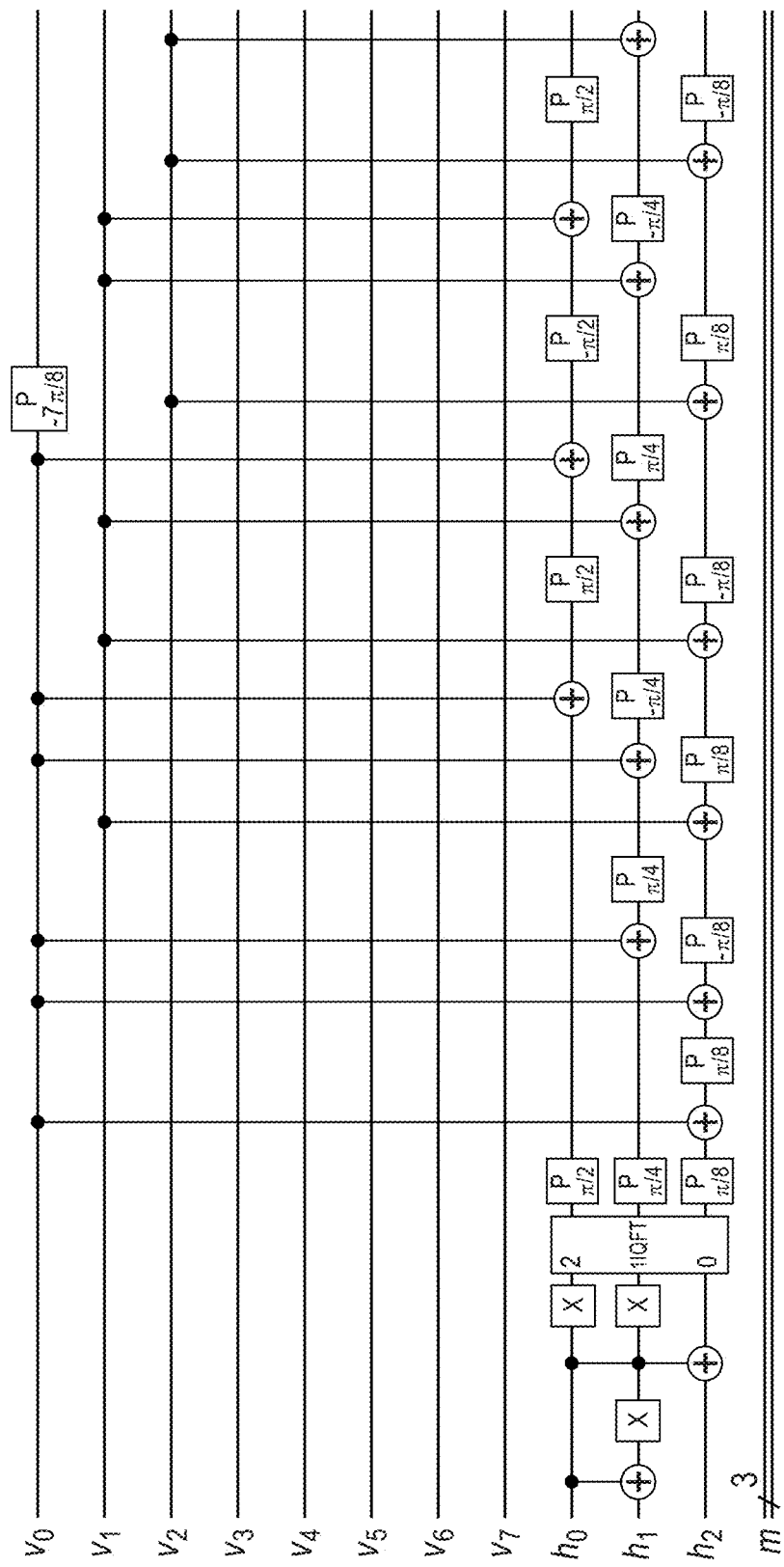
FIG. 22A is a diagram illustrating a first portion of another example quantum circuit that can be implemented as a quantum circuit for transformation of mixed state vectors in one embodiment.
Figure 22B:
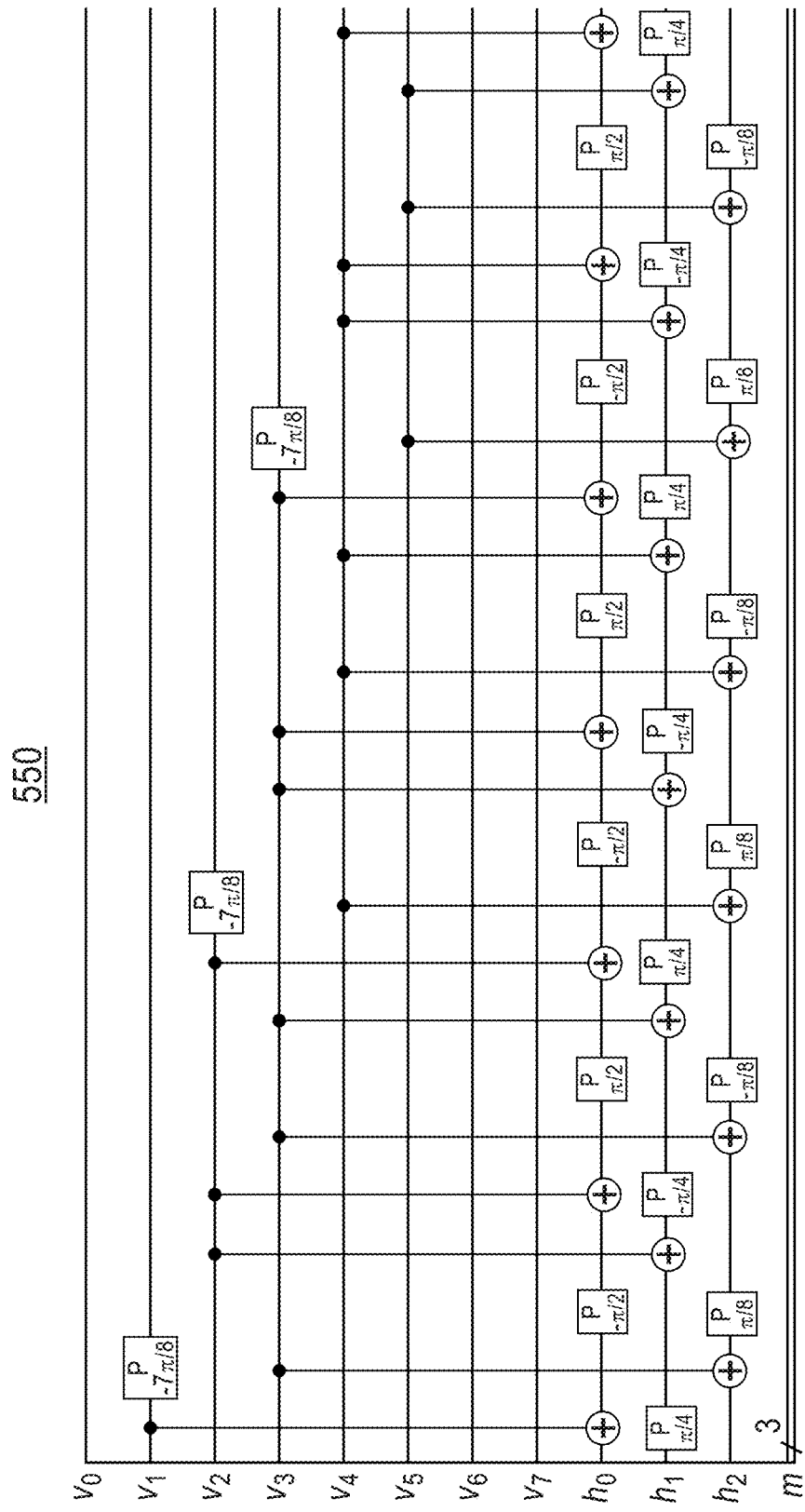
FIG. 22B is a diagram illustrating a second portion of the example quantum circuit in FIG. 5A that can be implemented as a quantum circuit for transformation of mixed state vectors in one embodiment.
Figure 22C:
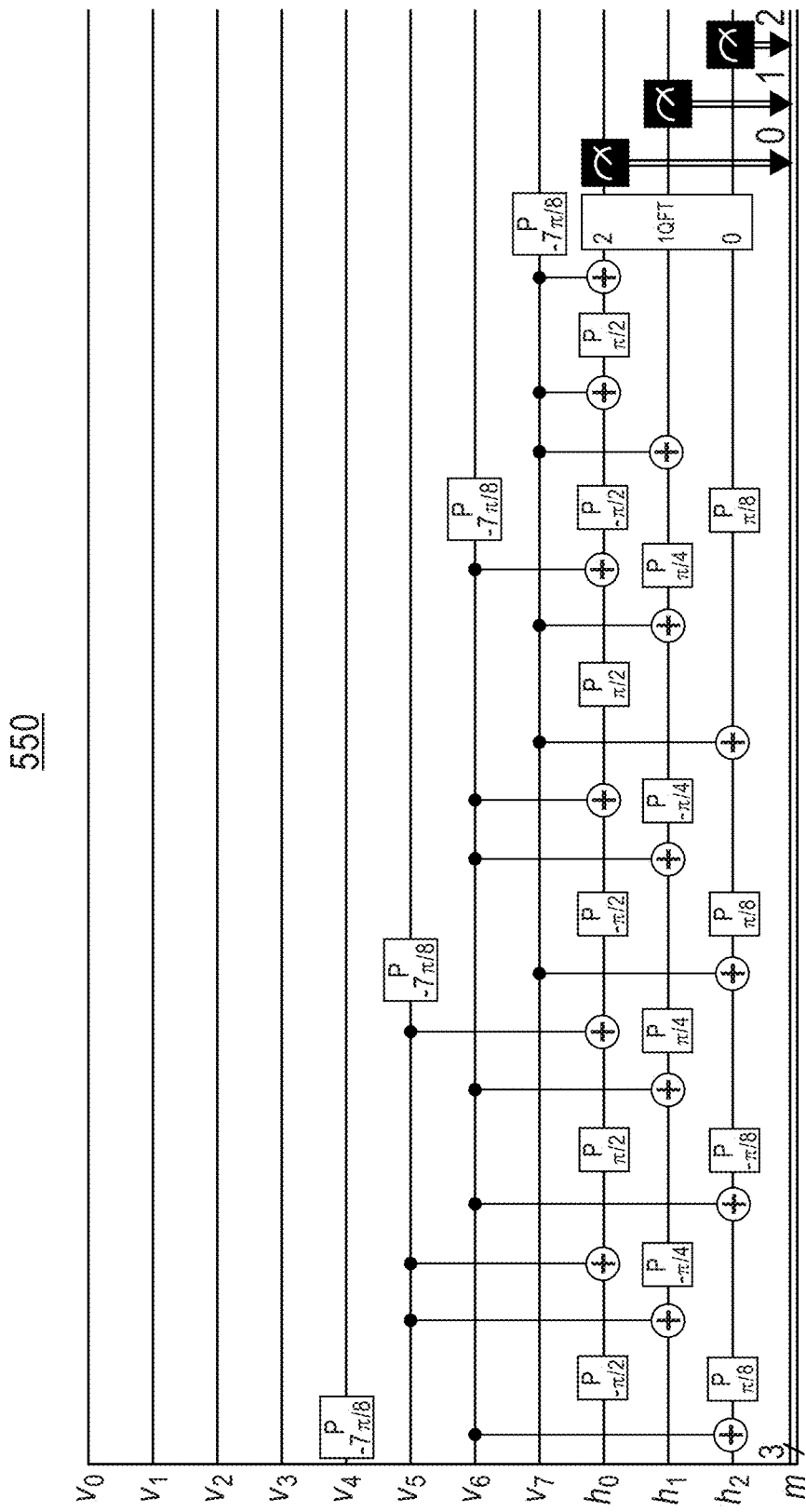
FIG. 22C is a diagram illustrating a third portion of the example quantum circuit in FIG. 5A that can be implemented as a quantum circuit for transformation of mixed state vectors in one embodiment.

FIG. 22A, FIG. 22B and FIG. 22C are diagrams illustrating an example quantum circuit 550 that can be implemented as a quantum circuit for transformation of mixed state vectors in one embodiment. FIG. 22A shows a first portion of quantum circuit 550, FIG. 22B shows a second portion of quantum circuit 550, and FIG. 22C shows a third portion of quantum circuit 550, where the second portion is a continuation of the first portion and the third portion is a continuation of the second portion. Three qubits, $h_0$, $h_1$ and $h_2$, can be assigned as count registers, and eight ubits $v_0$, . . . $v_7$ can be assigned as simplices registers. Qubits $v_0$, . . . $v_7$ can represent elements of the l-th sampled random state vector $|v_0⟩$ corresponding to an l-th vertex in a simplicial complex. Qubits $h_0$, $h_1$ and $h_2$ can be controlled by qubits $v_0$, . . . $v_7$, and states of $h_0$, $h_1$ and $h_2$ can represent a permutation corresponding to a count of nonzero elements (e.g., Hamming weight) among the l-th sampled random state vector $|v_l⟩$ represented by qubits $v_0$, . . . $v_7$.

Qubits $h_0$, $h_1$ and $h_2$ can be entangled with qubits $v_0$, . . . $v_7$ by CNOT gates. A plurality of phase gates and CNOT gates can entangle qubits $h_0$, $h_1$ and $h_2$ with qubits $v_0$, . . . $v_7$, such that states of $v_0$, . . . $v_7$ can control phase changes of qubits $h_0$, $h_1$ and $h_3$. Based on entanglement of qubits $h_0$, $h_1$ and $h_2$ with qubits $v_0$, . . . $v_7$, and operations of the controlled-rotation gates, quantum circuit 550 can increment a count represented by qubits $h_0$, $h_1$ and $h_2$ in response to specific states of qubits $v_0$, . . . $v_7$. The controlled-increment on the count qubits $h_0$, $h_1$ and $h_2$, performed by quantum circuit 550, can be used for determining a number of nonzero elements, or a Hamming weight, in the l-th sampled random state vector $|v_l⟩$ corresponding to an l-th vertex in a simplicial complex. In response to a completion of the conditional permutations implemented by the CNOT gates and phase gates, qubit $h_0$, $h_1$ and $h_2$ can be inputted to a quantum Fourier transform (qft) gate, and outputs from the qft gate can be measured or collapsed by measurement circuits (e.g., measurement circuits 138 in FIG. 19).

In an aspect, noisy intermediate-scale quantum (NISQ) processors are quantum processors that include approximately fifty to a few hundred qubits, but might not reach fault-tolerance. NISQ algorithms can be algorithms designed for NISQ processors, and can be hybrid algorithms that use NISQ processors but with reduced calculation load by implementing some parts of the algorithms in classical processors. NISQ algorithms may require error mitigation techniques to recover useful data. The controlled-increment described herein need not require quantum random access memory (QRAM) or fault-tolerance quantum computers, and can be NISQ compatible.

Figure 23:
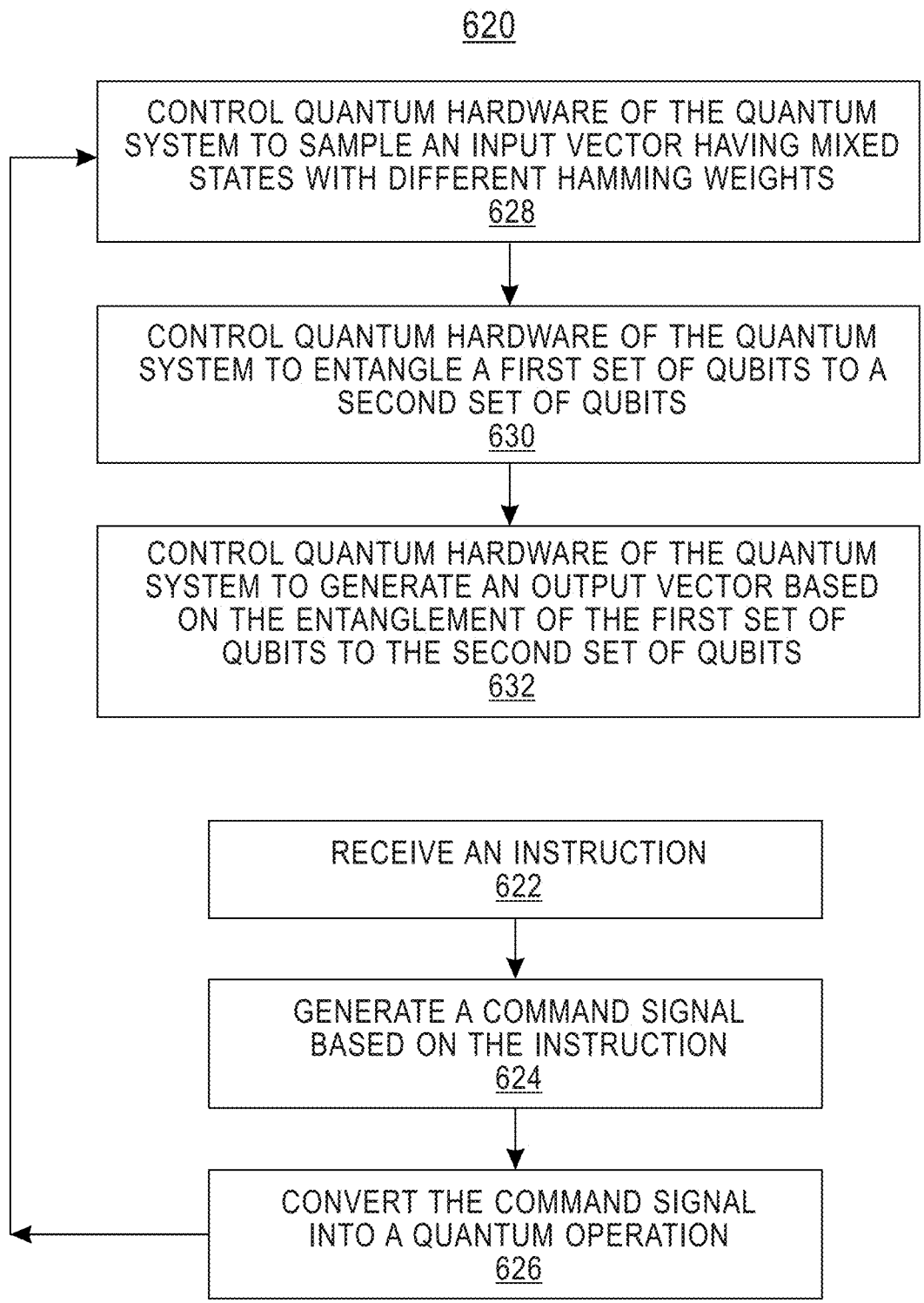
FIG. 23 is a flowchart of an example process that may implement a quantum circuit for transformation of mixed state vectors according to an embodiment of the disclosure.

FIG. 23 is a flowchart of an example process 620 that may implement a quantum circuit for transformation of mixed state vectors according to an embodiment of the disclosure. Example process 620 may include one or more operations, actions, or functions as illustrated by one or more of blocks 622, 624, 626, 628, 630 and/or 632. Although illustrated as discrete blocks, various blocks can be divided into additional blocks, combined into fewer blocks, eliminated, performed in different order, or performed in parallel, depending on the desired implementation.

Process 620 can be implemented by a computing device configured to process data encoded in qubits (e.g., quantum system 101 described herein). Process 620 can begin at block 622. At block 622, a controller of a quantum system can receive an instruction. Process 620 can proceed from block 622 to block 624. At block 624, the controller of the quantum system can generate a command signal based on the instruction. Process 600 can proceed from block 624 to block 626. At block 626, an interface of the quantum system can convert the command signal into a quantum operation. Process 620 can proceed from block 626 to block 628. At block 628, the computing device can sample an input vector having mixed states with different Hamming weights. Process 620 can proceed from block 628 to block 630. At block 630, the computing device can entangle a first set of qubits to a second set of qubits. The first set of qubits can represent elements of the input vector, and the second set of qubits can represent a count of nonzero elements in the input vector.

Process 620 can proceed from block 630 to block 632. At block 632, the computing device can generate an output vector based on the entanglement of the first set of qubits to the second set of qubits. The output vector can include one or more states having a specific Hamming weight. In one embodiment, the input vector can correspond to a dataset comprising a plurality of data points and a topology of the dataset can be represented by a simplicial complex. The simplicial complex can include n vertices. The first set of qubits can include n qubits and the second set of qubits can include log(n) qubits. The output vector can project simplices of an order k the simplicial complex based on the entanglement of the first set of qubits and the second set of qubits.

In one embodiment, the computing device can transform the first set of qubits into superposition quantum state. The computing device can entangle the first set of qubits in superposition quantum state to the second set of qubits. The computing device can perform phase change on the second set of qubits based on states of the first set of qubits. The phase change can increment the count represented by the second set of qubits. In one embodiment, the computing device can receive a set of random binary numbers. The computing device can generate a set of random state vectors based on the set of random binary numbers. The computing device can iteratively sample a random state vector among the set of random state vectors. The sampled random state vector can be the input vector. In one embodiment, the computing device can sample the random state vector by randomly inverting one or more of the first set of qubits and applying the set of Hadamard gates to the first set of qubits to produce the random state vector.

In one embodiment, the computing device can generate a vector that includes one or more states having a random Hamming weight. The computer device can measure the second set of qubits. In response to a result of the measurement indicating the random Hamming weight is same as the specific Hamming weight, the computing device can output the generated vector as the output vector. In response to a result of the measurement indicating the random Hamming weight is different from the specific Hamming weight, the computing device can sample a next input vector without generating the output vector.

As discussed in the commonly-owned, U.S. patent application Ser. No. 17/863,508 entitled QUANTUM CIRCUITS FOR MATRIX TRACE ESTIMATION, the whole contents and disclosure of which is incorporated by reference as if fully set forth herein, there is provided an apparatus and system and methods for estimating a trace of a matrix using log-depth quantum circuits.

In one embodiment, an apparatus and method for operating a quantum circuit is generally described. The apparatus can include a set of quantum registers configured to store a plurality of qubits. The apparatus can further include a quantum circuit configured to generate a random state vector represented by the plurality of qubits. The random state vector can include a specific number of independent entries. The quantum circuit can be further configured to use the random state vector to determine moments of a matrix. The apparatus can further include a measurement interface configured to input output the moments of the matrix to another circuit to estimate a trace of the matrix using the moments.

Figure 24:
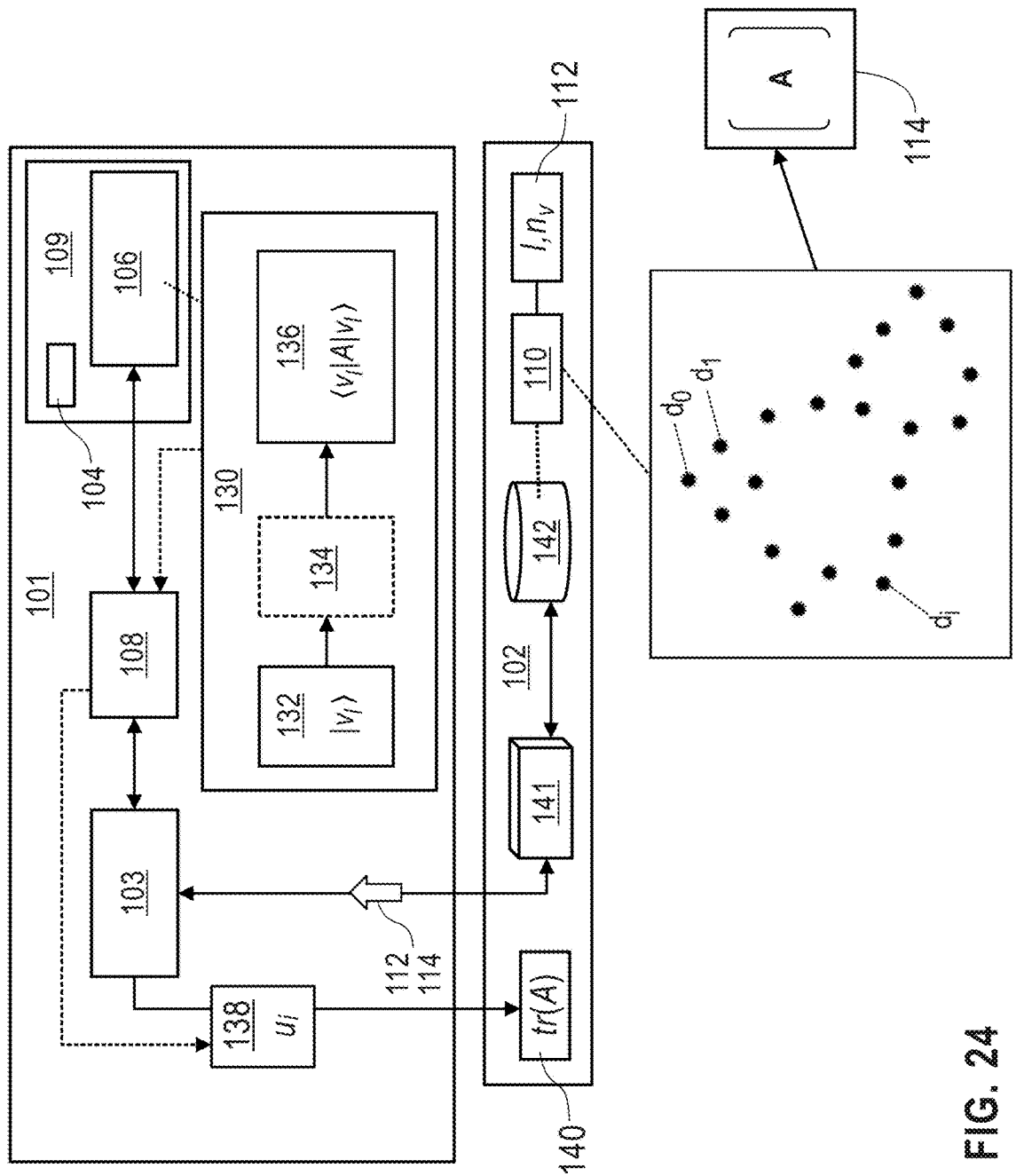
FIG. 24 is a block diagram of an example system for quantum circuits for matrix trace estimation in one embodiment.

FIG. 24 is a block diagram of an example system 175 for a short-depth quantum system for quantum circuits for matrix trace estimation in one embodiment. System 175 can be a hybrid computing system including a combination of one or more quantum computers, quantum systems, and/or classical computers. In an example shown in FIG. 24, system 175 can include same elements as embodiments of quantum systems shown in FIGS. 11 and 19 including: a quantum system 101 and a classical computer 102. In one embodiment, quantum system 101 and classical computer 102 can be configured to be in communication via one or more of wired connections and wireless connections (e.g., a wireless network). Quantum system 101 can include a quantum chipset that includes various hardware components for processing data encoded in qubits. The quantum chipset can be a quantum computing core surrounded by an infrastructure to shield the quantum chipset from sources of electromagnetic noise, mechanical vibration, heat, and other sources of noise, which tend to degrade performance. Classical computer 102 can be electronically integrated, via any suitable wired and/or wireless electronic connection, with quantum system 101.

In the example shown in FIG. 24, quantum system 101 can be any suitable set of components capable of performing quantum operations on a physical system. A quantum operation can be, for example, a quantum gate operation that manipulate qubits to interact with one another in accordance with the quantum gate operation. In the example embodiment depicted in FIG. 1, quantum system 101 can include a controller 103, an interface 108, and quantum hardware 109. In some embodiments, all or part of each of controller 103, interface 108, and quantum hardware 109 can be located in a cryogenic environment to aid in the performance of the quantum operations. Quantum hardware 109 may be any hardware capable of using quantum states to process information. Such hardware may include a plurality of qubits 104, and mechanisms to couple/entangle qubits 104, in order to process information using said quantum states. Qubits 104 may include, but are not limited to, charge qubits, flux qubits, phase qubits, spin qubits, and trapped ion qubits. Quantum hardware 109 can include a set of quantum gates 106 configured to perform quantum logic operations on qubits stored in quantum registers 104. Quantum gates 106 can include one or more single-qubit gates, two-qubit gates, and/or other multi-qubit gates.

Controller 103 can be any combination of digital computing devices capable of performing a quantum computation, such as executing a quantum circuit 106, in combination with interface 108. Such digital computing devices may include digital processors and memory for storing and executing quantum commands using interface 108. Additionally, such digital computing devices may include devices having communication protocols for receiving such commands and sending results of the performed quantum computations to classical computer 102. Additionally, the digital computing devices may include communications interfaces with interface 108. In one embodiment, controller 103 can be configured to receive classical instructions (e.g., from classical computer 102) and convert the classical instructions into commands (e.g., command signals) for interface 108. Command signals being provided by controller 103 to interface 108 can be, for example, digital signals indicating which quantum gates among quantum gates 106 needs to be applied to qubits 104 to perform a specific function (e.g., matrix trace estimation described herein). Interface 108 can be configured to convert these digital signals into analog signals (e.g., analog pulses such as microwave pulses) that can be used for applying quantum gates on qubits 104 to manipulate interactions between qubits 104.

Interface 108 can be a classical-quantum interface including a combination of devices capable of receiving commands from controller 103 and converting the commands into quantum operations for implementing quantum hardware 109. In one embodiment, interface 108 can convert the commands from controller 103 into drive signals that can drive or manipulate qubits 104, and/or apply quantum gates on qubits 104. Additionally, interface 108 can be configured to convert signals received from quantum hardware 109 into digital signals capable of processing and transmitting by controller 103 (e.g., to classical computer 102). Devices included in interface 108 can include, but are not limited to, digital-to-analog converters, analog-to-digital converters, waveform generators, attenuators, amplifiers, optical fibers, lasers, and filters. Interface 108 can further include circuit components configured to measure a basis of the plurality of qubits following the implementation of quantum gates 106, where measurement can yield a classical bit result. For example, a basis of |0⟩ corresponds to classical bit zero, and a basis of |1⟩ corresponds to classical bit one. Each measurement performed by interface 108 can be read out to a device, such as classical computer 102, connected to quantum system 101. A plurality of measurement results provided by interface 108 can result in a probabilistic outcome.

Classical computer 102 can include hardware components such as processors and storage devices (e.g., including memory devices and classical registers) for processing data encoded in classical bits. In one embodiment, classical computer 102 can be configured to control quantum system 101 by providing various control signals, commands, and data encoded in classical bits to quantum system 101. Further, quantum states measured by quantum system 101 can be read by classical computer 102 and classical computer 102 can store the measured quantum states as classical bits in classical registers. In one embodiment of an implementation, classical computer 102 can be any suitable combination of computer-executable hardware and/or computer-executable software capable of executing a preparation module 141 to perform quantum computations with data stored in data store 142 as part of building and implementing a machine learning protocol. Data store 142 may be a repository for data to be analyzed using a quantum computing algorithm, as well as the results of such analysis. Preparation module 141 may be a program or module capable of preparing classical data from data store 142 to be analyzed as part of the implementation of a quantum circuit 106. Preparation module 141 may be instantiated as part of a larger algorithm, such as a function call of an application programming interface (API) or by parsing a hybrid classical-quantum computation into aspects for quantum and classical calculation. As described in more detail below, preparation module 141 may generate instructions for creating a quantum circuit 106 using quantum gates 106. In an embodiment, such instructions may be stored by controller 103, and may instantiate the execution of the components of interface 108 so that the quantum operations of the quantum gates 106 may be executed on quantum hardware 109.

Components of classical computer 102 are described in more detail below with reference to FIG. 35. In an example system, classical computer 102 can be a laptop computer, a desktop computer, a vehicle-integrated computer, a smart mobile device, a tablet device, and/or any other suitable classical computing device. Additionally or alternatively, classical computer 102 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 38 and FIG. 39.

System 175 can be implemented to estimate a trace of any input Hermitian matrix, denoted as A, that has a quantum representation. A Hermitian matrix is a square matrix that is self-adjoint, where self-adjoint means the Hermitian matrix is equal to its own conjugate transpose. For example, in the Hermitian matrix, the element in the i-th row and j-th column is equal to the complex conjugate of the element in the j-th row and i-th column, for all indices i and j. In an aspect, determination of the trace of a relatively large matrix can be challenging if a quantum circuit is given for representing the large matrix but its entries and/or eigenvalues are inaccessible (e.g., entries or eigenvalues being unknown, or are not given). Applications that process such large matrices may implement system 175 for trace estimation without a need to simulate an entire Hermitian matrix.

In an aspect, noisy intermediate-scale quantum (NISQ) processors are quantum processors that include approximately fifty to a few hundred qubits, but might not reach fault-tolerance. NISQ algorithms can be algorithms designed for NISQ processors, and can be hybrid algorithms that use NISQ processors but with reduced calculation load by implementing some parts of the algorithms in classical processors. System 175 described herein is NISQ compatible, and can utilize a relatively short depth quantum circuit to estimate a trace of a Hermitian matrix without its entries and/or eigenvalues being accessible. Hence, fault-tolerance quantum computers may not be required.

The NISQ compatible trace estimation implemented by system 175, as described herein, can be used for various applications that can utilize trace estimation for a Hermitian matrix with a given quantum representation with its entries or eigenvalues being inaccessible. Other applications that may implement system 175 for trace estimation can include, but are not limited to, determination and/or approximation of a rank of the given matrix A (e.g., rank(A)), determination of a log-determinant of the given matrix A (e.g., log-det(A)), determination of Schatten p norms of the given matrix A (e.g., $\|A\|_p$), determination of a trace of a matrix inverse (e.g., trace($A^{-1}$)), determination of Betti numbers of a simplicial complex (e.g., count number of triangles in a graph or simplicial complex), determination of an Estrada index of a graph (e.g., trace(exp(A)) or trace($e^A$)), determination of a Von-Neumann entropy of a matrix trace (e.g., A log(A)), determination of a spectral density of the given matrix A, and/or various other applications that includes trace estimation of a given matrix.

Quantum computing offers the potential of exponential speedups for certain classical computations. In an aspect, quantum machine learning (QML) algorithms have been proposed as candidates for such exponential improvements. One type of data analysis that may benefit from quantum computing is Topological Data Analysis (TDA). In an aspect, TDA can consume massive datasets and reduce them to a handful of global and interpretable signature numbers, laden with predictive and analytical value. One of the possible application of system 175, as mentioned above, is determination of Betti numbers of a simplicial complex. In an aspect, the determination of Betti numbers can be a process in Topological Data Analysis (TDA). TDA can benefit from quantum computing because TDA can consume massive datasets and TDA can include reducing these massive datasets to a handful of global and interpretable signature numbers, laden with predictive and analytical value.

In one embodiment, data store 142 may include a dataset 110 including a plurality of data points, such as n data points ranging from $d_0, \ldots d_{n-1}$. The plurality of data points can be represented by one or more matrices, such as an input matrix 114 (e.g., an n×n matrix) denoted as A. In one embodiment, input matrix A can be a Hermitian matrix. In embodiments where system 175 is being implemented for TDA applications, input matrix A can be a restricted Laplacian of dataset 110 corresponding to simplices of a specific order k (e.g., k-simplices) in a simplicial complex representing a topology of dataset 110. The trace of input matrix A can be used for various applications, such as determination of a k-th Betti number (e.g., a number of k-simplices) of the simplicial complex for TDA applications.

System 175 can be implemented to estimate a trace of input matrix A without its entries and/or eigenvalues being accessible. Classical computer 102 can generate and provide one or more parameters 112 to quantum system 101. In one embodiment, parameters 112 can include $n_v$ n-bit random binary numbers denoted as $n_v$, and a value l, where $l=1, \ldots, n$. Quantum system 101 can use the $n_v$ n-bit random binary numbers to generate a set of random state vectors, denoted as $|v_l\rangle$. In one embodiment, the $n_v$ n-bit binary numbers can be used for generating $n_v$ random Hadamard vectors needed for the trace estimation.

Each one of random state vectors $|v_l\rangle$ can be a superposition of mixed states, which is a superposition of multiple states with different Hamming weights. For example, a random state vector $|v_l\rangle$ corresponding to a vector with four elements can include sixteen states, and these sixteen states can include a mixture of states having a Hamming weight of two (e.g., |0011⟩, |1010⟩, etc.) and three (e.g., |1011⟩, |1101⟩, etc.). The parameter $n_v$ can be an input provided by classical computer 102 to quantum system 101. Further, each one of the random state vectors (e.g., each l-th random state vector $|v_l\rangle$) can include a specific number of independent entries.

Each one of the random state vectors (e.g., each l-th $|v_l\rangle$) can include a specific number, denoted as t, of independent entries such that random state vector $|v_l\rangle$ can be a t-wise independent vector. Random state vector $|v_l\rangle$ being a t-wise independent vector can indicate that that if any t entries are randomly selected from $|v_l\rangle$, then the selected entries are independent from each other. Note that if more than t entries are selected, then the selected entries may not be necessarily independent from each other. In one embodiment, the number t can be four (e.g., t=4) such that each one of the random state vectors (e.g., each l-th $|v_l\rangle$) can be a 4-wise independent vector. Utilization of the random state vector $|v_l\rangle$ with four-wise independent entries may be sufficient to estimate the trace of input matrix A and can avoid a need to simulate a complete Hermitian matrix or sample vectors with random independent and identically distributed entries.

For n=4 (e.g., dataset 110 having four data points), there can be sixteen possible quantum states with equal probability, where the quantum states in $|v_l\rangle$ can be binary (e.g., ranging from |0000⟩ to |1111⟩). If any random four entries are selected, then the selected entries will be one of the sixteen possible states (e.g., |0000⟩ to |1111⟩). In an aspect, if random state vectors $|v_l\rangle$ have at least 4-wise independent entries, an expectation of input matrix A can be equivalent to the trace of A, and a variance of the trace estimation can be relatively low. Further, if system 100 can tolerate an error of up to $\epsilon$, then $$n_v > \frac{1}{\epsilon^2}$$

if random state vectors $|v_l\rangle$ have at least 4-wise independent entries.

Quantum gates 106 can include gates that form one or more quantum circuits 132, 134, 136. Quantum circuit 132 can be configured to generate the random state vectors $|v_l\rangle$. Interface 108 can be configured to control quantum circuits 132, 134, 136 based on a command signal received from controller 103. In one embodiment, interface 108 can control quantum circuits 132, 134, 136 by applying quantum gates (e.g., among quantum gates 106) being used for forming quantum circuits 132, 134, 136 on qubits 104. In one embodiment, quantum circuit 132 can sample random state vectors $|v_l\rangle$ from a $2^n \times 2^n$ Hadamard matrix. For example, a set of n qubits, with initial state |0⟩, among qubit register 104 can be assigned to hold or represent elements of a vector with n elements. Quantum circuit 132 can randomly invert or flip the n qubits (e.g., by applying NOT gates), and apply Hadamard gates to all n qubits to produce a state vector corresponding to a random column of the $2^n \times 2^n$ Hadamard matrix. The produced state vector can be assigned as the l-th random state vector $|v_l\rangle$.

In another embodiment, quantum circuit 132 can be a quantum t-design circuit configured to generate random state vectors $|v_l\rangle$ by generating pseudo-random states. In an aspect, a quantum t-design is a probability distribution over quantum states which cannot be distinguished from the uniform probability distribution over all quantum states (e.g., the Haar measure) if t copies of a state are given from this probability distribution. Quantum circuit 132, when implemented as a quantum t-design circuit, can output a state (e.g., pseudo-random state) that is indistinguishable from states drawn from a random Haar measure. In an aspect, quantum t-design circuits can be considered as being equivalent to t-wise independent vectors in the classical computing.

In one embodiment, quantum circuit 134 can be an application specific quantum circuit that can be inserted between quantum circuits 132, 136. For example, if system 175 is being implemented for Betti number determination in TDA applications, quantum circuit 134 can be inserted for generating a Laplacian $\Delta_k$ based on random state vectors $|v_l\rangle$, and the Laplacian $\Delta_k$ can be assigned as the input matrix 114 (e.g., $A = \Delta_k$).

Quantum circuit 136 can be configured to determine moments $\mu_l$ of input matrix 114 (e.g., input matrix A) using the following representations:

$$\mu_l = \langle v_l | A | v_l \rangle = \langle v_l | \phi_l \rangle$$

where $|\phi_l\rangle$ is a quantum state that represents an application of matrix A to $|v_l\rangle$ (e.g., $|\phi_l\rangle = A|v_l\rangle$), and $\langle v_l|$ denotes the inverse or the complex conjugate of the random state vector $|v_l\rangle$. In one embodiment, quantum circuit 136 can be implemented to determine the quantum state $|\phi_l\rangle$ and the complex conjugate $\langle v_l|$, then determine an inner product $\langle v_l | \phi_l \rangle$ of the quantum state and the complex conjugate to determine the moments $\mu_l$.

In embodiments where system 175 is being implemented for TDA and input matrix A is a Laplacian $\Delta_k$, quantum circuit 136 can be configured to determine the moments $\mu_l$ of $\Delta_k$ using the following representations:

$$\mu_l = \langle v_l | \Delta_k | v_l \rangle = \langle \phi_l | \phi_l \rangle = \||\phi_l\rangle\|^2$$

where $|\phi_l\rangle$ is a quantum state that represents an application of the Laplacian $\Delta_k$ to $|v_l\rangle$ (e.g., $|\phi_l\rangle = \Delta_k|v_l\rangle$), $\langle \phi_l|$ denotes the inverse or the complex conjugate of the quantum state $|\phi_l\rangle$, and $\||\phi_l\rangle\|^2$ denotes the norm of the quantum state $|\phi_l\rangle$. In one embodiment, quantum circuit 136 can be implemented to determine the quantum state $|\phi_l\rangle$ and the complex conjugate $\langle \phi_l|$, then determine an inner product $\langle \phi_l | \phi_l \rangle$ of the quantum state and the complex conjugate to determine the moments $\mu_l$. In another embodiment, quantum circuit 136 can be implemented to determine the quantum state $|\phi_l\rangle$ and the norm $\||\phi_l\rangle\|^2$ of the quantum state to determine the moments $\mu_l$. Since the state vector is of exponential size $2^n$, a repeated counting technique may be implemented to estimate the norm $\||\phi_l\rangle\|^2$.

Interface 108 can estimate or measure outputs of quantum circuit 136, and the measured outputs can be the moments 138 denoted as $\mu_l$. Quantum system 101 can send the moments 138 to classical computer 102. Classical computer 102 can average the moments 138 over the $n_v$ samples to estimate a trace 140 of input matrix A. For example, a trace of input matrix A can be estimated by averaging moments of input matrix A over the $n_v$ samples:

$$\text{trace}(A) \approx \frac{1}{n_v}\sum_{l=1}^{n_v} \langle v_l|A|v_l\rangle$$

Figure 25:
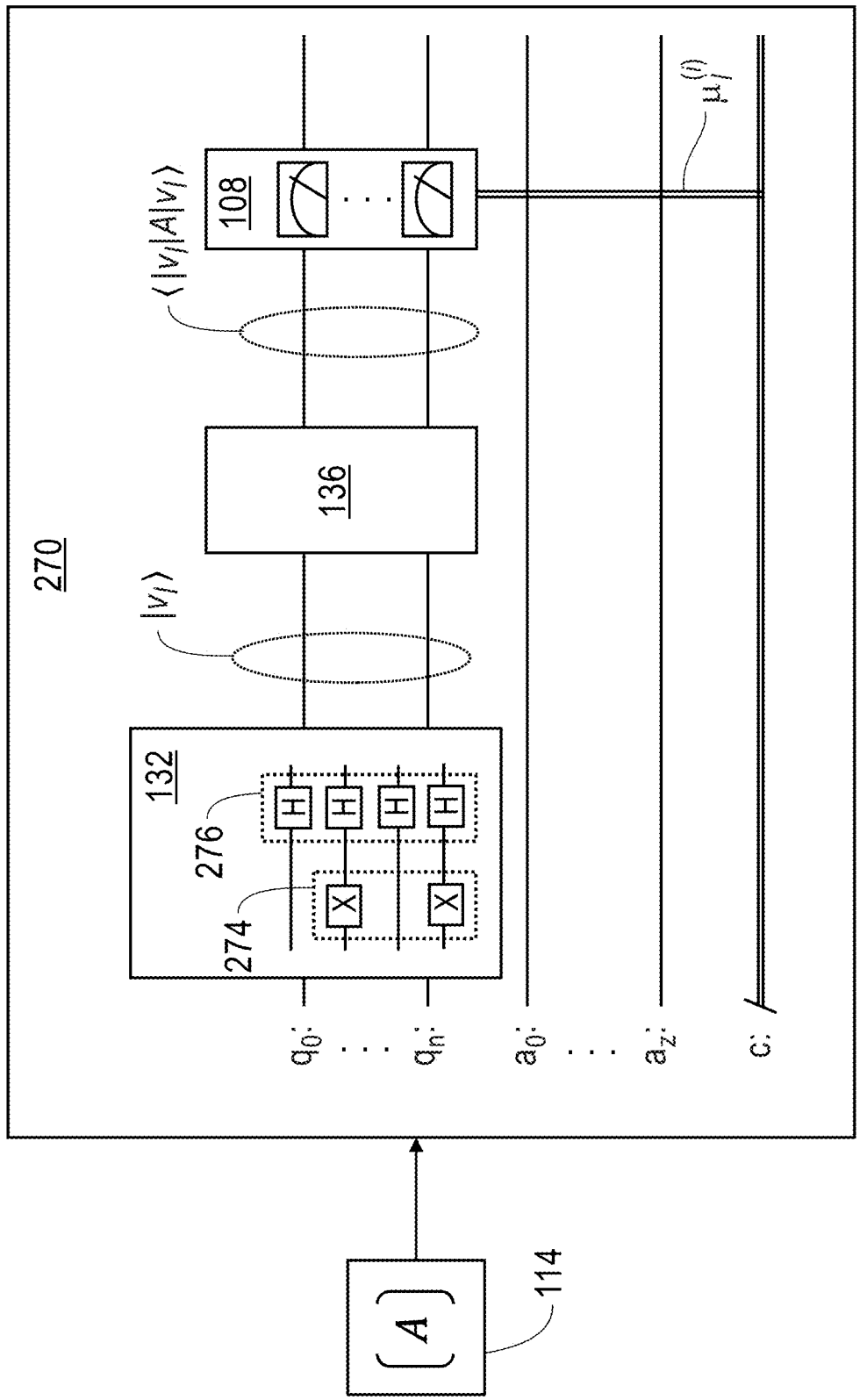
FIG. 25 is a diagram illustrating an example quantum circuit that can be implemented as quantum circuits for matrix trace estimation in one embodiment.

FIG. 25 is a diagram illustrating an example quantum circuit 270 that can be implemented as quantum circuits for matrix trace estimation in one embodiment. Quantum circuit 270 can be formed by at least quantum circuits 132, 136 and interface 108 as shown in FIG. 24. In one embodiment, quantum circuit 270 can receive input matrix 114 from classical system 101 (see FIG. 24). In embodiments where quantum circuit 270 is implemented f or TDA applications, quantum circuit 134 (see FIG. 1) can be inserted between quantum circuits 132, 136 for generating the Laplacian $\Delta_k$ of dataset 110 instead of using input matrix A as input matrix 114. Quantum circuit 270 can operate on n qubits (e.g., $q_0, \ldots q_n$) and/or z ancilla qubits (e.g., $a_0, \ldots a_z$). Quantum circuit 270 can be implemented to estimate a trace of input matrix A. Quantum circuit 132 can be a relatively short-depth circuit configured to generate random state vectors $|v_l\rangle$ by sampling random state vectors $|v_l\rangle$ from a $2^n \times 2^n$ Hadamard matrix. The n qubits can be initialized to state $|0\rangle$, and can be assigned to hold or represent elements of a vector with n elements. Quantum circuit 132 can randomly invert or flip the n qubits using a set of quantum NOT gates 274. One or more qubits among the n qubits can be randomly selected (e.g., by classical system 101) to be inverted, and one or more NOT gates among the set of NOT gates 274 can be used for inverting the randomly selected qubits. Quantum circuit 132 can further apply a set of Hadamard gates 276 to all n qubits, including the inverted qubits, to produce random state vectors $|v_l\rangle$. The produced $|v_l\rangle$ can correspond to a random column of a $2^n \times 2^n$ Hadamard matrix, and can be assigned as the l-th random state vector $|v_l\rangle$. When the random state vector $|v_l\rangle = |h_{c(l)}\rangle$ is some random Hadamard column with c(l) defining the random index, then the estimate $\langle h_{c(l)}|A|h_{c(l)}\rangle$ can be viewed as a uniform random sample of the transformed matrix $M = HAH^T$ with the Hadamard matrix H, i.e., $\langle h_{c(l)}|A|h_{c(l)}\rangle = \langle e_{c(l)}|M|e_{c(l)}\rangle$, where $|e_l\rangle$ are basis vectors.

Figure 26:
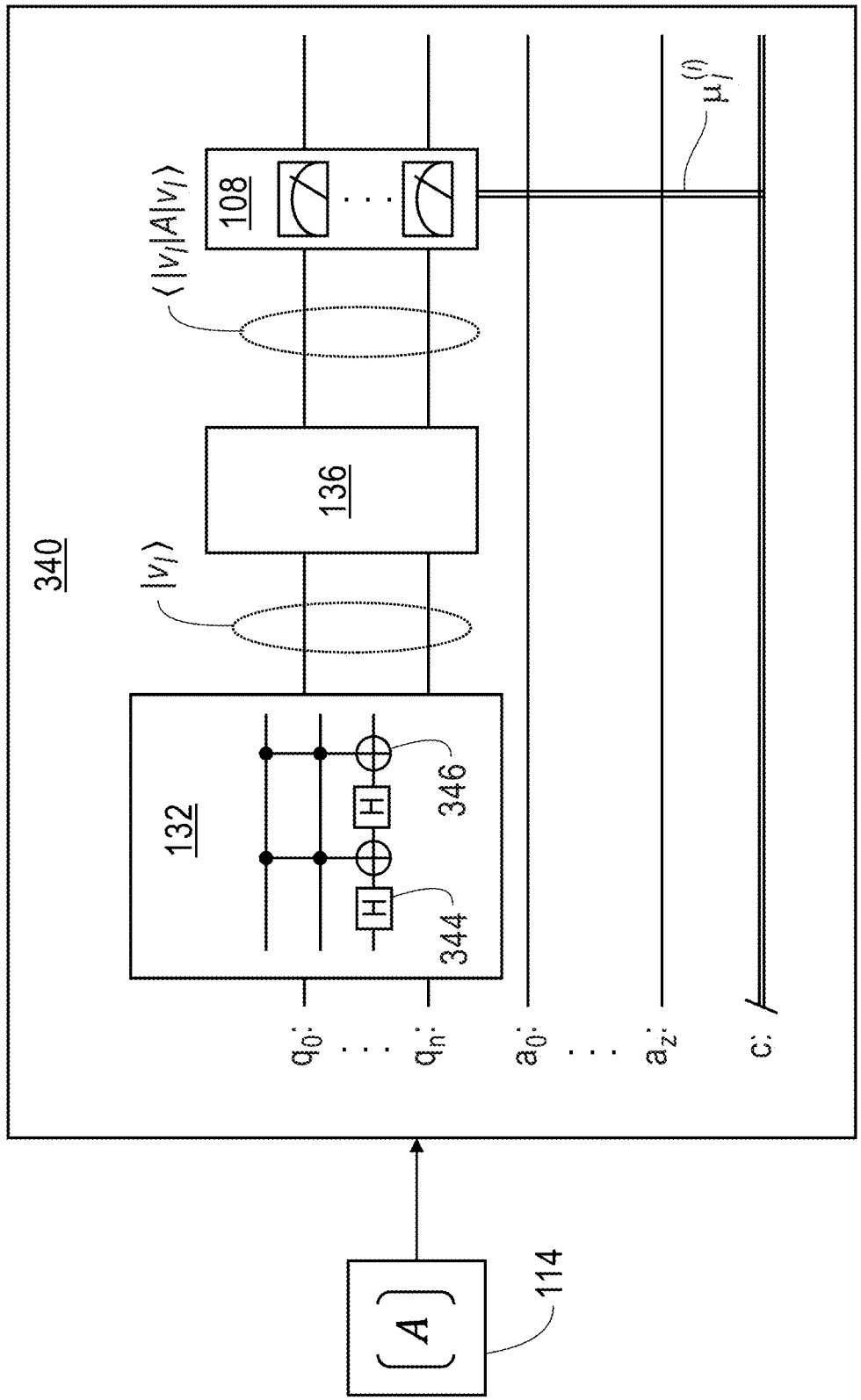
FIG. 26 is a diagram illustrating another example quantum circuit that can be implemented as quantum circuits for matrix trace estimation in one embodiment.

FIG. 26 is a diagram illustrating another example quantum circuit 340 that can be implemented as quantum circuits for matrix trace estimation in one embodiment. Quantum circuit 340 can be formed by quantum circuits 132, 136 and interface 108 as shown in FIG. 24. In one embodiment, quantum circuit 340 can receive input matrix 114 from classical system 101 (see FIG. 24). In embodiments where quantum circuit 340 is implemented for TDA applications, quantum circuit 134 (see FIG. 24) can be inserted between quantum circuits 132, 136 for generating the Laplacian $\Delta_k$ of dataset 110 instead of using input matrix A as input matrix 114. Quantum circuit 340 can operate on n qubits (e.g., $q_0, \ldots q_n$) and/or z ancilla qubits (e.g., $a_0, \ldots a_z$). Quantum circuit 340 can be implemented to estimate a trace of input matrix A. In the example shown in FIG. 26, quantum circuit 132 can be a quantum t-design circuit configured to generate random state vectors $|v_l\rangle$ by generating pseudo-random states. Quantum circuit 132, when implemented as a quantum t-design circuit, can include a set of Hadamard gates 304 and a set of Toffoli gates 306. The Hadamard gates 304 and the Toffoli gates 306 can form a set of Hadamard-Toffoli (HT) circuits that can output states that are indistinguishable from states drawn from a random Haar measure. An HT circuit can be a quantum circuit including a parallel layer of Hadamard gates followed by a circuit of Toffoli gates.

Figure 27:
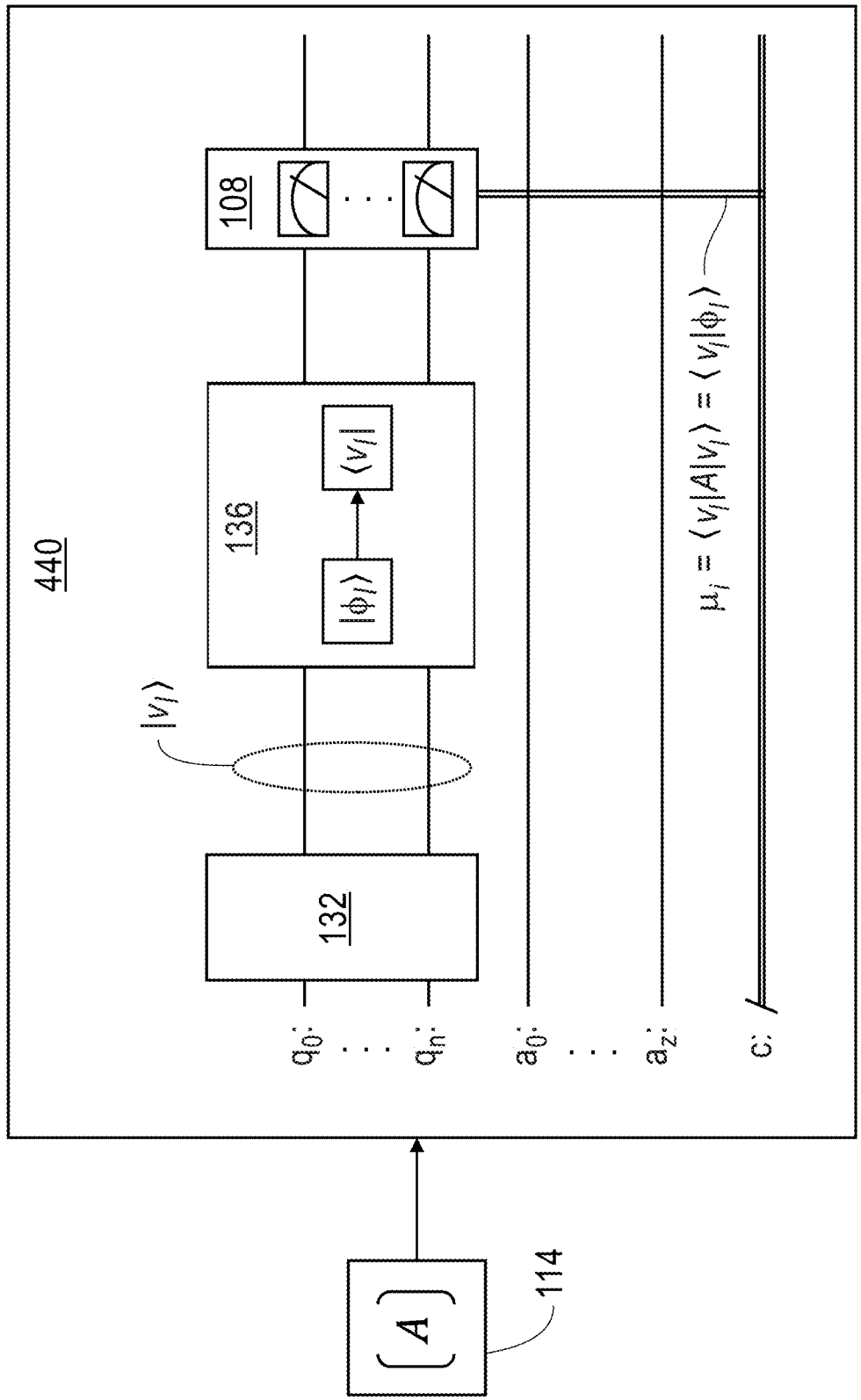
FIG. 27 is a diagram illustrating another example quantum circuit that can be implemented as quantum circuits for matrix trace estimation in one embodiment.

FIG. 27 is a diagram illustrating another example quantum circuit 440 that can be implemented as quantum circuits for matrix trace estimation in one embodiment. Quantum circuit 440 can be formed by quantum circuits 132, 136 and interface 108 as shown in FIG. 24. In one embodiment, quantum circuit 440 can receive input matrix 114 from classical system 101 (see FIG. 24). In embodiments where quantum circuit 440 is implemented for TDA applications, quantum circuit 134 (see FIG. 24) can be inserted between quantum circuits 132, 136 for generating the Laplacian $\Delta_k$ of dataset 110 instead of using input matrix A as input matrix 114. Quantum circuit 440 can operate on n qubits (e.g., $q_0, \ldots q_n$) and/or z ancilla qubits (e.g., $a_0, \ldots a_z$). Quantum circuit 440 can be implemented to estimate a trace of input matrix A. In the example shown in FIG. 27, quantum circuit 136 can be configured to determine the quantum state $|\phi_l\rangle = A|v_l\rangle$ and the inverse or conjugate transpose $\langle v_l|$. In one embodiment, the conjugate transpose can be obtained by using an inverse of quantum circuit 136. Interface 108 can measure outputs from quantum circuit 136 to determine an inner product $\langle v_l|\phi_l\rangle$, which can be an estimation of the moments $u_l$.

Figure 28:
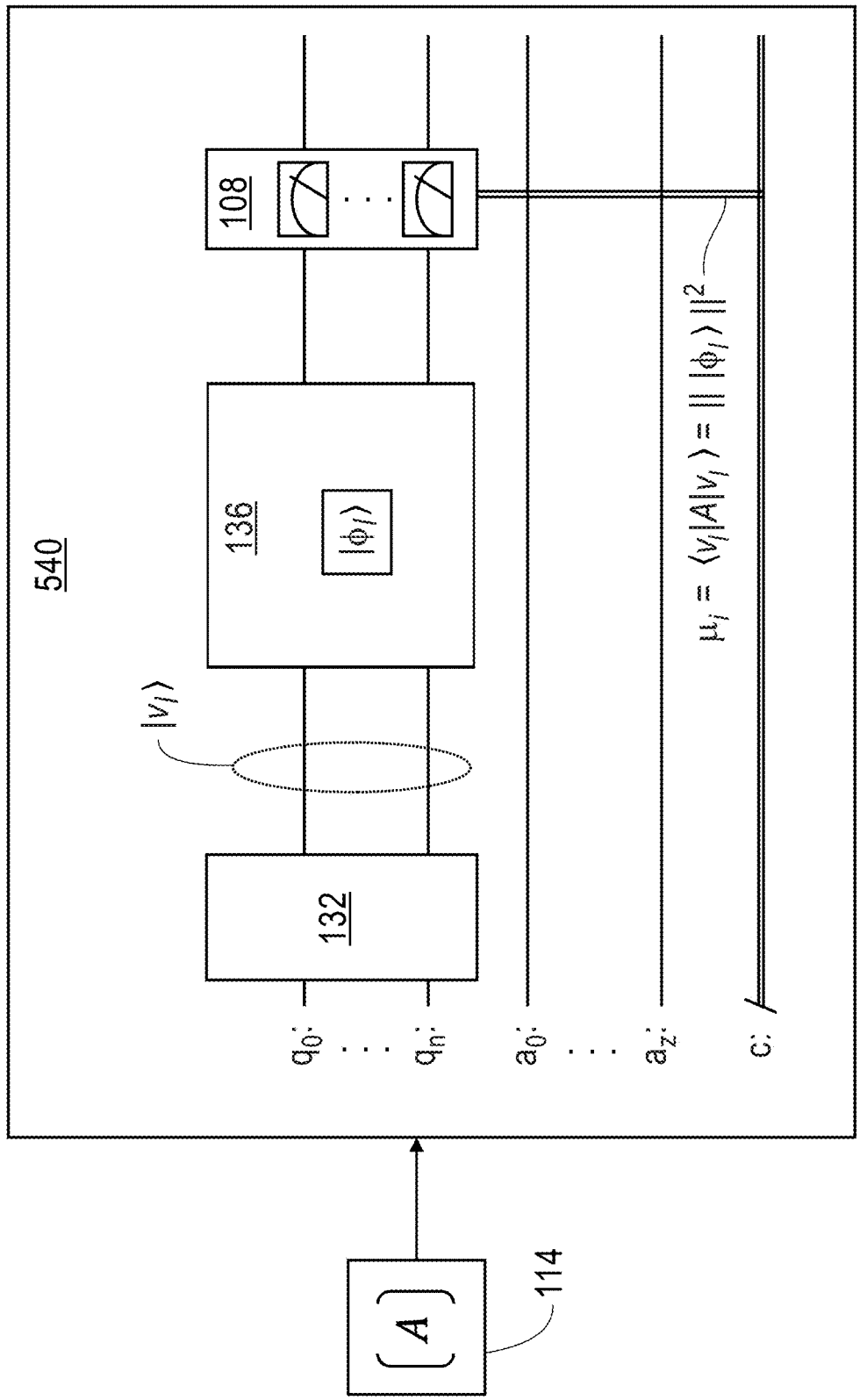
FIG. 28 is a diagram illustrating another example quantum circuit that can be implemented as quantum circuits for matrix trace estimation in one embodiment.

FIG. 28 is a diagram illustrating another example quantum circuit 540 that can be implemented as quantum circuits for matrix trace estimation in one embodiment. Quantum circuit 540 can be formed by quantum circuits 132, 136 and interface 108 as shown in FIG. 24. In one embodiment, quantum circuit 540 can receive input matrix 114 from classical system 101 (see FIG. 24). Quantum circuit 540 can be implemented for TDA applications, and quantum circuit 134 (see FIG. 24) can be inserted between quantum circuits 132, 136 for generating the Laplacian $\Delta_k$ of dataset 110 instead of using input matrix A as input matrix 114. Quantum circuit 540 can operate on n qubits (e.g., $q_0, \ldots q_n$) and/or z ancilla qubits (e.g., $a_0, \ldots a_z$). Quantum circuit 540 can be implemented to estimate a trace of the Laplacian $\Delta_k$. In the example shown in FIG. 28, quantum circuit 136 can be configured to determine the quantum state $|\phi_l\rangle$. Interface 108 can measure outputs (e.g., measure the norm $\||\phi_l\rangle\|^2$) from quantum circuit 136 to estimate the moments $u_l$, where the norm $\||\phi_l\rangle\|^2$ can be proportional to a square of the count register value c (e.g., probability of measuring a zero).

The circuit and computational complexities of the quantum circuits discussed herein can be NISQ implementable if there is efficient implementation of input matrix A. Further, sampling random state vectors with, for example, 4-wise independent entries, leads to utilization of log depth (relatively shorter) quantum circuits.

Figure 29:
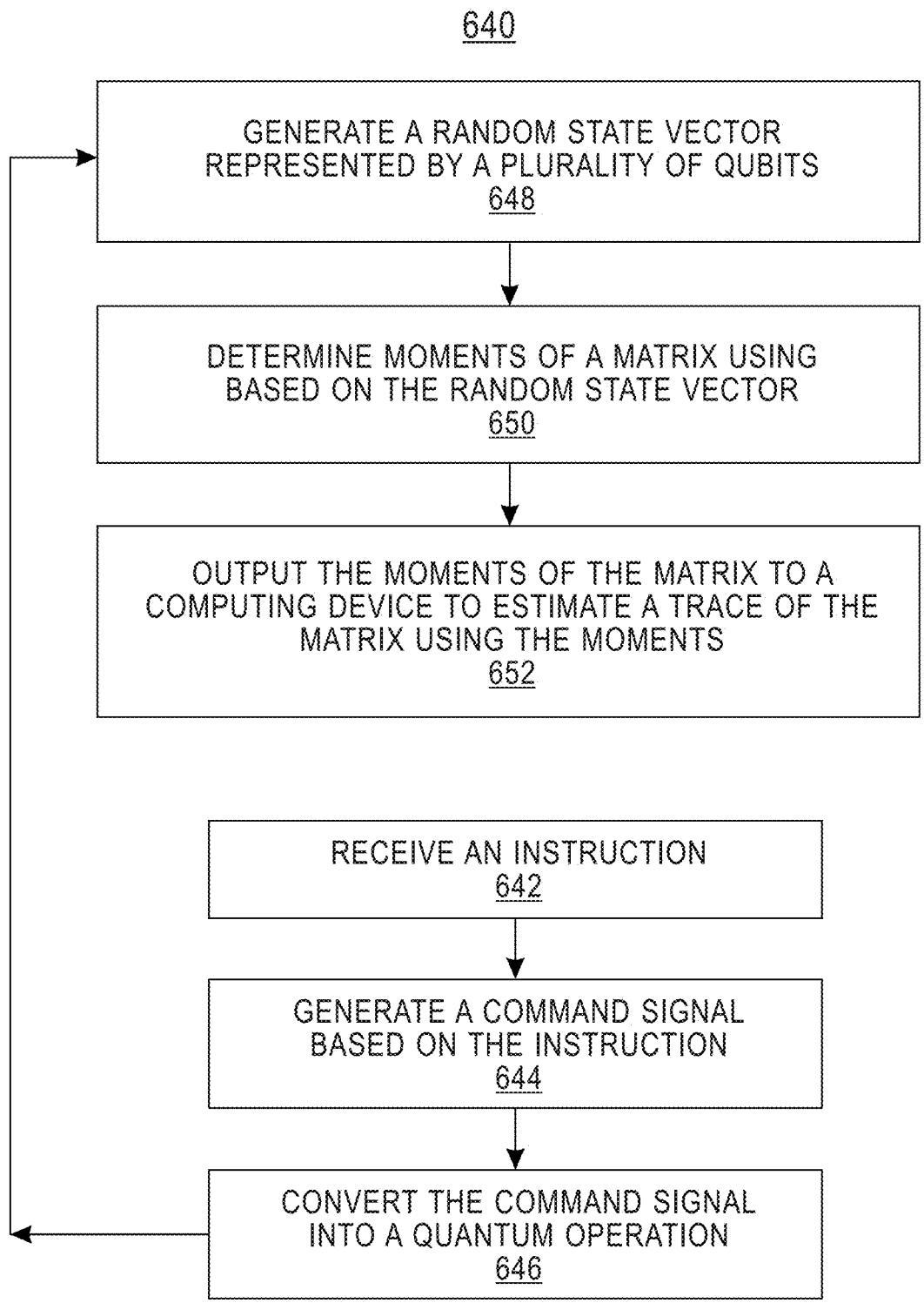
FIG. 29 is a flowchart of an example process that may implement quantum circuits for matrix trace estimation according to an embodiment of the disclosure.

FIG. 29 is a flowchart of an example process 640 that may implement quantum circuits for matrix trace estimation according to an embodiment of the disclosure. Example process 640 may include one or more operations, actions, or functions as illustrated by one or more of blocks 642, 644, 646, 648, 650 and/or 652. Although illustrated as discrete blocks, various blocks can be divided into additional blocks, combined into fewer blocks, eliminated, performed in different order, or performed in parallel, depending on the desired implementation.

Process 640 can be implemented for operating a quantum system to estimate a trace of a matrix. Process 640 can begin at block 642. At block 642, a controller of a quantum system can receive an instruction. Process 640 can proceed from block 642 to block 644. At block 644, the controller of the quantum system can generate a command signal based on the instruction. Process 640 can proceed from block 644 to block 646. At block 646, an interface of the quantum system can convert the command signal into a quantum operation. Process 640 can proceed from block 646 to block 648. At block 648, an interface of the quantum system can control quantum hardware of the quantum system to generate a random state vector represented by a plurality of qubits. The random state vector can include a specific number of independent entries. In one embodiment, the specific number of independent entries can be four entries. In one embodiment, the matrix can be a Hermitian matrix. Process 640 can proceed from block 648 to block 650. At block 650, an interface of the quantum system can determine moments of a matrix using based on the random state vector.

Process 640 can proceed from block 650 to block 652. At block 652, the controller of the quantum system can output the moments of the matrix to a computing device to estimate a trace of the matrix using the moments. In one embodiment, the matrix can correspond to a Laplacian of simplices of a specific order in a simplicial complex and a determination of Betti numbers of the simplicial complex can be based on the estimated trace. In one embodiment, the estimation of the trace can include determining an average of the moments over a number of samples used for the generation of the random state vector.

As discussed in the commonly-owned U.S. patent application Ser. No. 17/863,554 entitled QUANTUM CIRCUIT FOR ESTIMATING SPECTRAL SUMS, the whole contents and disclosure of which is incorporated by reference as if fully set forth herein, there is provided an apparatus and system and methods for estimate a trace of a function of a matrix using relatively short-depth quantum circuits for facilitating quantum topological data analysis.

The apparatus can include a set of quantum registers configured to store a plurality of qubits. The apparatus can further include a quantum circuit configured to determine a plurality of moments of a matrix using a random state vector represented by the plurality of qubits. The apparatus can further include a measurement interface configured to measure a plurality of moments of the matrix. The measurement interface can be further configured to output the plurality of moments of the matrix to a processor to estimate a trace of a matrix function. The matrix function can be a function of the matrix.

In an embodiment, the system can include a first computing device configured to process data encoded in binary data. The system can further include a second computing device configured to be in communication with the first computing device. The second computing device can be configured to process data encoded in qubits. The second computer device can include at least a quantum circuit. The second computing device can be configured to determine a plurality of moments of a matrix using a random state vector represented by a plurality of qubits. The second computing device is configured to measure a plurality of moments of the matrix. The second computing device is further configured to send the plurality of moments of the matrix to the first computing device. The first computing device can be configured to determine a set of polynomials using the plurality of moments of the matrix. The set of polynomials can approximate a matrix function. The first computing device can estimate a trace of the matrix function using the set of polynomials.

There is further provided a method for operating a quantum circuit to estimate a trace of a matrix function. The method can include operating a quantum circuit to generate a random state vector represented by a plurality of qubits. The method can further include measuring the plurality of qubits to determine a plurality of moments of a matrix using the random state vector. The method can further include sending the plurality of moments of the matrix to a processor to estimate a trace of a matrix function. The matrix function can be a function of the matrix.

Figure 30:
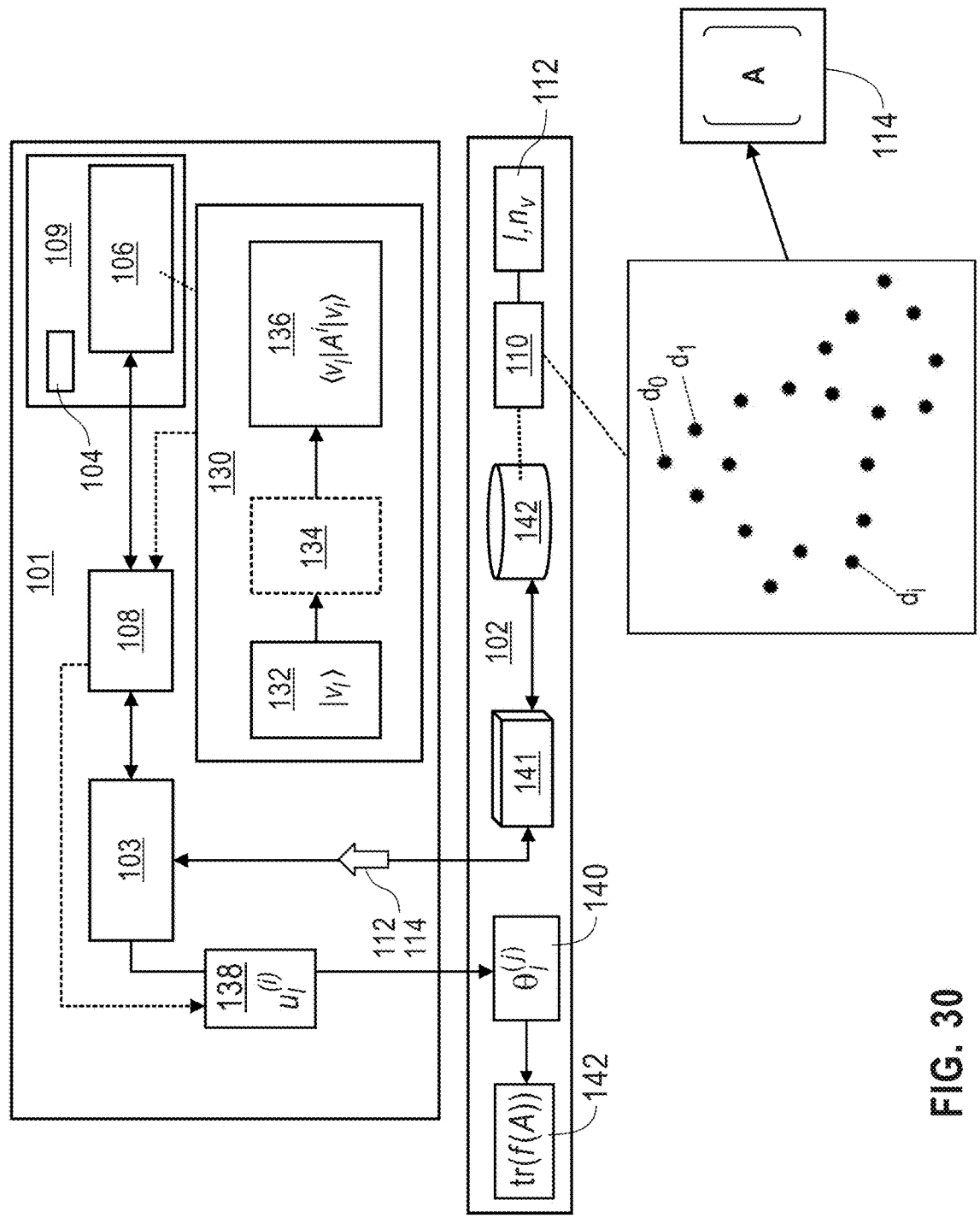
FIG. 30 is a block diagram of an example system for a quantum circuit for estimating matrix spectral sums in one embodiment.

FIG. 30 is a further block diagram of an example system 190 for a quantum circuit for estimating matrix spectral sums in one embodiment. System 190 can be a hybrid computing system including a combination of one or more quantum computers, quantum systems, and/or classical computers. In an example shown in FIG. 30, system 190 can include a quantum system 101 and a classical computer 102 as in prior embodiments. The quantum system 101 and classical computer 102 can be configured to be in communication via one or more of wired connections and wireless connections (e.g., a wireless network). Quantum computer 101 can include a quantum chipset that includes various hardware components for processing data encoded in qubits. The quantum chipset can be a quantum computing core surrounded by an infrastructure to shield the quantum chipset from sources of electromagnetic noise, mechanical vibration, heat, and other sources of noise, which tend to degrade performance. Classical computer 102 can be electronically integrated, via any suitable wired and/or wireless electronic connection, with quantum system 101.

The example shown in FIG. 30, quantum system 101 can be any suitable set of components capable of performing quantum operations on a physical system. A quantum operation can be, for example, a quantum gate operation that manipulate qubits to interact with one another in accordance with the quantum gate operation. In the example embodiment depicted in FIG. 30, quantum system 101 can include a controller 103, an interface 108, and quantum hardware 109. In some embodiments, all or part of each of controller 103, interface 108, and quantum hardware 109 can be located in a cryogenic environment to aid in the performance of the quantum operations. Quantum hardware 109 may be any hardware capable of using quantum states to process information. Such hardware may include a plurality of qubits 104, and mechanisms to couple/entangle qubits 104, in order to process information using said quantum states. Qubits 104 may include, but are not limited to, charge qubits, flux qubits, phase qubits, spin qubits, and trapped ion qubits. Quantum hardware 109 can include a set of quantum gates 106 configured to perform quantum logic operations on qubits stored in quantum registers 104. Quantum gates 106 can include one or more single-qubit gates, two-qubit gates, and/or other multi-qubit gates.

Controller 103 can be any combination of digital computing devices capable of performing a quantum computation, such as executing a quantum circuit 106, in combination with interface 108. Such digital computing devices may include digital processors and memory for storing and executing quantum commands using interface 108. Additionally, such digital computing devices may include devices having communication protocols for receiving such commands and sending results of the performed quantum computations to classical computer 102. Additionally, the digital computing devices may include communications interfaces with interface 108. In one embodiment, controller 103 can be configured to receive classical instructions (e.g., from classical computer 102) and convert the classical instructions into commands (e.g., command signals) for interface 108. Command signals being provided by controller 103 to interface 108 can be, for example, digital signals indicating which quantum gates among quantum gates 106 needs to be applied to qubits 104 to perform a specific function (e.g., matrix function trace estimation described herein). Interface 108 can be configured to convert these digital signals into analog signals (e.g., analog pulses such as microwave pulses) that can be used for applying quantum gates on qubits 104 to manipulate interactions between qubits 104.

Interface 108 can be a classical-quantum interface including a combination of devices capable of receiving commands from controller 103 and converting the commands into quantum operations for implementing quantum hardware 109. In one embodiment, interface 108 can convert the commands from controller 103 into drive signals that can drive or manipulate qubits 104, and/or apply quantum gates on qubits 104. Additionally, interface 108 can be configured to convert signals received from quantum hardware 109 into digital signals capable of processing and transmitting by controller 103 (e.g., to classical computer 102). Devices included in interface 108 can include, but are not limited to, digital-to-analog converters, analog-to-digital converters, waveform generators, attenuators, amplifiers, optical fibers, lasers, and filters. Interface 108 can further include circuit components configured to measure a basis of the plurality of qubits following the implementation of quantum gates 106, where measurement can yield a classical bit result. For example, a basis of |0⟩ corresponds to classical bit zero, and a basis of |1⟩ corresponds to classical bit one. Each measurement performed by interface 108 can be read out to a device, such as classical computer 102, connected to quantum system 101. A plurality of measurement results provided by interface 108 can result in a probabilistic outcome.

Interface 108 can include circuit components configured to measure a basis of a plurality of qubits being processed by quantum gates 106, where the basis is a measurement that will yield a classical bit result. For example, a basis of |0⟩ corresponds to classical bit zero, and a basis of |1⟩ corresponds to classical bit one. Measurements performed by measurement interface 106 can be probabilistic, and can be read out to a device, such as classical computer 102, connected to quantum system 101.

Classical computer 102 can include hardware components such as processors and storage devices (e.g., including memory devices and classical registers) for processing data encoded in classical bits. In one embodiment, classical computer 102 can be configured to control quantum system 101 by providing various control signals, commands, and data encoded in classical bits to quantum system 101. Further, quantum states measured by quantum system 101 can be read by classical computer 102 and classical computer 102 can store the measured quantum states as classical bits in classical registers. In one embodiment of an implementation, classical computer 102 can be any suitable combination of computer-executable hardware and/or computer-executable software capable of executing a preparation module 141 to perform quantum computations with data stored in data store 142 as part of building and implementing a machine learning protocol. Data store 142 may be a repository for data to be analyzed using a quantum computing algorithm, as well as the results of such analysis.

Preparation module 141 may be a program or module capable of preparing classical data from data store 142 to be analyzed as part of the implementation of a quantum circuit 106. Preparation module 141 may be instantiated as part of a larger algorithm, such as a function call of an application programming interface (API) or by parsing a hybrid classical-quantum computation into aspects for quantum and classical calculation. As described in more detail below, preparation module 141 may generate instructions for creating a quantum circuit 106 using quantum gates 106. In an embodiment, such instructions may be stored by controller 103, and may instantiate the execution of the components of interface 108 so that the quantum operations of the quantum gates 106 may be executed on quantum hardware 109.

Components of classical computer 102 are described in more detail below with reference to FIG. 35. In an example system, classical computer 102 can be a laptop computer, a desktop computer, a vehicle-integrated computer, a smart mobile device, a tablet device, and/or any other suitable classical computing device. Additionally or alternatively, classical computer 102 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 38 and FIG. 39.

System 190 can be implemented to estimate a trace of a matrix function, or a function of a matrix. In an aspect, the trace of the matrix function can be referred to as a spectral sum. A matrix function can be a matrix f(A) resulting from an application of a function f( ) on a matrix A. In one embodiment, the matrix A can be a Hermitian matrix that has a quantum representation. A Hermitian matrix is a square matrix that is self-adjoint, where self-adjoint means the Hermitian matrix is equal to its own conjugate transpose. For example, in the Hermitian matrix, the element in the i-th row and j-th column is equal to the complex conjugate of the element in the j-th row and i-th column, for all indices i and j. In an aspect, determination of the trace of a matrix function can be challenging if eigenvalues and/or specific entries of the matrix function are unavailable or inaccessible. For example, simulation of the Hermitian matrix A to determine the eigenvalues and/or entries may consume significant time and processing power. To mitigate consuming excessive time and processing power to determine the eigenvalues and/or entries, system 190 can be implemented to estimate the trace of matrix function f(A) without the eigenvalues and entries of the matrix function being available.

In an aspect, noisy intermediate-scale quantum (NISQ) processors are quantum processors that include approximately fifty to a few hundred qubits, but might not reach fault-tolerance. NISQ algorithms can be algorithms designed for NISQ processors, and can be hybrid algorithms that use NISQ processors but with reduced calculation load by implementing some parts of the algorithms in classical processors. System 190 described herein is NISQ compatible, and can utilize a relatively short depth quantum circuit to estimate a trace of a matrix function without its entries and/or eigenvalues being accessible. Hence, fault-tolerance quantum computers need not be required.

The NISQ compatible matrix function trace (or spectral sum) estimation implemented by system 190, as described herein, can be used for various applications that can utilize matrix function trace estimation with entries and/or eigenvalues of an input matrix being inaccessible. Other applications that may implement system 190 for matrix function trace estimation can include, but are not limited to, determination of the log-determinant of a Hermitian matrix (e.g., f(A)=log−det(A)), determination of Schatten p norms of any matrix (e.g., f(A)=$\|A\|_p$), determination of a trace of matrix inverse (f(A)=$A^{-1}$), count number of triangles in a graph (e.g., f(A)=A^3), computation of the Estrada index of a graph (e.g., f(A)=exp(A) or ($e^A$)), computation of the Von-Neumann entropy of a matrix (e.g., f(A)=A log(A)), determination of the spectral density of a matrix (e.g., f(A)=δ(A), where δ can denote impulse function).

Quantum computing offers the potential of exponential speedups for certain classical computations. In an aspect, quantum machine learning (QML) algorithms can be candidates for such exponential improvements. One type of data analysis that may benefit from quantum computing is Topological Data Analysis (TDA). In an aspect, TDA can consume massive datasets and reduce them to a handful of global and interpretable signature numbers, laden with predictive and analytical value. One of the possible applications of system 190, as mentioned above, is determination of Betti numbers of a simplicial complex. In an aspect, the determination of Betti numbers can be a process in Topological Data Analysis (TDA). TDA can benefit from quantum computing because TDA can consume massive datasets and TDA can include reducing these massive datasets to a handful of global and interpretable signature numbers, laden with predictive and analytical value.

In one embodiment, data store 142 can include a dataset 110 including a plurality of data points, such as n data points ranging from $d_0, \ldots d_{n-1}$. The plurality of data points can be represented by one or more matrices, such as an input matrix 114 (e.g., an n×n matrix) denoted as A. In embodiments where system 190 is being implemented for TDA applications, input matrix A can be a restricted Laplacian $\Delta_k$ of dataset 110 corresponding to simplices of a specific order k (e.g., k-simplices) in a simplicial complex representing a topology of dataset 110. The trace of a matrix function f($\Delta_k$), for TDA applications where $\Delta_k$ is input matrix A, can be used for determination of a k-th Betti number (e.g., a number of k-simplices) of the simplicial complex. For example, a k-th Betti number can be based on a rank of $\Delta_k$ (e.g., rank ($\Delta_k$)), and rank($\Delta_k$)=trace(h($\Delta_k$)), where h( ) is a step function.

System 190 can be implemented to estimate a trace of a matrix function of a matrix A where entries and/or eigenvalues of matrix A may be unavailable. Classical computer 102 can generate and provide one or more parameters 112 to quantum system 101. In one embodiment, parameters 112 can include $n_v$, n-bit random binary numbers denoted as $n_v$, and a value l, where l=1, ..., $n_v$. Quantum system 101 can use the $n_v$ n-bit random binary numbers to generate a set of random state vectors, denoted as $|v_l\rangle$. In one embodiment, the $n_v$ n-bit binary numbers can be based on a number of random Hadamard vectors needed for the trace estimation.

Each one of random state vectors $|v_l\rangle$ can be a superposition of mixed states, which is a superposition of multiple states with different Hamming weights. For example, a random state vector $|v_l\rangle$ corresponding to a vector with four elements can include sixteen states, and these sixteen states can include a mixture of states having a Hamming weight of two (e.g., |0011⟩, |1010⟩, etc.) and three (e.g., |1011⟩, |1101⟩, etc.). The parameter $n_v$ can be an input provided by classical computer 102 to quantum system 101. Further, each one of the random state vectors (e.g., each l-th random state vector $|v_l\rangle$) can include a specific number, denoted as t, of independent entries such that random state vector $|v_l\rangle$ can be a t-wise independent vector. Random state vector $|v_l\rangle$ being a t-wise independent vector can indicate that that if any t entries are randomly selected from $|v_l\rangle$, then the selected entries are independent from each other. Note that if more than t entries are selected, then the selected entries may not be necessarily independent from each other. In one embodiment, each one of the random state vectors (e.g., each l-th $|v_l\rangle$) can be a 4-wise independent vector, each random state vector $|v_l\rangle$ includes four independent entries. Utilization of the random state vector $|v_l\rangle$ with four-wise independent entries may be sufficient to estimate the trace of f(A) and can avoid a need to simulate a complete Hermitian matrix or sample vectors with random independent and identically distributed entries.

Quantum gates 106 can include gates that form one or more quantum circuits 132, 134, 136. Interface 108 can be configured to control quantum circuits 132, 134, 136 based on a command signal received from controller 103. In one embodiment, interface 108 can control quantum circuits 132, 134, 136 by applying quantum gates (e.g., among quantum gates 106) being used for forming quantum circuits 132, 134, 136 on qubits 104. Quantum circuit 132 can be configured to generate the random state vectors $|v_l\rangle$. Quantum circuit 136 can be configured to determine the i-th moments $\mu_l^{(i)}$ of input matrix A using the following representation:

$$\mu_l^{(i)} = \langle v_l | A^i | v_l \rangle$$

The i-th moments $\mu_l^{(i)}$ of input matrix A can based on the i-th power of input matrix A (e.g., $A^i$). Quantum circuit 136 can determine a plurality of moments $\mu_l^{(i)}$, denoted as moments 138, for a plurality of given values of i and l. Interface 108 can estimate or measure outputs of quantum circuit 136 to readout the plurality of moments 138.

In one embodiment, quantum circuit 134 can be an application specific quantum circuit that can be inserted between quantum circuits 132, 136. For example, system 190 is being implemented for Betti number determination in TDA applications, and quantum circuit 134 can be inserted for generating a Laplacian $\Delta_k$ based on random state vectors $|v_l\rangle$, and the Laplacian $\Delta_k$ can be assigned as the input matrix 114 (e.g., A=$\Delta_k$).

Quantum system 101 can send the moments 138 to classical computer 102. Classical computer 102 can average the moments 138 over the $n_v$ samples to estimate a trace of the input matrix A:

$$\text{trace}(A) \approx \frac{1}{n_v} \sum_{l=1}^{n_v} \langle v_l | A | v_l \rangle$$

For a given matrix function of the given matrix A, such as f(A), where f(•) is known and/or available, classical computer 102 can estimate a trace 142 of the matrix function f(A) as follows:

$$\text{trace}(f(A)) \approx \frac{1}{n_v} \sum_{l=1}^{n_v} \langle v_l | f(A) | v_l \rangle$$

If the function f(•) is unknown and/or unavailable, then classical computer 102 can estimate the trace 142 of the matrix function trace(f(A)) based on an approximation of the function f(•) implemented by quantum system 101. Classical computer 102 can be configured to generate a set of moments 140, denoted as $\theta_l^{(j)}$, using the moments 138 determined by quantum system 101. Each j-th moment $\theta_l^{(j)}$ can be based one or more i-th moments $\mu_l^{(i)}$. Classical computer 102 can use the moments 140 to determine or estimate trace($f(A)$) without knowing the function $f(\cdot)$.

In an aspect, an eigendecomposition of the Hermitian matrix A can be given as $A = U \Lambda U^T$ and the matrix function can be defined as $f(A) = U f(\Lambda) U^T$, where U can be a square n×n matrix whose i-th column is an i-th eigenvector of A and $\Lambda$ can be a diagonal matrix whose diagonal elements are the corresponding eigenvalues, such as $\Lambda_{ii}$=i-th eigenvalue of A. Based on the eigendecomposition of Hermitian matrices, if moments 138 $\mu_l^{(i)} = \langle v_l | A^i | v_l \rangle$, then the set of moments 140 can be expressed as:

$$\theta_l^{(j)} = \langle v_l | T_j(A) | v_l \rangle$$

where i=0, ..., j, and $T_j(\cdot)$ is the j-th degree Chebyshev polynomial. The moments $\theta_l^{(j)}$ can be a set of polynomials that approximates a Chebyshev function (e.g., $\theta_l^{(j)}$ can be Chebyshev polynomials). The estimation of moments $\theta_l^{(j)}$ using the above expression can be considered as using the j-th degree Chebyshev polynomial $T_j(\cdot)$ to estimate the function $f(\cdot)$ in situations where $f(\cdot)$ is unknown. In one embodiment, the moments $\theta_l^{(j)}$ can be polynomials corresponding to the j-th degree Chebyshev polynomial $T_j(A)$. By using classical computer 102 to determine moments 140 and using quantum system 101 to determine the moments 138, significant quantum speedup can be achieved. Further, the circuit and computational complexities of the quantum circuits discussed herein can be NISQ implementable if there is efficient implementation of input matrix A.

Figure 31:
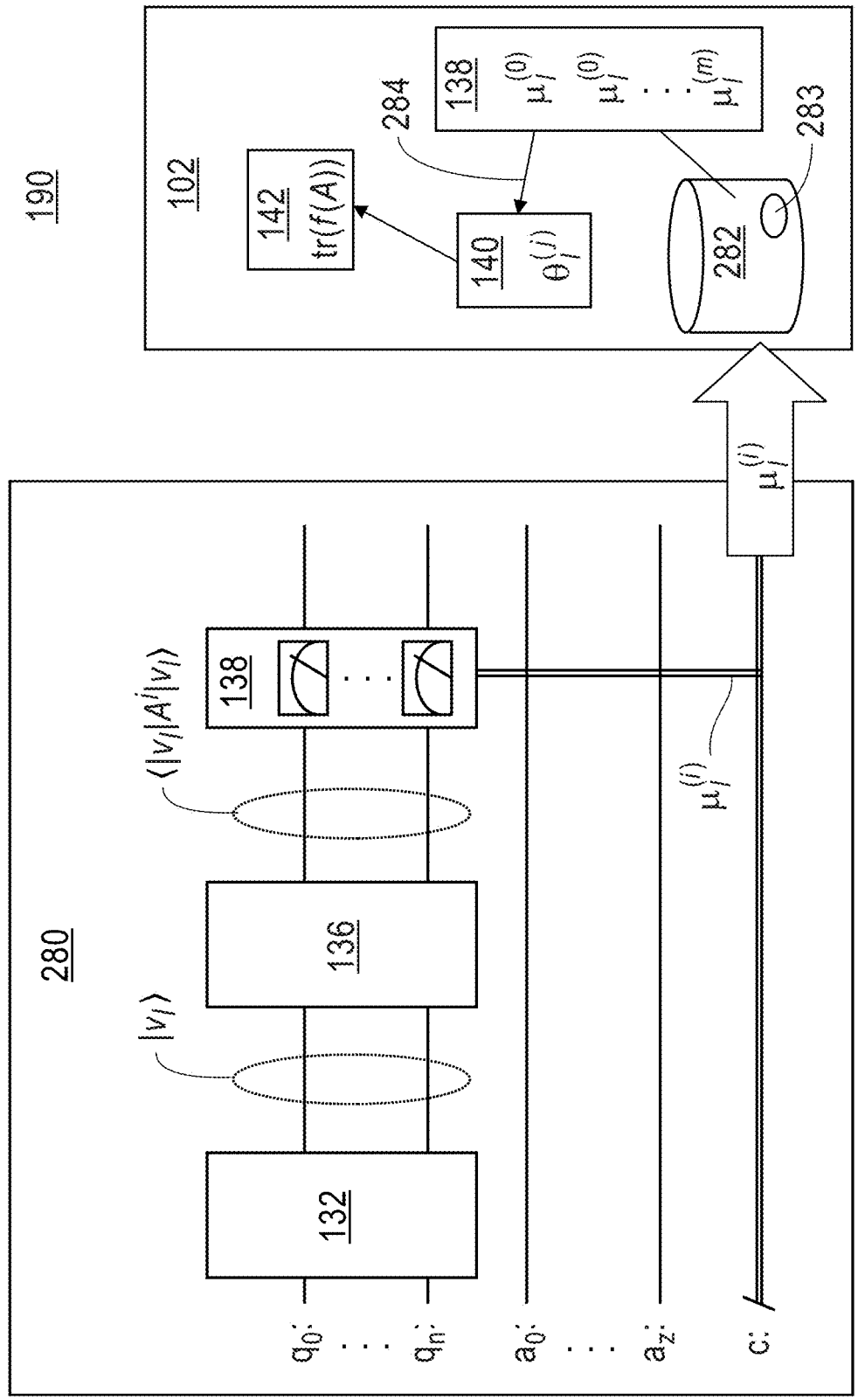
FIG. 31 is a diagram illustrating an example quantum circuit that can be implemented as a quantum circuit for estimating matrix spectral sums in one embodiment.

FIG. 31 is a diagram illustrating an example quantum circuit 280 that can be implemented as a quantum circuit for estimating matrix spectral sums in one embodiment. Quantum circuit 280 can be formed by at least quantum circuits 132, 136 and interface 108 as shown in FIG. 30. In one embodiment, quantum circuit 280 can receive input matrix 114 from classical system 101 (see FIG. 30). In embodiments, quantum circuit 280 is implemented f or TDA applications, and quantum circuit 134 (see FIG. 30) can be inserted between quantum circuits 132, 136 for generating the Laplacian $\Delta_k$ of dataset 110 instead of using input matrix A as input matrix 114. Quantum circuit 280 can operate on n qubits (e.g., $q_0, \ldots q_n$) and/or z ancilla qubits (e.g., $a_0, \ldots a_z$). Quantum circuit 280 can be implemented to estimate a trace of the input matrix A. Quantum circuit 132 can be a relatively short-depth circuit configured to generate random state vectors $|v_l\rangle$. The n qubits can be initialized to state $|0\rangle$, and can be assigned to hold or represent elements of a vector with n elements. Quantum circuit 136 can be configured to determine the i-th moments $\mu_l^{(i)}$ of input matrix A for a plurality of given values of i and l. Interface 108 can estimate or measure outputs of quantum circuit 136 to readout the moments $\mu_l^{(i)}$. Quantum system 101 can send the moments $\mu_l^{(i)}$ to classical computer 102.

In one embodiment, classical computer 102 can receive the moments $\mu_l^{(i)}$ and store the moments $\mu_l^{(i)}$ in a memory device 282. Memory device 282 can be, for example, a volatile or a nonvolatile memory device of classical computer 102. In one embodiment, quantum circuit 280 can determine m+1 moments from $\mu_l^{(0)}$ to $\mu_l^{(m)}$, and classical computer 102 can store the m+1 moments 138 in memory device 202. In one embodiment, a set of instructions 283 can be stored in memory device 282, where instructions 283 can be executable code that can be run by a processor of classical computer 102. Instructions 283 can be instructions for generating moments 140 denoted as $\theta_l^{(j)}$, and instructions 283 can include program code that implements the following expression:

$$T_j(x) \approx \sum_{i=0}^{\frac{j}{2}} (-1)^i 2^{j-(2i+1)} g(j, i) x^{j-2i}$$

where $g(j, i) = \dfrac{\binom{2i}{i}\binom{j}{2i}}{\binom{j-1}{i}}$

In one embodiment, moments 140 can correspond to $T_j(x)$ and classical computer 102 can determine moments 140 using a relationship (that can be part of instructions 283) between moments $\theta_l^{(j)}$ and $T_j(x)$, denoted as $\theta_l^{(j)} = \langle v_l | T_j(A) | v_l \rangle = T_j(u_l)$. An implementation of the relationship between $\theta_l^{(j)}$ and $T_j(x)$, for j=0, 1, 2, results in $\theta_l^{(0)} = \mu_l^{(0)}$, $\theta_l^{(1)} = \mu_l^{(1)}$, and $\theta_l^{(2)} = 2\mu_l^{(2)} - \mu_l^{(0)}$. Further, classical computer 102 can select one or more moments, denoted as selected moments 284, among moments 138 stored in memory device 282 based on the relationship between $\theta_l^{(j)}$ and $T_j(x)$. For example, in response to $\theta_l^{(2)} = 2\mu_l^{(2)} - \mu_l^{(0)}$, classical computer 102 can select moments $\mu_l^{(2)}$ and $\mu_l^{(0)}$, and extract $\mu_l^{(2)}$ and $\mu_l^{(0)}$ from memory device 282, to determine $\theta_l^{(2)}$. The set of moments $\theta_l^{(j)}$ determined based on Chebyshev polynomials $T_j(\cdot)$ are Chebyshev moments.

In one embodiment the function $f(\cdot)$ can be approximately expanded using a m-degree Chebyshev polynomial approximation, resulting in an approximated function $f(\cdot)$:

$$f(A) \approx \sum_{j=0}^{m} c_j T_j(A)$$

where $T_j(\cdot)$ is the j-th degree Chebyshev polynomial. Based on this expansion approximation, classical computer 102 can estimate the trace of the matrix function trace($f(A)$) as follows:

$$\text{trace}(f(A)) \approx \frac{1}{n_v} \sum_{l=1}^{n_v} \left[ \sum_{j=0}^{m} c_j \langle v_l | T_j(A) | v_l \rangle \right] = \frac{1}{n_v} \sum_{l=1}^{n_v} \sum_{j=0}^{m} c_j \theta_l^{(j)}$$

where $c_j$ denotes interpolation or expansion coefficients. The expansion coefficients $c_j$ can vary depending on the function being approximated by the Chebyshev polynomials $T_j(\cdot)$. In general, the expansion coefficients $c_j$ can be represented by the following expressions:

$$c_j = \frac{2 - \delta_{j0}}{\pi} \int_{-1}^{1} \frac{f(x) T_j(x)}{\sqrt{1-x^2}} dx$$

or $$c_j = \frac{2 - \delta_{j0}}{m+1} \sum_{k=0}^{m} f(x_k) T_j(x_k)$$

where $x_k$ denote Chebyshev nodes $$x_k = \cos\left(\frac{\pi(k+1)/2}{m+1}\right).$$

In embodiments, where system 190 is being implemented for rank estimation (e.g., rank(f(x)), f(x) can be a step function h(•) that takes a value 1 in the interval [a, b] and 0 elsewhere, and the expansion coefficients $c_j$ can be denoted as:

$$c_j = \begin{cases} \frac{1}{\pi}(\cos^{-1}(a) - \cos^{-1}(b)): & j = 0 \\ \frac{2}{\pi}\left(\frac{\sin(j\cos^{-1}(a)) - \sin(j\cos^{-1}(b))}{j}\right): & j > 0 \end{cases}$$

Based on the determination of $c_j$ and moments $\theta_l^{(j)}$, classical computer 102 can estimate trace (f(A)) without entries and/or eigenvalues of A being available.

Figure 32:
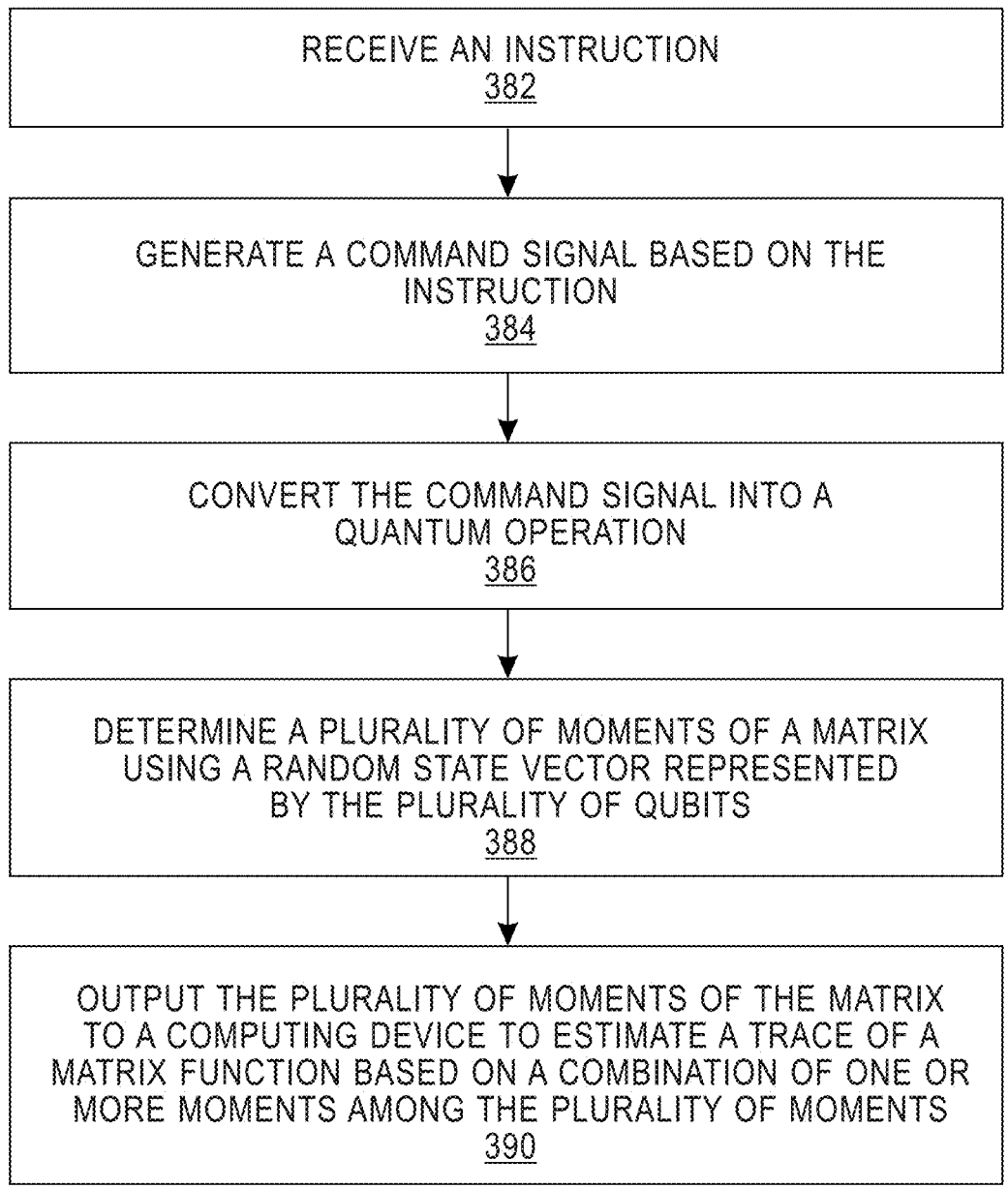
FIG. 32 is a flowchart of an example process that may implement a quantum circuit for estimating matrix spectral sums according to an embodiment of the disclosure.

FIG. 32 is a flowchart of an example process 380 that may implement a quantum circuit for estimating matrix spectral sums according to an embodiment of the disclosure. Example process 380 may include one or more operations, actions, or functions as illustrated by one or more of blocks 382, 384, 386, 388, and/or 390. Although illustrated as discrete blocks, various blocks can be divided into additional blocks, combined into fewer blocks, eliminated, performed in different order, or performed in parallel, depending on the desired implementation.

Process 380 can be implemented for operating a quantum system to estimate a trace of a matrix function. Process 380 can begin at block 382. At block 382, a controller of a quantum system can receive an instruction. Process 380 can proceed from block 382 to block 384. At block 384, the controller of the quantum system can generate a command signal based on the instruction. Process 380 can proceed from block 384 to block 386. At block 386, an interface of the quantum system can convert the command signal into a quantum operation. Process 380 can proceed from block 386 to block 388. At block 388, an interface of the quantum system can, based on the quantum operation, control quantum hardware of the quantum system to determine a plurality of moments of a matrix using a random state vector represented by the plurality of qubits. In one embodiment, the matrix can be a Hermitian matrix. In one embodiment, the random state vector can include a specific number of independent entries. Process 380 can proceed from block 388 to block 390. At block 390, the controller of the quantum system can output the plurality of moments of the matrix to a computing device to estimate a trace of a matrix function based on one or more selected moments among the plurality of moments, wherein the matrix function is a function of the matrix.

Process 380 can proceed from block 384 to block 386. At block 386, the quantum circuit of the computing device can send the plurality of moments of the matrix to a processor to estimate a trace of a matrix function. The matrix function can be a function of the matrix. In one embodiment, the trace of the matrix function can be based on a set of polynomials determined based on the plurality of moments. The set of polynomials can be Chebyshev polynomials. In one embodiment, the set of polynomials can be determined based on a subset of the plurality of moments. In one embodiment, the matrix can correspond to a combinatorial Laplacian of simplices of a specific order in a simplicial complex. A determination of Betti numbers of the simplicial complex can be based on the estimated trace of the matrix function. In one embodiment, the processor can be a classical computer.

Figure 35:
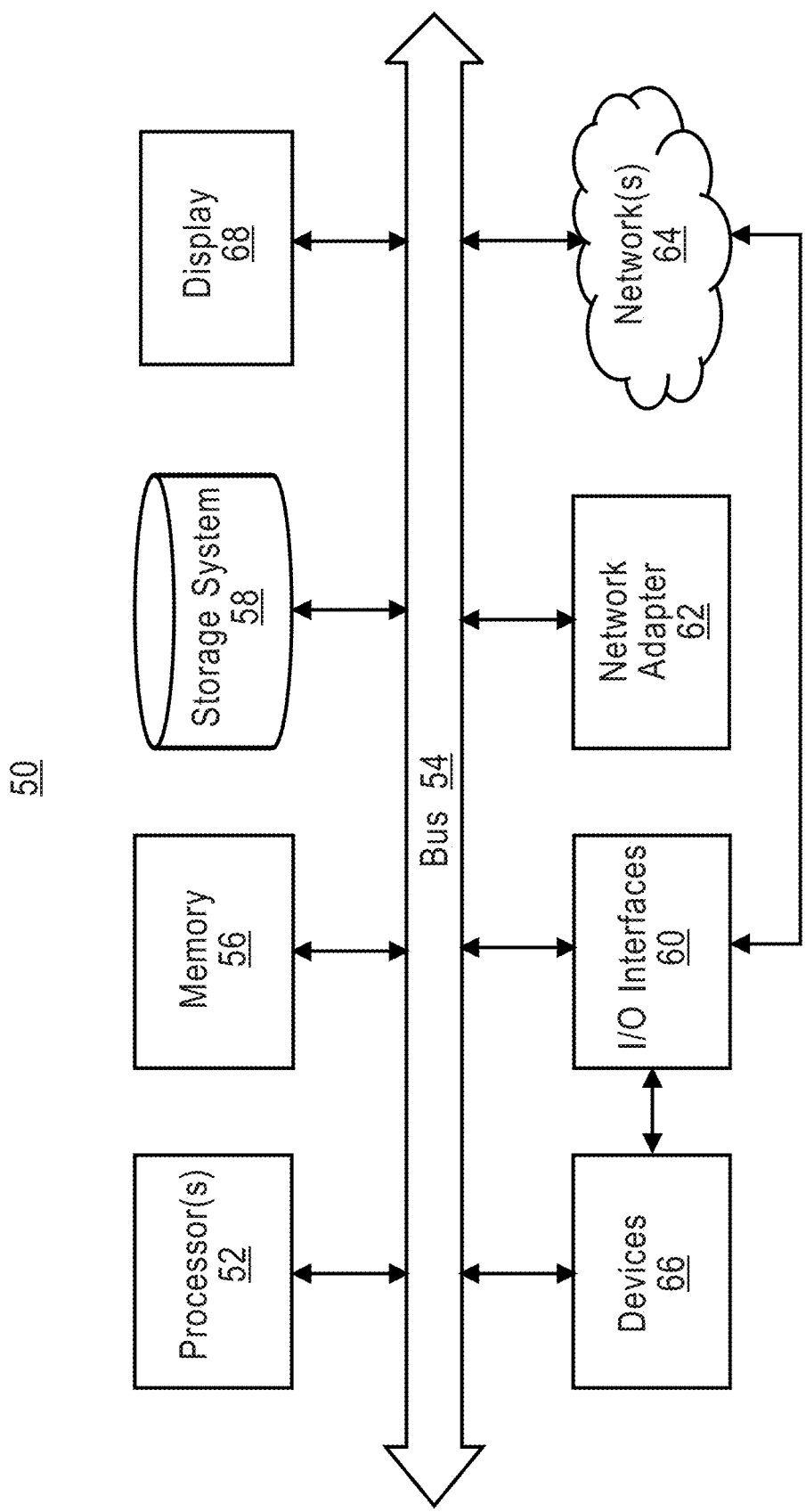
FIG. 35 illustrates a schematic of an example computer or processing system that may implement NISQ-QTDA analysis in one embodiment of the present disclosure.

FIG. 35 illustrates a schematic of an example computer or processing system 50 that may implement a quantum circuit for performing a NISQ-QTDA analysis that includes: the simulating of a boundary operator, the pairwise testing, the transformation of mixed state vectors, the estimating matrix spectral sums, and the matrix trace estimation in one embodiment. The computer system 50 is an example of a suitable processing system and is not intended to suggest any limitation as to the scope of use or functionality of embodiments of the methodology described herein. The computer system 50 shown may be operational with numerous other general-purpose or special purpose computing system environments or configurations. Examples of well-known computing systems, environments, and/or configurations that may be suitable for use with the processing system shown in FIG. 35 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, quantum computing systems, hybrid systems including quantum computers and classical computers, and distributed cloud computing environments that include any of the above systems or devices, and the like. Classical computers among computer system 10 can execute classical computing processes by performing operations based on information encoded in bits. Quantum computers among computer system 50 can execute quantum computing processes by performing operations based on information encoded in qubits.

The computer system 50 may be described in the general context of computer system executable instructions, such as program modules, being implemented by a computer system. Generally, program modules may include routines, programs, objects, components, logic, data structures, and so on that perform particular tasks or implement particular abstract data types. The computer system 50 may be practiced in distributed cloud computing environments where tasks are performed by remote processing devices that are linked through a communications network. In a distributed cloud computing environment, program modules may be located in both local and remote computer system storage media including memory storage devices.

The components of computer system 50 may include, but are not limited to, one or more processors or processing units 52, a system memory 56, a bus 54, storage system(s) 58, I/O interface(s) 60, network adapter(s) 62, network 64, devices 66, and display(s) 68. Bus 54 may couple various components of computer system 50. The processor 52 may include modules (e.g., programming modules) that performs the methods described herein. The modules among processor 52 may be programmed into the integrated circuits of the processor 52, or loaded from memory 56, storage device 58, or network 64 or combinations thereof. Processor 52 can be, for example, a microprocessor, a microcontroller, a processor core, a multicore processor, central processing unit (CPU) of computing devices such as a classical computer and/or quantum computers, and/or other types of computer processing element.

Bus 54 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Universal Serial Bus (USB), Video Electronics Standards Association (VESA) local bus, and Peripheral Component Interconnects (PCI) bus.

Computer system 50 may include a variety of computer system readable media. Such media may be any available media that is accessible by computer system, and it may include both volatile and non-volatile media, removable and non-removable media.

System memory 56 can include computer system readable media in the form of volatile memory, such as random access memory (RAM) and/or cache memory or others. Computer system may further include other removable/non-removable, volatile/non-volatile computer system storage media. By way of example, storage system 58 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 54 by one or more data media interfaces.

Computer system 50 may also communicate with one or more external devices 66 such as a keyboard, a pointing device, a display 68, network card, modem, etc. that enable a user to interact with computer system and/or that enable computer system 50 to communicate with one or more other computing devices. Devices 66 can be connected to components among computer system 50 via bus 54 and/or input/output (I/O) interfaces 60.

Computer system 50 can communicate with one or more networks 64 such as a local area network (LAN), a general wide area network (WAN), and/or a public network (e.g., the Internet) via network adapter 62 and/or I/O interfaces 60. Computer system 50 can communicate with networks 64 through wired connections (e.g., wires or cables connected to bus 54) or wireless connections (e.g., through network cards among I/O devices 60 and/or network adapter 62). Network adapter 62 can communicate with the other components of computer system 50 via bus 54. It should be understood that although not shown, other hardware and/or software components could be used in conjunction with computer system 50. Examples include, but are not limited to: field-programmable gate array (FPGA), system on chip (SoC), microcode, device drivers, redundant processing units, external disk drive arrays, RAID systems, tape drives, and data archival storage systems, etc.

Figure 36:
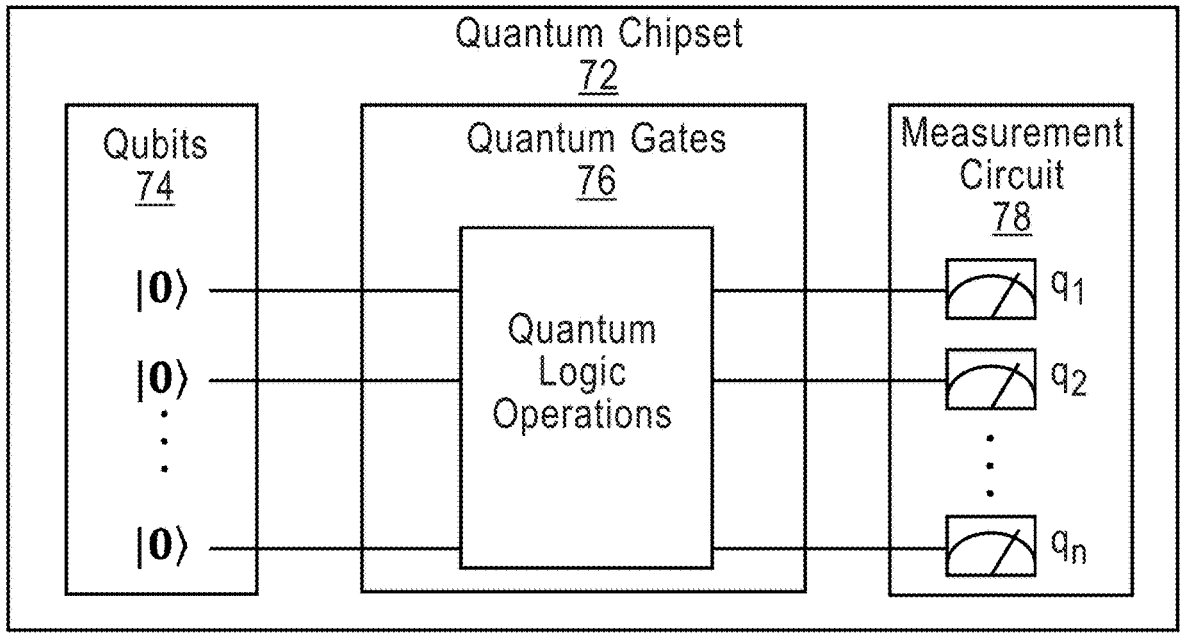
FIG. 36 illustrates a schematic of an example quantum computing system that may implement NISQ-QTDA analysis in one embodiment of the present disclosure.

FIG. 36 illustrates a schematic of an example quantum computing system 70 that may implement quantum circuits for performing a NISQ-QTDA analysis that includes: the simulating of a boundary operator, the pairwise testing, the transformation of mixed state vectors, the estimating matrix spectral sums, and the matrix trace estimation, in embodiments. Quantum computing system 70 can be implemented by a quantum computer among processor 52 shown in FIG. 35, or coupled to network 64 shown in FIG. 35. Quantum computing system 70 can include a quantum chipset 72. Quantum chipset 72 can include one or more components configured to operate on a plurality of qubits 74. In an aspect, qubits 74 can be arranged in a two-dimensional or three-dimensional array, such as being arranged in a lattice structure. A two-dimensional qubit array can be formed on a surface of a two-dimensional wafer, and the qubits 74 can be arranged in a two-dimensional lattice structure and configured to communicate with one another. A three-dimensional device array can be formed by a stack of two-dimensional wafers, and qubits 74 can be arranged in a three-dimensional lattice structure and configured to communicate with one another via connections between the two-dimensional wafers.

Quantum chipset 72 can be a quantum computing core surrounded by an infrastructure to shield quantum chipset 72 from sources of electromagnetic noise, mechanical vibration, heat, and other sources of noise, which tend to degrade performance. Magnetic shielding can be used to shield the system components from stray magnetic fields, optical shielding can be used to shield the system components from optical noise, thermal shielding and cryogenic equipment can be used to maintain the system components at controlled temperature, etc. For example, an infrastructure that can surround quantum chipset 72 can be a refrigerator that can cool the quantum chipset to an operating temperature of quantum chipset 72.

The plurality of qubits 74 can be denoted as $q_1, q_2, \ldots, q_n$. Quantum chipset 72 can operate by performing quantum logic operations (e.g., using quantum gates 76) on qubits 74. Quantum gates 76 can include one or more single-qubit gates and/or two-qubit gates. Quantum circuits can be formed based on quantum gates 76, and quantum chipset 72 can operate the quantum circuits to perform quantum logic operations on single qubits or conditional quantum logic operations on multiple qubits. Conditional quantum logic can be performed in a manner that entangles the qubits. Control signals can be received by quantum chipset 72, and quantum chipset 72 can use the received control signals to manipulate the quantum states of individual qubits and the joint states of multiple qubits.

Measurement circuit 78 can include circuit components configured to measure a basis of qubits 74, where the basis is a measurement that will yield a classical bit result. Each measurement performed by measurement circuit 78 can be read out to a device (e.g., a classical computer) connected to quantum computing system 70. A plurality of measurement results provided by measurement circuit 78 can result in a probabilistic outcome.

Figure 37:
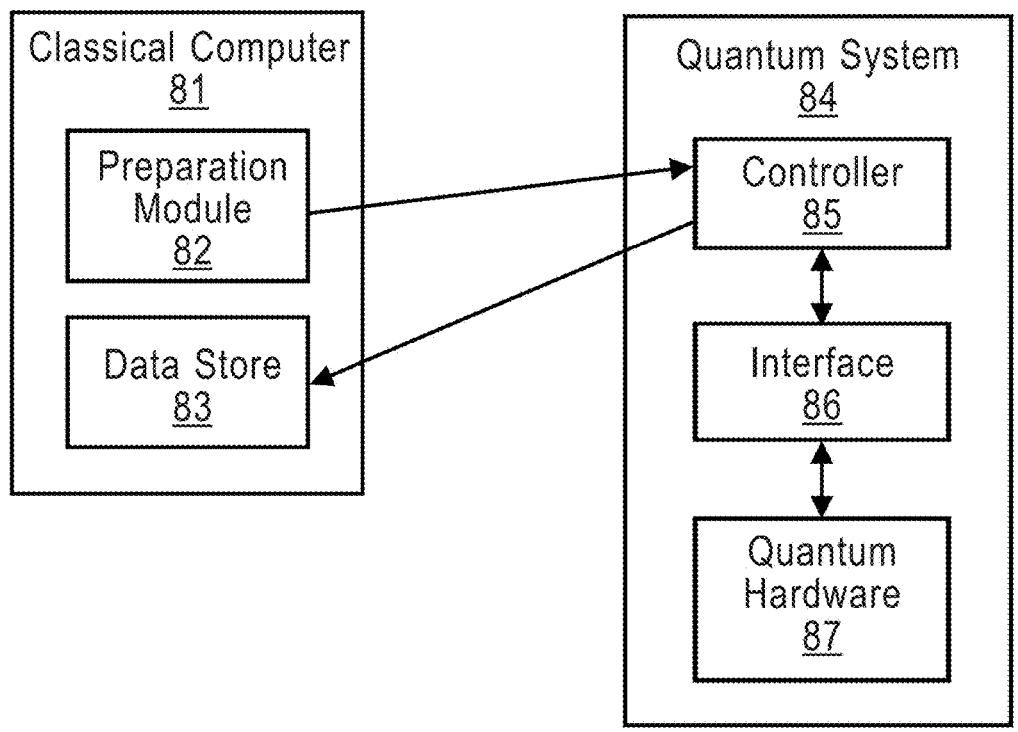
FIG. 37 illustrates a schematic of an example hybrid computing system that may implement NISQ-QTDA analysis in one embodiment of the present disclosure.

FIG. 37 illustrates a block diagram of an example system 80 that can facilitate execution of a quantum algorithm. As shown, a classical computer 81 can be electronically integrated, via any suitable wired and/or wireless electronic connection, with a quantum system 84. The quantum system 84 can be any suitable set of components capable of performing quantum operations on a physical system. In the example embodiment depicted in FIG. 37, quantum system 84 can include controller 85 (e.g., a local classical controller), an interface 86 (e.g., a classical-quantum interface), and quantum hardware 87. In some embodiments, all or part of each of the controller 85, the interface 86, and quantum hardware 87 may be located in a cryogenic environment to aid in the performance of the quantum operations.

Controller 85 may be any combination of digital computing devices capable of performing a quantum computation, such as executing a quantum circuit, in combination with interface 86. Such digital computing devices may include digital processors and memory for storing and executing quantum commands using interface 86. Additionally, such digital computing devices may include devices having communication protocols for receiving such commands and sending results of the performed quantum computations to classical computer 81. Additionally, the digital computing devices may include communications interfaces with the interface 86. Controller 85 can be configured to receive classical instructions (e.g., from classical computer 81) and convert the classical instructions into drive signals. The drive signals can be used for driving or manipulating qubits and/or quantum gates and/or circuits among quantum hardware 87.

Interface 86 may be a combination of devices capable of receiving command signals from controller 85 and converting those signals into quantum operations for execution on the quantum hardware 87. Additionally, interface 86 may be capable of converting signals received from the quantum hardware 87 into digital signals capable of processing and transmitting by controller 85. Devices included in interface 86 may include, but are not limited to, digital-to-analog converters, analog-to-digital converters, waveform generators, attenuators, amplifiers, optical fibers, lasers, and filters.

Quantum hardware 87 may be any hardware capable of using quantum states to process information. Such hardware may include a collection of qubits, and mechanisms to couple/entangle such qubits, in order to process information using said quantum states. Such qubits may include, but are not limited to, charge qubits, flux qubits, phase qubits, spin qubits, and trapped ion qubits.

The classical computer 81 can be any suitable combination of computer-executable hardware and/or computer-executable software capable of executing a preparation module 82 to perform quantum computations with data contained in a data store 83 as part of building and implementing a machine learning protocol. Data store 83 may be a repository for data to be analyzed using a quantum computing algorithm, as well as the results of such analysis. In an example system, classical computer 81 can be a laptop computer, a desktop computer, a vehicle-integrated computer, a smart mobile device, a tablet device, and/or any other suitable classical computing device. Additionally or alternatively, classical computer 81 may also operate as part of a cloud computing service model, such as Software as a Service (SaaS), Platform as a Service (PaaS), or Infrastructure as a Service (IaaS). Classical computer 81 may also be located in a cloud computing deployment model, such as a private cloud, community cloud, public cloud, or hybrid cloud. Aspects of this embodiment are described in more detail below with reference to FIG. 38 and FIG. 39.

Preparation module 82 may be a program or module capable of preparing classical data from data store 83 to be analyzed as part of the implementation of a quantum circuit. Preparation module 82 may be instantiated as part of a larger algorithm, such as a function call of an application programming interface (API) or by parsing a hybrid classical-quantum computation into aspects for quantum and classical calculation. Preparation module 82 may generate instructions for creating a quantum circuit using quantum gates in quantum hardware 87. In an embodiment, such instructions may be stored by controller 81, and may instantiate the execution of the components of interface 86 so that the quantum operations of the quantum gates may be executed on quantum hardware 87.

Figure 38:
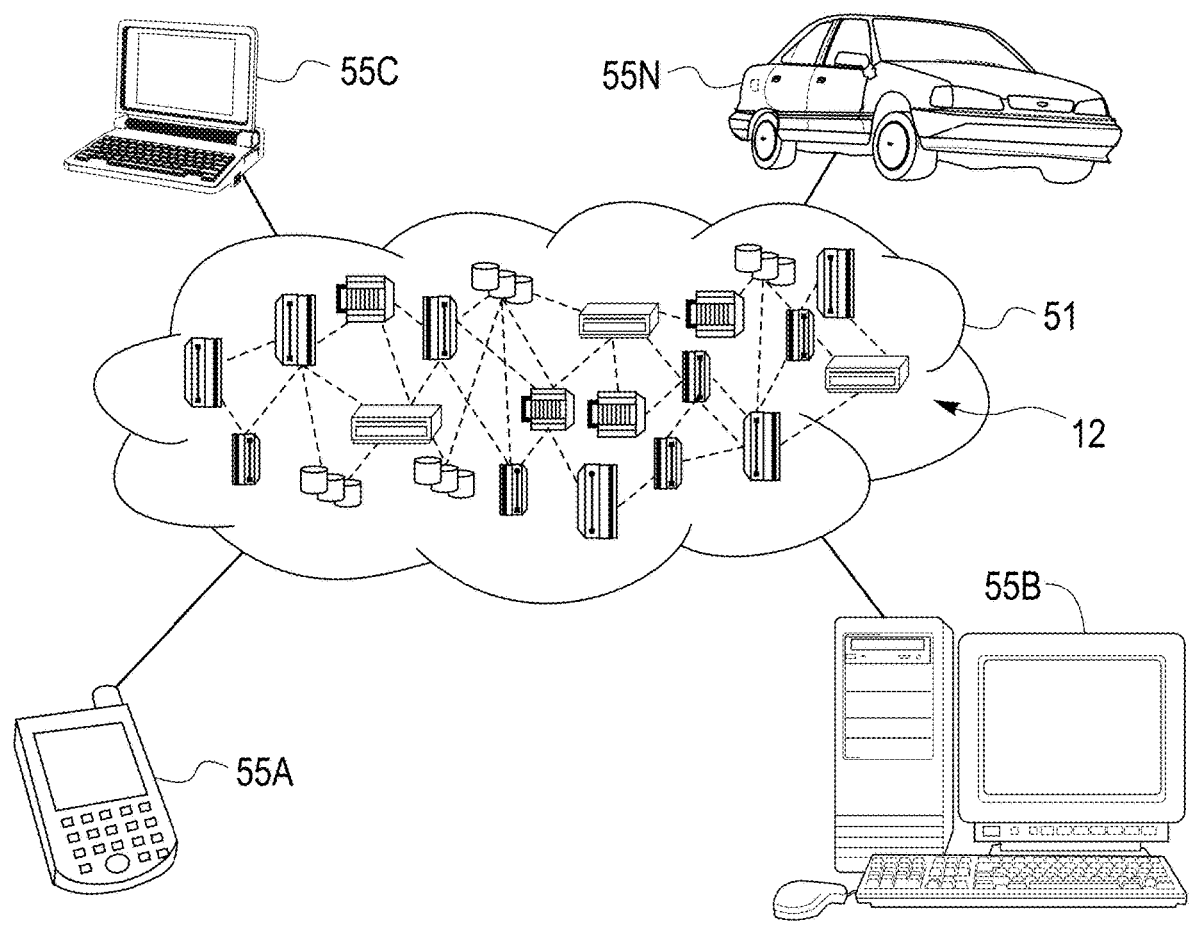
FIG. 38 depicts a cloud computing environment according to an embodiment of the present invention.

FIG. 38 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 38, illustrative cloud computing environment 51 is depicted. As shown, cloud computing environment 51 includes one or more cloud computing nodes 12 with which local computing devices used by cloud consumers, such as, for example, personal digital assistant (PDA) or cellular telephone 55A, desktop computer 55B, laptop computer 55C, and/or automobile computer system 55N may communicate. Nodes 12 may communicate with one another. They may be grouped (not shown) physically or virtually, in one or more networks, such as Private, Community, Public, or Hybrid clouds as described hereinabove, or a combination thereof. This allows cloud computing environment 51 to offer infrastructure, platforms and/or software as services for which a cloud consumer does not need to maintain resources on a local computing device. It is understood that the types of computing devices 55A-N shown in FIG. 38 are intended to be illustrative only and that computing nodes 12 and cloud computing environment 51 can communicate with any type of computerized device over any type of network and/or network addressable connection (e.g., using a web browser).

Figure 39:
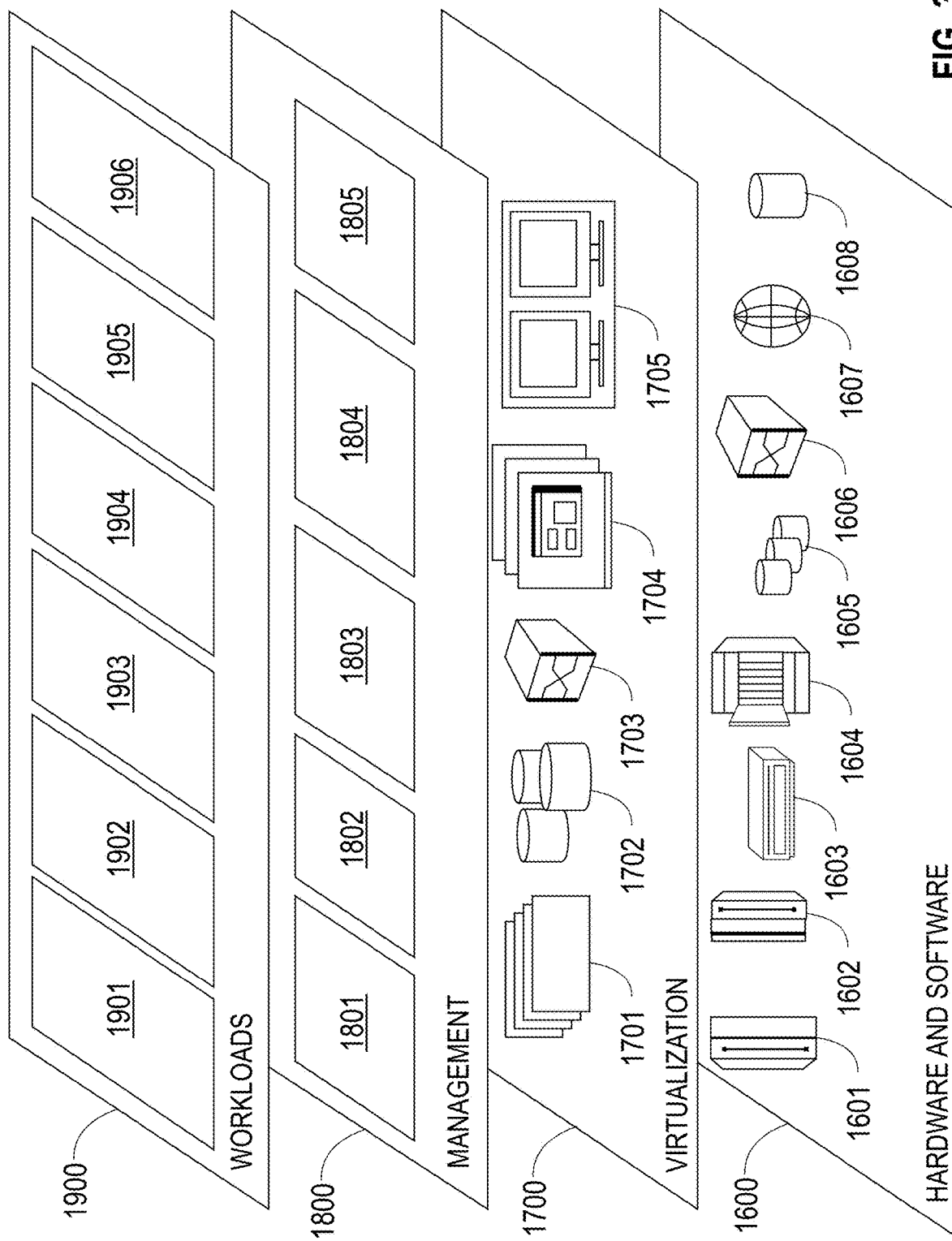
FIG. 39 depicts abstraction model layers according to an embodiment of the present invention.

FIG. 39 depicts abstraction model layers according to an embodiment of the present invention. Referring now to FIG. 39, a set of functional abstraction layers provided by cloud computing environment 51 (FIG. 38) is shown. It should be understood in advance that the components, layers, and functions shown in FIG. 39 are intended to be illustrative only and embodiments of the invention are not limited thereto. As depicted, the following layers and corresponding functions are provided:

Hardware and software layer 1600 includes hardware and software components. Examples of hardware components include: mainframes 1601; RISC (Reduced Instruction Set Computer) architecture based servers 1602; servers 16003; blade servers 1604; storage devices 1605; and networks and networking components 1606. In some embodiments, software components include network application server software 67 and database software 68.

Virtualization layer 1700 provides an abstraction layer from which the following examples of virtual entities may be provided: virtual servers 1701; virtual storage 1702; virtual networks 1703, including virtual private networks; virtual applications and operating systems 1704; and virtual clients 1705.

In one example, management layer 1800 may provide the functions described below. Resource provisioning 1801 provides dynamic procurement of computing resources and other resources that are utilized to perform tasks within the cloud computing environment. Metering and Pricing 1802 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1803 provides access to the cloud computing environment for consumers and system administrators. Service level management 1804 provides cloud computing resource allocation and management such that required service levels are met. Service Level Agreement (SLA) planning and fulfillment 1805 provide pre-arrangement for, and procurement of, cloud computing resources for which a future requirement is anticipated in accordance with an SLA.

Workloads layer 1900 provides examples of functionality for which the cloud computing environment may be utilized. Examples of workloads and functions which may be provided from this layer include: mapping and navigation 1901; software development and lifecycle management 1902; virtual classroom education delivery 1903; data analytics processing 1904; transaction processing 1905; and topological domain analysis 1906.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following description is made for illustrating the general principles of the invention and is not meant to limit the inventive concepts claimed herein. In the following detailed description, numerous details are set forth in order to provide an understanding of the system, platform, computer program product, method, and/or techniques for optimizing a pipeline for detecting suspicious activity, however, it will be understood by those skilled in the art that different and numerous embodiments of the system, platform, computer program product and/or their method of operation may be practiced without those specific details, and the claims and disclosure should not be limited to the arrangements, structures, systems, assemblies, subassemblies, platforms, modules, functional units, circuitry, embodiments, features, aspects, instructions, programming, processes, methods, techniques, and/or details specifically described and shown herein. Further, particular features, aspects, arrangements, structures, systems, assemblies, subassemblies, platforms, modules, functional units, circuitry, embodiments, instructions, programming, processes, methods, techniques, details, etc. described herein can be used in combination with other described features, aspects, arrangements, structures, systems, assemblies, subassemblies, platforms, modules, functional units, circuitry, embodiments, instructions, programming, processes, methods, techniques, details, etc. in each of the various possible combinations and permutations.

What is claimed is:

1. A system for topological domain analysis comprising:
a controller configured to generate command signals;
quantum hardware including a plurality of qubits encoding an input dataset comprising a plurality of data points, a topology of the dataset is represented by a simplicial complex;
an interface connected to the controller and the quantum hardware, the interface being configured to control the quantum hardware based on the command signals to implement a first quantum circuit configured to simulate a boundary map operator that creates a mapping of boundaries of a given graph having at least nodes and edges formed using said input dataset, the quantum circuit having linear depth relative to number of nodes in the given graph;
the interface being configured to further control the quantum hardware to implement a second quantum circuit configured to simulate a combinatorial Laplacian of simplices of a specific order in the simplicial complex based on the simplicial complex and boundary map operator; and
a hardware processor configured to estimate Betti numbers by computing a stochastic rank estimation of the combinatorial Laplacian and obtain one or more features of said input dataset based on a Betti number estimate.

2. The system of claim 1, wherein a number of quantum gates in the quantum hardware has a linear relationship with the number of vertices in the given graph.

3. The system of claim 1, wherein the boundary operator is represented in terms of a sum of Pauli spin operators, and wherein fermionic creation and annihilation operators are mapped to the Pauli spin operators.

4. The system as claimed in claim 1, further comprising:
further quantum hardware for generating a first projector onto all simplices using quantum sampling and control-based projection, said combinatorial Laplacian of simplices simulated by an interleaving of the first projector with said boundary operator, said system further comprising:
a further controller configured to generate a command signal;
a further interface connected to the controller and the further quantum hardware, the further interface being configured to control the further quantum hardware based on the command signal received from the further controller to perform pairwise checking for every pair of data points in a dataset to identify a property relating to the data points.

5. The system of claim 4, wherein:
the plurality of datapoints of said dataset comprises n data points;

the further quantum hardware is configured to:
perform n−1 iterations of pairwise checking; and
perform pairwise checking on n/2 pairs of data points in each iteration of pairwise checking.

6. The system of claim 5, wherein for each iteration of pairwise checking, the n/2 pairs of data points that undergo the pairwise checking is selected using a cyclic shift technique, and the n/2 pairs of data points are checked in parallel.

7. The system of claim 4, further comprising:
another quantum hardware for generating a second projector onto all k-simplices of the simplicial complex using quantum sampling and control-based projection, wherein said another quantum hardware comprises:
a plurality of qubits including a first set of qubits and a second set of qubits, wherein the first set of qubits represents elements of an input vector having mixed states with different Hamming weights, and the second set of qubits represent a count of nonzero elements in the input vector;
the further interface being configured to control the another quantum hardware to:
sample the input vector;
entangle the first set of qubits to the second set of qubits; and
generate an output vector based on the entanglement of the first set of qubits to the second set of qubits, wherein the output vector includes one or more states having a specific Hamming weight.

8. The system as claimed in claim 7, wherein:
the input vector corresponds to a dataset comprising a plurality of data points, and a topology of the dataset is represented by a simplicial complex;
the simplicial complex comprises n vertices;
the first set of qubits comprises n qubits;
the second set of qubits comprises log(n) qubits; and
wherein the output vector projects simplices of an order k on the simplicial complex based on the entanglement of the first set of qubits and the second set of qubits.

9. The system as claimed in claim 1, wherein said further interface is further configured to control the further quantum hardware based on the command signal received from the controller to:
generate a random state vector represented by the plurality of qubits, wherein the random state vector comprises a specific number of independent entries;
use the random state vector to determine moments of a matrix corresponding to a Laplacian of simplices of a specific order in a simplicial complex; and
the further controller being further configured to output the moments of the matrix to the hardware processor to estimate a trace of the matrix using the moments.

10. The system of claim 9, wherein the estimation of Betti numbers of the simplicial complex is based on the estimated trace.

11. The system of claim 10, wherein the third quantum circuit is further configured to:
determine a quantum state that represents an application of the Laplacian to the random state vector; and
determine a norm of the quantum state to determine the moments.

12. The system of claim 9, wherein estimation of the trace comprises averaging the moments over a number of samples used for generating the random state vector.

13. The system of claim 1, wherein said further interface is further configured to control the further quantum hardware based on the command signal received from the controller to:
determine a plurality of moments of a matrix using a random state vector represented by the plurality of qubits, the matrix corresponding to a combinatorial Laplacian of simplices of a specific order in a simplicial complex; and
the further controller being further configured to output the plurality of moments of the matrix to the hardware processor to estimate a trace of a matrix function based on one or more selected moments among the plurality of moments, wherein the matrix function is a function of the matrix.

14. The system of claim 13, wherein the trace of the matrix function is based on a set of polynomials determined based on the plurality of moments, the set of polynomials being a set of Chebyshev polynomials.

15. A method for topological domain analysis using a quantum computing system, said method comprising:
receiving, by a controller of a quantum system, an instruction;
generating, by the controller of the quantum system, a command signal based on the instruction;
converting, by an interface of the quantum system, the command signal into a quantum operation; and based on the quantum operation,
controlling quantum hardware including a plurality of qubits encoding an input dataset comprising a plurality of data points, a topology of the dataset is represented by a simplicial complex, said controlling quantum hardware configuring a first quantum circuit to simulate a boundary map operator that creates a mapping of boundaries of a given graph having at least nodes and edges formed using said input dataset, the first quantum circuit having linear depth relative to number of nodes in the given graph; and
further controlling the quantum hardware to implement a second quantum circuit configured to simulate a combinatorial Laplacian of simplices of a specific order in the simplicial complex based on the simplicial complex and boundary map operator;
estimating Betti numbers by computing, using a hardware processor, a stochastic rank estimation of the combinatorial Laplacian; and
obtaining, using the hardware processor of a computing system, one or more features of said input dataset based on a Betti number estimate.

16. The method for topological domain analysis as claimed in claim 15, wherein said simulating said boundary map operator further comprises: controlling said quantum hardware to represent a boundary operator that maps boundaries of a given graph having at least nodes and edges in terms of Pauli spin operators, the boundary operator decomposed as a sum of the Pauli spin operators; and
constructing on the quantum computing system, a quantum circuit that includes Pauli quantum gates that map to the Pauli spin operators, wherein fermionic creation and annihilation operators are mapped to the Pauli spin operators.

17. The method of claim 15, wherein the simulating of the combinatorial Laplacian of simplices of a specific order in the simplicial complex further comprises:
controlling said quantum hardware to generate a first projector onto all simplices using quantum sampling and control-based projection, said combinatorial Laplacian of simplices simulated by an interleaving of the first projector with said boundary operator;
transform a plurality of qubits into superposition quantum state, wherein the plurality of qubits encodes n data points of a dataset;
entangle n/2 pairs of qubits among the plurality of qubits to n/2 ancilla qubits, wherein the n/2 pairs of qubits include distinct pairs of qubits, and one qubit pair is entangled to one ancilla qubit;
measure outputs from a set of Toffoli gates that entangled the n/2 pairs of qubits to the n/2 ancilla qubits; and
in response to measuring the outputs from the set of Toffoli gates, reset the n/2 ancilla qubits,
wherein the entangling, the measuring, and the resetting is repeated for n−1 iterations.

18. The method of claim 17, further comprising selecting the n/2 pairs for entangling using a cyclic shift technique.

19. The method of claim 15, wherein the simulating of the combinatorial Laplacian of simplices of a specific order in the simplicial complex further comprises:
sampling an input vector having mixed states with different Hamming weights;
entangling a first set of qubits to a second set of qubits, wherein the first set of qubits represents elements of the input vector, and the second set of qubits represent a count of nonzero elements in the input vector; and
generating an output vector based on the entanglement of the first set of qubits to the second set of qubits, wherein the output vector includes one or more states having a specific Hamming weight.

20. The method of claim 19, wherein:
the input vector corresponds to a dataset comprising a plurality of data points, and a topology of the dataset is represented by a simplicial complex;
the simplicial complex comprises n vertices;
the first set of qubits comprises n qubits;
the second set of qubits comprises log(n) qubits; and
the output vector projects simplices of an order k on the simplicial complex based on the entanglement of the first set of qubits and the second set of qubits.

21. The method of claim 15, wherein the computing said stochastic rank estimation of the combinatorial Laplacian comprises:
operating the third quantum circuit to estimate a trace of a matrix representing the combinatorial Laplacian of simplices of a specific order in a simplicial complex, the method comprising:
generating, by a quantum computing system, a random state vector represented by a plurality of qubits, the random state vector comprising a specific number of independent entries;
measuring, by the quantum computing system, the plurality of qubits to determine moments of a matrix using the random state vector; and
estimating, by the quantum computing system, a trace of the matrix using the moments, wherein a determination of Betti numbers of the simplicial complex is based on the estimated trace.

22. The method of claim 15, wherein the computing said stochastic rank estimation of the combinatorial Laplacian comprises:
operating the third quantum circuit to estimate a trace of a matrix function, the method comprising:
generating, by a quantum circuit, a random state vector represented by a plurality of qubits;

measuring, by the quantum circuit, the plurality of qubits to determine a plurality of moments of a matrix using the random state vector; and sending, by the quantum circuit, the plurality of moments of the matrix to a processor to estimate a trace of a matrix function, wherein the matrix function is a function of the matrix.

23. The method of claim 22, wherein the trace of the matrix function is based on a set of polynomials determined based on the plurality of moments, the set of polynomials being Chebyshev polynomials.

24. A computer program product for topological domain analysis using a quantum computing system, the computer program product comprising a computer readable storage medium having program instructions embodied therewith, the program instructions readable by the quantum computing system to cause the one or more quantum processing circuits to:

provide, to a first quantum circuit of the quantum computing system, a plurality of qubits encoding an input dataset comprising a plurality of data points, a topology of the dataset is represented by a simplicial complex;

simulate, using a second quantum circuit, a boundary map operator that creates a mapping of boundaries of a given graph having at least nodes and edges formed using said input dataset, the first quantum circuit having linear depth relative to number of nodes in the given graph simulate, using a third quantum circuit of the quantum computing system, a combinatorial Laplacian of simplices of a specific order in the simplicial complex based on the simplicial complex and boundary map operator;

estimate Betti numbers by computing, using a hardware processor of a computing system, a stochastic rank estimation of the combinatorial Laplacian; and obtaining, using the hardware processor of the computing system, one or more features of said input dataset based on a Betti number estimate.

25. An apparatus comprising:

a controller configured to at least:
  receive an instruction from the first computing device; and
  generate a command signal based on the instruction;
quantum hardware including a plurality of qubits; and
an interface connected to the controller and the quantum hardware, the interface being configured to control the quantum hardware based on the command signal received from the controller to:
apply a first projector onto a simplicial order, the simplicial order being an order in a given simplicial complex representing a topology of a dataset;
apply a second projector onto the given simplicial complex; and
simulate a boundary operator that creates a mapping of simplices of orders in the given simplicial complex, wherein the application of said first projector, said second projector and said boundary operator is interleaved.

* * * * *